United States Patent [19]
Hazama et al.

[11] Patent Number: 5,971,589
[45] Date of Patent: Oct. 26, 1999

[54] APPARATUS AND METHOD FOR MANAGING AND DISTRIBUTING DESIGN AND MANUFACTURING INFORMATION THROUGHOUT A SHEET METAL PRODUCTION FACILITY

[75] Inventors: Kensuke Hazama, Yorba Linda; Kalev Kask, Irvine; Satoshi Sakai, Newport Coast; Moshe Schwalb, Irvine, all of Calif.

[73] Assignee: Amadasoft America, Inc., Lamirada, Calif.

[21] Appl. No.: 08/700,671

[22] Filed: Jul. 31, 1996

Related U.S. Application Data

[60] Provisional application No. 60/016,958, May 6, 1996.
[51] Int. Cl.$^6$ ............... G06F 19/00; G06T 17/00
[52] U.S. Cl. ............... 364/472.01; 364/474.07; 364/474.24
[58] Field of Search ............... 364/468.01, 468.03, 364/468.04, 468.24, 468.25, 472.01, 474.07, 474.24, 512; 345/419, 420, 158

[56] References Cited

U.S. PATENT DOCUMENTS

| | | | |
|---|---|---|---|
| 4,912,644 | 3/1990 | Aoyama et al. | 364/468.04 |
| 5,029,462 | 7/1991 | Wakahara et al. | 72/379.2 |
| 5,089,970 | 2/1992 | Lee et al. | 364/468 |
| 5,115,400 | 5/1992 | Watanabe et al. | 364/474.24 |
| 5,237,647 | 8/1993 | Roberts et al. | 395/119 |
| 5,276,606 | 1/1994 | Mizukami et al. | 364/191 |
| 5,297,054 | 3/1994 | Kienzle et al. | 364/474.24 |
| 5,307,282 | 4/1994 | Conradson et al. | 364/468.04 |
| 5,315,522 | 5/1994 | Kauffman et al. | 364/474.07 |
| 5,396,265 | 3/1995 | Ulrich et al. | 345/158 |
| 5,429,682 | 7/1995 | Harlow, Jr. et al. | 118/681 |
| 5,434,791 | 7/1995 | Koko et al. | 364/468 |

(List continued on next page.)

FOREIGN PATENT DOCUMENTS

| | | |
|---|---|---|
| 0290809 | 11/1988 | European Pat. Off. . |
| 0397904 | 11/1990 | European Pat. Off. . |
| 0402475 | 12/1990 | European Pat. Off. . |

(List continued on next page.)

OTHER PUBLICATIONS

An English Language Abstract of JP 5–216525, Aug. 1993.
An English Language Abstract of JP 2–15828, Jan. 1990.
An English Language Abstract of JP 1–309727, Dec. 1989.
An English Language Abstract of JP 63–154220 Jun. 1988.
An English Language Abstract of JP 2–15827, Jan. 1990.
An English Language Abstract of JP 1–309728. Dec. 1989.

(List continued on next page.)

*Primary Examiner*—William Grant
*Assistant Examiner*—Steven R. Garland
*Attorney, Agent, or Firm*—Greenblum & Bernstein P.L.C.

[57] ABSTRACT

A system and method are provided for developing a bend model of a part to be produced at an intelligent production facility. In accordance with an aspect of the disclosed system and method, faces of the part are detected based on initial part information, and bendlines of the part are identified based on the detected faces of the part. Further, additional part information is generated by performing a predetermined operation (e.g., a folding operation or an unfolding operation) on the detected faces of the part. The disclosed system and method also include other capabilities, such as the capability to perform clean-up operations on initial, 2-D part information and to selectively eliminate part thickness representations in order to facilitate the preparation of a 3-D representation of the part from the modified 2-D part information.

152 Claims, 68 Drawing Sheets

Microfiche Appendix Included
(5 Microfiche, 250 Pages)

U.S. PATENT DOCUMENTS

| | | | |
|---|---|---|---|
| 5,453,933 | 9/1995 | Wright et al. | 364/474.23 |
| 5,485,390 | 1/1996 | Leclair et al. | 364/474.24 |

FOREIGN PATENT DOCUMENTS

| | | |
|---|---|---|
| 0419013 | 3/1991 | European Pat. Off. . |
| 0485766 | 5/1992 | European Pat. Off. . |
| 0664186 | 7/1995 | European Pat. Off. . |
| 1-309727 | 12/1989 | Japan . |
| 1-309728 | 12/1989 | Japan . |
| 2-15827 | 1/1990 | Japan . |
| 2-15828 | 1/1990 | Japan . |
| 5216525 | 8/1993 | Japan . |
| 7121418 | 12/1995 | Japan . |

OTHER PUBLICATIONS

Chu et al., Wesley W., *Cooperative Query Answering Via Type Abstraction Heirarchy,* Computer Science Department Technical Report, CSD–900032, Department of Computer Science, University of California, Los Angeles, pp. 1–28 (Oct. 1990).

Chiang, Kuorong, *Automatic Generation of Type Abstraction Hierarchies For Cooperative Query Answering* (A dissertation submitted as part of the requirements for the degree of Doctor of Philosophy in Computer Science), University of California, Los Angeles, pp. 1–98 (1995).

Mortenson, Michael E., *Geometric Modeling* (Title Page & Table of Contents), John Wiley & Sons,New York, (1988).

Foley et al., James D.*The Systems Programming Series: Fundamentals of Interactive Computer Graphics,* (Title Page & Table of Contents), Addison–Wesley Publishing Co., Reading, Massachusetts (Mar. 1983).

Mantyla, Martti, *An Introduction To Solid Modeling* (Title Page & Table of Contents), Computer Science Press, Inc. Rockville, Maryland (1988).

Wesley et al., M.A., "Fleshing Out Projections", *IBM J. Res. Develop.,* vol. 25, No. 6, pp. 934–954 (Nov. 1981).

Aomura et al., Shigeru, "Creating Solid Model With Machine Drawings", *the Sixth Computational Mechanics Conference,* JSME, No. 930–71, pp. 497–498, Japan (1983).

Aomura, Shigeru, "Recent Trends And Future Prospect of Research And Practical Use (Automatic Reconstruction of 3D Solid From Drawings", JSME, No. 586–61, pp. 2180–2187, Japan (1995).

*Open GL Reference Manual* (Title Page & Table of Contents), Release 1,Open GL Architecture Review Board, Addison–Wesley Publishing Co., Reading, Massachusetts (Jan. 1995).

*Open GL Programming Guide* (Title Page & Table of Contents), Release 1,Open GL Architecture Review Board, Addison–Wesley Publishing Co., Reading, Massachusetts (Jun. 1995).

*RenderWare,* API Reference Manual (Title Page & Table of Contents), V2.0, Criterion Software Ltd., United Kingdom (Oct. 1995).

*2D–3D: UNKEI/Solid and UNKEI/ Drawing Check & Projection/Reconstruction System,* Sales Brochure, Toyo Engineering Corp. (TEC), Tokyo, Japan (1993).

Naessens, Diederik, "Flexible Automation on Press Brakes", *American Machinist,* pp. 36–39 (Jun. 1994).

Wysong Literature, *The Perfect Forming Touch: New, PH Plus Series, DNC Press Brakes,* Cat. PHP–1, Wysong & Miles Company, Greensboro, North Carolina (1993).

Bourne, David A., "Intelligent Manufacturing Workstrations", *Knowledge–Based Automation of Processes,* Session at the 1992 ASME Winter Annual Meeting (Nov. 1992).

Wang, Cheng–Hua, "A Parallel Design System For Sheet Metal Parts", *Mechanical Engineering Report,* presented to the Mechanical Engineering Department, Carnegie Mellon University, Pittsburagh, Pennsylvania, pp. 1–31 (May 1992).

Wang et al., Cheng–Hua, "Concurrent Product/Process Design With Multiple Representations Parts", IEEE, No. 1050–4729/93, pp. 298–304 (1993).

*Amada Unfold: Manual For Autocad,* Table of Contents, Index & pp. 1–27, U.S. Amada, Ltd., Buena Park, California (Mar. 1994).

*Amada Unfold: Manual For Cadkey,* Table of Contents, Index & pp. 1–18, U.S. Amada, Ltd., Buena Park California (May 1994).

*Amada Windows Unfold: Manual For Cadkey,* Table of Contents & pp. 1–13, U.S. Amada, Ltd., Buena Park, California (Nov. 1995).

*AMACOM: AP40 Literature,* Version 4, Amada Co., Ltd., Japan (Jul. 1996).

*AMACOM: AP60 Literature,* Amada Co., Ltd., Japan (Jul. 1996).

*AMACOM: AP200 Literature,* Amada Co., Ltd., Japan (Jul. 1996).

"Method For Understanding Drawing Attributes For 3D Models", IBM Technical Disclosure Bulletin, vol. 37, No. 07, pp. 99–104 (Jul. 1994).

Tseng et al., Yuan–Jye, "Recognizing Multiple Interpretations Of Interacting Machining Features", Computer–Aided Design, vol. 26, No. 9, pp. 667–688 (Sep. 1994).

Gu et al., P. "Product Modelling Using Step", Computer–Aided Design, vol. 27, No. 3, pp. 163–179 (Mar. 1995).

An International Search Report mailed Oct. 1, 1997 with Application No. PCT/US 97/07472.

An International Search Report mailed Nov. 6, 1997 with Application No. PCT/US97/07473.

An International Search Report mailed Nov. 4, 1997 with Application No. PCT/US97 07474.

An International Search Report mailed Oct. 1, 1997 with Application No. PCT/US 97/07471.

Amada Windows Unfold: Manual for Cadkey, Table of Contents, pp. 1–35, & Index, U.s. Amada, Ltd., Buena Park California (Nov. 1995).

Papanikolopoulos, Nikolaos P., "FORS: A System For Flexible Design," *Conference Proceedings: 1990 IEEE International Conference On Systems, Man, And Cybernetics,* Nov. 4–7, 1990, Los Angeles, California, pp. 724–726.

Patent Abstracts of Japan, vol. 18, No. 689 (P–1850), Dec. 26, 1994, JP 06–274219.

An International Search Report issued with PCT App. No. PCT/US 97/07474, 1998.

An International Written Opinion issued in counterpart PCT Application No. PCT/US97/07473, on Sep. 28, 1998.

An International Written Opinion issued in counterpart PCT Application No. PCT/US97/07472, on Oct. 16, 1998.

An International Preliminary Examination Report issued in counterpart PCT Application No. PCT/US97/07474, on Nov. 20, 1988.

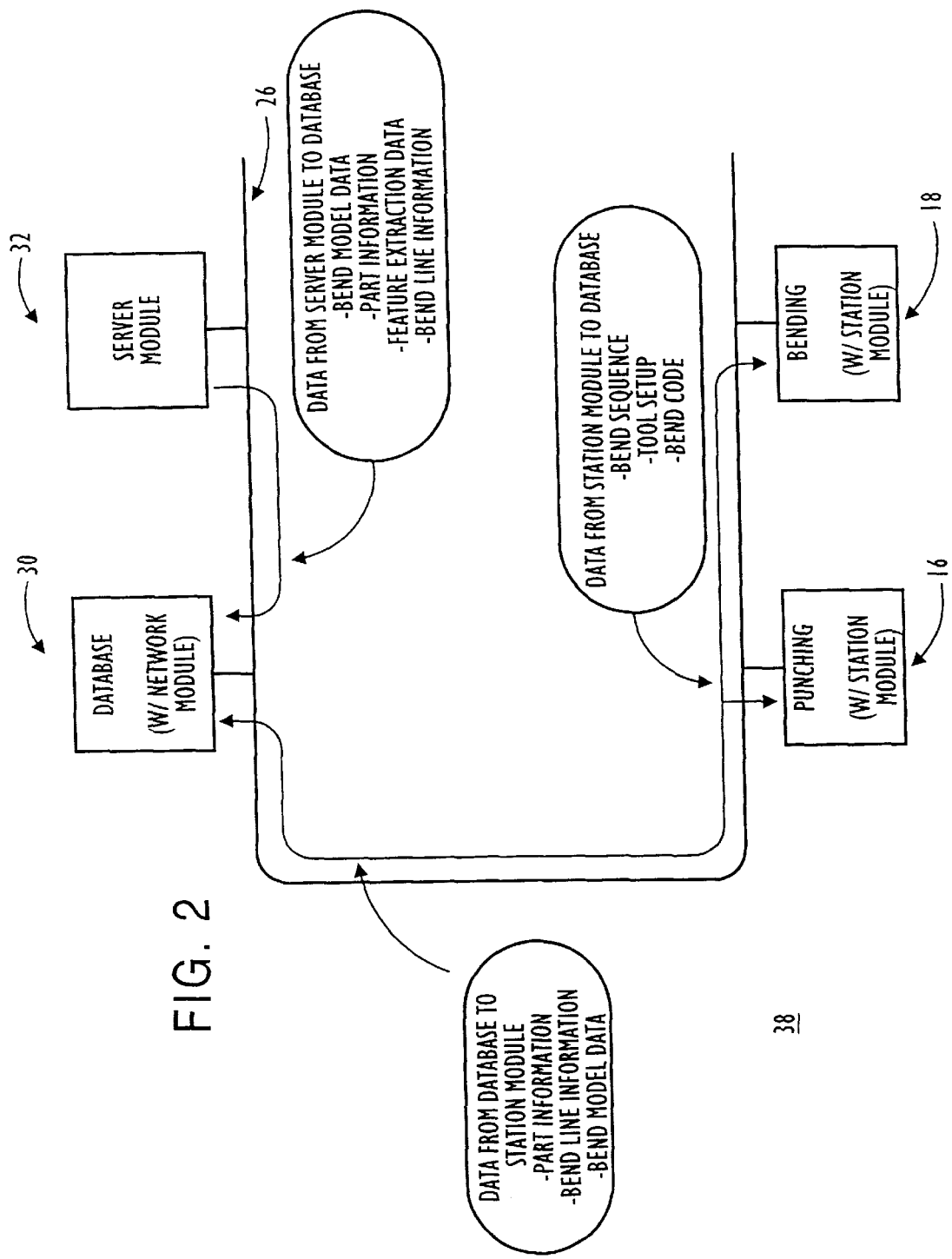

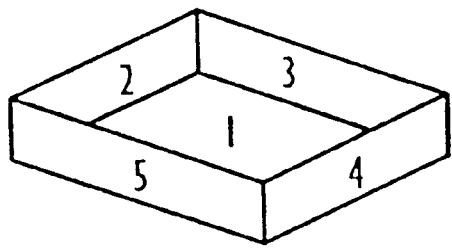
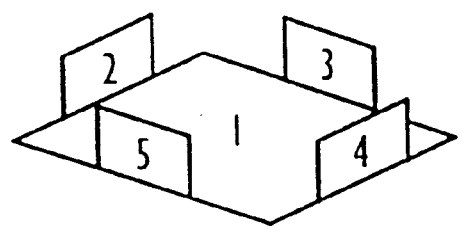
FIG. 6A    FIG. 6B
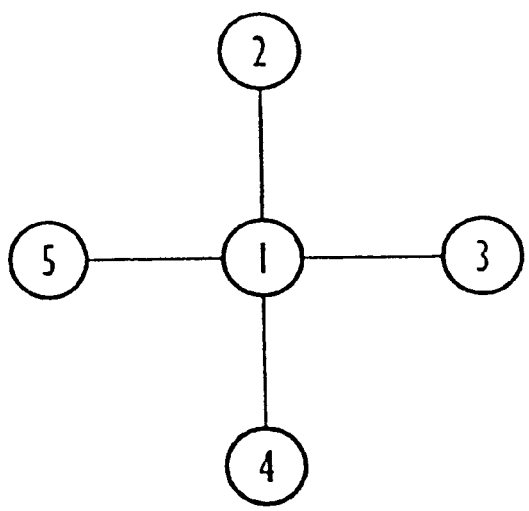
FIG. 6C

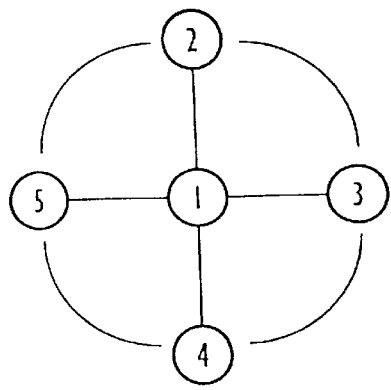
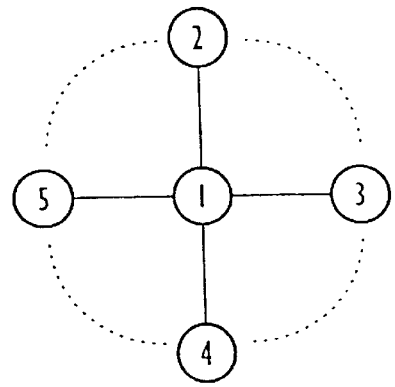
FIG. 6D  FIG. 6E
| 5 | + | T |   | T |   |
|---|---|---|---|---|---|
| 4 | + |   | T |   | T |
| 3 | + | T |   | T |   |
| 2 | + |   | T |   | T |
| 1 |   | + | + | + | + |
|   | 1 | 2 | 3 | 4 | 5 |
WHERE: + = 90 DEGREE POSITIVE BEND
T = TOUCHED CORNER
O = OPEN CORNER
FIG. 6F
| 5 | + | 0 |   | 0 |   |
|---|---|---|---|---|---|
| 4 | + |   | 0 |   | 0 |
| 3 | + | 0 |   | 0 |   |
| 2 | + |   | 0 |   | 0 |
| 1 |   | + | + | + | + |
|   | 1 | 2 | 3 | 4 | 5 |
WHERE: + = 90 DEGREE POSITIVE BEND
T = TOUCHED CORNER
O = OPEN CORNER
FIG. 6G

| FEATURE | FEATURE RELATION |
|---|---|
| 1 & 2 | 2 BENDLINES |
| 1 & 3 | 4 BENDLINES |
| 2 & 3 | 2 BENDLINES |

SEARCH KEYS (i)   FOUR BEND BOX
      FOUR BEND BOX (ii)  4 BENDLINES (iii) BRIDGE (iv)  2 BENDLINES
      2 BENDLINES

FIG. 9B
INPUT: 2 INTERSECTING LINES.
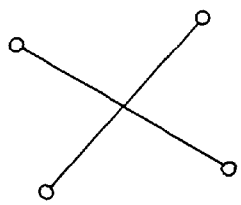
OUTPUT: FOUR MEETING LINES.
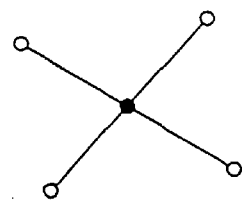
FIG. 9C
INPUT: AN ARC AND A LINE.
OUTPUT: 2 LINES AND 2 ARCS.
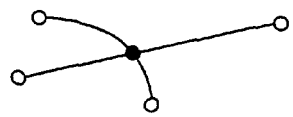
FIG. 9D
INPUT: 2 INCIDENT LINES.
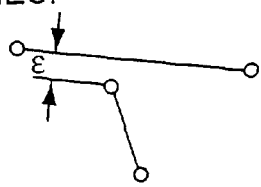
OUTPUT: THREE MEETING LINES.
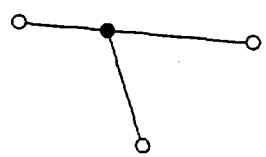

LAYOUT A  　　　　　LAYOUT B

FIG. 16

S.200: Enter 3D Drawing (with thickness)

S.204: Eliminate Thickness

S.206: Develop 3D Model (with no thickness)

UNSELECTED BEND LINE　　　　　SELECTED BEND LINE

BEFORE FLIP　　　　　AFTER FLIP

IF THERE ARE ANY PROBLEMS WITH FIRST CHOICE OF THE PUNCH, THE OPERATOR TRIES TO CHECK WITH A SECOND OPTION PUNCH.

IN CASE OF USE A SECOND PUNCH, A SECTION WILL BE HIGHLIGHTED WITH DIFFERENT COLOR.

DYNAMIC ROTATION AXIS

FIG. 48

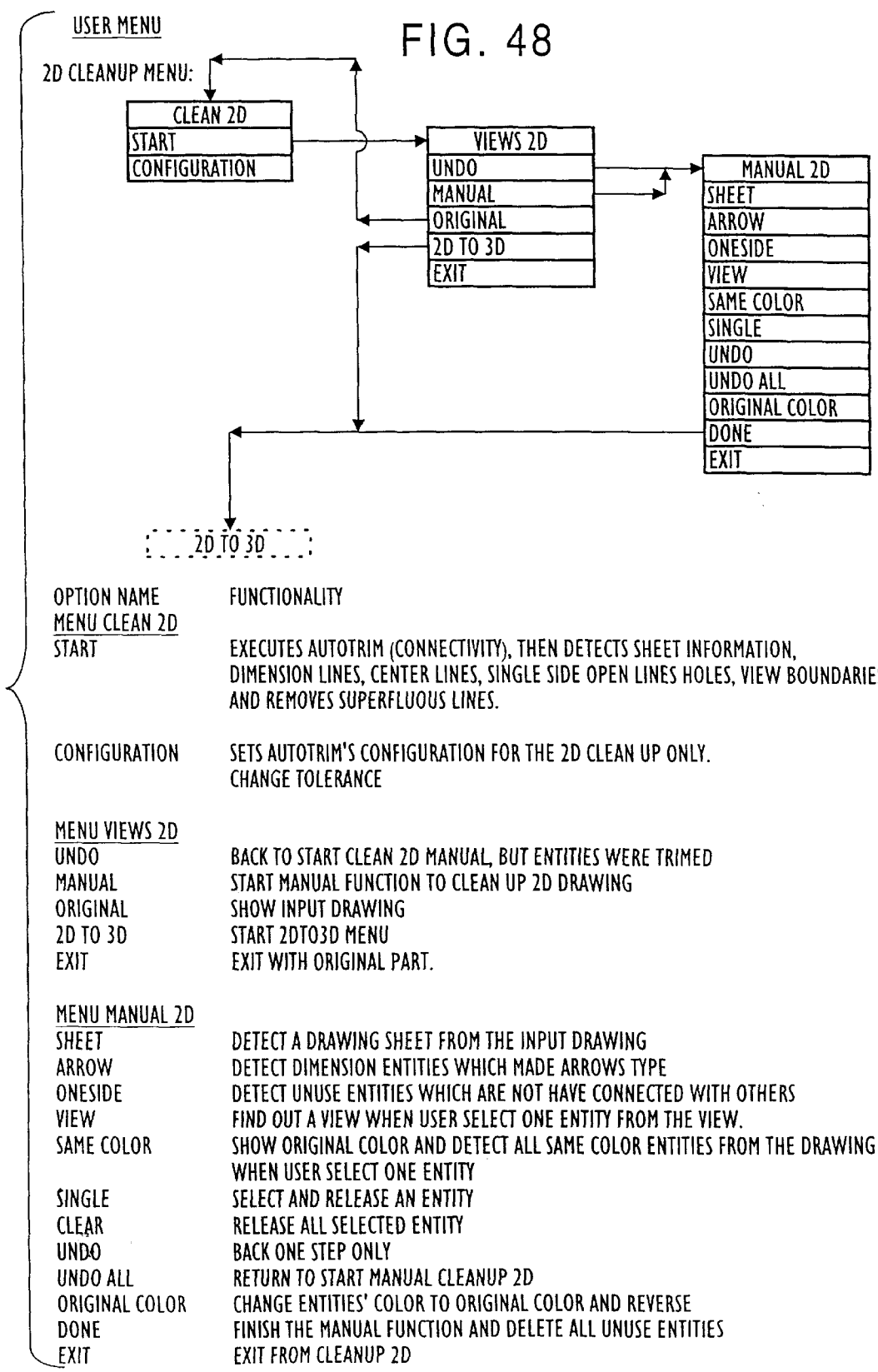

| OPTION NAME | FUNCTIONALITY |
|---|---|
| MENU CLEAN 2D | |
| START | EXECUTES AUTOTRIM (CONNECTIVITY), THEN DETECTS SHEET INFORMATION, DIMENSION LINES, CENTER LINES, SINGLE SIDE OPEN LINES HOLES, VIEW BOUNDARIES, AND REMOVES SUPERFLUOUS LINES. |
| CONFIGURATION | SETS AUTOTRIM'S CONFIGURATION FOR THE 2D CLEAN UP ONLY. CHANGE TOLERANCE |
| MENU VIEWS 2D | |
| UNDO | BACK TO START CLEAN 2D MANUAL, BUT ENTITIES WERE TRIMED |
| MANUAL | START MANUAL FUNCTION TO CLEAN UP 2D DRAWING |
| ORIGINAL | SHOW INPUT DRAWING |
| 2D TO 3D | START 2DTO3D MENU |
| EXIT | EXIT WITH ORIGINAL PART. |
| MENU MANUAL 2D | |
| SHEET | DETECT A DRAWING SHEET FROM THE INPUT DRAWING |
| ARROW | DETECT DIMENSION ENTITIES WHICH MADE ARROWS TYPE |
| ONESIDE | DETECT UNUSE ENTITIES WHICH ARE NOT HAVE CONNECTED WITH OTHERS |
| VIEW | FIND OUT A VIEW WHEN USER SELECT ONE ENTITY FROM THE VIEW. |
| SAME COLOR | SHOW ORIGINAL COLOR AND DETECT ALL SAME COLOR ENTITIES FROM THE DRAWING WHEN USER SELECT ONE ENTITY |
| SINGLE | SELECT AND RELEASE AN ENTITY |
| CLEAR | RELEASE ALL SELECTED ENTITY |
| UNDO | BACK ONE STEP ONLY |
| UNDO ALL | RETURN TO START MANUAL CLEANUP 2D |
| ORIGINAL COLOR | CHANGE ENTITIES' COLOR TO ORIGINAL COLOR AND REVERSE |
| DONE | FINISH THE MANUAL FUNCTION AND DELETE ALL UNUSE ENTITIES |
| EXIT | EXIT FROM CLEANUP 2D |

APPARATUS AND METHOD FOR MANAGING AND DISTRIBUTING DESIGN AND MANUFACTURING INFORMATION THROUGHOUT A SHEET METAL PRODUCTION FACILITY

RELATED APPLICATION DATA

This application claims the benefit of U.S. Provisional Application No. 60/016,958, filed May 6, 1996, entitled "Apparatus and Method for Managing and Distributing Design and Manufacturing Information Throughout a Sheet Metal Production Facility," the disclosure of which is expressly incorporated herein by reference in its entirety.

MICROFICHE APPENDIX

This application includes a microfiche appendix for Appendices A-L. The microfiche appendix consists of 5 sheets and 250 frames.

COPYRIGHT NOTICE

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

BACKGROUND OF THE INVENTION

1. Field of the Invention

The present invention generally relates to the field of manufacturing and to the production of components, such as sheet metal components. More particularly, the present invention relates to an apparatus and method for managing and distributing design and manufacturing information throughout a factory in order to facilitate the production of bent sheet metal components.

2. Background Information

Traditionally, the production of bent sheet metal components at, for example, a progressive sheet metal manufacturing facility, involves a series of production and manufacturing stages. The first stage is a design stage during which a sheet metal part design is developed based on a customer's specifications. A customer will typically place an order for a particular sheet metal component to be produced at the facility. The customer's order will usually include the necessary product and design information so that the component may be manufactured by the factory. This information may include, for example, the geometric dimensions of the part, the material required for the part (e.g., steel, stainless steel, or aluminum), special forming information, the batch size, the delivery date, etc. The sheet metal part requested by the customer may be designed and produced for a wide variety of applications. For example, the produced component may ultimately be used as an outer casing for a computer, an electrical switchboard, an armrest in an airplane, or part of a door panel for a car.

During the design stage, a sheet metal part design may be developed by the design office of the manufacturing facility using an appropriate Computer-Aided Design (CAD) system. Based on a customer's specifications, a 2-dimensional (2-D) model of the sheet metal part may be developed by a programmer with the CAD system. Typically, a customer will provided a blueprint containing one or more drawings of the component and the critical geometric dimensions of the part. The blueprint may also indicate any special forming or marking to be included in the part, as well as the location of holes or other types of openings on the surface(s) of the sheet metal part. The design programmer will often use this blueprint to develop a 2-D model on the CAD system. The 2-D model may include a flat view and one or more other perspective views of the sheet metal part, with bending line and/or dimensional information.

Before actual bending of the sheet metal part takes place, the part must first be punched and/or cut from initial stock material. Computer Numerical Control (CNC) or Numerical Control (NC) systems are typically used to control and operate punch presses and plasma or laser cutting machinery to process the stock material. In order to facilitate processing of the stock material, a Computer-Aided Manufacturing (CAM) system or CAD/CAM system can be used by a design programmer to generate control code based on the 2-D model. The control code may comprise a part program that is imported to and utilized by the punch press and/or cutting machinery to punch or cut the sheet metal component from the stock material.

The next stage in the production process is a bending plan stage. During this stage, a bending plan is developed by a bending operator at the shop floor. The operator will normally be provided with the blueprint or 2-D drawing of the component, along with one or more samples of the cut or punched stock material. With these materials, the bending operator will develop a bending plan which defines the tooling to be used and the sequence of bends to be performed. The bending workstation may include CNC metal bending machinery, such as a CNC press brake, that enables the operator to enter data and develop a bending code or program based on the bending plan.

Once the bending plan is developed, the operator will set up the workstation for initial testing of the bending sequence. During this testing stage, the punched or cut stock material will be manually loaded into the press brake and the press brake will be operated to execute the programmed sequence of bends on the workpiece. The operator will analyze the final bent sheet metal part and inspect it for conformance with the customer's specification. Based on the results of the initial runs of the press brake, the operator may modify the bending sequence by editing the bending program. The operator may also provide feedback to the design office so that the sheet metal part design can be appropriately modified. Further testing will typically be conducted until the bent sheet metal component is within the required design specifications.

One of the final stages in the production process is the bending stage. After the bending plan has been developed and tested, the bending operator will set up the required tooling at the bending station and operate the press brake based on the bending plan and the stored bending program or code. Job scheduling is also performed in order to ensure that the necessary amount of punched or cut stock material will be available on time at the bending station, and so that other jobs will be completed by the requested delivery dates. Job scheduling may be developed or modified by a shop floor foreman during the earlier stages of the production process and/or concurrently throughout the entire process. After the final bent sheet metal parts have been produced, the parts may then be assembled and packaged for shipping to the customer.

The conventional production and manufacturing process described above suffers from several drawbacks and disadvantages. For example, although the design and manufacturing data for each customer's order is normally archived physically (e.g., by paper in a file cabinet) or electronically (e.g., by storing on a disk or magnetic tape), such data are normally stored separately and not easily retrievable. Further, in most factory settings, the distribution of critical job information takes the form of a paper job or work sheet that is distributed throughout the factory floor. As a result, data is often lost or damaged, and it is difficult to search for both the design and manufacturing data relating to a previous or similar job. In addition, due to the inefficient manner in which the data is stored, valuable time is lost in attempting to distribute the design and manufacturing information to the shop floor and to other locations throughout the factory. Considerable manufacturing time is also lost during the development of the sheet metal part design and bending plan, since the development of the part design and bending plan is primarily performed by the design programmer and bending operator, and relies heavily on the individual's knowledge, skill and experience.

In recent years, there have been developments and attempts to improve the conventional sheet metal manufacturing process and to improve the efficiency of the overall process. For example, the use and development of 2-D and 3-dimensional (3-D) modeling in commercially available CAD/CAM systems has facilitated and improved the production process and modeling of bent sheet metal components. The design programmer and operator can now utilize both the 2-D and 3-D representations to better understand the geometry of the part and more efficiently develop a part design and bending code sequence. The ability to store and transfer data electronically has also improved the flow of information from the design office to locations on the shop floor. With the advancement of computers and data communication networks, it is no longer necessary to search through a cabinet or file of old paper tapes or magnetic disks.

Despite such advancements, there is still a need to improve the organization and flow of design and manufacturing information throughout the factory environment. For example, conventional manufacturing systems do not logically associate both critical design and manufacturing information associated with each customer's order so that it may be easily accessed and retrieved from any area in the factory. Previous systems also fail to provide the ability to search previous job information based on various criteria, such as the features and attributes of the sheet metal component. The ability to search and retrieve previous job information based on, for example, an identical or similar part search, would greatly enhance the overall production process and reduce the required manufacturing time for future jobs.

Past attempts also fail to facilitate the development of the sheet metal part design and bending plan by the design programmer and shop floor operator. While the introduction of 2-D and 3-D modeling systems have enabled the designer to have a better understanding of the shape and geometry of the part, such systems have not reduced the burdens placed on the design programmer and shop floor operator. For example, such systems have not enabled the design programmer to easily convert an existing 2-D CAD model into a 3-D representation. In addition, while 2-D and/or 3-D drawings of the component may be provided to the shop floor operator to assist in the development of the bending plan, the operator must still determine and develop the tooling requirements and bending sequence by hand and/or experimentation.

SUMMARY OF THE INVENTION

In view of the foregoing, the present invention, through one or more of its various aspects, embodiments and/or specific features or sub-components thereof, is provided to bring about one or more objects and advantages, such as those specifically noted below.

A general object of the present invention is to provide an apparatus and method for managing and distributing design and manufacturing information throughout a factory in order to facilitate the production of components, such as bent sheet metal components.

A further object of the present invention is to provide an apparatus and method that prevents the loss or destruction of critical job information, and that enhances the efficiency and organization of stored expert knowledge at, for example, a progressive sheet metal production facility.

Another object of the invention is to provide an apparatus and method for logically storing both the design and manufacturing information for each customer's order, so that it may be easily accessed and retrieved from any area in the factory.

Yet another object of the present invention is to provide an apparatus and method for managing and distributing design and manufacturing information, wherein the job data is stored at a central database or file server in a logical fashion so that it may be easily searched and retrieved from any location throughout the factory. The job data may provide not only the design and manufacturing information associated with the job, but also the actual bend code for executing the required bending operations.

Still another object of the present invention is to provide an apparatus and method for searching previous job information, including design and manufacturing information, based on various search criteria. The search criteria may include, for example, the basic features and attributes of the sheet metal component to be manufactured, so that previous job information relating to an identical or similar part can be utilized to reduce the overall manufacturing time of future jobs.

Another object of the present invention is to replace the traditional paper job or work sheet, associated with each customer's order, with an electronic job sheet that can be instantaneously accessed from any location in the factory. The electronic job sheet may be displayed at any location and include critical design and manufacturing information, including the 2-D and/or 3-D model view of the component, the tooling selection, the optimum bending sequence, the required staging information, and the bar code or identification number associated with the job. The electronic job sheet may also include an audio and/or video portion recorded by a bending operator to indicate, for example, any special instructions or procedures that may be helpful when running the same job or a similar job again in the future.

Another object of the invention is to shorten the time required to analyze a part drawing by providing 2-D and 3-D computerized views of the sheet metal part. Various viewing modes may be provided, including a solid 3-D viewing mode, a 3-D wire frame viewing mode, a 2-D flat screen viewing mode, and an orthographic viewing mode. Different viewing functions may also be provided, including zooming, panning, rotating and auto-dimensioning, to facilitate analysis of the sheet metal part.

A further object of the invention is to provide an apparatus and method that facilitates the development of the sheet metal part design and bending plan by the design programmer and shop floor operator. For example, it is an object of the present invention to enable the design programmer to easily develop a 3-D representation of the component from an existing 2-D model. It is also another object of the invention to provide a graphical user interface to shorten the time required to develop the bending plan and programmed bending code.

The present invention, therefore, is directed to an apparatus and method for developing a bend model of a part to be produced in an intelligent production facility, wherein the part includes a plurality of faces and at least one bendline. The apparatus may comprise a receiving system for receiving initial part information relating to the part, including data relating to a representation of the part within a first predetermined coordinate space. A face detecting system may also be provided for detecting, within the first predetermined coordinate space, the faces of the part based on the initial part information. In addition, the apparatus may include a bendline identification system for identifying at least one bendline of the part based on the detected faces, and a system for generating additional part information, relating to the part and including data relating to a representation of the part within a second predetermined coordinate space, by performing a predetermined operation on each of the faces detected by the face detecting system. The predetermined operation may be performed based upon at least the initial part information and at least one bendline identified by the bendline identification system.

The first predetermined coordinate space may comprise a 2-D coordinate space and the second predetermined coordinate space may comprise a 3-D coordinate space, wherein the predetermined operation comprises a folding operation performed on the faces detected by the face detecting system. The folding operation may include rotating and translating each of the faces detected by the face detecting system relative to at least one bendline identified by the bendline identification system. In addition, the initial part information may further comprise a bend angle amount relating to at least one bendline of the part, whereby the folding operation is performed based on the bend angle amount.

According to another aspect of the invention, the first predetermined coordinate space may comprise a 3-D coordinate space and the second predetermined coordinate space may comprise a 2-D coordinate space, wherein the predetermined operation comprises an unfolding operation performed on the faces detected by the face detecting system. The unfolding operation may include rotating and translating each of the faces detected by the face detecting system relative to at least one bendline identified by the bendline identification system. In addition, the initial part information may further comprise a bend angle amount relating to at least one bendline of the part, whereby the unfolding operation is performed based on the bend angle amount.

The part to be produced may comprise a sheet metal part, and the data relating to a representation of the part within the first predetermined coordinate space may include coordinate data and/or vector data. Further, the faces of the part may comprise the base surface(s) of the part as well as the folded surfaces of the part. According to another aspect of the invention, the initial part information may comprise data relating to a representation of the part in a 3-D coordinate space, and the data may include thickness data of the part in 3-D coordinate space.

The apparatus for developing a bend model may also include an auto-trimming and cleanup system for performing an auto-trimming and cleanup operation on the data relating to the initial part information to prepare the data for the face detecting system and the bendline identification system. The data may comprise part entity data representing, at least, line entities and bendline entities of the part, and the auto-trimming and cleanup system may further comprise a system for detecting intersection points of the entities and for selectively breaking the entities at detected intersection points, and a system for assigning the resultant broken entities to have a common endpoint based on the detected intersection points. The auto-trimming and cleanup system may also comprise a system for detecting open intersection areas between adjacent entities and for selectively connecting the adjacent entities by assigning a common endpoint to the adjacent entities. open intersection areas may be detected, by the system for detecting open intersection areas, when the endpoints of the adjacent entities are determined to be within a predetermined distance from one another.

According to yet another feature of the invention, the data relating to the initial part information may comprise part entity data representing, at least, line entities of the part, and the face detecting system may be adapted to perform a loop and entity analysis of the part based on the part entity data to detect the faces of the part. The loop and entity analysis may initially be performed on an outside boundary of the part and then performed on inner boundaries and areas of the part. The face detecting system may generate an initial linked list of entities when performing the loop and entity analysis on the outside boundary of the part, such that the initial linked list of entities define an outward loop and boundary of the part. The face detecting system may further generate an additional linked list of entities when performing the loop and entity analysis on the inside boundaries and areas of the part, such that the additional linked list of entities define inner loops and boundaries of the part. In addition, the face detecting system may further comprise a system for generating a loop tree based on the outward loop defined by the initial linked list of entities and the inner loops defined by the additional linked list of entities. Further, the face detecting system may detect the faces of the part based on the loop tree and the sequence of boundaries defined by the initial linked list entities and the additional linked list of entities.

The bendline identification system of the invention may comprise a system for analyzing the initial linked list of entities and the additional linked list of entities to determine common line entities between the faces detected by the face detecting system. Bendlines may be identified based on the detection of one of the faces having only one common line entity with another one of the faces. In addition, the bendline identification system may apply predetermined heuristics to identify bendlines of the part when the system for determining common line entities detects that there are more than one common line entity between the faces. The heuristics may comprise identifying bendlines of the part such that a minimum number of total bendlines are identified for the part. The heuristics may also comprise identifying bendlines of the part, when one of the faces have more than one common line entity with another one of the faces, based on the common line entity that has the longest length.

According to another feature of the invention, a system for receiving a deduction amount may be provided to receive a deduction amount related to the part. A system for compensating for bend deduction, when performing the predetermined operation on the faces, based on the deduction amount may also be provided. The system for compensating for bend deduction may increase a dimensional length of the faces by one half of the deduction amount on each side of the bendline of the part when performing a folding operation. The system for compensating for bend deduction may also be adapted to decrease a dimensional length of the faces by one half of the deduction amount on each side of the bendline of the part when performing an unfolding operation.

The method for developing a bend model may comprise the following steps: receiving initial part information relating to the part, the initial part information including data relating to a representation of the part within a first predetermined coordinate space; detecting, within the first predetermined coordinate space, the faces of the part based on the initial part information; identifying at least one bendline of the part based on the faces detected by the detecting; and generating additional part information, including data relating to a representation of the part within a second predetermined coordinate space, by performing a predetermined operation on each of the faces detected by the detecting, the operation being performed based upon the initial part information and at least one bendline identified by the identifying.

The first predetermined coordinate space may comprise a 2-D coordinate space and the second predetermined coordinate space may comprise a 3-D coordinate space. In addition, the method may further comprise performing a folding operation on the faces detected by the step of detecting. The folding operation may include rotating and translating each of the faces relative to at least one bendline identified by the step of identifying. Further, the initial part information may comprise a bend angle amount relating to at least one bendline of the part, whereby the folding operation is performed based on the bend angle amount.

According to another feature of the invention, the first predetermined coordinate space may comprise a 3-D coordinate space and the second predetermined coordinate space may comprise a 2-D coordinate space. The method may also further comprise performing an unfolding operation on the faces detected by the step of detecting. The unfolding operation may include rotating and translating each of the faces relative to at least one bendline identified by the step of identifying. Further, the initial part information may comprise a bend angle amount relating to at least one bendline of the part, whereby the unfolding operation is performed based on the bend angle amount.

The method may also comprise performing an auto-trimming and cleanup operation on the data of the initial part information before detecting the faces and identifying the at least one bendline. The data of the initial part information may comprise part entity data representing, at least, line entities of the part, and the step of detecting of the faces may comprise performing a loop and entity analysis of the part based on the part entity data to detect the faces of the part. The loop and entity analysis may initially performed on an outside boundary of the part and then performed on inner boundaries and areas of the part.

In addition, according to the invention, the step of identifying may further comprise applying predetermined heuristics to identify bendlines of the part when more than one common edge between the faces is detected. The heuristics may comprise identifying bendlines of the part such that a minimum number of total bendlines are identified for the part. The heuristics may also comprise identifying bendlines of the part, when one of the faces have more than one common line entity with another one of the faces, based on the common line entity that has the longest length.

The present invention also encompasses a system for developing a bend model of a part to be produced in a production facility, wherein the part includes a plurality of faces and at least one bendline. The system comprises means for receiving initial part information relating to the part, wherein the initial part information including data relating to a representation of the part within a first predetermined coordinate space. Detecting means may also be provided for detecting, within the first predetermined coordinate space, the faces of the part based on the initial part information. The system may also include means for identifying at least one bendline of the part based on the faces detected by the face detecting means, and means for generating additional part information, including data relating to a representation of the part within a second predetermined coordinate space, by performing a predetermined operation on the faces detected by the detecting means. The predetermined operation may be performed based on, at least in part, the bendline identified by the bendline determining means of the system.

According to another aspect of the invention, a system and method is provided for developing a bend model of a part to be produced in an intelligent production facility. The system may comprise a receiving system for receiving initial part information relating to the part, wherein the initial part information comprises respective representations of a plurality of views the part in 2-D coordinate space, and each of the representations include part thickness representations of the part. A cleanup operation system may also be provided to perform a 2-D cleanup operation on the initial part information to eliminate any extraneous information and to identify each of the representations. The system may also include a part thickness elimination system for selectively eliminating the part thickness representations in each of the identified representations to provide modified representations of the views of the part in 2-D coordinate space with no thickness, and a system for developing a representation of the part in 3-D coordinate space based on the modified representations of the part in 2-D coordinate space with no thickness.

The initial part information may comprise part entity data representing, at least, line entities of the part, and the cleanup operation system may include a break and trimming system for detecting intersection points of the entities and for selectively breaking the entities at detected intersection points. Further, the break and trimming system may assign the resultant broken entities to have a common endpoint based on the detected intersection points. The break and trimming system may further comprise a system for detecting open intersection areas between adjacent entities and for selectively connecting the adjacent entities by assigning a common endpoint to the adjacent entities. Open intersection areas may be detected, by the system for detecting open intersection areas, when the endpoints of the adjacent entities are determined to be within a predetermined distance from one another.

In accordance with another aspect of the invention, the cleanup operation system may comprise a system for developing a connectivity graph structure based on the initial part information, such that the cleanup operation system eliminates extraneous information based on the connectivity graph structure. The extraneous information that is eliminated may comprise unconnected line entities, wherein the unconnected line entities relating to, at least, dimension lines.

The initial part information may also comprise key words for identifying part entity data and extraneous information relating to text. The cleanup operation system may eliminate the extraneous information relating to text based on the key words included in the initial part information.

According to yet another feature of the invention, the cleanup operation system may comprise a system for detecting, based on the initial part information, the representations of the top view, the front view, and the right side view of the part. As disclosed herein, the plurality of views of the part may comprise a top view, a front view, and a right side view of the part in 2-D coordinate space. In addition, the developing system may include a system for performing a projection operation to develop the representation of the part in 3-D coordinate space based on the representations of the part in 2-D coordinate space. The projection operation may comprise detecting the relative depths of each of the plurality of views and projecting each of the plurality of views into 3-D coordinate space.

The method for developing a bend model may comprise the steps of: receiving initial part information relating to the part, the initial part information comprising respective representations of a plurality of views the part in 2-D coordinate space, each of the representations including part thickness representations of the part; performing a 2-D cleanup operation on the initial part information to eliminate extraneous information and to identify each of the representations; selectively eliminating the part thickness representations in each of the identified representations to provide modified representations of the views of the part in 2-D coordinate space with no thickness; and developing a representation of the part in 3-D coordinate space based on the modified representations of the part in 2-D coordinate space with no thickness.

The initial part information may comprise part entity data representing, at least, line entities of the part, and the step of performing may comprise detecting intersection points of the entities and selectively breaking the entities at detected intersection points, with the resultant broken entities being assigned to have a common endpoint based on the detected intersection points. The step of performing may also comprise detecting open intersection areas between adjacent entities and selectively connecting the adjacent entities by assigning a common endpoint to the adjacent entities. Open intersection areas may be detected when the endpoints of the adjacent entities are within a predetermined distance from one another.

The method may also comprise the steps of developing a connectivity graph structure based on the initial part information and eliminating extraneous information from the initial part information based on the connectivity graph structure. The extraneous information may comprise unconnected line entities, the unconnected line entities relating to, at least, dimension lines. In addition, the initial part information may comprise key words for identifying part entity data and extraneous information relating to text, wherein the step of performing includes the step of eliminating the extraneous information relating to text based on the key words.

According to another feature of the invention, the step of selectively eliminating the part thickness may comprise prompting a user to identify the part thickness representations to be eliminated in each of the plurality of views and to identify a dimension of the part to be retained in each of the plurality of views. The dimension of the part may comprise one of an outside dimension or an inside dimension of the part. Further, the step of developing may comprise performing a projection operation to develop the representation of the part in 3-D coordinate space based on the modified representations of the part in 2-D coordinate space. The projection operation may include detecting the relative depths of each of the plurality of views and projecting each of the plurality of views into 3-D coordinate space.

Further features and/or variations may be provided in addition to those noted above. For example, the invention may be directed to various combinations and subcombinations of the above-described features and/or combinations and subcombinations of several further features noted below in the detailed description.

The above-listed and other objects, features and advantages of the present invention will more be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the illustrations, and wherein:

FIG. 2 illustrates the respective data flow between the server module, database and station modules, in accordance with an aspect of the present invention;

FIGS. 6A, 6C, 6C, 6D, 6E, 6F and 6G illustrate, in accordance with an aspect of the invention, a feature extraction operation for a four bend box with touched corners and for a four bend box with open corners;

FIG. 16 is a flow chart of the logic flow of the various processes and operations that may be implemented to develop a 3-D model with no thickness from a 3-D drawing with thickness, in accordance with an aspect of the present invention;

FIG. 48 is an exemplary menu screen diagram and structure for a 2-D clean-up operation of the present invention.

BRIEF DESCRIPTION OF THE APPENDICES

In order to further facilitate the detailed description of the present invention, reference is made to the noted plurality of appendices (provided in the microfiche appendix) by way of non-limiting examples of preferred embodiments of the present invention, in which sample source code and comments are provided with respect to the various features, operations and functions of the invention, and wherein:

Appendix A is an exemplary source code for executing a feature extraction operation of the present invention when performing, for example, a similar part search;

Appendix B is an exemplary source code for effectuating a similarity index operation when performing, for example, a similar parts search of the invention;

Appendix C is an exemplary source code for performing a bendline detection operation of the invention;

Appendix D is an exemplary source code for implementing a 2-D cleanup operation of the present invention, which may be utilized when developing a 3-D model of a sheet metal part based on an original 2-D, three view drawing;

Appendix E is an exemplary source code for implementing the various view modes and functions of a bend model viewer of the present invention;

Appendices F, G, H and I are exemplary source code and comments relating to executing and performing an auto dimensioning feature of the present invention;

Appendix J is an exemplary source code for implementing a part and entity visibility function of the bend model viewer of the invention;

Appendix K includes general comments relating to the implementation of the bend model and the organization of the part structure, according to the various teachings of the present invention; and Appendix L includes exemplary source code for implementing a 3-D manipulation and navigation system with dynamic calculation of the rotation axis of the rendered part.

DETAILED DESCRIPTION OF THE INVENTION

According to an aspect of the present invention, an apparatus and method are provided for managing and distributing design and manufacturing information throughout a factory, and for facilitating the production of components within the factory. The features of the present invention may be used in a wide variety of factory environments and settings and, more particularly, the invention may be implemented in factory environments wherein a series of production and manufacturing stages are effectuated at different locations. By way of non-limiting embodiments and examples, the present invention will now be described with reference to the production of bent sheet metal components at, for example, a progressive sheet metal manufacturing facility.

Figure 1A:
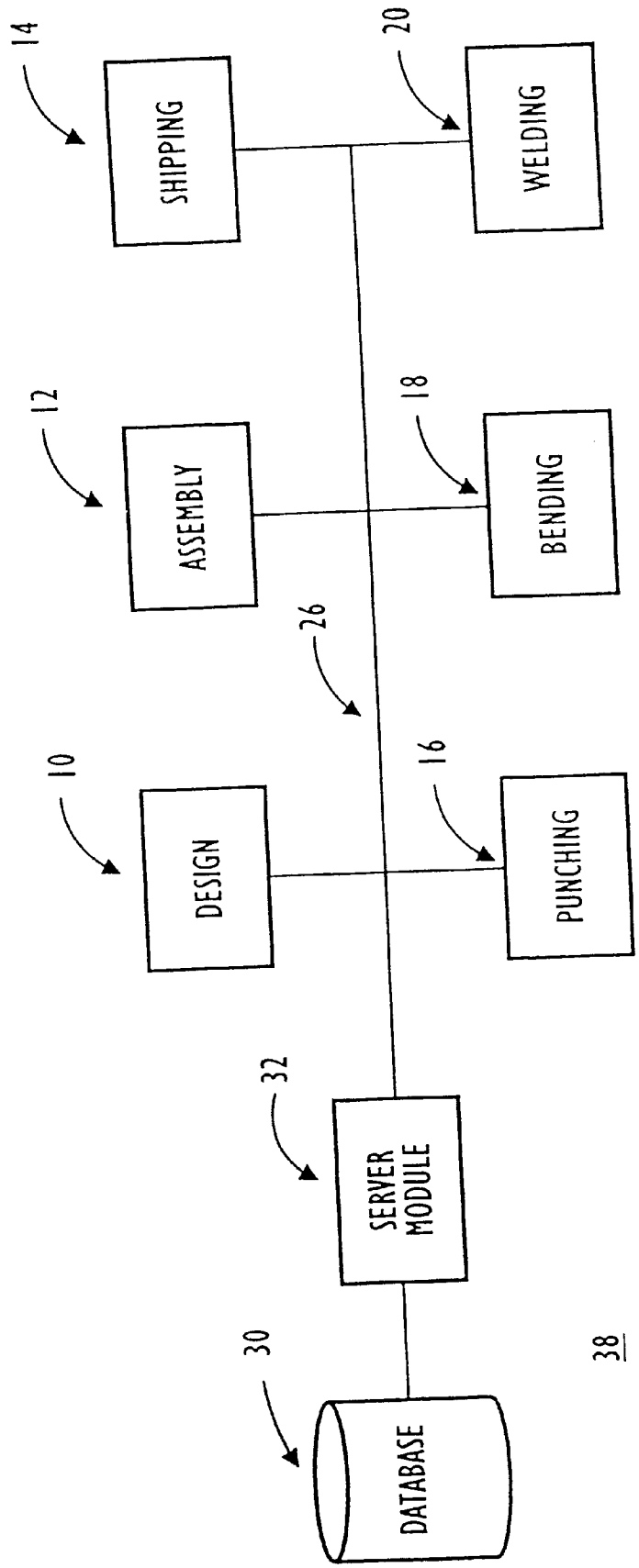
FIG. 1A is a block diagram illustration of a progressive sheet metal manufacturing facility constructed according to an embodiment of the present invention.

Referring to FIG. 1A, a progressive sheet metal manufacturing facility 38 is generally illustrated in block diagram form, according to an embodiment of the present invention. As shown in FIG. 1A, the sheet metal manufacturing facility or factory 38 may include a plurality of locations 10, 12, 14 . . . 20 that are dispersed throughout the factory. These locations may comprise a design office 10, an assembly station 12, a shipping station 14, a punching station 16, a bending station 18, and a welding station 20. Although the sheet metal factory 38 in FIG. 1A is depicted as having only six discrete locations, the factory may of course include more than six discrete locations and may also include more than one location for each type of office or station illustrated in FIG. 1A. For example, depending on the size of and production capacity requirements for the facility 38, more than one punching station 16, bending station 18, and/or welding station 20 may be provided. In addition, the factory 38 may include more than one design office 10, assembly station 12 or shipping station 14, and may also include other types of locations for facilitating the production and manufacturing of components, such as bent sheet metal components.

Each of the locations 10, 12, 14 . . . 20 within the factory 38 may be adapted and include equipment to execute one or more of the discrete production and manufacturing stages or processes associated with the production and manufacturing of the components. For example, the design office 10 may include an appropriate CAD/CAM system, to facilitate the development of the sheet metal part design based on a customer's specification. The CAD/CAM system may comprise one or more personal computers, a display unit, a printer, and commercially available CAD/CAM software. By way of a non-limiting example, the CAD/CAM system of the design office 10 may include AUTOCAD or CADKEY, or an Amada AP40 or AP60 CAD/CAM system available from Amada America, Inc. (previously operating under the corporate name of U.S. Amada Ltd.), Buena Park, Calif. In addition, other commercially available CAD systems may be used, such as VELLUM, which is a Windows based CAD system available from Ashlar Incorporated. With the CAD/CAM software, the design programmer may develop a 2-D model and/or 3-D model of the sheet metal part based on the drawings and data provided in the customer's order. The design programmer may also generate control code based on the sheet metal part design, in order to generate a part program for controlling, for example, CNC punch presses and/or cutting machinery to punch or cut the sheet metal component from stock material.

Punching station 16 and bending station 18 may each be provided with any combination of CNC and/or NC based machine tools. For example, punching station 16 may include one or more CNC and/or NC punch presses, such as COMA series and/or PEGA series Amada turret punch presses or other commercially available CNC and/or NC punch presses, and bending station 18 may include one or more CNC and/or NC press brakes, such as RG series Amada press brakes or other commercially available multiple-axis, gauging press brakes. Further, welding station 20 may be provided with appropriate welding machinery in order to effectuate any required welding to the sheet metal component. Punching station 16, bending station 18 and welding station 20 may be located at various areas on the factory floor of the facility 38 and include machinery that is manually operated by skilled operators (e.g., punch press operators, bending operators, etc.). Fully automated or robot assisted machinery, such as the Amada CELLROBO MINI and the Amada PROMECAM, may also be provided at these locations. The required punching and bending operations, and any necessary welding operations, may be performed at these stations during the production process.

As further shown in FIG. 1A, the progressive sheet metal facility 38 may also include assembly station 12 and shipping station 14. Assembly station 12 and shipping station 14 may include the necessary packaging, routing and/or transportation equipment to facilitate the assembly and shipping of the manufactured components to the customer. The assembly and shipping of the components may be performed or controlled manually by factory personnel and also may be machine automated and/or machine assisted. In addition, assembly station 12 and shipping station 14 may be physically located near the factory floor (e.g., in close proximity to punching station 16, bending station 18 and/or welding station 20) or within a separate facility or area of the sheet metal factory 38.

In accordance with an aspect of the present invention, the management and distribution of critical design and manufacturing information is achieved by electronically storing and distributing the design and manufacturing information. By replacing or at least supplementing the traditional paper job set-up or work sheet with an electronic job sheet that can be accessed instantaneously from any location in the factory, the present invention improves the overall efficiency of the factory. In addition, through the various aspects and features of the invention, the organization and accessibility of stored design and manufacturing information is improved. Further, the ability to access and retrieve previous job information relating to similar or identical sheet metal parts is enabled through the various features of the invention.

Figure 1B:
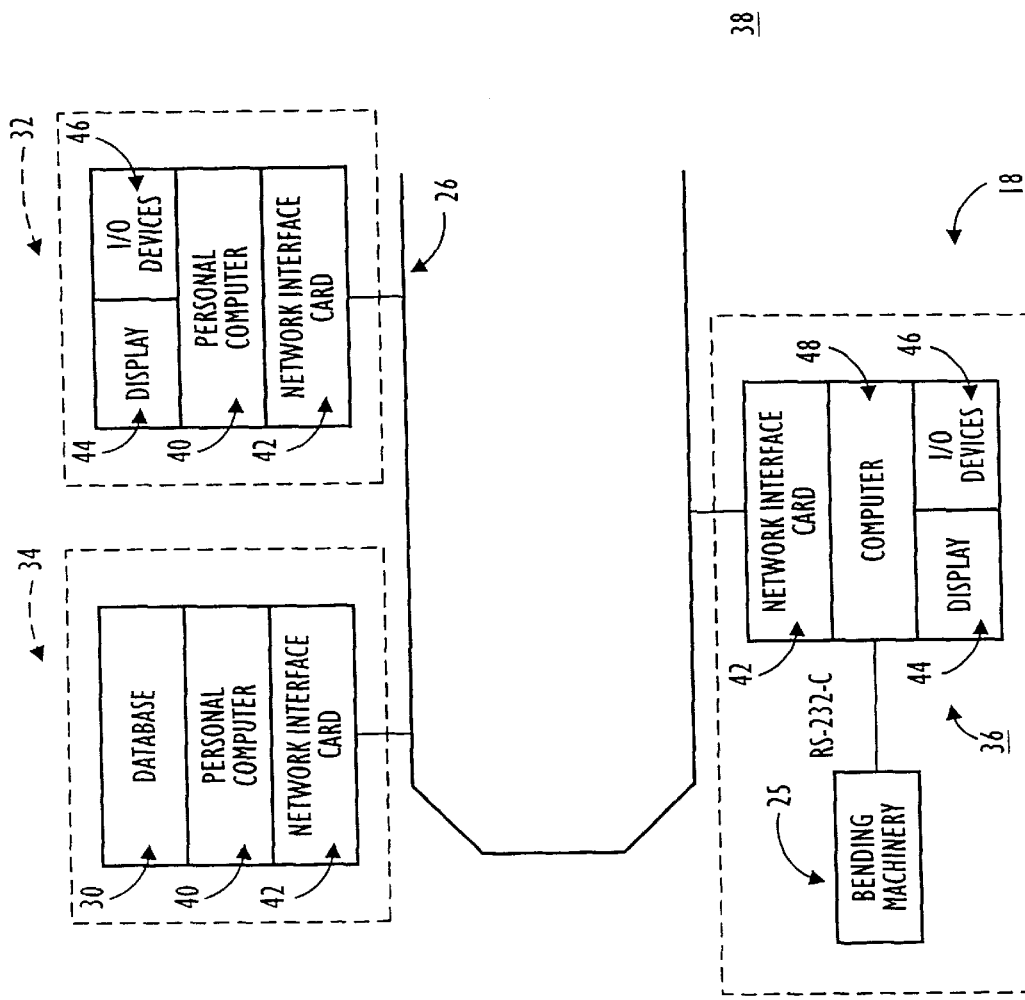
FIG. 1B is a block diagram illustration of a progressive sheet metal manufacturing facility constructed according to another embodiment of the present invention.

To this end, the various aspects of the present invention may be implemented and effectuated by providing a communications network 26 that interconnects a server module 32 and a database 30 to each of the plurality of locations 10, 12, 14 . . . 20 within the sheet metal facility 38. As further discussed below, each of the locations 10, 12, 12 . . . 20 may include station modules that interface with communications network 26 and database 30. FIGS. 1A, 1B and 2 illustrate non-limiting examples of these features and implementation of the invention.

As shown in FIGS. 1A and 1B, communications network 26 may interconnect each of the various locations 10, 12, 14 . . . 20 of the facility 38 with server module 32 and database 30. Communications network 26 may comprise any network capable of transmitting data and information to and from the locations 10, 12, 14 . . . 20 and the server module 32 and database 30. Such transmission may be achieved electronically, optically, by RF transmission or by infrared transmission. By way of non-limiting example, communications network 26 may be implemented by a Local Area Network (LAN), Ethernet or an equivalent network structure. As further discussed below, each of the locations 10, 12, 14 . . . 20 may also include station modules having network terminating equipment (such as a computer, minicomputer or workstation) and/or peripheral devices (such as a display monitor or screen, printers, CD-ROMs, and/or modems) to transmit and receive information over communications network 26. The network terminating equipment and peripheral devices may include hardware and appropriate software or programmed logic for interfacing with communications network 26 and for providing the various features and aspects of the present invention, as more fully discussed below. If a computer is provided at the factory location, the computer may be a stand-alone, personal computer or a general purpose computer that is part of an interface device of the equipment or machinery provided at the location. For example, the computer may be an IBM compatible personal computer or may be a computer that is part of an interface/control system of the machinery, such as an Amada AMNC system.

Server module 32 and database 30 are also connected to communications network 26. Server module 32 may comprise network terminating equipment, such as a personal computer, minicomputer or mainframe, with suitable hardware and software for interfacing with communications network 26. Server module 32 may also include software or firmware for implementing the various features of the invention, such as those described in greater detail hereinafter. Further, according to an aspect of the present invention, server module 32 may also include database 30 for storing the design and manufacturing information associated with each customer's order. Database 30 may be implemented by any commercial available database with sufficient memory capacity for storing the design and manufacturing information of the factory's customers and storing other data, tables and/or programs. For example, database 30 may comprise a SCSI memory disk with 4 GB or more of available memory space. The design and manufacturing information that is stored in database 30 may be accessed and distributed to the various locations 10, 12, 14 . . . 20 within the sheet metal facility 38 via communications network 26. Various data formats, such as Structured Query Language (SQL), may be used for accessing and storing data to database 30. In addition, information that is stored in database 30 may be backed-up and stored on a wide variety of storage medium, such as magnetic tape, optical disks or floppy disks. Server module 32 and database 30 may be connected to communications network 26 at a separate area or location within the factory 38 (see, e.g., FIG. 1A), or at a location that is within or in close proximity to one of the predefined stations (e.g., within design office 10). Although the embodiment of FIG. 1A depicts database 30 as being part of server module 32 and interfacing with communications network 26 via the server module, database 30 may of course be physically located separately from server module 32 and connected to communications network 26 via a network database module 34, such as that shown in FIG. 1B.

By way of a non-limiting example, and in accordance with a preferred embodiment of the present invention, server module 32 and each of the locations 10, 12, 14 . . . 20 may comprise a personal computer, such as an IBM compatible computer with a 100–200 MHz central processor unit (CPU), including a Pentium or an equivalent microprocessor, at least 32 MB of memory and a high resolution display screen, such as any commercially available SVGA monitor with 800×600 resolution. Server module 32 and locations 10, 12, 14, . . . 20 may also include a joystick or mouse device and a Sound Blaster or compatible sound and game port adapter card for interfacing and controlling the display of information. Operating system software may also be provided to support communications. For example, server module 32 may be provided with Microsoft Windows New Technology (NT) or Windows 95 operating system software (both of which are available from Microsoft Corporation, Redmond, Wash.), and each of the locations 10, 12, 14 . . . 20 may include Microsoft Windows 95 operating system software. In addition, server module 32 and locations 10, 12, 14 . . . 20 may be adapted to support multiple languages (such as English, Japanese, etc.) and full support for an Object Linking and Embedding (OLE) server, such as an OLE2 server, may be provided.

Various database languages and management systems may also be used for creating, maintaining and viewing information stored in database 30. A database language such as Structured Query Language (SQL) may be used for defining, manipulating and controlling data in database 30. For example, SQL Server (which is a retail product available from Microsoft Corporation) may be utilized to implement the present invention. In addition, the invention may be provided with an Open Database Connectivity (ODBC) compatible driver to facilitate access of information from database 30 over communications network 26. More information concerning OBDC may be found, for example, in the Microsoft Open Database Connectivity Software Development Kit Programmers Reference manual.

FIG. 1B illustrates, in block diagram form, a progressive sheet metal manufacturing facility constructed according to another embodiment of the present invention. In the embodiment of FIG. 1B, the database 30 and server module 32 are provided separately, with the database 30 being connected to communications network 26 via a network database module 34. As discussed above, the present invention is not limited to this arrangement and the database 30 and server module 32 may be provided together (as shown, e.g., in FIG. 1A), with the functionality of the network database module 34 for providing access to the database being incorporated in the server module. The embodiment of FIG. 1B also illustrates an example of the station module 36 that may be provided at each of the various locations 10, 12, 14 . . . 20 throughout the sheet metal manufacturing facility 38. For purposes of illustration, an exemplary station module 36 that may be located at bending station 18 is provided in FIG. 1B. Although not depicted in the example of FIG. 1B, similar station modules 36 may also be provided at the other locations within the facility 38.

As shown in FIG. 1B, each of the modules (i.e., server module 32, network database module 34, and station module 36) may be connected to communications network 26 via a network interface card or port 42. The network interface card 26 may be vendor specific and be selected based on the type of communications network that is selected. Each of the modules 32, 34 and 36 may also include network software or programmed logic for interfacing with the communications network 26. The communications network 26 may be an Ethernet with any of a number of commercially available cable types, such as 10 Base/T (twisted pair), 10 Base/2 (coax), or 10 Base/5 (thick cable), with the cable type being selected based on the size of facility 38 and the amount or length of the cable required.

In FIG. 1B, server module 32 may comprise a personal computer 40 with display monitor or CRT 44 and input/output devices 46, which may include a keyboard, mouse and/or joystick. The network interface card 42 may be plugged into an available expansion slot or port of the personal computer 40. In addition, personal computer 40 may comprise an IBM compatible computer with 100–200 Mhz operating speed and a Pentium or Pentium Pro microprocessor. Personal computer 40 may also include, for example, 32 MB or more of available main memory and 1.2 GB or more of available random access memory (RAM). Display 44 may include a high resolution display screen, such as any commercially available SVGA monitor with, for example, 800×600 resolution. To support the various graphics and information that may be displayed on display 44, personal computer 40 may also include any commercially available graphics card such as a PCI graphics card. Further, computer 40 may include a Sound Blaster or compatible sound and game port adapter card and input/output devices 46 may include a keyboard, joystick and/or mouse device.

In order to implement the various features of the invention, server module 32 may be configured with software and various software packages. For example, server module 32 may be provided with operating system software, such as Microsoft Windows NT (workstation version) or Windows 95. Further, in order to provide the server module specific functionality and features of the invention (see, e.g., FIG. 3), server module 32 may include software or programmed logic implemented routines. As discussed in greater detail below, these routines may be developed using a high level programming language, such as C++, and object oriented programming techniques. Server module 32 may also include or interface with CAD or CAD/CAM software, such as VELLUM or Amada AP40 or AP60 software, to enter and/or develop original 2-D and 3-D drawings based on a customer's specifications. For this reason, server module may be located in the design office 10 of the manufacturing facility 38. In order to access data from database 30, server module 32 may also include an OBDC driver, such as Microsoft ODBC driver, and may use SQL as a standard for accessing data. An OLE server, such as OLE2 server, may also be provided to link the data.

In the embodiment of FIG. 1B, database 30 is provided separate from server module 32 and is connected to communications network 26 via network database module 34. As indicated above, database 30 may comprise a SCSI disk with appropriate memory space (e.g., 1–4 GB), which may be selected based on the size of the factory 38 and the amount of part information to be stored in the database. Network database module 34 may include a personal computer 40, such as an IBM compatible computer with a Pentium microprocessor, and an expansion slot fitted with network interface card 42 for interfacing with communications network 26. Database 30 may be connected to personal computer 40 via a data bus and personal computer 40 may include standard display and input/output devices (not shown in FIG. 1B), such as a display monitor or CRT and a keyboard.

In order to facilitate access to database 30 based on SQL, personal computer 40 of network database module 34 may be configured with a commercially available SQL server, such as a Microsoft SQL server or Oracle SQL server. An OLE server, such as OLE2 server, may also be provided to link the data. Personal computer 40 may also be configured with various operating software, such as DOS and Microsoft Windows NT (server version).

The embodiment of FIG. 1B also includes an exemplary implementation of one station module 36. In this embodiment, the station module 36 is implemented at bending station 18. As shown in FIG. 1B, the station module 36 may include similar hardware to that of the server module 32. That is, each station module (e.g., at the other stations shown in FIG. 1A) may comprise a computer 48 with display monitor or CRT 44 and input/output devices 46, which may include a joystick or mouse. The network interface card 42 may be plugged into an available expansion slot or port of the computer 40. As discussed above, the computer of the station module 36 may be a stand-alone, personal computer or a general purpose computer that is part of an interface device of the equipment or machinery provided at the location. For example, computer 48 may comprise a free-standing, personal computer such as an IBM compatible computer with 100–200 Mhz operating speed and a Pentium or Pentium Pro microprocessor, or computer 48 may be a computer that is part of or built into an interface/control system of the machinery, such as an Amada AMNC system. Computer 48 may also include, for example, 32 MB or more of available main memory and 1.2 GB or more of available random access memory (RAM). Display 44 may include a high resolution display screen, such as any commercially available SVGA monitor with, for example, 800×600 resolution. To support the various graphics and information that may be displayed on display 44, computer 48 may also include any commercially available graphics card such as a PCI graphics card. Further, computer 48 may include a Sound Blaster or compatible sound and game port adapter and to support, for example, a joystick or mouse of the input/output devices 46.

In order to implement the various features of the invention, station module 36 may also be configured with software and various software packages. For example, station module 36 may be provided with operating system software, such as Microsoft Windows 95 or Windows NT (workstation version). Further, in order to provide the station module specific functionality and features of the invention (see, e.g., FIG. 4), station module 36 may include software or programmed logic implemented routines. As discussed in greater detail below, these routines may be developed using a high level programming language, such as C++, and object oriented programming techniques. In order to access and link data, station module 36 may also include an OBDC driver, such as Microsoft ODBC driver, and an OLE server, such as OLE2 server. Similar to server module 32, station module may use SQL as a standard for accessing data from database 30.

If the station module 36 of bending station 18 is provided as a free-standing personal computer, then software may be provided to create bending code data (i.e., NC data) and to interface with the machinery 25 (e.g., a CNC or NC controlled press brake). In the embodiment of FIG. 1B, computer 36 is illustrated as being implemented as a personal computer and is configured with software to interface with bending machinery 25 via a standard RS-232-C wire interface. This interface may be provided to permit the station module 36 to communicate with and send or receive bending code data to the bending machinery 25 via the RS-232-C interface. The implementation of the interface is vendor specific and will depend on the data format and machine instruction set used for the bending machinery 25. All data that is sent from the station module 36 to the bending machinery 25 should thus be formatted based on the machine instruction set that is defined for the machinery. The computer 48 of station module 36 may also be provided with any commercially available CNC or NC software for generating bending code data, in order to simulate the functionality that is normally provided by a built-in computer of CNC or NC systems (such as a Amada AMNC) for such machinery.

FIG. 2 illustrates an exemplary embodiment of the respective data flows between server module 32, database 30 and the various locations of the sheet metal manufacturing facility 38. For purposes of illustration, and to better facilitate the description of the respective data flow in the embodiment, server module 32 and database 30 (integrated with network database module 34) are each shown in FIG. 2 as being separately and directly connected to communications network 26, with the data flow between these elements being carried out across the communications network. Of course, as will be appreciated by those skilled in the art, a wide variety of data flow arrangements may be provided between these elements; and, if database 30 is arranged to be directly connected to server module 32, then the data and information can be directly transferred from the server module to the database without use of communications network 26. In addition, for purposes of facilitating the description herein, the illustration of communications network 26 in FIG. 2 has been simplified and only punching station 16 and bending station 18 are shown in the drawing. Nonetheless, it will be appreciated that the data flow to and from locations 10, 12, 14 . . . 20 (as well as any other location or area that may be present in the factory) may be carried out in a similar manner to that described for punching station 16 and bending station 18.

The design and manufacturing information associated with each customer's order may be organized and stored in database 30. When a customer's order is initially received, basic product and design information may be entered at server module 32 and then transferred and stored to database 30. As discussed above, server module 32 may include any suitable means for entering the data, such as a personal computer with a keyboard, etc. If a personal computer is utilized at server module 32, software may be provided to generate menu driven screens to facilitate the entry of the data by factory personnel. The data entry program may be, for example, a Microsoft Windows based application with help and/or menu screens, etc. By way of a non-limiting example, the data that is entered and/or developed at server module 32 and transferred to database 30 may include part information, bend model data, feature extraction data, and bend line information, as generally illustrated in FIG. 2.

The part information may comprise, for example, a part or order reference number, the customer's name, a brief description of the part, the batch size or quantity, and scheduled delivery date. The bend model data may include, for example, part geometry and manufacturing data, such as the overall dimensions of the part (e.g., width, height, depth), and part material information such as the material type (e.g., steel, stainless steel, or aluminum), thickness and tensile strength. Further, feature extraction data may be manually entered and/or automatically generated to identify the key features of the part and to facilitate similar part searches and other searches of the database. The feature extraction data may be stored in a separate data file in database 30, or may be stored with the bend model data and other job information for each part. The feature extraction data may comprise, for example, features of the part such as the number of surfaces or faces, the number or types of bends present (e.g., a positive bend between two faces or a negative bend between two faces), the relationships between the faces and/or the number of holes or other types of openings in the part. As discussed more fully below, such data may be represented and organized in a feature based part matrix and/or a sequence of search keys (see, e.g., FIGS. 5–7 below). Lastly, bend line information may be entered at server module 32 for storage in database 30. The bend line information may comprise, for example, pertinent bend line information for each bend in the part, including the bend angle, the bend length, the inside radius (IR) of the bend, the amount of deduction, and the bend direction (e.g., front or back).

In order to transmit to and receive data from database 30 over communications network 26, each of the locations 10, 12, 14 . . . 20 may comprise a station module (such as station module 36 described above) that is connected to the communications network. In FIG. 2, punching station 16 and bending station 18 are generally illustrated in block diagram form with a station module. As discussed above, the station module may comprise, for example, software or control logic and a stand-alone personal computer or a general purpose computer that is part of the equipment or machinery provided at the location. For each customer's order, the design and manufacturing information (including the part information, bend line information, and bend model data) may be accessed and retrieved by entering, for example, a predetermined reference number or code. The reference number or code may be entered manually (e.g., by keyboard or digital input pad) or by scanning a bar code with a bar code reader or scanner provided at the station module. In addition, in accordance with an aspect of the present invention, previous job data may be accessed and retrieved from database 30 from any location 10, 12, 14 . . . 20 within the factory 38 by performing a similar part search. As discussed more fully in the detailed description that follows, a similar part search may be conducted based on the feature extraction data or search keys stored in database 30 so that previous job information relating to identical or similar part(s) can be retrieved and utilized to reduce the overall manufacturing time of future jobs.

The design and manufacturing information that is retrieved from database 30 may be used by the shop floor operators to develop and test the bending plan. For example, a bending operator at bending station 18 may access and retrieve the part information, bend line information and bend model data from database 30 in order to determine the necessary tooling and the optimum bend sequence for the sheet metal part. In accordance with an aspect of the present invention, an ODBC driver may be provided to permit each station module to interface database 30 and display information stored in the database. In addition, server module 32 or the network database module of database 30 may comprise a SQL server to facilitate the access and retrieval of data stored in the database. Once the bending code has been programmed based on the final bending plan, the bending code along with the bend sequence and tool setup information may be sent from the station module of bending station 18 to database 30 over communications network 30, as generally shown in FIG. 2. This information may then be stored along with the other design and manufacturing information associated with that job.

Other information may also be stored in database 30. For example, the 2-D and/or 3-D image representation of the part may be stored with the bend model data for the part. The 2-D or 3-D image representation may be developed at design station 10 or another location with a CAD/CAM system and transferred to database 30 via the station module of the design station (or another appropriate location) and through the communications network 26. Alternatively, the 2-D or 3-D image may be developed at server module 32, by utilizing or interfacing with an appropriate CAD/CAM system or modeling software and performing a series of functions or operations, as will be discussed more fully below.

Figure 3:
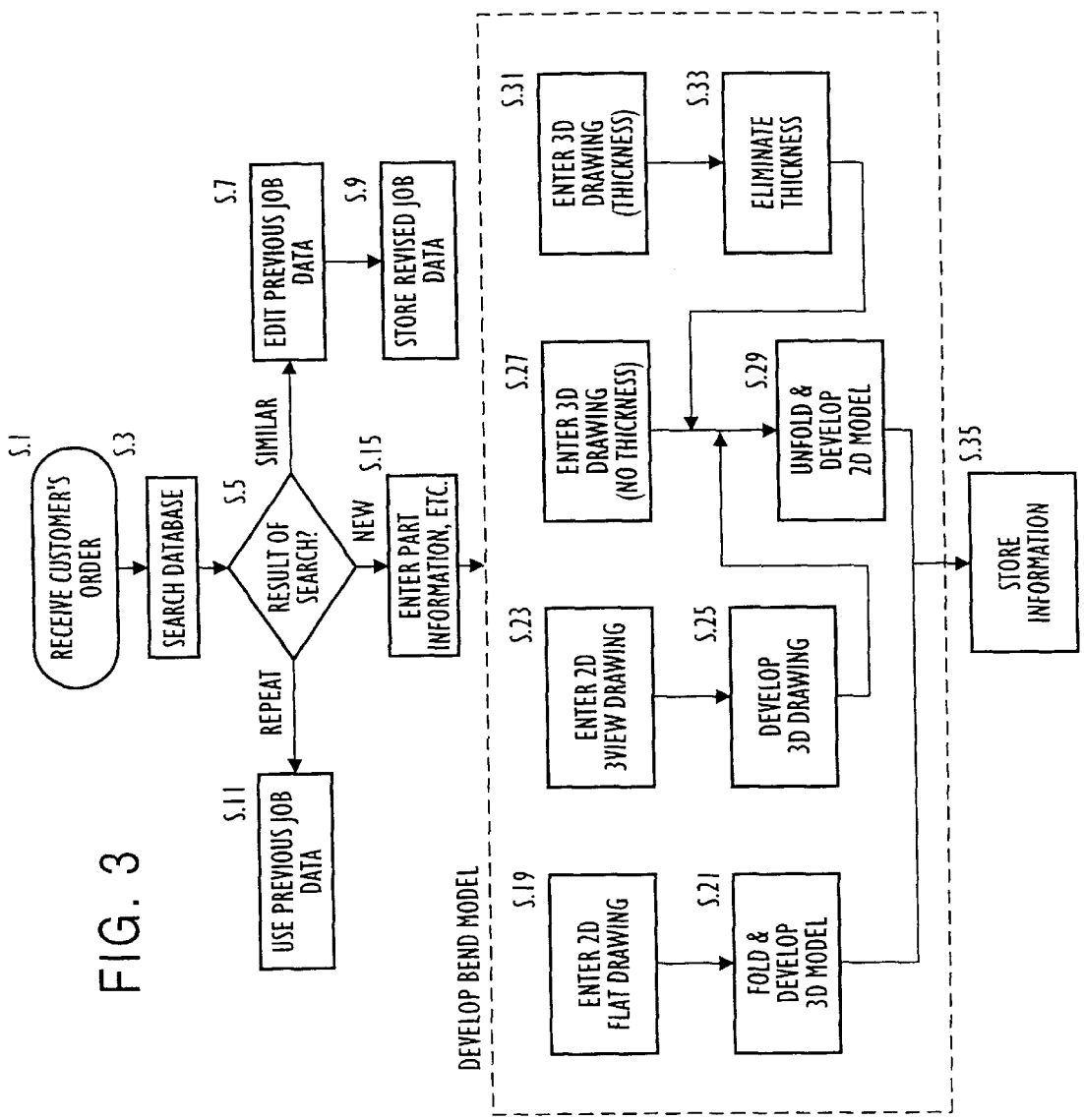
FIG. 3 is a flow chart of the general processes and operations that may be performed by the server module, according to another aspect of the invention.
Figure 4:
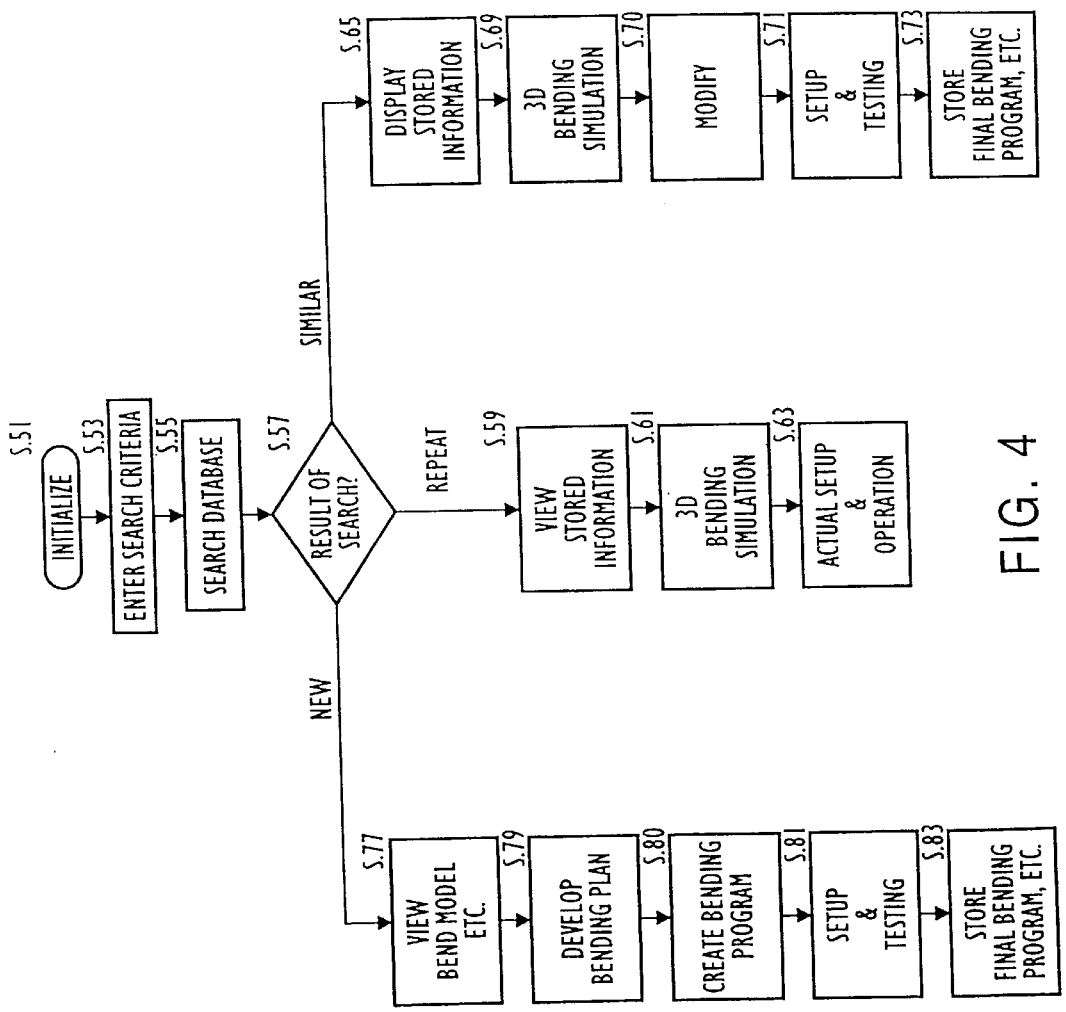
FIG. 4 is a representative flow chart of the basic processes and operations that may be performed by each of the station modules, in accordance with the teachings of the present invention.

Referring now to FIGS. 3 and 4, a detailed description of the processes and operations that may be programmed and performed by server module 32 and the station modules of each of the locations 10, 12, 14 . . . 20 will be provided. FIGS. 3 and 4 are flow charts of the basic logic flow that may be performed by server module 32 and the station modules of each of the locations 10, 12, 14 . . . 20 within the sheet metal manufacturing facility 38. While FIG. 4 is directed to the processes and operations that would typically be performed at, for example, bending station 18, it will be appreciated that other processes and steps may be performed depending upon the operations performed at each particular location within the facility 38. The processes and operations discussed below may be implemented by software and by using any one of a wide variety of programming languages and techniques. For example, in accordance with an aspect of the present invention, the processes and operations described below with reference to the accompanying drawings may be implemented by using a high level programming language such as C++ and using object oriented programming techniques. Further, by way of a non-limiting example, VISUAL C++ may be utilized, which is a version of the C++ programming language written by Microsoft Corporation for Windows based applications.

FIG. 3 is a flow chart of the basic processes and operations performed by server module 32, in accordance with an aspect of the invention. FIG. 3 illustrates the basic logic flow of the processes and operations performed by the software or programmed logic of server module 32. Server module 32 may include a Windows based application with tool bar icons and help and/or menu screens to assist an operator or user in selecting and executing the various processes and operations of the server module. The process begins at step S.1, when a customer's order is received at the sheet metal manufacturing facility 38. The customer's order will normally include the necessary product and design information so that the component may be manufactured by the factory 38. This information may include, for example, the geometric dimensions of the part, the material required for the part, and other design information. Based on the information received from the customer, server module 32 may perform a search of previous job information stored in database 30, as illustrated in step S.3. The job information stored in database 30 may be searched based on a wide variety of search criteria. For example, information may be searched based on a predetermined reference or job number or a similar part search may be performed based on certain design features of the part, so that previous job information relating to an identical or similar part can be retrieved and utilized for the current job. A more detailed description of a similar parts search that may be utilized is provided below with reference to FIGS. 5–7.

At step S.5, the results of the search of the database are analyzed to determine whether the current customer's order relates to a new part, a part that is similar to a previous job, or a repeat of a previous job. If an identical match is found (e.g., the same part or reference number is located) and the present customer's order is a complete repeat of a previous job performed at the factory, then no further modifications to the job information is necessary and the previous job information may be accessed from database 30 and used to carry out the present customer's order, as shown at step S.11. The search of the database may provide the part or reference number and/or file name of the previous job so that the job information may be accessed from the database by an operator at the server module 32 or any of the station modules. If only the part or reference number is provided, then a translation table may be provided so that the file name of the previous job information may be determined and accessed based on the entry of the part reference or job number by an operator. Thus, an operator at, for example, server module 32 may access the job information and the 2-D and 3-D modeling information from database 30 to analyze the geometry of the part and confirm that it is similar to that of the repeat order. If the order is confirmed to be a repeat order, then a bending operator located at the station module of bending station 18 may also access the previous job information and utilize the manufacturing information, including the bending code data and tool setup information, to bend and produce the part. The use of such stored expert knowledge thus enables repeat orders to be manufactured more efficiently and without the need to reproduce previously entered and developed job information.

If, however, it is determined at step S.5 that the current customer's order is similar to a previous job or the same as a previous job but requires modification of, for example, the job or reference number or batch size, etc., then at step S.7 the previous job data located by the search may be retrieved from database 30, and edited and modified by an operator at server module 32. An editing function may be provided to allow editing and modification of previous job data to create new job data that may be stored in database 30 for the present customer's order. The amount of editing required will depend upon the amount of similarity that exists between the previous job and the current job. The amount of editing may encompass simply modifying the reference or job number or batch size, and/or may involve more extensive modifications such as editing the dimensions of the part and the defined bend sequence. After the previous job information has been edited, the revised job information may then be stored in database 30 at step S.9. The revised job information may be stored under a new reference or job number. In addition, various database management functions (such as copy, delete, save, rename, etc.) may be provided to permit the previous job information to be maintained in database 30 or to permit the previous job information to be erased or overwritten upon entry of a special command.

If it is determined that there is no similar or identical match to the current job and, thus, that the present customer's order relates to a new job, then logic flow proceeds to step S.15, as shown in FIG. 3. Since, in this case, the current job relates to a new job it will be necessary to independently develop and enter the design and manufacturing information. Menu and/or help screens may be provided by the server module 32 to assist the operator in entering all of the necessary job information. In accordance with an aspect of the invention, an operator at server module 32 may create a new file by first entering the basic part information for the new job. The part information may comprise, for example, a reference or job number, the customer's name, a brief description of the part, the required batch size or quantity for the job, and the scheduled delivery date. The feature extraction data or search keys may also be entered at step S.15, or this data may be automatically developed or extracted concurrently with the development of the bend model data, as described below. Other data or information may also be entered at step S.15, or entered after or during the entry of the bend model data, such as the bend line information which may comprise, for example, the bend angle, radius and length for each bend line in the part. After step S.15, logic flow proceeds so that the bend model data may be developed and entered at server module 32 by an operator, as shown in FIG. 3.

The development and entry of the bend model data may depend upon the original drawings and information provided from the customer. The customer's order may include, for example, a 2-D, single view flat drawing of the part to be manufactured and/or a 2-D, three view (e.g., including top, front and side views) drawing of the part. occasionally, the customer may also provide a 3-D, wire frame drawing of the part, with or without the thickness of the material of the part being indicated in the drawing. In accordance with an aspect of the present invention, the bend model data may include both the unfolded (i.e., the 2-D flat representation) and the folded (i.e., the 3-D representation) information for the part to be manufactured. Thus, if only a 2-D flat drawing is provided by the customer, it will be necessary to develop a 3-D drawing of the part by applying, for example, a folding algorithm or process to the 2-D drawing. Alternatively, if only a 3-D drawing of the part is provided, then it will be necessary to develop a 2-D flat drawing by applying, for example, an unfolding algorithm or process to the 3-D drawing. In accordance with another aspect of the present invention, the 2-D and 3-D models that are saved in the bend model may be developed and represented without the sheet material thickness (i.e., with no thickness). This is possible due to the unique symmetry of all sheet metal parts. Providing and representing the 2-D and 3-D drawings with no thickness provides modeling and simulation views of the part that can be more easily interpreted and understood by the design programmer, the bending operator and other users. Removing the thickness information also shortens and improves the processing time required by the server module and station modules when performing and executing the various features of the invention described herein. A more detailed description of such features, as well as the folding and unfolding algorithms that may be utilized in the present invention, is provided below with reference to the accompanying drawings.

FIG. 3 shows the general processes and operations performed when developing the bend model data. The various types of drawings that may be received or developed based on the customer's order and that may be entered to develop the bend model data are generally shows at steps S.19, S.23, S.27 and S.31. A tool icon bar and menu and/or help screens may be provided by the server module 32 to assist the operator in selecting and executing each of these steps. The processing of these drawings to develop the 2-D and 3-D models of the part for the bend model will depend on what type of drawings are initially provided. These drawings may be manually entered or developed at server module 32, or they may be downloaded from a tape or disk. Server module 32 may, for example, interface with a CAD/CAM system located at, for example, design office 10, or server module 32 may include a stand alone CAD/CAM system. Further, the 2-D and 3-D drawings may be saved as DXF or IGES files and imported to server module 32.

If a 2-D, single view flat drawing is provided, then processing to develop the bend model may begin at step S.19, as shown in FIG. 3. At step S.19, the 2-D, flat drawing that was received or developed may be entered at server module 32. Other bend model data, such the overall dimensions of the part (e.g., width, height, depth), and part material information may also be enter at step S.19. Thereafter, a folding algorithm or process may be utilized to develop a 3-D model (with no material thickness) based on the original 2-D single view drawing, as generally shown at step S.21. An example of the processes and operations that may be performed to develop a 3-D model from a 2-D, flat drawing is provided below with reference to FIGS. 8–11.

If a 3-D, wire frame drawing (with no material thickness) of the part is received or developed, the drawing information may be entered at step S.27. In addition, other bend model data, such the overall dimensions of the part (e.g., width, height, depth), and part material information may be entered at step S.27. Thereafter, an unfolding algorithm or process may be executed at server module 32 in order to develop a 2-D model of the part, as shown at step S.29. An example of the processes and operations that may be performed to develop a 2-D model from a 3-D drawing (with no thickness) is provided below with reference to, for example, FIG. 12.

The 2-D and 3-D model representations of the part may be stored as part of the bend model for that part. In addition, as noted above, during the development and entry of the 2-D and 3-D models, other bend model data may be entered (such as the part material information and other manufacturing information) so that it may be stored with the bend model data in database 30. The various features and data structure arrangements that may be implemented for organizing and storing the bend model data are discussed more fully below (see, for example, FIGS. 17 and 18).

As shown in FIG. 3, if a simple 3-D drawing (with no material thickness) of the component is not originally developed or received, additional processing may be necessary in order to develop a 3-D model of the part (with no thickness), before executing the necessary unfolding algorithm or processes to develop the final 2-D model. Steps S.23, S.25, S.31 and S.33 generally show the additional processing and operations that may be performed by server module 32 before executing an unfolding algorithm and developing the 2-D model at step S.29.

For example, if a 2-D, three-view drawing of the part is originally provided or developed, then at step S.23 the drawing may be entered at or imported to server module 32. Further, other bend model data, such the overall dimensions of the part (e.g., width, height, depth), and part material information may also be enter at step S.23. Thereafter, at step S.25, a simple 3-D, flat drawing of the part may be developed based on the 2-D, three-view drawing that was entered. The developed 3-D drawing may then be used to develop the 2-D model at step S.29, as shown in FIG. 3. An example of the processes and operations that may be performed to develop a 3-D model from a 2-D, three view drawing is provided below with reference to, for example, FIG. 13.

If, however, a 3-D drawing with material thickness is originally received or developed, then the drawing information may be entered at step S.31 for further processing before applying the unfolding algorithm. Other bend model data, such the overall dimensions of the part (e.g., width, height, depth), and part material information may also be enter at step S.31. Thereafter, at step S.33, an eliminate thickness procedure may be executed to eliminate the thickness in the 3-D drawing. In accordance with an aspect of the invention, server module 32 may prompt the operator or user to indicate the thickness in the drawing and to indicate which surfaces (e.g., the outside or inside) should be retained when executing the eliminate thickness procedure. An example of an eliminate thickness procedure that may be utilized in the present invention is provided below with reference to, for example, FIGS. 15A and 15B. After the thickness in the 3-D drawing has been eliminated at step S.33, logic flow will proceed to step S.29, where the revised 3-D model with no thickness may be utilized and an appropriate unfolding algorithm or process may be applied to develop the final 2-D model. An example of an unfolding process and the various processes and operations that may be performed to develop a 2-D model from a 3-D drawing is provided below with reference to, for example, FIG. 12.

As shown in FIG. 3, after all of the relevant information has been developed and entered, the part information, bend model information and other data associated with the customer's order may be transferred from server module 32 and stored in database 30 at step S.35. The data stored in database 30 may include feature extraction or search data that may be utilized when performing database searches. As described below, the feature extraction or search data may include data that is indicative of the basic or key features of the part associated with each job, so that searches of the database may be performed to locate job information and stored expert knowledge relating to the same or similar parts. The data and information entered at server module 32 may be sent directly to database 30 or transferred over communications network 26, as shown, for example, in FIG. 2. As indicated above, a more detailed description of the various processes and operations that may be performed for the various drawings when developing the bend model data will be provided below with reference to the accompanying drawings.

FIG. 4 is a flow chart of the basic processes and operations performed by each of the station modules that may be provided at the locations 10, 12, 14 . . . 20 of the sheet metal manufacturing facility 38. For purposes of illustration, FIG. 4 provides an example of basic logic flow of the processes and operations that may be performed by a station module located at, for example, bending station 18. As will be appreciated by those skilled in the art based on the teachings of the present invention, the logic flow illustrated in FIG. 4 may of course be modified for each station module depending upon the nature of the operations and processes to be performed at each of the locations. Further, as with server module 32, the processes and operations of the station module described below may be implemented by software or programmed logic. In addition, the station module may include a Windows based application with tool bar icons or help and/or menu screens to facilitate an operator or user in selecting and executing the various processes and operations of the station module. Such help and/or menu screens may also be provided to facilitate the entry or transfer of data at the station module.

As shown in FIG. 4, after initializing the station module at step S.51, an operator may input one or more database search criteria or key terms at step S.53. The search criteria may be entered to locate previous job information or job information relating to a new or current job that is stored in database 30. The operator may input, for example, a predetermined reference number or code in order to retrieve particular job information from database 30. For example, in accordance with an aspect of the present invention, a bar code may be provided on a routing sheet or may be affixed to the punched stock material and scanned by a bar code reader at the station module to access the information. Alternatively, the reference code or number could be entered manually through a keyboard or digital input pad at the station module. A translation table may be provided so that the file name of the previous job information may be determined based on the entry of the part reference or job number by an operator. In addition, it is contemplated that search criteria or keys may be entered to perform a similar part search for previously stored job information. Such a search may be performed based upon the various design features or feature extraction data of the part. A description of a similar part search that may be implemented, in accordance with an aspect of the present invention, is provided below with reference to FIGS. 5–7.

After the search criteria has been entered at step S.53, the station module may execute a search of the database 30 at step S.55 via communications network 26 and network database module 34. The results of the search may then be sent back to the station module and analyzed at step S.57 in order to determine whether the operator or user has requested information relating to a new job or a similar previous job, or whether the request relates to the complete repeat of a previous job.

If an identical match is found (e.g., the same part or reference number is located) and it is determined that a previous job is to be repeated, then the stored design and manufacturing information relating to the job may be transferred from database 30 to the station module, where it may be displayed for viewing by the operator, as generally shown at step S.59. The station module may include one or more menu display screens or directories to permit the operator to select and display the various information retrieved from database 30. The operator may review the displayed information and run various simulations, such as a 3-D bending simulation at step S.61, to view the various stages in the bending sequence and to understand the geometry of the part for that job. The operator may also review other information such as the required tooling and any other special instructions or messages that may have been recorded with the job information. After confirming the job information, the operator can then set-up the bending or other required machinery and operate the machinery to produce the specified sheet metal components. The job information that is retrieved from database 30 may include the final bending plan data, including the bending code to control the machinery at, for example, bending station 18. The set-up and actual operation of the machinery may thus be carried out by the operator, as generally shown at step S.63 in FIG. 4.

If no identical or similar job information is located and it is determined that the information relates to a new job (i.e., only preliminary job information has been entered at the server module 32 and complete job information has not yet been developed), then the partial part information and bend model data may be downloaded from database 30 and sent to the station module where it may be viewed by the operator at step S.77. Since the information requested relates to a new job, it will be necessary for the operator to develop and enter a bending plan, including the required tooling and bending sequence. Thus, at step S.79, with the information provided at the station module, the bending operator may develop and define the bending sequence and tooling selection for the new job. As will be discussed in greater detail below, a graphical user interface (GUI) and other features may be provided at the station module to facilitate the bending operator in developing the bending plan. The GUI may be provided to help the operator develop a bending plan by, for example, displaying tooling options, automatically checking for potential collisions between the part and tool(s), and simulating each of the intermediate steps in a proposed bend sequence. After developing and entering the bending plan at the server module, the operator may program the bending sequence at step S.80 to generate the bending code (i.e., the CNC or NC code for executing the bend sequence with the bending machinery). The bending code may be directly entered at the server module or imported to the server module by interfacing with, for example, a CNC or NC controller of the bending machinery. Thereafter, the operator may set-up and test the bending plan at the bending work station at step S.81. When all of the necessary testing and any necessary modifications to the bending plan have been completed, the final bending data may be entered and saved to database 30 at step S.83. The final bending data may include the bend sequence and tool set-up information, as well as the bending program. This information may be sent from the station module of, for example, bending station 18 to database 30 so that it may be saved with the other design and manufacturing information associated with the new job.

If it is determined at step S.57 in FIG. 4 that the information relates to a similar part of a previous job or the same part of a previous job but having, for example, a different reference or job number or batch size, etc., then logic flow may proceed to step S.65. At step S.65, the previous job information may be retrieved from database 30 and displayed at the bending station 18. The bending operator or user may then view the data to determine which changes to the data will be necessary for the similar part. once again, the station module may include a series of menu display screens or directories to enable the operator to select which information to display and the manner in which the information is to be displayed or modified. For example, at step S.69, the station module may provide a 3-D bending simulation based on the retrieved information in order to facilitate the operator's development of a bending plan for the similar part. After reviewing the previous job information, the operator may modify the tooling and bending information, as well as the bending program, at step S.70. Other job information, such as the dimensions of the part, the reference number or batch size, may also be modified and edited at step S.70. Thereafter, at step S.71, actual tooling set-up and testing may be performed by the operator on the shop floor in order to test the modified bending plan. Upon completion of testing and any further modifications to the bending plan, the operator may enter at step S.73 the final bending data and store the same in database 30 under a new reference or job number. As noted above, the previous job information may be maintained in database 30 along with the other stored job files. Further, various database management functions may be provided for storing, deleting, renaming, etc. the files stored in the database.

Referring now to FIGS. 5–7, a detailed description of an example of a similar part search function that may be implemented in accordance with the teachings of the invention will be provided. In accordance with an aspect of the present invention, a similar part search procedure may be provided that utilizes a feature based topology similarity search algorithm to search and retrieve previous job information from database 30. The similar part search may involve a search for identical and/or similar parts based the design features and/or manufacturing information relating to the part to be produced. Further, the similar part search may be implemented through use of software or programmed logic residing within, for example, server module 32 and/or the various station modules throughout the factory 38. The similar part search may be executed from server module 32 or any of the station modules of the locations 10, 12, 14 . . . 20 within the sheet metal bending factory 38. A high level programming language, such as C++ or Microsoft's VISUAL C++ programming language, and object oriented programming techniques may be utilized to implement the various processes and operations of the similar part search.

Figure 5A:
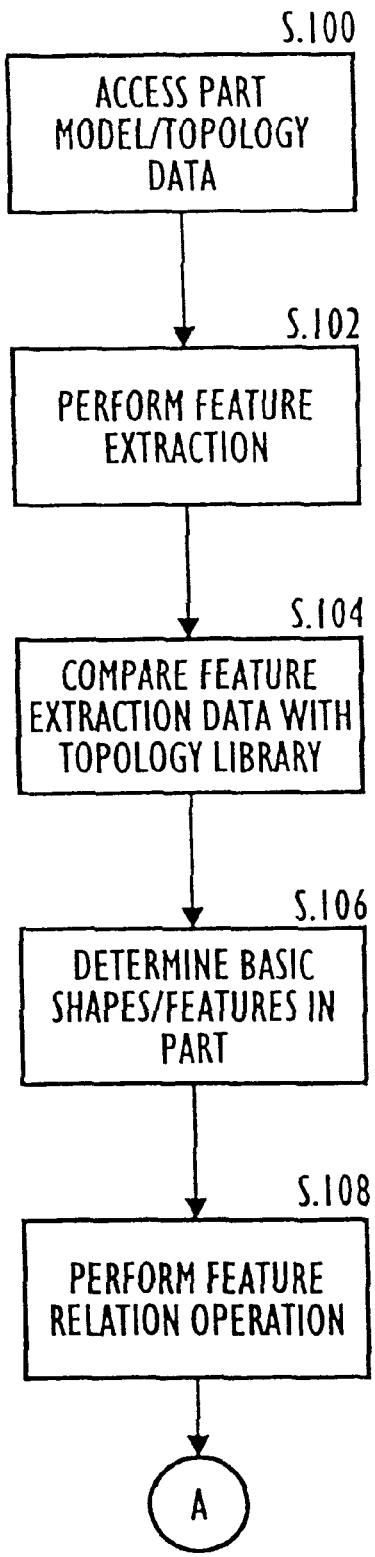
FIGS. 5A and 5B are flowcharts that illustrate the logic flow of a similar part search algorithm or process, according to an aspect of the present invention.
Figure 5B:
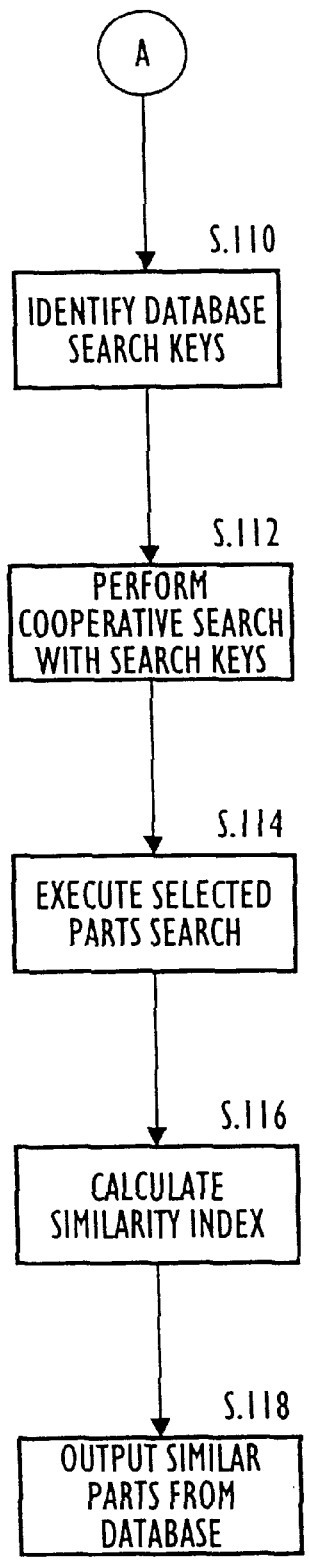

FIGS. 5A and 5B illustrate the logic flow of a similar part search algorithm or process that may be utilized. As shown in FIG. 5A, the relevant part model data file may be accessed at step S.100. The part model may comprise, for example, the bend model data developed at a CAD system located at design office 10 and/or the data developed and entered at server module 32. The part model data may include, for example, part topology data representing the orientation, geometric relationships and relative position of the various surfaces or faces and bendlines of the part. After the part model data has been retrieved, or after the bend model data for a part has been manually entered, a feature extraction operation may be performed at step S.102 to automatically derive feature extraction data for that part based on the bend model and/or part topology data of the part.

According to an aspect of the present invention, feature extraction data may be derived automatically by analyzing the various features of the sheet metal part. For example, various surface or face features and bend features may be analyzed to determine the similarities between various parts. For instance, the various faces of a part may be analyzed to determine whether adjacent faces have open or touching corners. Other features such as the existence of parallel bends, serial bends, collinear bends or opposite bends may be analyzed to determine and extract the distinct and unique features of each part.

Table 1 indicates various bend and face features that may be analyzed when performing a similar part search. The extraction features that should be included in the feature extraction operation include the positive bend and negative bend features, as well as the touch corner and open corner features. In addition, the feature extraction operation should also include at least feature analysis of parallel bends, serial bends, collinear bends, different phase, collinear bends and thickness offset bends.

TABLE 1

| Feature | Brief Description |
| --- | --- |
| PosBend | positive bend between two faces |
| NegBend | negative bend between two faces |
| P90Bend | 90 degree positive bend angle |
| N90Bend | 90 degree negative bend angle |
| MrPosBend | multiple positive bendlines between two faces |
| MrNegBend | multiple negative bendlines between two faces |
| ZBend | Z bend |
| heMBend | Hemming bend in positive direction |
| hemBend | Hemming bend in negative direction |
| TouchCnr | two faces touched in corners with same bend direction |
| OpenCnr | two faces open in corners with same bend direction |
| PrllBend | two parallel bendlines with same bend angle direction and opposite bendline direction |
| SerlBend | two parallel bendlines with same bend angle direction and same bendline direction |
| cLnrBend | collinear bendlines with same bend angle direction on one face |
| DfClnrBend | collinear bendlines with same bend angle and on different faces |
| tHkOffBend | thickness offset bendlines with same bend angle direction and on two neighboring faces |
| touchCnr | two faces touched in corners with opposite bend direction |
| openCnr | two faces open in corners with opposite bend direction |
| prllBend | two parallel bendlines with opposite bend angle direction and opposite bendline direction |
| serlBend | two parallel bendlines with opposite bend angle direction and same bendline direction |
| clnrBend | collinear bendlines with opposite bend angle direction on one face |
| thkOffBend | thickness offset bendlines with opposite bend angle direction on two neighboring faces |
| NoRelation | no relation between two faces |

The feature extraction operation performed at step S.102 may include a series of operations including analyzing the bend model data and topology for each feature, modifying the topologies, and developing feature based matrices from the topologies for further analysis. For purposes of illustration, FIGS. 6A–6G show an example of a feature extraction operation for a part consisting of a four bend box with touched corners and a part consisting of a four bend box with open corners. For purposes of illustration, FIGS. 6A–6G show the feature extraction based on the corner relationship of adjacent faces. For a closed, four bend box, with five faces (1–5) such as that shown in FIG. 6A, and for an open, four bend box, with five faces (1–5) such as that shown in FIG. 6B, the same simple face topology, such as that shown in FIG. 6C, may be provided to represent either part. This topology may be stored in and provided with the part or bend model data. The simple face topology of FIG. 6C, however, only provides basic information regarding the relationship of the faces (1–5) of the part and does not provide any information as to the various features of the part, such as the corner relationship between adjacent faces or the type of bends that are included. Accordingly, during the feature extraction operation, by analyzing the part or bend model data and the related face topology stored therewith, the basic face topology may be modified to contain additional information with respect to the various features of the part.

For instance, by examining the part or bend model data for the closed, four bend box of FIG. 6A, the corner relationship of adjacent faces may be analyzed and a modified face topology, such as that indicated in FIG. 6D, may be developed to indicate the touched corner status of the respective faces. Similarly, by examining the part or bend model data of the open, four bend box of FIG. 6D, a modified face topology, such as that shown in FIG. 6E, may be developed to indicate the open corner relationship between the various adjacent faces in the part. As shown in FIGS. 6D and 6E, special connectors may be added to the face topology to indicate the relationship (e.g., touched or open) between the corners of the faces. Other data may be added to the face topology data structure to indicate other features (e.g., the type of bends present, etc.) and to developed a featured based, face topology. After modifying the topology to include the feature based information, a matrix may be developed so that the extracted information may be more easily analyzed and compared. For example, based on the feature based face topology of FIG. 6D, a matrix such as that shown in FIG. 6F may be developed to indicate the various features of the closed, four bend box of FIG. 6A. Similarly, for the open, four bend box of FIG. 6B, a matrix such as that shown in FIG. 6G may be developed based on the feature based face topology shown for example in FIG. 6E. Other feature extraction data may also be indicated in the matrix, such as the bend features of the part (e.g., a 90° positive bend angle or a 90° negative bend angle, etc.).

As noted above, the features extraction operation of step S.102 may be performed by analyzing the bend model data and topologies to determine if various features are present in the part. In accordance with an aspect of the present invention, the feature extraction operation may be performed on the bend model and topology data provided for the part. This data includes all of the critical geometric and location data (e.g., in 2-D space (X,Y) and/or 3-D space (X,Y,Z)) relating to the sheet metal part, including face data, bendline data (e.g., bendline length and location, etc.), face-bendline relationship data, bend angle data, and special features data (e.g., data relating to special bending such as Z-bends and Hemming, etc.). The lines, bendlines and other entities may be defined by endpoints and/or vectors. For example, each 2D line may be specified by a set of 2D endpoints (e.g., X1,Y1 and X2,Y2) and each 3D line may be defined by a set of 3D endpoints (e.g., X1,Y1,Z1 and X2,Y2,Z2). Bendlines may be represented by vectors, which indicate 2D or 3D space location as well as direction of the bendline. Further, 2D arcs may be specified by 2D space data (e.g., CenterX, CenterY, Radius, Begin Angle, End Angle) and 3D arcs may be defined by 3D space data (e.g., CenterX, CenterY, CenterZ, View Matrix, Radius, Begin Angle, End Angle). Part topology data may also be provided to indicate the location of the various faces and bendlines of the part, as well as their geometric relationships to one another. Each face may be defined by a collection or linked data list of lines and/or arcs.

To extract features of the part, the feature extraction operation may be performed on the bend model and topology data to analyze and determine whether certain features are present in the part. This process may include analyzing the bend model and topology data for the part based on the various characteristics and relationships associated with each of the features to be extracted. By analyzing the bend model and topology data for the existence of the characteristics and relationships for each feature to be analyzed, the presence of features (such as a touched corner or open corner feature between faces, or a parallel or serial bends feature) may be detected. Different processes may be provided to detect the particular characteristics and relationships of each feature in the feature extraction operation. Based on the similarity of characteristics and relationships among the features to be analyzed, processes may be combined or developed to check for the existence of more than one feature in the part.

By way of a non-limiting example, a process that may be performed during the feature extraction operation of step S.102 in order to extract and detect corner features, such as a touch corner feature of two faces having the same bend direction (i.e., a TouchCnr feature in Table 1), will be provided. The process described below may also be applied to detect other features, such as a touch corner feature of two faces having with opposite bend direction (i.e., a touchCnr feature in Table 1) or open corner features between two faces having the same or opposite bend direction (i.e., a OpenCnr or opencnr feature in Table 1). The process may also be modified to detect other features (e.g., parallel bends, serial bends, etc.). In addition, the data relating to each possible combination of faces may be analyzed for the characteristics and relationships of each of the features to be extracted.

For example, for the touched corner feature TouchCnr, the basic characteristics or relationship to be detected include: two faces with a common face; the same bendline directions; non-parallel bendline directions; and bendlines with a common vertex (or vertices with a distance therebetween that is within a predefined range). For the touched corner feature touchCnr, similar characteristics or relationships should be detected; however, instead of the faces having bendlines that are in the same direction, the faces should have bendlines that are in the opposite direction (see, e.g., Table 1). The open corner features OpenCnr and opencnr may be similarly detected, however, for each feature the presence of an open corner between the faces (e.g., the bendlines of the faces are spaced apart by a distance that is greater than a predefined range) instead of a touched corner relationship, and the detection of the bendlines having the same bendline direction or the opposite direction (see, e.g., Table 1 and the definitions provided therein for OpenCnr and opencnr) should be analyzed.

To detect the touch corner feature (e.g., the TouchCnr feature in Table 1), the bend model and topology data for any two faces may first be analyzed to determine if the two faces are attached to a common face. This may be detected by looking at the bendline data for each of the faces and the bendline-face relationship data for each of the bendlines to determine if a common face exists. If the two faces are attached to a common face, then the bendline direction of each of the faces may be analyzed to see if they have the same bendline direction (or the opposite bendline direction if detecting, for example, the touchCnr feature). This may be determined by analyzing, for example, the vector data indicating the bendline direction for each of the faces.

If it is determined that the two faces have a common face and have the same bendline direction based on the bend model and topology data, then the data may be checked to detect if the bendlines are parallel. Various methods may be used to detect whether the bendlines are parallel based on the bend model and topology data. For example, the detection of parallel bendlines may be determined by taking the cross-product of the vectors defining the bendline directions. If the cross-product of the vectors equals zero (or is approximately zero), then it may be determined that the bendlines are parallel. If the cross-product of the vectors does not equal zero (or is not approximately zero), then the bendlines of the two faces are not parallel.

After determining that the two faces have a common face, the same bendline direction and the bendlines are not parallel, then the bend model data may be analyzed to determine the corner relationship between the faces (e.g., touched or open). The corner relationship of the two faces may be determined by detecting from the bend model data whether the bendlines of the faces have a common vertex. If the bendlines have a common vertex, then the two faces have a touched corner relationship with the same bendline direction (e.g., TouchCnr feature in Table 1). If the bendlines have a common vertex, but it was determined that the bendlines of the two faces do not have the same direction, then it may be determined that the two faces instead have a touched corner relationship with opposite bendline direction (e.g., touchCnr feature in Table 1).

If the bendlines of the two faces do not have a common vertex, then it still may be determined that the two faces have a touched corner relationship if the distance between the vertices is within a predefined range. Often, a minimum amount of space will be provided between adjacent faces of the part to provide clearance for passage of, for example, the punch tool. This spacing is usually defined by the width of the tool at the height of the flange. By way of example, a touched corner feature may be determined to be present if the spacing between the vertices of the bendlines of the two faces is within 0–5 mm. If the spacing between the corner of the two faces is greater than the predefined range, then it may determined that a open corner feature is present (e.g., the OpenCnr or opencnr feature of Table 1).

The above described process may be performed for every possible combination of faces in the part, to determine the corner feature of each of the faces. Other features relating to the faces and bendlines of the part may be conducted in a similar fashion by analyzing the part geometry and topology data. An exemplary code for performing the feature extraction operation of step S.102 is provided in Appendix A. The code was written in C++ programming language and includes the various processes for extracting and detecting features such as those noted in Table 1. Comments are provided in the code of Appendix A to facilitate the analysis of the logic and algorithms used therein. In addition, the terminology for the various features in Table 1 is maintained in the sample code to aid understanding of the same.

After detecting the various features of the part, the basic topology of the part may be modified to include the extracted features. While it may be useful to provide feature based topologies, such topologies can not be easily compared with one another. Instead, the inventors of the present application have discovered that it is more efficient and easier to compare feature extraction information when provided in the form of matrices. Therefore, according to one of the features of the present invention, a feature based part matrix (such as the representative matrix shown in FIGS. 6F and 6G) may be created based on the features detected during the feature extraction operation. The feature based matrix for the part may then be compared with other predefined and stored matrices to determine what basic shapes or features are included in the part.

A feature based matrix may be created and stored for each part after detecting and extracting the various features for the part. As shown in FIGS. 6F and 6G, the matrix may be a two dimensional matrix that is symmetric and that has an order that is equal to the number of faces in the part. The matrix may contain all of the detected feature information for the part, with the various features between each of the faces being provided in each of the locations of the matrix. The feature based part matrix may be temporarily stored in the memory of the server or station module and only used and compared with the predefined matrices during execution of the similar part search. Alternatively, the feature based part matrix may be permanently stored with the other job information in database 30 and accessed from any location within the factory.

Referring back to FIG. 5A, after the feature extraction operation has been performed, the resultant feature extraction data matrix may be compared with predefined feature extraction data matrices provided in a feature topology library. The feature topology library may be stored as a separate datafile in a database, such as database 30, or the memory of the server module or the station module. The feature library may consist of predefined matrices with feature extraction data corresponding to or defining basic or fundamental part shapes (e.g., a four bend box, a bridge, etc.). Each of the predefined feature based matrices, as well as the feature based part matrix, may be stored as ASCII or text files. The comparison at step S.104 may be conducted to determine the basic or fundamental shapes/features that are present in the sheet metal part, as illustrated at step S.106. A stored lookup table may be provided to indicate which fundamental shape corresponds to each of the predefined feature matrices. When a match is located, the lookup table may be accessed at step S.106 to determine which fundamental shapes are present. The matched matrices from the predefined library may be of the same order as the feature based part matrix (in which case the part is determined to exactly correspond and include only one fundamental shape), or may be sub-matrices of the part matrix (in which case the part may include more than one fundamental shape).

Recursive programming techniques may be utilized to compare the feature based part matrix with the matrices in the predefined library. By interchanging the indexes of the matrices when comparing the information therein, the use of data assignments may be avoided and the amount of required processing time reduced. The use of recursive programming techniques and interchanging of indexes also facilitates the comparison of matrices that have different orders and different base faces.

According to an aspect of the present invention, the comparison operation that is performed at step S.104 may consist of a series of comparisons and may initially begin based on the comparisons of matrices relating to more complicated shapes (e.g., those shapes containing multiple bends or complex forming such as tabs) and then proceed through less complicated shapes (e.g., those shapes containing fewer bends or less complex bends or number of faces). This series of comparisons may be performed until a predetermined number of fundamental shapes are located in the part. For example, the comparison operation may be performed to extract the three most complicated features or shapes within any particular part. In addition, this operation may be performed by first conducting the series of comparisons on groups of matrices that relate to shapes that are more common or frequently found in sheet metal parts, and then proceeding to less common shapes. Various methods for comparing the part with the predefined library may be performed to provide useful results.

For example, the series of comparisons may be first applied to a right angle group of matrices that include fundamental shapes that include right angle bends, such as rectangular and square shapes with multiple right angle bends and simple parts with right angle bends. This group of matrices may be searched based upon a series of comparisons extending from more complex matrices within the group (e.g., a matrix corresponding to a four bend box with tabs) to less complex matrices within the group (e.g., a matrix relating to a simple hat part). The series of the comparisons may then be applied to a polygonal part group of matrices and then a special features group of matrices. The polygonal part group may include matrices defining parts having more than five sides and at least one bend angle that is greater than 90 degrees. The special features group of matrices may include matrices within the predefined library that relate to parts with special features or forming, such as Z-bends or Hemming. Once again, the series of comparisons between the feature based matrix of the part and the predefined matrices within each of the groups may be performed based on decreasing levels of complexity. Thereafter, other groups of predefined matrices may be compared, such as a multiple features group of matrices that includes parts that have two or more features on a single face of the part.

By comparing the part with the matrices in the predefined library in order of complexity, and by applying the series of comparisons to groups of matrices based on frequency of appearance and use, a more effective and efficient comparison of the library may be conducted to determine the fundamental shapes in the part. In addition, an overlap of detected features is prevented and only the more complex shapes are identified.

At step S.108, a feature relation operation may be performed to determine the relationship between the fundamental features or shapes located in the part. The relation between the features or shapes may be defined in terms of distance. The distance between any two shapes may be determined based on the number of bendlines or faces between the base face of each of the shapes. Alternatively, the relationship between features may be defined in terms of the physical distance or real dimension between the features, by geometrically analyzing the part and the relative position and distance between the base face of each of the features.

Figures 7A, 7B, 7C:
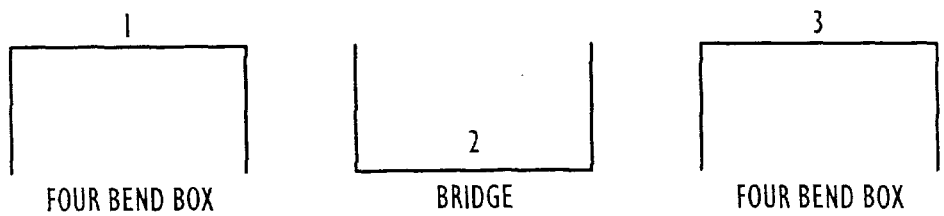
FIGS. 7A, 7B and 7C illustrate, in accordance with another aspect of the present invention, a feature relation operation and process for identifying search keys for a part having a four bend box, a bridge and another four bend box.

Assume, for purposes of illustration, that the three most complicated features or shapes determined at step S.106 for the part: consist of a four bend box, a bridge, and another four bend box, as shown in FIG. 7A. A feature relation operation performed on such a part may be conducted to determine, for example, the number of bendlines between the base surface or face of each fundamental feature. As shown in FIG. 7B, the feature relation between the base (1) of the first four bend box and the base (2) of the bridge is a spacing of two bendlines. Further, the relation between the base (1) of first four bend box and the base (3) of the second four bend box is a spacing of four bendlines, and the relation between the base (2) of the bridge and the base (3) of the second four bend box is a spacing of two bendlines.

Various processes may be provided for determining the number of bendlines between the base faces of the fundamental shapes of the part. For example, a matrix analysis of the feature based part matrix and the predefined shape matrices may be utilized to determine the feature relation in step S.108. First, the corresponding base faces of each of the fundamental shapes may be located in the part matrix. This may be performed by correlating the base face of the predefined shape matrix with the face index in the part matrix. As discussed above, the predefined shape matrices isolated during the comparison operation may be submatrices of the part matrix. In order to locate the corresponding base face for each fundamental shape in the part matrix, the location of the shape matrix within the part matrix and the correlation between the indices of the matrices may be analyzed. With the base face of each of the fundamental shapes being predefined and located within the first column of the shape matrix, the corresponding location and base face within the part matrix may be located.

After determining the base faces of each of the fundamental shapes in the feature based part matrix, the distance between the base faces of each shape may be analyzed to determine the feature relationships. This analysis may include a search process to identify the distance between any two base faces. By looking at the feature and bendline information in the part matrix, the number of bendlines between any two base faces may be determined. If more than one path is possible between two faces, the minimum distance may be used to define the feature relation at step S.108.

After performing the feature relation operation, logic flow continues to step S.110. As shown in FIG. 5B, an identification of database search keys may be performed at step S.110 in order to determine the search keys to be utilized in the similar part search of the database. The search keys may consist of any number of combination of features and feature relations identified for the part. In addition, any hierarchy of criteria may be used for assembling the search keys. By way of a non-limiting example, the search keys may be developed by the following criteria: (i) the first and second most complicated features or shapes identified in the part; (ii) the distance or feature relation between the two most complicated features; (iii) the third most complicated feature or shape identified in the part; and (iv) the feature relation or distance between the first most complicated feature and the third most complicated feature, and the distance or feature relation between the second most complicated feature and the third most complicated feature identified in the part. FIG. 7C illustrates the search keys that may be developed based on the example of FIG. 7A.

In order to simplify the search of the database, the search keys may be represented by a string of integers, with predetermined codes being assigned to the various fundamental shapes defined in the topology library. For example, assume that the integer code "16" was assigned to a four bend box, and that the integer code "32" was assigned to a bridge. In such a case, the search keys of the example in FIG. 7C would be represented by a string of integers comprising "16, 16, 4, 32, 2, 2", wherein "4" and "2" represent the various distances between the fundamental shapes or features. The representation of the search keys, however, is not limited to integer strings and any combination of integers and/or character strings may be used to represent the search keys.

The search keys for each part may be stored with the job information (as a separate file or in the same file) in a database, e.g., database 30. The search keys, which are representative of the feature extraction data, may be manually entered or automatically developed, as described above. Additional feature extraction data, such as the feature based part matrix, may also be stored with the search keys. If the search keys are stored in a separate data file, a lookup table may be provided for locating the part information associated with each set of search keys. Alternatively, the search keys may be saved with a data field identifying the part information (e.g., by part or reference number).

At step S.112, a cooperative search of the database is performed based on the identified search keys. The cooperative search is a search using a cooperative database search technique. The cooperative search technique not only locates parts with identical search keys, but also parts having similar search keys. This enables the identification of similar and identical parts in the database. When a search is performed based on a particular part, the identified search keys for that part may be compared with the other search key data in the database. The cooperative search performed at step S.112 may be adapted to identify those items in the database which exactly match or are most similar to a particular part defined by the search keys, by relaxing or modifying the sequence of search keys. Various processes and methods may be employed for adapting the search keys during the cooperative search.

For example, an initial search of the database is performed to identify parts having the exact sequence of search keys as that identified for the part to be searched. This is performed by comparing the identified search keys with the search keys stored in the database. After identifying the parts (if any) with the same search keys, subsequent searches of the database may be performed based on different modified search key sequences to locate other similar parts. Initially, the items or criteria within the search keys that are less critical or sensitive (such as the feature relation or distances) may be modified and searched before modifying the more critical or sensitive search items (such as the fundamental features or shapes located within the part). In addition, each of these items may be modified in terms of their importance, with more weight or importance given to those items relating to the first and second most complicated features or shapes located in the part. For instance, a first subsequent search may be performed after modifying the defined distances between the third most complicated feature and the first and second most complicated features. The distance may be modified by increasing the distance by a predetermined number of bendlines (e.g., 1–3) or defining a predetermined range for the distance based on the current value for the distance. Thereafter, the distance between the first and second most complicated features or shapes may be altered to provide another set of modify search keys for searching the database. After modifying the feature relation or distance search keys for the part, the identified shapes may be altered to derive additional modified search keys in the cooperative search. For example, the search key item relating to the third most complicated feature or shape may be changed to a related but less complex shape depending on the current feature or shape (e.g., from a four bend box with tabs to a simple four bend box). In addition, the search keys for the first and second most complicated features may be similarly altered to provided further modified search keys for the cooperative search.

The manner in which the distance and feature/shape related to the search keys are modified during the cooperative search may be executed according to various methods and techniques. As described above, the amount by which to vary the distance may depend on the current value of the distance. The distance amount (e.g., 4 bendlines) may be modified to a distance range (e.g., 3–5 bendlines) to expand and make the search more cooperative. For the features or shapes, modification of the search keys may also be performed to identify similar parts. The features or shapes may be modified through a hierarchical structure of feature types. For example, the current feature type (e.g., a four bend box) may be modified to a less complex feature type (e.g., a three bend box) that is related and within the same feature type. The hierarchical structure by which the features/shapes are modified may be predetermined and developed based on different methodologies, such as type abstraction hierarchy (TAH). More information on TAH and TAH generation are provided, for example, in CHU et al., Wesley W., *Cooperative Query Answering via Type Abstraction Hierarchy*, CSD-900032, Department of Computer Science, University of California, Los Angeles, (October 1990) and CHIANG, Kuorong, *Automatic Generation of Type Abstraction Hierarchies for Cooperative Query Answering*, a dissertation submitted as part of the requirements for a Degree of Philosophy in Computer Science, University of California, Los Angeles, (1995), the disclosures of which are expressly incorporated herein by reference in their entireties.

Other processes and steps may be performed during the cooperative search. For example, in addition to searching the database based on the identified search keys relating to the features of the part, searching may also be performed based on search criteria relating to the manufacturing information for the part. For instance, additional search keys may be utilized to compare, for example, the machine set-up required for each part. The machine set-up information may include the type of machine or machinery required to produced the part, the tool(s) and tool set-up used to produce the part, and/or the backgaging setting(s) of the machinery. The additional search keys may be developed based on the machine set-up information and/or other manufacturing information and be used along with the identified search keys when performing the cooperative search of the present invention. As a result, the parts that are identical or similar to the part to be produced may be identified based on both the design and manufacturing features of the part.

In order to select the most similar parts, a selected parts search may be executed at step S.114 to perform a more detailed comparison of the results from the cooperative search and to select a predetermined number of parts that are the same or most similar to the part searched. The selected parts search may involve the analysis of additional information or characteristics of each of the parts identified from the cooperative search. This may involve analyzing various features of the located parts, such as the dimensions of the part or the types of holes or openings in the part, which are not provided from the search key data. This may also involve comparing the manufacturing information relating to each of the located parts, such as the machine set-up required for each part. As noted above, the machine set-up information may include the type of machine or machinery required to produced the part, the tool(s) and tool set-up used to produce the part, and/or the backgaging setting(s) of the machinery. In order to perform the selected parts search, the bend model and other job information for each part may be accessed from the database based on the search keys identified during the cooperative search. As noted above, a lookup table or additional data field may be provided to provide the job reference number or code associated with each set of search keys. After retrieving the part information from the database, the additional information concerning each part (e.g., part dimension, material type, special forming, part holes or openings, etc.) may be analyzed to determine which parts are most similar to the part searched. This process is optional and may act as an additional screening process for selecting and grouping those parts from the database that are most similar to the part. By analyzing and matching this additional information or characteristics of the part, the selected parts search may be performed to identify or select a predetermined number or set of most similar parts. For example, the selected parts search may identify the five most similar parts based on the number of matching search keys and matching additional part characteristics. The number of parts to be selected from the selected parts search is not limited to five, and may be selected based on the needs of the factory and the number of the parts actually stored in the database. This number may also be selectively modified to provide more effective and useful search results, and the user may be given the opportunity to modify this number to vary the search set.

After performing the selected parts search, a similarity index may be calculated at step S.116 to rank the parts (in terms of similarity of features and number of matching search keys) identified in the selected parts search. The similarity index may be calculated and provided as output at the server or station module at step S.118, so that the user may select which job files are to be retrieved from the database and provided for viewing. The similarity index may provide a ranking of the selected parts (e.g., a ranking of 1 through 5 with the job or reference number for each part) based on the level of similarity of features between the selected parts and that of the searched part. For this purpose, the feature based matrix for each of the parts may be compared to that of the searched part. Comparing the feature based matrices may provide a better indication of the similarity between the selected parts and the searched part. As noted above, a feature based part matrix may be stored along with search keys for each part. However, permanently storing the feature based part matrix for each previous job along with the search keys may unnecessarily take up a large amount of memory space (particularly when a large number of parts are stored on the database). As such, it is possible to only store the search key data for each of the parts and to automatically generate the feature based matrix for each of the selected parts when a similar part search is performed.

Accordingly, after the bend model and other job information has been retrieved for each of the selected parts, a feature based matrix may be developed through the feature extraction operation of the invention, as described above with respect to step S.102. The feature based matrix for the searched part, which may be temporarily stored during a similar part search, may then be compared with each of the developed feature based matrices of the selected parts. Various methods and processes may be utilized to compare the feature based matrices of the parts and to determine the similarity between the parts. For example, for each feature based matrix of the selected parts, the locations within the matrix may be compared with those of the searched part. Each location within the matrices may be compared based on recursive programming techniques. The information in the matrices may be compared by determining the location of corresponding base faces in each matrix and interchanging the indexes of the matrices. Since the selected parts may correspond to or have shapes that are sub-features of the searched part, and since the indexes of the matrices may not be identical or numbered in the same way, it will be necessary to locate comparable faces in the part matrices and to switch the indices when comparing the information therein. In addition, where more than one sub-feature is located in a searched part, it may also be necessary to introduce one or more pseudo faces (i.e., face columns and rows in the matrix with no or blank information) in order to provide matrices of the same order when comparing the information in the matrices.

When comparing the information in the matrices, different ranking schemes may be used in order to determine the level of similarity between each of the selected parts and the searched part. For example, a penalty based ranking scheme may be used wherein a predetermined penalty level or amount is assigned for each non-matching location within the matrix. After comparing all of the information in the matrices, the total penalty level for each selected part may then be used to determine the similarity index. The selected part with the lowest penalty level may be determined to be the most similar part to the searched part. The other selected parts may also be ranked based on the total penalty level associated with each part (e.g., the lower the penalty level the higher the similarity index).

In accordance with another aspect of the present invention, the penalty levels for each non-matching location may be assigned based on the type of information located therein. The penalty level may be an integer amount and may be varied based on the criticality or importance of the non-matching information. For example, a higher penalty level or amount may be assigned for non-matching locations relating to different and unrelated feature groups (e.g., a parallel bend feature versus a serial bend feature). In contrast, for non-matching locations relating to different but similar feature groups (e.g., a touch corner feature with same bendline direction versus a touch corner feature with opposite bendline direction). The penalty levels or amounts may be predetermined and categorized based on the type of information and the type of difference present for non-matching locations.

An exemplary code for performing the similarity index operation of step S.116 is provided in Appendix B. The code was written in C++ programming language and includes the various processes and operations described above with respect to comparing the matrices and assigning penalty levels for non-matching location. As noted above, the resultant total penalty levels for each selected part that was compared may be used to derive and display the similarity index. The code listing in Appendix B includes comments to facilitate understanding of the logic and structure of the exemplary program code therein.

Figure 12:
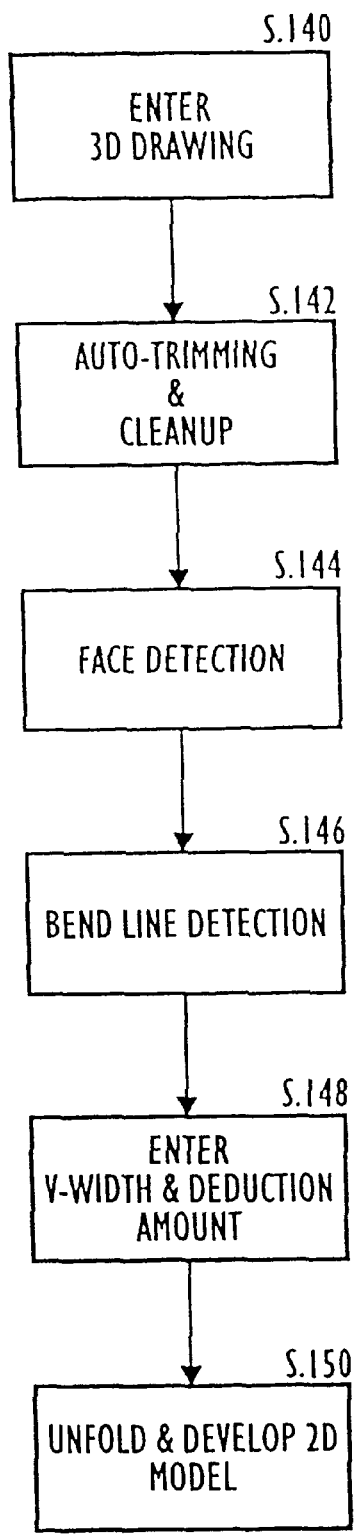
FIG. 12 is a flow chart of the basic logic flow for developing a 2-D model based on an original 3-D drawing (with no thickness) using an unfolding algorithm and other processes, according to the teachings of the invention.

Referring now to FIGS. 8–16, a more detailed description of the various processes and operations that may be performed for developing the bend model data and developing the 2-D and 3-D models of the part based on various 2-D and 3-D drawings will be provided in accordance with an aspect of the present invention. As discussed above, the bend model data associated with each sheet metal component includes data relating to both the 2-D and 3-D representations of the part. Based on the type of original drawings provided or developed based on the customer's order, various folding and unfolding algorithms and other processes may be utilized to develop the 2-D and 3-D models. In particular, FIGS. 8–11 show an example of the logic flow of the folding algorithm and other processes that may be utilized for developing a 3-D model based on an original 2-D, single view drawing of the part. Further, FIG. 12 shows an example of the basic logic flow of the unfolding algorithm and other processes that may be used for developing a 2-D model based on an original 3-D drawing (with no thickness). Lastly, FIGS. 13–15 and FIG. 16 show examples of the logic flow of the various processes and operations that may be implemented to develop a 3-D model with no thickness from, respectively, a 2-D, three view drawing and a 3-D drawing with thickness. The resultant 3-D model (with no thickness) that is developed from these processes and operations may then be utilized to develop a 2-D model based on an unfolding algorithm or process, such as that disclosed herein.

Figure 8:
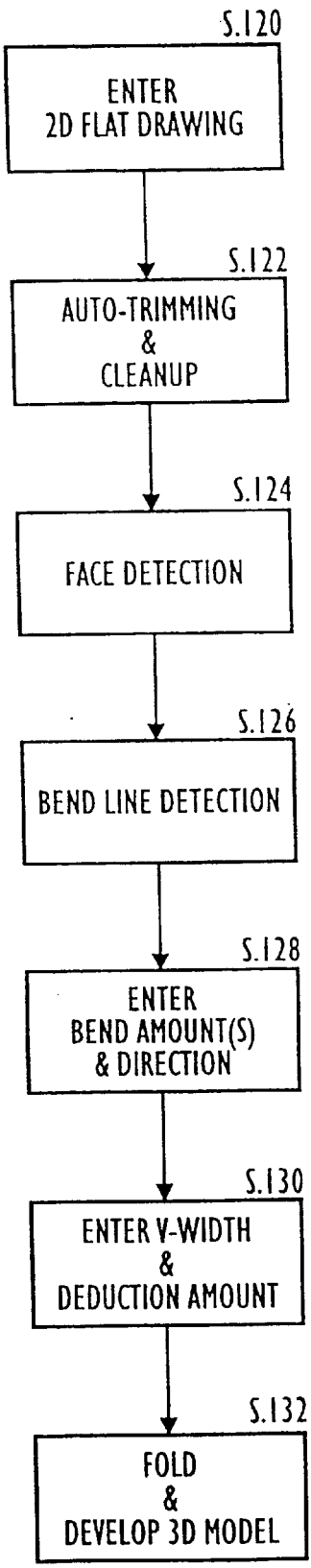
FIG. 8 is a flow chart that illustrates the logic flow of the processes and operations that may be performed to develop a 3-D model from a 2-D, single view drawing using a folding algorithm.

FIG. 8 illustrates the logic flow of the processes and operations for developing a 3-D model from a 2-D, single view drawing using a folding algorithm. The functions and operations performed in the flow chart of FIG. 8 may be implemented with software or programmed logic residing in, for example, server module 32. At step S.120, the 2-D, single view flat drawing that was provided or originally developed based on the customer's specifications is entered or imported to the server module 32. The 2-D flat drawing may be developed and entered into the server module 32 through the use of CAD software, or may be imported to the server module by interfacing with an appropriate CAD or CAD/CAM system, such as VELLUM or CADKEY. The 2-D drawing may be stored, for example, as a DXF or IGES file and may illustrate the punched and/or cut stock material that is to be bent. The 2-D flat drawing may also indicate the location of the bending lines and the location of holes or other openings in the surfaces or faces of the sheet metal part. In order to prepare the 2-D drawing for later processing, an auto-trimming and cleanup function may be performed by server module 32 at step S.122, before a succeeding face detection process is performed at step S.124 and a bendline detection operation is executed at step S.126.

The auto-trimming and cleanup function of the present invention is provided in order to prepare the 2-D flat drawing for processing. The 2-D flat drawing is a 2-D representation of the sheet metal part in its unfolded state and includes part entities, such as lines and arcs, that make up and represent the geometry of the part, as well as indicate the location of any openings or holes in the part. Normally, the entities of such 2-D flat drawings are entered and developed using a CAD or CAD/CAM system. However, when constructing the 2-D flat drawing, such entities are often improperly connected or overlapped, and a single entity may be used to indicate the boundaries of more than one face. Further, outside lines defining the boundary of the part may be disconnected at their adjacent corners, making it difficult to detect the out dimensions of the part and each face. Further, the 2-D flat drawing may include extraneous information, such as dimensional information and text. Such irregularities make it difficult to properly analyze the original 2-D drawing and to uniformly detect the faces and bendlines of the part. By providing the auto-trimming and cleanup operation of the present invention, each of the faces may be represented by a unique set of connected entities. As a result, the 2-D flat drawing may be more easily and efficiently analyzed for subsequent processing and eventual folding in order to develop the 3-D model representation.

Figure 9A:
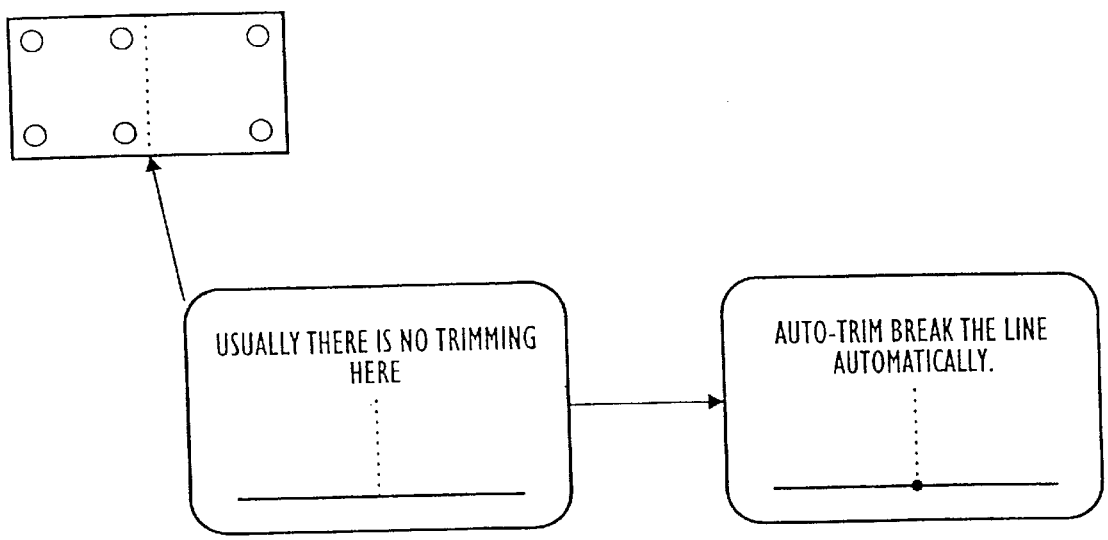
FIGS. 9A, 9B. 9C, 9D and 9E illustrate examples of an auto-trimming function and cleanup function that may be performed to prepare a drawing for a face detection process.
Figure 9E:
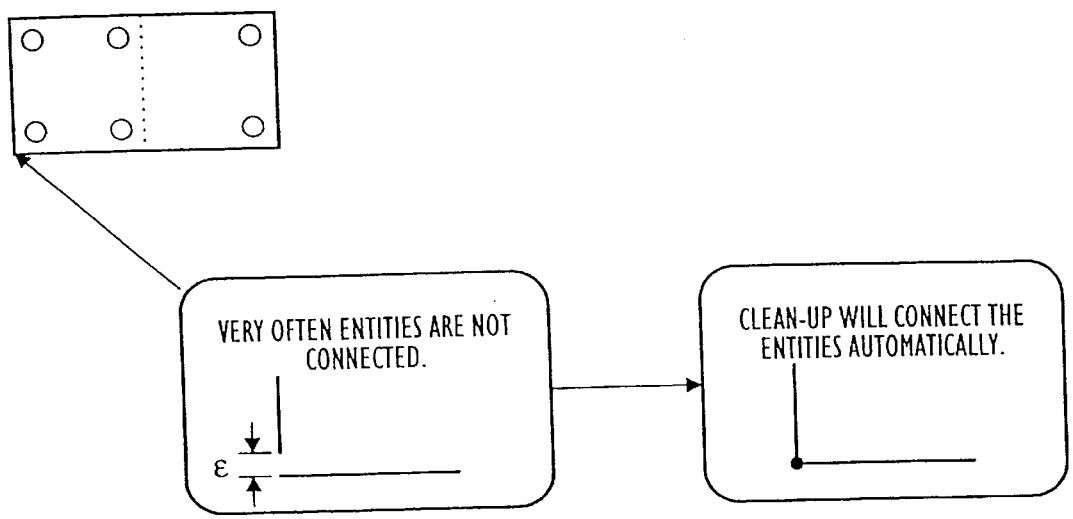

As shown in FIG. 9A, an original 2-D drawing may not provide trimming between faces and a single line entity in the drawing may define the outer boundary or boundaries of more than one face. As discussed above, such an arrangement makes it difficult to detect each of the faces. The auto-trimming function of the present invention may be provided to analyze the end points and intersection points of each of the part entities (such as lines, arcs and bendlines), in order to determine connectivity information and to break such entities at their intersection points. Such a trimming function may include setting the endpoints for each of the broken entities to the determined intersection point. For example, trimming of the intersection point illustrated in FIG. 9A would result in three meeting entities (two lines and one bendline), each having a common endpoint at the intersection point. By providing such a trimming function, the faces of the part may be more easily detected based on entity analysis and connectivity. A more detailed description of a face detection operation that may be implemented is provided below with reference to FIGS. 10A–10G.

Various processes and operations may be utilized to detect the intersection points of the entities of the 2-D drawing. Such processes and operations may be developed based on the format and arrangement of the data in the 2-D drawing file. Typically, a 2-D flat drawing will include geometrical data (defining the various part entities, etc.) and non-geometrical (e.g., text, etc.) data. It is possible to distinguish between the geometrical data from the non-geometrical data based on the keywords provided for each line or sequence of data. Such keywords are set in accordance with the data format of the 2-D drawing. Common formats for 2-D and 3-D drawings include DXF and IGES formats. By analyzing the geometrical data for each of the entities, the end points and intersection points for such entities may be detected and, where appropriate, trimming may be performed.

As discussed above, the lines, bendlines and other entities may be defined by endpoints and/or vectors. For example, for a 2-D flat drawing, each 2-D line may be specified by a set of 2-D endpoints (e.g., X1,Y1 and X2,Y2) and bendlines may be represented by vectors, which indicate 2-D space location as well as direction of the bendline. Further, 2-D arcs may be specified by 2-D space data (e.g., CenterX, CenterY, Radius, Begin Angle, End Angle). The geometrical data may also include attributes to distinguish between the various types of line entities (e.g., arc, solid line, dashed line, dot-dashed line, etc.). Typically, arc entities are used to indicate holes and openings in a sheet metal part, and solid lines are used to indicate the boundaries and shape of the part. Bendlines are usually represented by dashed lines, and the centerline of the part is represented by a dot-dashed line.

The geometrical data from the original 2-D flat drawing may be analyzed to determine the intersection points between each entity. Various data analysis techniques, such as data assignment or recursion, may be used to analyze the geometrical data for each entity of the 2-D drawing. Based on the endpoints and/or other 2-D space data for each entity, simple geometrical analysis may be applied to determine whether lines and other entities intersect. If two entities are determined to intersect, then each entity may be broken at the determined intersection point and the resultant entities may have their endpoints assigned to a common point defined by the intersection point.

The manner in which trimming is performed may be based on the type of entities that are detected to intersect. For example, if two solid line entities are detected to intersect, then each line entity may be broken to provide four line entities that meet at the determined intersection point, as shown in FIG. 9B. Further, if a line entity and arc entity are determined to intersect, such as that shown in FIG. 9C, then each entity may be broken to provide two line entities and arc entities that have common endpoints. Detection of the intersection of other entities, however, may not result in trimming. For example, if any entity is determined to intersect with a centerline (e.g., a dot-dashed entity), then no breaking of the entities is required, since the centerline of any part does not define or distinguish the faces or bendlines of the part and trimming is not required. In addition, unconnected entities may be broken if the open intersection or area is within a predetermined tolerance. For instance, if the endpoint of a potentially intersecting line is within a predetermined tolerance or distance ∈ (e.g., 0.0–0.01 mm, or 0.0–0.001 inches) of actually intersecting another entity, then the entities may be treated as connecting and intersecting at that projected point; and the entities may be broken, as shown, for example, in FIG. 9D.

After auto-trimming has been performed, the resultant data may then be processed by a cleanup function to detect and correct non-connected entities; however, the present invention is not limited to such processing; and, in order to reduce processing time, the cleanup function may performed simultaneously with the auto-trimming function while each of the entities are being analyzed. During cleanup, the geometrical data of the 2-D drawing is analyzed to detect open intersections or areas between adjacent entities. As with the auto-trimming function, the endpoints and other 2-D space data of each entity may be analyzed to detect an open intersection areas between the entities. Simple geometrical analysis may be applied to such data to determine whether the endpoints of the entities are within a predetermined tolerance or distance ∈ (e.g., 0.0–0.01 mm, or 0.0–0.001 inches) of one another. If the endpoints of the entities are determined to have such an open intersection, then the entities may be connected and assigned a common endpoint, such as that shown in FIG. 9E.

Once again, the manner in which the cleanup function is performed may be controlled based on the type of entities that are detected to have an open intersection. If two solid lines are detected to have an open intersection, then the endpoints of the lines may be assigned a common endpoint (see, for example, FIG. 9E). However, if any entity is determined to have an open intersection with a centerline of the part (e.g., a dot-dashed entity), then the entities should not be connected nor assigned a common endpoint and the centerline entity should be ignored. In addition, the cleanup function may include additional processes or operations for deleting the non-geometrical data (text, etc.) from the 2-D drawing. As noted above, the non-geometrical data may be distinguished from the geometrical data based on the keywords provided with the 2-D drawing data. The cleanup function may also incorporate other cleanup functions, such as those described in greater detail below with reference to the 2-D cleanup function of the invention (see, for example, FIGS. 14A–14E).

After the auto-trimming and cleanup functions are performed at step S.122, a face detection procedure may be performed on the processed 2-D drawing, at step S.124. In accordance with an aspect of the present invention, the face detection procedure may include face detection logic for detecting and defining the faces of the part based on entity (line and arc) and loop analysis. FIGS. 10A–10H illustrate an example of the various processes and operations that may be performed in the face detection procedure. Loop detection techniques may be used in the present invention to determine and detect the faces of the part. The face detection procedure may be implemented through software or programmed logic residing at, for example, server module 32.

According to an aspect of the present invention, a loop detection analysis of the outside boundary of the part followed by analysis of the minimum or inside loops of the part may be utilized to detect each of the faces. Due to the unique geometry of sheet metal parts, the faces and openings of the part may be detected based on the analysis of the sequence of the relative maximal (e.g., outside) and minimal (e.g., inside) loops. As discussed below, loop analysis may be performed based on the connectivity of the line and arc entities of the part. By performing loop analysis from the outside of the part and proceeding towards the center of the part, the openings and faces of the part may be detected based on the boundaries defined between the loops in accordance with a cyclic sequence (e.g., face material, opening, face material, opening, etc.).

Figure 10A:
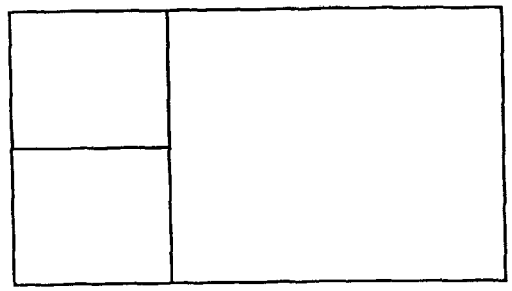
FIGS. 10A, 10B, 10C, 10D, 10E, 10F, 10G, and 10H illustrate the various processes and operations that may be performed in a face detection process, in accordance with an aspect of the present invention.
Figure 10B:
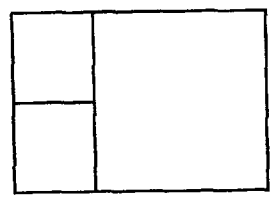
Figure 10C:
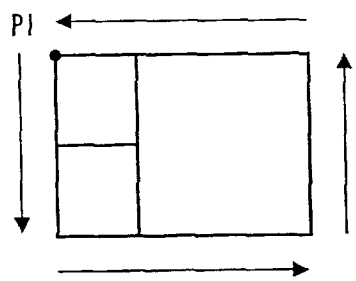

Assume that a 2-D flat drawing, such as that shown in FIG. 10A, is provided with various line entities for each face as shown in the drawing. As noted above, loop and entity analysis may be performed by starting from the outside boundary of the part. Any entity on the outside boundary of the part may be used as an initial reference point. By way of non-limiting example, the left most side line entity may be detected and used as an initial reference point, as shown in FIG. 10B. The left most side line entity may be detected by comparing the geometrical data of each of the entities in the 2-D drawing and determining which entity has the lowest X-coordinate value. After the left most line entity has been detected, an outward appearance of the part may be derived from a point P1 to detect the outside boundary of the part, as shown in FIG. 10C. Either endpoint of the left most line entity may be used to define point P1. In the illustrated embodiment of FIG. 10C, the upper endpoint (i.e., the endpoint with the greatest Y-coordinate value) has been used as point P1.

Conventional loop analysis techniques may be used to derive the outward appearance or loop about the part. For example, lead line vectors may be projected from the initial point P1 and the endpoints of the connecting entities as the outward appearance of the part is followed. As each entity is detected and traversed, a flag may be provided to indicate that the entity has been picked (e.g., a flag in memory may be set to 1 to indicate that it has been selected once). The loop path may be initiated in either direction from the initial point P1. For example, the lead line vector may be projected in the counterclockwise direction (e.g., by projecting the lead line vector in the Y-coordinate direction) from the point Pi. The loop is completed when the loop path returns to the initiating point (i.e., point P1).

As noted above, from the initial point P1 a lead line vector may be projected in the counterclockwise direction (e.g., by initiating the first lead line vector in the Y-coordinate direction). Thereafter, in order to detect the first entity in the path of the loop, the angle that each unselected entity about point P1 forms with the lead line vector is measured and analyzed based on a coordinate frame, with the entity that forms the smallest angle with the lead line vector being selected. For the outside loop, each angle may be measured based on the outside angle that the entity line forms with the lead line vector. The entities about point P1 may be determined based on which entities have an endpoint that is common to point P1. The unselected status of each entity may be determined by analyzing the flag associated with each entity. As shown in FIG. 10C, two entity lines (one extending in the X-coordinate and one extending in the Y-coordinate) are provided about P1 in the exemplary 2-D drawing illustrated therein. When analyzing these entities, the line entity that extends in the Y-coordinate would be selected since it forms a smaller angle (i.e., 0 degrees) with the lead line vector than the angle (i.e., 270 degrees) of the other line entity.

The loop analysis would then continue to the other endpoint of the selected line entity, which would have a flag set to indicate that it has been selected. At that endpoint, another lead line vector would be projected and the unselected entities about that point would be compared to determine which forms the smaller angle with the lead line vector. Once again, the angle should be measured from the outside of the lead line vector and a coordinate frame may be used to determine the angle amount. If an arc entity is encountered, then the angle should be measured from the outside of the lead line vector to a line that is tangent to the arc. Further, if only one entity is about the next endpoint (such as at the corner positions of the part), then no comparison is necessary and that entity is simply selected and included in the loop.

Figure 10D:
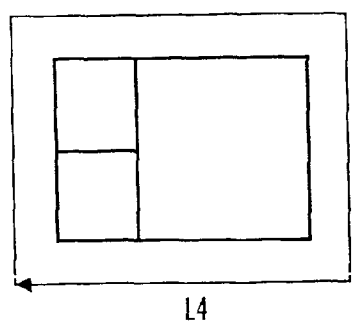

As the loop path proceeds about the outward appearance of the part, each selected entity may be included in a linked list to indicate the connectivity of the entities within the loop. When the path returns to the initial point P1, the cycle is complete and the loop may be defined (L4) based on the outward appearance and the linked list of entities or lines that indicate the outside boundary of the part. Each of the lines or entities within the loop L4 may be connected at their end points. The direction of the loop L4 may be turned in the opposite direction (i.e., clockwise), as shown in FIG. 10D, in order to indicate that it is an outside loop. The direction of the loop may be defined based on the order in which the lines are linked in the loop L4; and, thus, the direction may be changed by reversing the order of the link list.

Figure 10E:
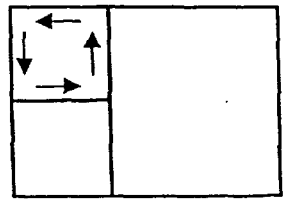
Figure 10F:
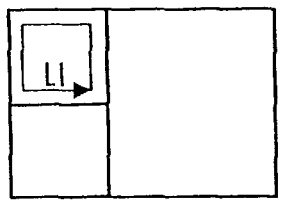
Figure 10G:
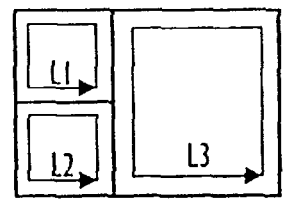

After the outward loop has been completed, inside loop analysis of the part may be performed based on a similar process to that used for the outside loop analysis. In the inside loop analysis, however, each of the unselected entities are compared based on the inside angle that each entity forms with the lead line vector. Further, during the inside loop analysis, where both entities about a point are indicated as being selected (e.g., when comparing two outside line entities which border a face), the two entities may still be compared unless they have been selected twice (i.e., a flag setting of 2). When there is an entity that has been selected at least once (e.g., an outside entity) and an unselected entity (e.g., an inside entity), no comparison may be performed and the unselected entity may be selected as part of the loop. FIGS. 10E–10G illustrated exemplary inside loops that may be performed to detect and define the faces of the part shown in FIG. 10A.

The inside loop analysis may begin at any of the outside entity endpoints or by detecting an entity that has not been selected. For example, point P1 may be selected to initiate the inside loop analysis and may be used to project the lead line vector; alternatively, one of the inside line entities that was not selected during the outside loop analysis may also be used as an initial point for analysis. As with the outside loop analysis, the lead line vector may be extended in the counterclockwise direction (e.g., by initiating the first lead line vector in the Y-coordinate direction). Each entity about point P1 is then compared to determine which entity forms the smallest angle with the lead line vector. A coordinate frame may be used to determine the angle formed with the lead line vector. As noted above, during inside loop analysis the entities are compared based on the inside angle that each entity forms with the lead line vector instead of with the outside angle. After the initial entity has been selected and included in the linked list for the loop, its flag may be increment by one and further analysis may be performed by projecting the next lead line vector. The process continues until the loop returns to the initial starting point, at which point the first inside loop is defined (e.g., L1) by its associated linked list of entities.

Further inside loop analysis may performed in a similar fashion by proceeding inwardly of the part. Subsequent starting points may selected by determining which entities have been only selected once. Entities with flags that have been selected twice will indicate that it is an outside entity that has already been selected for the outside loop (e.g., L4) and for at least one of the inner loops (e.g., L1). Once again, as each entity is selected, its associated flag may be incremented by one to indicate that it has been included in the inside loop link list.

After all of the inside loops have been defined (e.g., after all of the entities have been selected twice in the example of FIG. 10G), the resultant loops may be used to construct a loop tree.

Figure 10H:
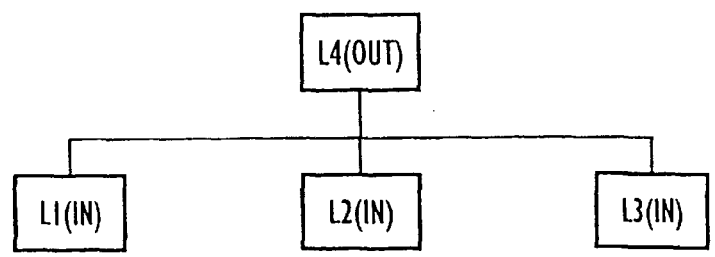
Figure 11A:
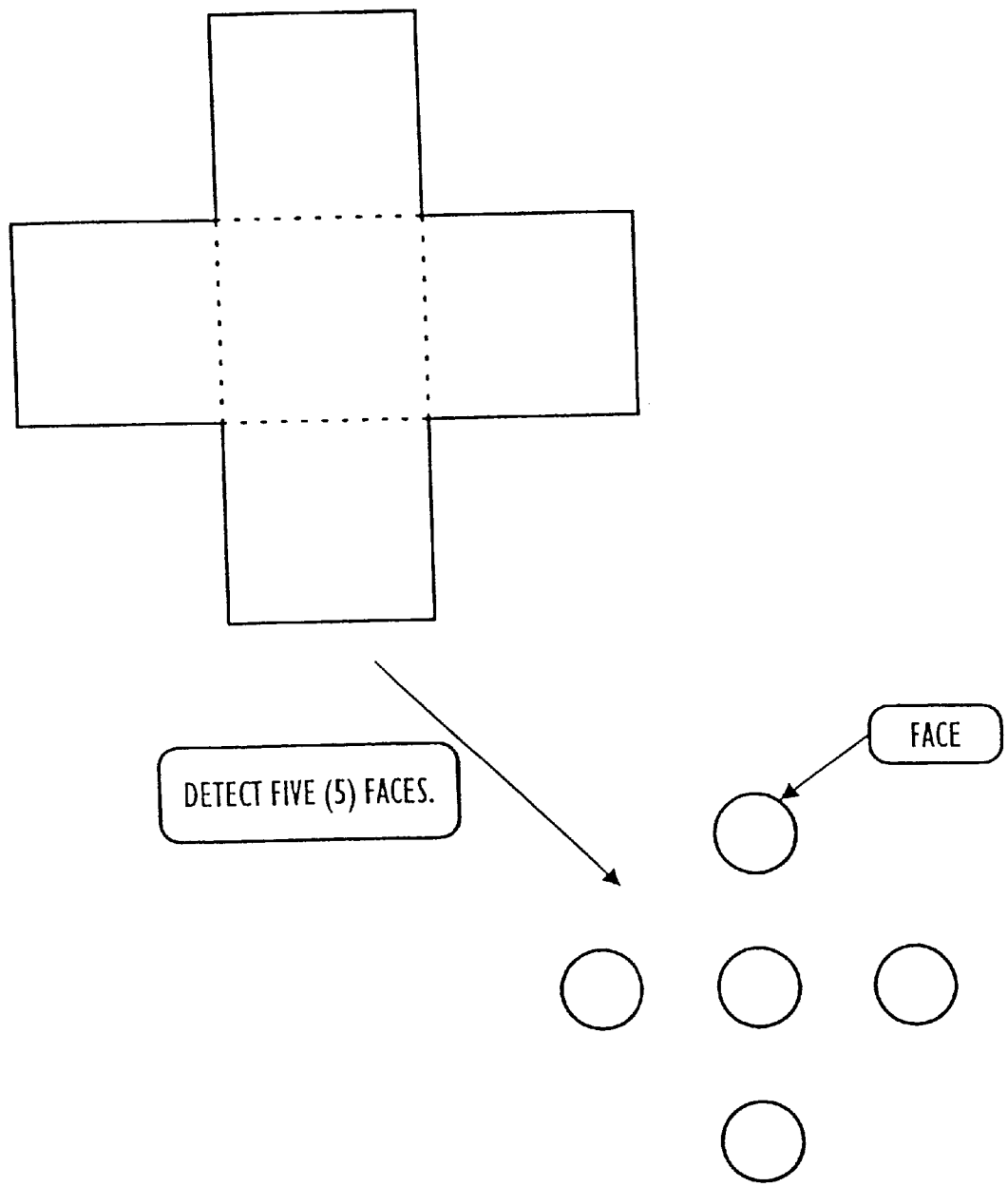
FIGS. 11A and 11B illustrate the development of a final bend graph data structure from the execution of a face detection process and bend line detection operation, according to an aspect of the present invention.
Figure 11B:
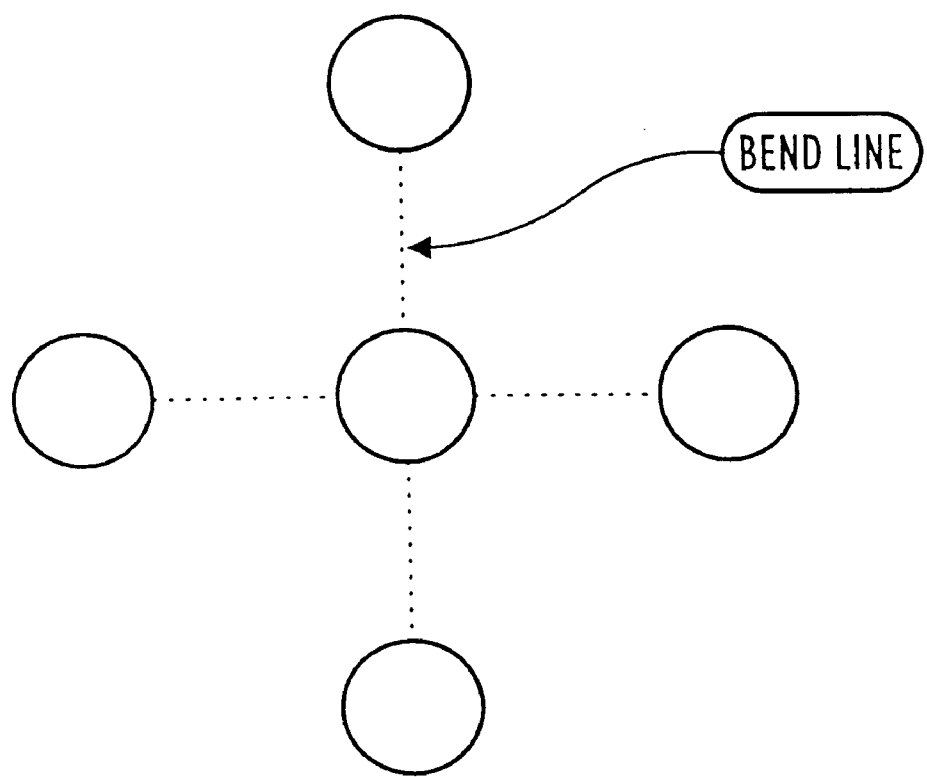

FIG. 10H illustrates an exemplary loop tree that may be defined based the detected loops L1–L4. The outside loop (L4) of the part may be defined as the root of the tree, with each inside loop (L1–L3) that has a common entity with the outside loop being defined as children of the root. The presence of common entities may be detected based on analyzing and comparing the linked list of entities that define each loop. If additional entities (e.g., holes or openings) are detected within the inside loops, then these loops may be defined as children of the inside loops (i.e., grandchildren of the root of the loop tree) within which they are located.

After the face detection procedure has been performed at step S.124, a bendline detection operation may be performed at step S.126. As shown for example in FIG. 11A, when detecting and analyzing the loops of a part at step S.124, the face detection logic of the invention may utilize the loop tree to define the face information and store the detected faces as nodes in a bend graph data structure. The faces of the part may be detected from the sequence of the outside and inside loops in the loop tree. As indicated above, each of the loops may include a link list of entities or lines. These entities may be used to define the boundaries of each face of the part. The bendline detection operation of step S.126 may then be performed to determine the relationship between the faces and bendlines of the part. The bendline detection operation of step S.126 may include bendline detection logic for detecting all of the bendlines between the various faces of the part by searching for common edges or line entities between any two adjacent faces. Further, for faces that connect at more than one area (e.g., when applying the bendline detection algorithm to a 3-D model—see, e.g., FIG. 12 discussed below) a number of heuristics may also be applied to detect and select the minimum number of bendlines for the part. The detected bendlines then may be stored as connecting agents between the face nodes to produce the final bend graph data structure, as shown for example in FIG. 11B.

The bendline detection operation of the present invention may be implemented through software or programmed logic residing at, for example, server module 32. The purpose of the bendline detection operation is to detect and select the bendlines for the part so that the part becomes connected with the minimum number of bendlines. The bendline detection operation may be provided for both 2-D and 3-D versions of the part. A discussion of an application of the bendline detection operation in connection with an original 3-D model is provided below with reference to FIG. 12. As noted above, the detected bendlines may be stored as connecting agents between the face nodes to produce the final bend graph data structure. This final bend graph data structure may then be utilized to fold and construct the 3-D version of the part from the 2-D data model.

The original 2-D drawing that is provided as input at step S.120 in FIG. 8 may not include bendline information or such bendline information may be ambiguous and not uniquely or consistently defined. Thus, the bendline detection operation may be performed to detect the bendlines and their relation to the detected faces of the part. During this process, the linked list of entities defining each of the faces may be analyzed to determine adjacent edges or line entities that each face has with other faces of the part. This may performed by analyzing all possible contacts between any given two faces. A contact may be determined based on the presence of a common line entity (or entities that are within a predetermined distance tolerance of one another) that has a length that is greater than 0 (i.e., the line entity is not a point but a real line). The geometrical data in the linked lists may be analyzed to determine the presence of such contact between any two faces in the part.

If a particular face only has one common edge or area of contact with another face, then the entity that is common to both faces may be defined as a bendline. For faces that have common contact at more than one area (e.g., a 3-D model; however, this may occur with 2-D models as well), a number of heuristics may be applied to detect and select the minimum number of bendlines for the part. The heuristics that are applied should be adapted so that the faces of the part become connected at the bendlines and so that no continuous loop of faces is formed (since such a bend sheet metal part is impossible to manufacture).

For example, one such heuristic that may be applied is to select the common area that has the longest contact area as the bendline. Thus, where a face has more than one common edge with other faces, this heuristic may be applied so that the common entity having the longest length is selected as the bendline for the face. This heuristic is based on the principal that is usually better to have a longer contact area when manufacturing bent sheet metal parts. Another heuristic that may be applied relates to selecting among different possible combinations of bendlines (such as when determining the bendlines for a 3-D model). According to this heuristic, when all possible common areas are detected and various combinations of bendlines may be selected, the combination of bendlines that produces the minimum number of bendlines is selected.

After the bendlines have been detected, the faces of the part and the determined bendlines may be displayed to the operator for verification. If the operator is not satisfied with the selection of bendlines for the part, the bendline detection operation may provide a manual selection feature to permit the operator at the server module 32 to selectively indicate the preferred bendlines for the sheet metal part. The operator may indicate to keep or change a bendline by any suitable input means, such as a mouse or keyboard, etc. The revised bendlines selected by the operator may then be used for developing the final 3-D (or 2-D) part.

Various processes and operations may be provided to implement the bendline detection operation of the present invention. An exemplary code for implementing the bendline detection operation is provided in Appendix C attached hereto. The sample code was written in C++ programming language and includes comments to facilitate the understanding of the logic flow therein. The sample code is an exemplary implementation for the bendline detection operation that may be performed on a 2-D or 3-D model, and includes heuristics (such as those described above) for determining the optimum selection of bendlines.

The detected face and bendline information may be utilized in the folding and unfolding process of the invention. By performing a three dimensional rotation around each bendline during folding or unfolding, the resultant 3-D or 2-D model may be derived. This task may be accomplished by simply applying matrix transformation, involving rotations and translations, to each of the faces and other entities of the part. The features of various commercially available unfolding and folding software applications may be utilized to implement these basic unfolding or folding steps of the invention. For example, the Amada UNFOLD and FOLD system software may be utilized to perform these basic operations. The Amada UNFOLD and FOLD system software is available from Amada America, Inc. (previously operating under the corporate name of U.S. Amada Ltd.), Buena Park, Calif. Information concerning the Amada UNFOLD and FOLD system software may be found in the Amada UNFOLD Manual for AUTOCAD (March 1994 Edition), the Amada UNFOLD Manual for CADKEY (May 1994 Edition), and the Amada Windows UNFOLD Manual for CADKEY (November 1995 Edition), the disclosures of which are expressly incorporated herein by reference in their entireties. Further discussion of the folding process to develop the 3-D model from the 2-D model is provided below with reference to step S.132.

Referring back to FIG. 8, after the bendline detection operation has been performed at step S.126, server module 32 may prompt the user for pertinent bend and deduction information for subsequent use during the folding process. For example, at step S.128, server module 32 may prompt the user to indicate the bend amount for each bend line, including the bend angle and/or bend inside radius, as well as the bend direction (e.g., front or back, etc.). At step S.130, the user may also be prompted by the server module 32 to enter the V-width, material type, and/or the deduction amount. This information may be utilized to compensate for bend deduction during the folding process. Depending upon the thickness and type of material used for the sheet metal part, as well as the angle of the bend and the V-width of the die to be utilized, the actual sheet metal part will tend to stretch by a deduction amount during folding of the sheet metal part.

In order to compensate for this effect in the model, the deduction amount information may be utilized so that the dimensions of the faces of the part are stretched by half of the deduction amount on each side of the bending line when constructing the 3-D model through the folding process. In accordance with an aspect of the present invention, this deduction amount may be entered directly by the user at the server module 32 (e.g., by keyboard, etc.). Alternatively, a material table may be displayed to the operator that includes the deduction amounts based on the material type and thickness of the part. The material table may indicate the various deduction amounts based on different bend angles and V-widths. The user may then automatically set the deduction amount by selecting a desired V-width and bend angle from the material table displayed at the server module 32 (e.g., by mouse or keyboard). The inside radius of the bend angle may also be automatically set by the user through the material table when selecting a desired V-width.

The deduction amount entered by the operator may be in (or converted after entry by the operator to) a unit measure of length (e.g., mm) that is identical to that represented by the part geometry data. During a folding process, the dimensional length of each of the faces on either side of the bendline may be increased by one-half of the deduction amount entered for that particular bendline. The dimensional length of the face that is perpendicular to the bendline may be increased by extending the endpoints of the entities defining the boundaries of the faces that are located on either side of the bendline. Such deduction compensation may also be performed at each of the other bendlines of the part based on the deduction amount provided by the operator for each bend.

In step S.132, a folding process is performed with deduction compensation to develop the 3-D model based on the processed 2-D, flat drawing. As noted above, the folding procedure may be carried out by conventional geometric modeling methods, including the use of matrix transformation and using each of the respective bendlines defined in the final bend graph data structure as a rotational axis. In addition, in order to compensate for the effect of deduction, when folding and developing the 3-D model, the faces of the part may be stretched by half of the deduction amount on each side of the bendline to more accurately reflect the change in the dimensions of the faces when actual bending of the sheet metal is performed.

For example, when performing the folding process at step S.132, the part geometry and topology data (or bend graph structure) may be utilized, along with the bend parameters (e.g., bend angle, inside radius, etc.). A transformation matrix may be computed for each face, bendline, hole and forming in the part represented in 2-D space. Conventional matrix transformation may be applied to the 2-D flat data to get the 3-D space data. The transformation generally involves a rotation followed by a translation. As noted above, rotation is performed about each bendline axis in accordance with bend angle amount. Translations are performed for shifting and moving the geometrical data about space. Such translations may be determined based on the bending radius, bending angle and deduction amount for each bend. During folding, deduction compensation is performed so as to stretch or increase the dimensions of the faces by one-half of the deduction amount on either side of the bendline, as described above. Such deduction compensation will provide a 3-D representation of the part that more accurately reflects the dimensions of the 2-D sheet metal part when it is folded by bending machinery.

For further information on geometrical modeling and transformations, see, for example, MORTENSON, Michael M., *Geometric Modeling*, John Wiley & Sons, New York (1988) and FOLEY et al., James, *The Systems Programming Series: Fundamentals of Interactive Computer Graphics*, Addison-Wesley Publishing Company, Reading, Massachusetts (1983), the disclosures of which are expressly incorporated herein by reference in their entireties. Chapter 8 of MORTENSON provides a discussion of geometrical transformations, including translations and rotations (see, e.g., pp. 345–354). Further, FOLEY et al. at Chapter 7, pp. 245–265 provides information on geometrical transformations, including matrix representation of 2-D and 3-D transformations. Additional information of modeling and geometrical transformations may also be found in MANTYLA, Martti, *An Introduction to Solid Modeling*, Computer Science Press, Inc., Rockville, Md. (1988), the disclosure of which is expressly incorporated herein by reference in its entirety. Information on coordinate transformations may be found at pp. 365–367 of MANTYLA.

Referring now to FIG. 12, a description of the processes and operations that may be performed for developing a 2-D model based on an original 3-D, flat drawing (with no thickness) will be provided, in accordance with another aspect of the present invention. Similar to the folding process described above with reference to FIG. 8, the various processes and operations for unfolding a 3-D drawing and developing a resultant 2-D model may be implemented through the software and/or programmed logic at server module 32. As shown in FIG. 12 at step S.140, the original 3-D, flat: drawing which was provided or developed based on the customer's specification may be entered or imported into server module 32. The 3-D drawing may be stored as a DXF or IGES file and may be entered by interfacing with or utilizing a CAD or CAD/CAM system from server module 32. After entering the 3-D drawing, an auto-trimming and cleanup operation may be performed at step S.142 by server module 32 to prepare the drawing for subsequent face detection and other processing. As discussed above with reference to FIGS. 9A–9E, the auto-trimming and cleanup functions may break and connect entities and surfaces so that the various faces of the part may be properly detected and defined.

The auto-trimming and cleanup operation described above with reference to FIGS. 8 and 9 may similarly be applied to the geometric data of the 3-D drawing entered at step S.140 of FIG. 12. Instead of analyzing the data in 2-D space (as was the case with the 2-D flat drawing), each of the entities (e.g., lines, arcs, etc.) represented in the 3-D drawing may be analyzed based on the 3-D coordinate and space information provided therein. The intersection points and open intersection areas may be detected by analyzing each entity individually and comparing it with other entities one at a time. Once again, basic geometrical analysis of the endpoints and other attributes of the entities may be utilized to determine intersection points and open intersection areas within tolerance.

After performing auto-trimming and cleanup functions on the 3-D drawing, at step S.144 a face detection operation may be performed to detect and define each of the faces of the sheet metal part. Face detection for the 3-D drawing may be performed by analyzing and detecting each of the faces in 2-D space and developing a loop tree, similar to that described above. Face detection may be executed by starting at any predetermined entity. For example, the left most entity (i.e., the entity with the lowest X-coordinate) may be used as the initial entity. Thereafter, a plane may be defined by taking the initial line entity and another connecting or adjacent line entity (e.g., any entity with a common endpoint to the initial entity). A face detection operation may then be performed using loop and entity analysis, such as that described above with respect to FIGS. 10A–10H. As each entity is detected within the defined 2-D plane, the various outside and inside loops may be defined and the entities may be marked (e.g., by setting or incrementing a flag of the selected entity) to indicate that they have been selected and included in a linked list defining one of the loops in that plane.

Subsequent loop analysis may then be performed in the other 2-D planes that comprise the 3-D drawing. In order to proceed with loop analysis of the other entities, additional planes may be defined by searching for unmarked or unselected entities within the 3-D drawing. Such planes may be defined between two unselected entities or an unselected entity and a previously selected entity that was previously analyzed. In each of the additional 2-D planes, further loop analysis may be performed to detect the inside and outside loops. Once again, linked lists of connecting entities may be maintained and the selected entities marked (e.g., by incrementing a flag associated with the selected entity) as each of the loop paths are defined.

After all of the entities have been detected, the resulting loops may be used to develop a loop tree for each of the 2-D planes that were analyzed. As discussed above, a loop tree may be provided to determine the faces and opening or holes in the sheet metal part. For a 3-D drawing, a loop tree may be developed for each of the planes of the sheet metal part. The loops detected within each plane may be grouped and analyzed to develop each loop tree. The root of each tree may be defined as the outside loop detected in the plane, with each inside loop of that plane that has a common entity with the outside loop being defined as children of the root. The presence of common entities may be detected based on analyzing and comparing the linked list of entities that define each loop. If additional entities (e.g., holes or openings) are detected within the inside loops of the plane, then these loops may be defined as children of the inside loops (i.e., the grandchildren of the root of the loop tree) within which they are located. The generated loop trees may then be used to detect all of the faces of the 3-D drawing. The detected faces may then be stored as nodes in a bend graph data structure.

The resultant bend graph structure may then be supplemented with the connecting bending line connecting agents after performing a bendline detection operation at step S.146. The bendline detection operation and the development of the final bend graph structure or part topology may be carried out in a similar manner to that described above with reference to FIGS. 11A and 11B.

As discussed above, an exemplary code for implementing the bendline detection operation is provided in Appendix C attached hereto. The sample code is an exemplary implementation for the bendline detection operation that may be performed on a 2-D or 3-D model, and includes heuristics (such as those described above) for determining the optimum selection of bendlines. The bendline detection operation may include a manual selection feature to permit the operator at the server module 32 to selectively indicate the preferred bendlines for the sheet metal part if not satisfied with the bendlines that were detected. The operator may indicate to keep or change a bendline by any suitable input means, such as a mouse or keyboard, etc. The revised bendlines selected by the operator may then be used for developing the final 2-D part.

Before performing an unfolding process about the bending lines of the final bend graph structure, the user may be prompted for the V-width, material type and/or deduction amount at step S.148. As discussed above, since metal tends to stretch when it is folded, the dimensions of the 3-D part will be slightly larger than that of the 2-D flat part. As such, during unfolding of the sheet metal part, the dimensions of the part should be shrunk or reduced by the deduction amount based on the material type and V-width selected. Accordingly, in accordance with an aspect of the present invention, a shrinking process may be performed when unfolding the 3-D model to more accurately develop the 2-D model and the respective dimensions of its surfaces. As described above, the deduction amount may be entered directly by the user or a material table may be displayed in order to enable the user to automatically set the deduction amount by selecting a desired V-width and bend angle.

The deduction amount entered by the operator may be in (or converted after entry by the operator to) an unit measure of length (e.g., mm) that is identical to that represented by the part geometry data. During an unfolding process, the dimensional length of each of the faces on either side of the bendline may be decreased by one-half of the deduction amount entered for that particular bendline. The dimensional length of the face that is perpendicular to the bendline may be decreased by reducing the endpoints of the entities defining the boundaries of the faces that are located on either side of the bendline. Such deduction compensation may also be performed at each of the other bendlines of the part based on the deduction amount provided by the operator for each bend.

After entry of all of the necessary data, an unfolding process may be performed at step S.150 to develop the 2-D model. Conventional methods may be used for unfolding the 3-D bend model, including the use of matrix transformation with each of the bending lines being used as a rotational axis. During the unfolding process, each of the bend angles may be measured and the part may be unfolded by the bend angle amount to develop the flat 2-D model. In addition, based on the deduction amount entered, a shrinking or reduction of the dimensions of the faces may be performed by half of the deduction amount on each side of the bending line to more accurately simulate the physical characteristics of the sheet metal material and the difference between the 3-D and 2-D models.

When performing the unfolding process at step S.150, the part geometry and topology data (or bend graph structure) may be utilized, along with the bend parameters (e.g., bend angle, inside radius, etc.). A transformation matrix may be computed for each face, bendline, hole and forming in the part represented in 3-D space. Conventional matrix transformation may be applied to the 3-D data to get the 2-D space data. The transformation generally involves a rotation followed by a translation. As noted above, rotation is performed about each bendline axis in accordance with bend angle amount. For unfolding, rotation is carried out in the reverse direction until there is a 180 degree angle between the two faces (i.e., until the part is flat). Translations are performed for shifting and moving the geometrical data about space. Such translations may be determined based on the bending radius, bending angle and deduction amount for each bend. During unfolding, deduction compensation is performed so as to shrink or decrease the dimensions of the faces by one-half of the deduction amount on either side of the bendline, as described above. Such deduction compensation will provide a 2-D representation of the part that more accurately reflects the dimensions of the sheet metal part before it is folded during a bending operation.

Once again, further information on geometrical modeling and transformations may be found in MORTENSON, FOLEY et al. and MANTYLA. As indicated above, Chapter 8 of MORTENSON provides a discussion of geometrical transformations, including translations and rotations (see, e.g., pp. 345–354). Further, FOLEY et al. at Chapter 7, pp. 245–265 provides information on geometrical transformations, including matrix representation of 2-D and 3-D transformations. In addition, information on coordinate transformations may be found at pp. 365–367 of MANTYLA.

Figure 13:
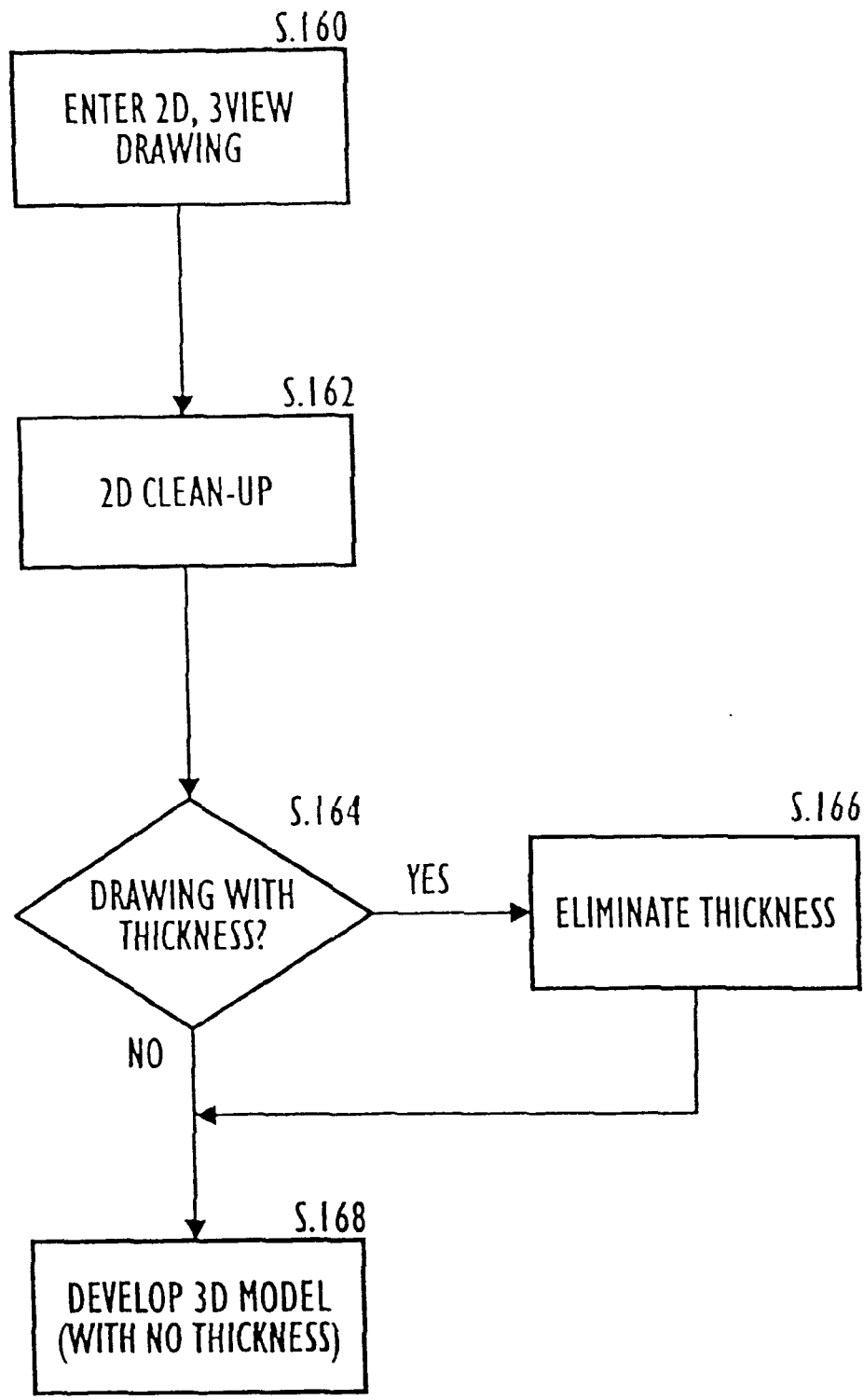
FIG. 13 is a flow chart of the basic logic flow for developing a 3-D model based on an original 2-D, three view drawing using a 2-D clean-up-operation, in accordance with an aspect of the present invention.

As discussed above with reference to FIG. 3, if a 2-D, three view drawing or a 3-D, wire frame drawing with thickness is originally provided or developed based upon the customer's order, then further processing will be required in order to develop a 3-D model without thickness; and, thereafter, the developed 3-D model without thickness may be used to create a 2-D model by applying an unfolding process or algorithm. FIGS. 13–15 illustrate the various processes and operations that may be applied in order to develop a 3-D model based on an original 2-D, three view drawing. Further, FIG. 16 illustrates, in accordance with another aspect of the present invention, the additional processes and operations that may be applied for developing a 3-D model without thickness from an original 3-D, wire frame drawing with thickness. Once again, the various processes and operations depicted in FIGS. 13–16 may be implemented through the software and/or programmed logic residing at, for example, server module 32.

Figure 14A:
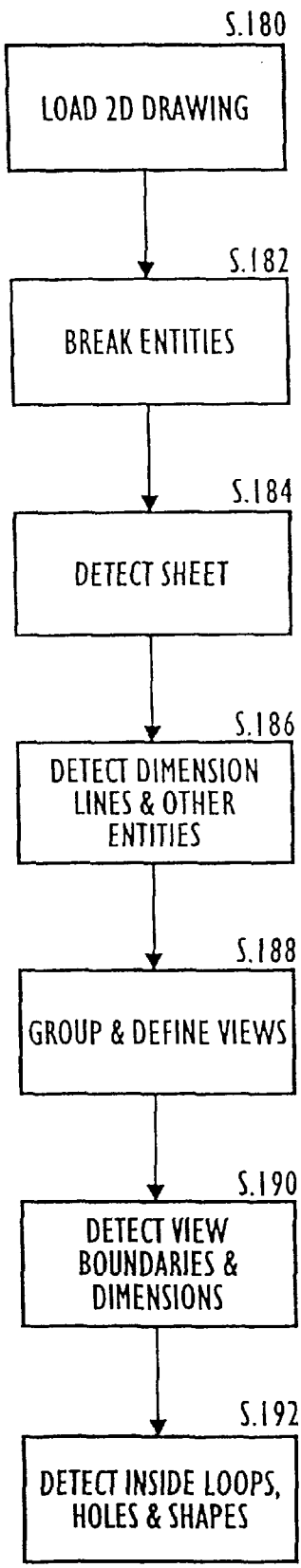
FIG. 14A is a flow chart, according to an aspect of the invention, of the basic logic flow of the processes and operations for performing a 2-D clean-up operation on a 2-D, three view drawing.

Referring now to FIG. 13, a description of the logic flow of the operations and processes that may be performed in order to develop a 3-D model (with no thickness) based on an original 2-D, three view drawing will be provided, in accordance with the teachings of the invention. Initially, the 2-D, three view drawing may be entered or imported to server module 32 at step S.160. The original 2-D, three view drawing may comprise various views of the part (e.g., a front view, a top view and a right side view—see, e.g., FIGS. 14B and 14C) and may be a CAD drawing such as a DXF or IGES file that may be downloaded or imported to server module 32. Thereafter, at step S.162, a 2-D cleanup operation may be performed by server module 32 in order to prepare the drawing for subsequent processing into the 3-D model. The 2-D cleanup operation may be performed in order to eliminate extraneous and non-geometrical information, including text, centerlines and dimension lines, which do not represent the actual geometry of the part. The 2-D cleanup operation may also be performed in order to connect all exterior lines at, for example, their connecting ends and to break and trim any intersecting lines or entities. FIG. 14A illustrates an example of the logic flow of the various processes that may be carried out when the 2-D cleanup operation is performed by server module 32.

As shown in FIG. 14A, the 2-D drawing is first read from a data file or loaded at step S.180 by server module 32. Thereafter, at step S.182, server module 32 may analyze the respective entities and geometrical data in the 2-D drawing and break the various entities in order to prepare the drawing for further processing. The break and trimming function performed at step S.182 may be carried out in a similar manner to that described above with respect to the autotrimming and cleanup function of the present invention. Thus, at step S.182, all of the geometrical data in the 2-D, three view drawing may be analyzed in order to detect the intersection of entities and any open intersections that are within tolerance. Any intersecting lines may be broken, with the resultant entities meeting at a common endpoint defined by the intersection point. Further, for entities having an open intersection area that is within a predetermined tolerance (e.g., 0.0–0.01 mm or 0.0–0.001 inches), such entities may be joined, in a similar manner to that described above with respect to, for example, FIG. 9E.

Figure 14B:
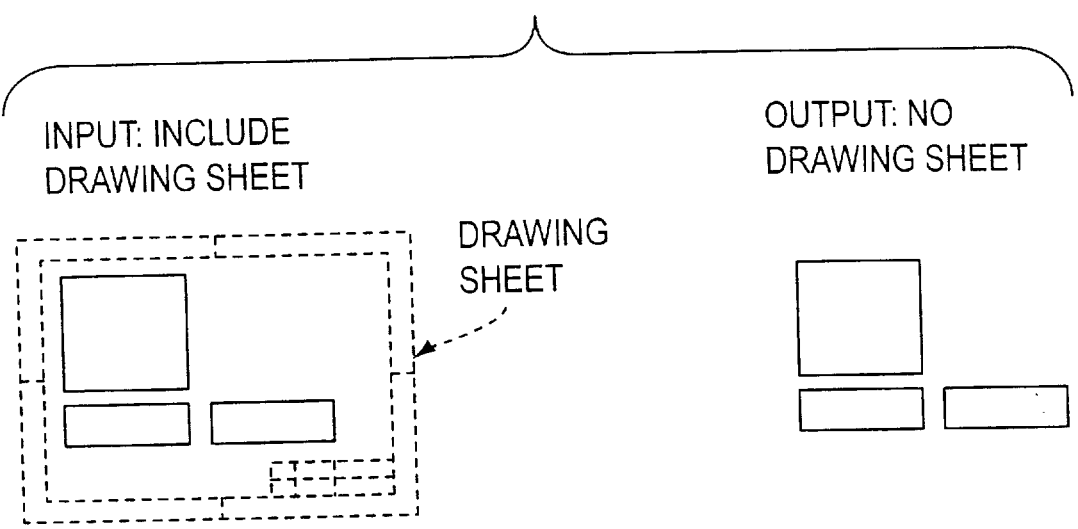
FIGS. 14B and 14C illustrate views and aspects of an exemplary 2-D, three view drawing that may be processed by the 2-D clean-up operation of the present invention.
Figure 14C:
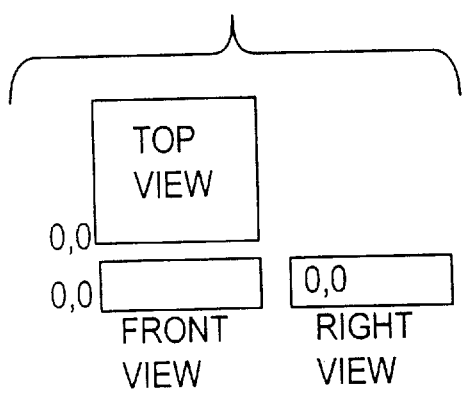

At step S.184, the perimeter of the 2-D drawing sheet may be detected and any exterior lines or data (such as border lines, coordinate grids and numbers, etc.) may be eliminated. As shown in FIG. 14B, a 2-D, three view drawing will often be provided on a drawing sheet. The drawing sheet may include extraneous and non-geometrical information that is not necessary to process the views of the sheet metal part. As such, during step S.184, this type of information may be detected and eliminated from the 2-D drawing when developing the 3-D model utilizing the 2-D clean-up process of the invention.

The 2-D drawing data may include key words or type fields to indicate the type of data contained therein (e.g., geometrical or non-geometrical/text). Thus, these key words or type fields, which are provided based on the data format of the drawing file, may be used to eliminate various extraneous information, such as text and other non-geometrical data. However, further processing is usually necessary in order to properly eliminate all of the unwanted drawing sheet data. Often, the border lines and other outside information are saved as entities (e.g., lines, etc.) that can not easily be distinguished based on the data key words or type fields. As such, according to an aspect of the present invention, a connectivity graph structure may be developed when analyzing the data of the 2-D drawing. The connectivity graph structure may indicate for each entity a list of incident vertices and a list of connected entities. For each vertex, a list of adjacent vertices and a list of entities on which it is incident may also be provided. With this graph structure, which may be developed when performing the break and trimming function of step S.182, it may be determined which entities are connected by matching endpoints. As a result, extraneous data, such as as border lines, information boxes and other non-geometrical data, may be eliminated since this data will typically not be constructed with or include connecting entities.

As noted above, the 2-D, three view drawing may include extraneous information, such as dimension lines, arrow lines, centerlines, and text, which do not represent the actual geometry of the part. These entities may be detected at step S.186 and deleted from the 2-D data file in order to prepare the 2-D drawing for further processing. The detection of these extraneous entities may be performed automatically by server module 32 (e.g., by detecting items in the 2-D data file that do not relate to the actual geometry of the part). For example, by using the connectivity data graph structure, two-sided opened entities (e.g., lines used for underlining text or to indicate a dimension or centerline in the part) may be detected and eliminated. Other entities, such as arrows, may also be detected based on the presence of floating endpoints and other characteristics of such entities. In order to effectively eliminate all unnecessary data, the server module 32 may also provide a manual editing function to permit an operator to indicate (e.g., by mouse or keyboard) which items in the 2-D drawing should be eliminated. Through the assistance or confirmation of the operator, additional extraneous information may thus also be removed from the drawing.

After step S.186, the various views in the 2-D drawing may be grouped and then respectively defined at step S.188. In accordance with an aspect of the present invention, server module 32 may support predefined or standard views and orientations, such as a top view, front view, right side view layout, such as that shown in FIGS. 14C and 14D. Other views and layouts, such as combinations of a top view, a front or back view, and a right or left view, may also be supported. As further described below, server module 32 may also support rotated views (see, for example, FIG. 14D) in order to process the views in the 2-D drawing into the 3-D representation of the part. In any event, at least two (and preferably three) different views of the part with thickness representations should be provided so that a 3-D model of the part may be constructed. By analyzing the connectivity and grouping of the entities in the connectivity graph structure, server module 32 may group and define the views based on the relative position and/or coordinate location of each of the views.

By way of a non-limiting example, the definition of the views by server module 32 may be carried out in accordance with a predefined or customary arrangement or layout for analyzing the views in the data file, and/or based upon detecting the orientation of the views and matching the various dimensions of the part in each of the respective views in the drawing. A predefined or canonical form, such as that shown in FIG. 14E, may be used to determine and define each of the views according to possible view types. Geometric comparisons of the various endpoints and relationships between the entities defining each group may be performed in order to effectuate step S.188. The view detection feature of server module 32 may label each of the views according to one of plurality of possible view types (e.g., top view, front view, back view, left view, right view). The detection of each of the views may be based on a predefined or canonical view layout or form, and based on the detected relationships between each of the views that are present.

Various processes and operations may be used at step S.188 to group and define the views in the 2-D, three view drawing. For example, after accessing the processed 2-D, three view drawing, the server module 32 may first identify the top view of the part in the drawing data. The top view may be detected based on the predefined or canonical form, view layout (such as that in FIG. 14E). If three separate views are detected in either a horizontal or vertical direction, then the center view may be defined as the top view. Further, if three separate views are not detected, and only two separate views are detected in a vertical direction, then the upper view may be defined as the top view. Once again, the connectivity and grouping of the entities in the connectivity graph structure may be utilized to detect each of the views. A stored lookup table or matrix representing the predefined or canonical form may be used to compare the views of the 2-D drawing and detect each of the views.

After detecting the top view from the 2-D, three view drawing data, the other views of the part may be detected based on the relative position of each of the views to the detected top view. For example, based on the canonical view layout of FIG. 14E, if a view grouping is located above the top view, then the view may be defined as a back view. If, however, a view grouping is located below the top view, then the view may be defined as a front view of the part. Further, a right view and a left view may be detected based on their relative position on the corresponding right hand side and left hand side, respectively, of the top view. Thereafter, any remaining views, which do not conform to the canonical form (such as FIG. 14E), may be detected based on their relative position to the detected views (e.g., a detected back view or front view). For example, for the layout B shown in FIG. 14D, the right view has been provided in a rotated position relative to the top view. The right view in layout B, however, may still be detected based on its relation to the detected front view. That is, undetected views that are present on the right hand side or left hand side of a detected back or front view may be defined, respectively, as a right view or a left view of the part.

Various predefined or canonical view layouts may be used to detect and define views in the 2-D, three view drawing. The canonclial forms (such as that in FIG. 14C or FIG. 14D) may be selected based on the numbers of view types that are to be supported and/or based on the view layouts that are more prevalent or selected/required by the manufacturing facility. If any views are not detected, a warning signal may be provided by the server module so that an operator may modify the 2-D, three view drawing data in accordance with the preferred view layout, or take other appropriate action. In addition to providing a predefined or canonical form for detecting the views in the 2-D drawing, a predefined or canonical form (such as layout A in FIG. 14D) may also be provided for processing the detected views and developing the 3-D model of the part. As such, a rotated view feature may be provide to properly group the detected views in accordance with the canonical form before further processing is performed.

Figure 14D:
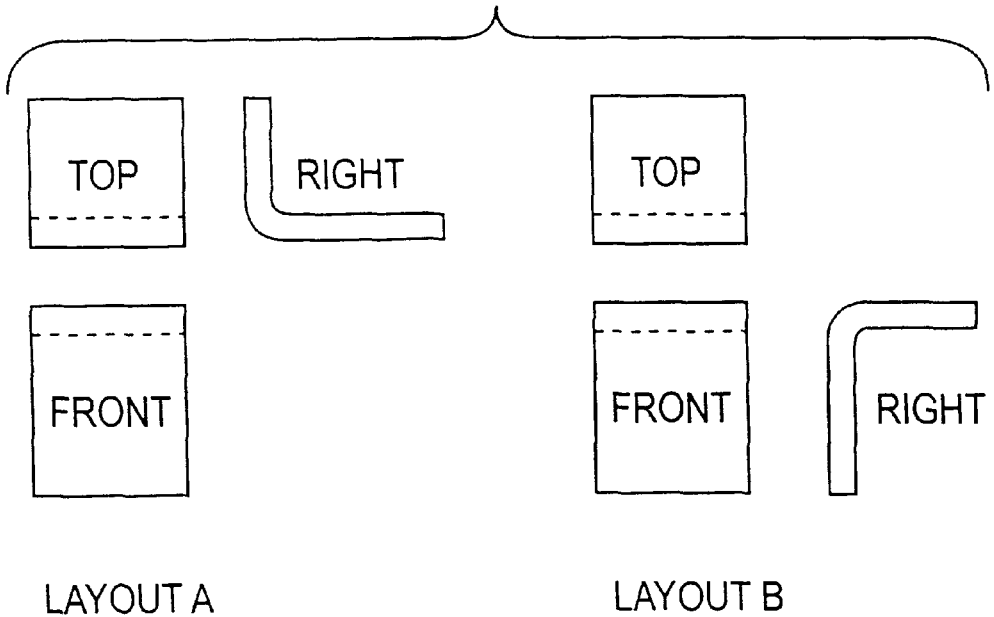
FIG. 14D illustrates a rotated view feature of the 2-D clean-up operation of the present invention.
Figure 14E:
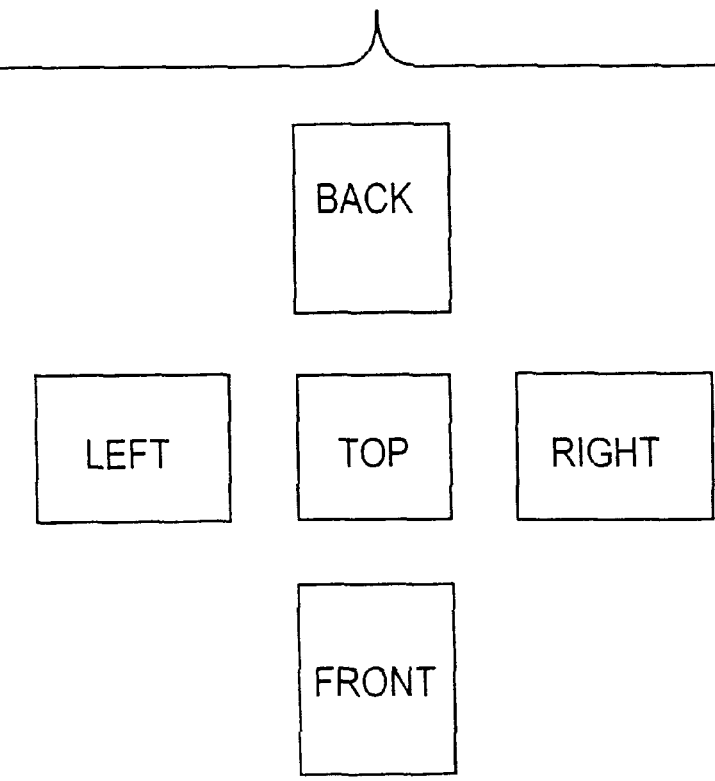
FIG. 14E illustrates, in accordance with an aspect of the present invention, a canonical form relating to the 2-D clean-up operation of the present invention.

As mentioned above, the 2-D cleanup operation may support and detect rotated views which do not conform to the predefined or canonical form for detecting views in a drawing. With the rotated view option, non-conforming views that have been detected may be rotated or translated so that each of the views conform to the predefined or canonical view form for processing and developing the 3-D model of the part. Assuming a canonical form such as that illustrated in FIG. 14E for detecting views of the part, each of the views in layout B in FIG. 14D may be detected based on the relative position of the views to the top view and the other detected views, as described above. If, for example, the layout A in FIG. 14D is to be used as a predefined or canonical view layout for processing the various views in a 2-D drawing having a top view, front view and a right view, then at step S.188 the right view in layout B may be rotated by 90 degrees to provide a modified view layout for the part that is similar to layout A. By rotating the right view in layout B by 90 degrees so that the right view of the part is provided on the right side of the top view of the part, the views in the drawing may be processed in accordance with the canonical form represented by layout A. A stored lookup table or matrix representing the predefined or canonical form may be used to compare the views of the 2-D drawing and to determine which views require rotation and translation.

In order to ensure that an accurate 3-D model of the part is developed from the views in the 2-D drawing, the respective dimensions in each of the views should be checked for consistency and matching. As further shown in FIG. 14A, at step S.190, the boundaries of the views in the data file may be detected in order to confirm that all of the dimensions of the respective views are in scale with one another. If it is determined that the views do not match within a predetermined tolerance (e.g., 0.0–0.01 inches), then appropriate modification may be made at step S.190 to redimension any particular view in order to ensure that all of the views are provided in the same scale. A warning component may be provided in server module 32 to alert a user that the view dimensions do not match so that the necessary modifications can be made to the 2-D drawing data that is present.

Various operations and processes may be utilized to detect and verify the consistency of the dimensions in the respective views of the part. For example, the corresponding dimensions of each of the views may be compared to determine if they are within a predetermined tolerance of one another. Such an analysis may include comparing the line entities that define the boundaries of each view of the part. Assuming the canonical form in FIG. 14E, a top view may be detected as matching a right view or a left view if the difference, for each view, between a maximal Y coordinate position and a minimal Y coordinate position is within a predetermined tolerance (e.g., 0.0–0.01 inches). Further, the top view may be detected as matching a front view or a back view if the difference, for each view, between a maximal X coordinate position and a minimal X coordinate position is within a predetermined tolerance (e.g., 0.0–0.01 inches). Moreover, the left view or right view may be determined as matching a front view or a back view if the difference between a maximal X coordinate position and a minimal X coordinate position compared to the difference between a maximal Y coordinate postion and a minimal Y coordinate position is within a predetermined tolerance (e.g., 0.0–0.01 inches). Once again, a warning component or module may be provided in server module 32 to alert a user when the view dimensions or related face dimensions do not match so that the necessary modifications can be made to the 2-D drawing data that is present.

Finally, at step S.192, the inside loops, holes and shapes of the part may be detected in accordance with the teachings of the face detection procedure of the present invention. The various holes and shapes provided on the interior of the faces of each view may be detected by looping through the various lines and boundaries of the part from the exterior of the part towards the center. Loop and entity analysis may be performed on each view of the part in the 2-D drawing. By analyzing each view from the outside and working inwardly towards the center of the part, the detected loops will define the boundaries and areas of the material and openings of the part based upon a cyclic sequence (e.g., material, opening, material, etc.). A loop tree, such as that in FIG. 10H, may be developed for each view to determine the location of the faces and any openings within each face. Unconnected entities, such as floating arcs or lines, within the faces of the part may also be detected and eliminated during step S.192.

An exemplary code for performing the 2-D clean-up operation of the present invention is provided in Appendix D. The code was written in C++ programming language and includes comments to facilitate the analysis of the logic and algorithms used therein. The code includes the various processes and operations of the 2-D clean-up mode, such as those discussed above with reference to FIGS. 14A–14C.

Referring back to FIG. 13, after a 2-D clean-up operation has been performed, logic flow will then continue to step S.164 where it may be determined whether the 2-D drawing represents or includes the thickness of the material (i.e., whether the 2-D drawing is with thickness). If the 2-D drawing is determined to contain the thickness amount, then at step S.166, an eliminate thickness procedure may be performed by server module 32 in order to prepare the 2-D drawing for subsequent processing into a 3-D model. The determination of the existence of thickness in the 2-D drawing may be performed automatically by server module 32 based on the data of the drawing, or may be performed by the server module through the assistance or response from the operator (e.g., the operator may be prompted to indicate whether thickness removal is necessary or desired). The thickness of the part may be eliminated due to the unique symmetry of all sheet metal parts. By eliminating the thickness of the part, the resultant sheet metal part with no thickness may be more easily analyzed by a sheet metal operator or designer. Further, the inventors of the present application have found that by eliminating the thickness of the 2-D, three view drawing, the time required to convert the 2-D drawing and develop the 3-D model may be substantially reduced.

Figure 15A:
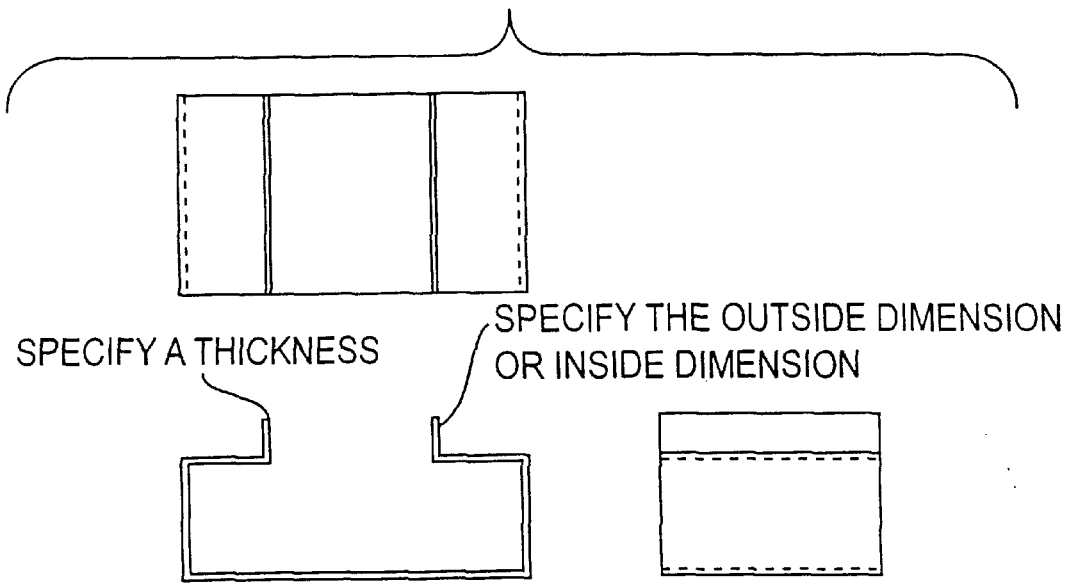
FIGS. 15A and 15B illustrate an example of a 2-D, three view drawing with thickness and a simplified 2-D, three view drawing model with no thickness that may be developed using an eliminate thickness procedure, according to the teachings of the present invention.
Figure 15B:
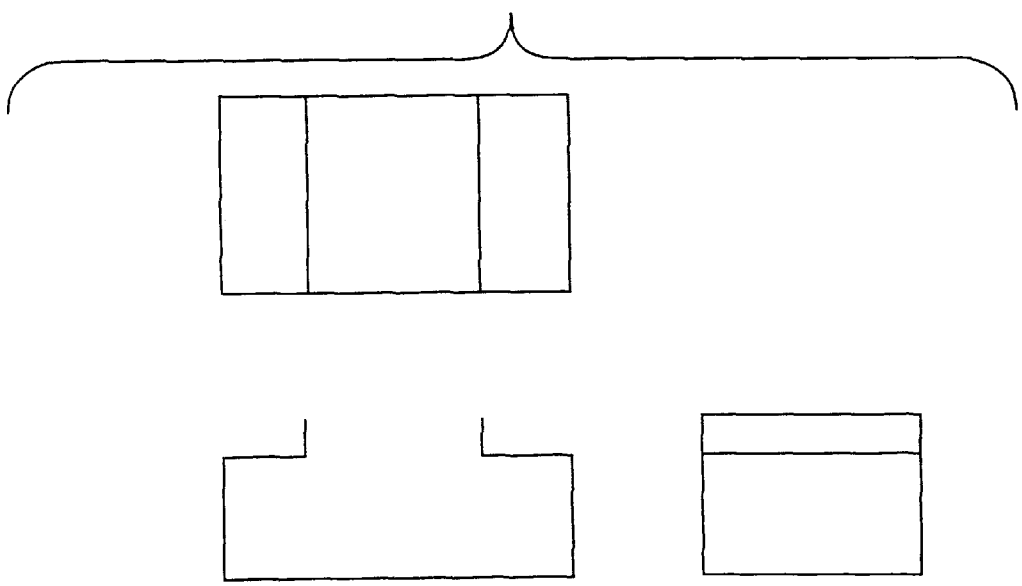

Since most 2-D, three view drawings include a material thickness amount, an operator may often be confused by which bend lines should be selected in order to make a 3-D model from the 2-D drawing. As a result, considerable time is wasted in selecting the appropriate bend lines so that the 2-D, three view drawing may be converted into a 3-D model. An example of a three view, 2-D drawing with thickness is shown in FIG. 15A. According to an aspect of the present invention, an eliminate thickness procedure may be provided to display a simplified 2-D, three view drawing model which is represented and processed with no material thickness, but retains the material thickness amount and the inside or outside dimensions of the part in the bend model data. FIG. 15B illustrates the simplified three view, 2-D drawing that may be viewed and displayed to the operator at server module 32 after performing the eliminate thickness procedure.

When the eliminate thickness procedure is executed, the user may be prompted to specify the material thickness in the 2-D, three view display, and may be prompted to specify which dimension (i.e., the outside dimension or inside dimension) is to be retained in the display. The operator may indicate the thickness and surface to retain in one of the views by use of, for example, a mouse. Based upon the data entered by the user, server module 32 may modify the 2-D, three view drawing to eliminate the material thickness indicated by the user and to retain the inside or outside dimension based on the operator's selection.

In order to eliminate the thickness in the 2-D, three view drawing, the server module 32 may analyze each of the three views based on the selections made by the operator. The selected surface may be projected into each of the other views by geometrical computations (e.g., by detecting the corresponding entities that lie in the same X-coordinate or Y-coordinate projection as the selected entity line or surface) to detect the corresponding entities and lines in each of the views. The corresponding entities may be marked and retained, with the nonmatching entities or surfaces being eliminated or not displayed on the screen, such as that shown in FIG. 15B. Further, the thickness dimension line indicated by the operator may be similarly projected into each of the other views, with the matching thickness dimension lines or entities being eliminated, as further shown in the example if FIG. 15B. As a result, each of the views in the drawing may appropriately modified and then displayed to the user at the server module 32. The resultant 2-D, three drawing with no thickness may also be used for subsequent processing in order to develop the 3-D model of the part.

The thickness elimination procedure of the present invention may include a manual thickness elimination mode to permit an operator to selectively indicate in each view the thickness lines to be eliminated and the surface entities to be retained. A mouse or other appropriate input device may be used by the operator to indicate which areas in each of the displayed views are to be eliminated and which surfaces are to be retained. Based on the data entered by the operator, the server module 32 may eliminate each line entity selected by the operator from the 2-D, three view drawing in order to provide a drawing with no thickness.

Figure 15C:
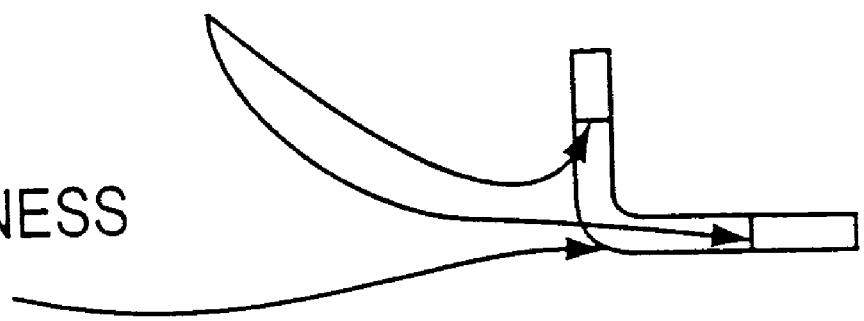
FIG. 15C is an illustration of a cross thickness line and thickness arc of an exemplary part, according to an aspect of the invention.

The present invention may also include a warning system or module to analyze and detect whether all the thickness representations have been properly identified in the 2-D, three view drawing, and to alert the user when there are unmarked thickness components and/or when there are inconsistencies in the drawing data. For example, a thickness warning component may be provided to highlight on the display screen possible unmarked thickness segments, and a face warning component may be provided to highlight on the screen possible mismatched faces when the face dimension does not match the thickness mark in another view. A bendline warning component may also be provided to highlight inconsistent bendlines and highlight mismatching thickness arcs. An arc may be highlighted when at least one bendline projected on this arc is not bound by two cross thickness lines. For instance, FIG. 15C illustrates a thickness arc that is properly bounded by two or another non-zero even number of cross-thickness lines (i.e., a small line crossing the thickness in one of the views). Each bendline should also be bound by two or another non-zero even number of cross-thickness lines. The analysis of these entities of the part in each view may be based on performing a loop analysis on and analyzing the connectivity of the line and arc entities that make-up each view. An open thickness line may be defined based on a thickness line that has at least one end point that is not connected to another thickness line or arc. A side that includes an open thickness line may be defined as an open thickness side. A thickness line may be highlighted if the open thickness side of an open thickness line does not match the bounding box of a minimal loop. By providing such warnings relating to the processed 2-D, three view image to a user, the user may be alerted of inconsistencies in the drawing data, and the user will thus be able to modify and/or correct the drawing data before further processing is performed to develop the 3-D model of the part. Inclusion of such a warning system and user interaction also improves the accuracy of the representation of the part by the 3-D model.

At step S.168 in FIG. 13, the processed 2-D, three view drawing with no material thickness may then be converted and developed into a 3-D model. The conversion and development of the 3-D model from the 2-D, three view drawing may be performed by using well-known or established projection and/or extrusion methods. For example, in order to develop the 3-D model from the three view, 2-D drawing, the depths of each of the views may be detected and then each of the views projected in order to develop a 3-D model. The resultant 3-D model may then be used when developing the bend model data and also converted into a single view, 2-D flat drawing by applying the above-described unfolding algorithm. For more information geometric modeling techniques, see MORTENSON, FOLEY et al. and MANTYLA. For additional information on projection techniques to construct 3-D models from 2-D drawings, see, for example, WESLEY et al., W.A., *Fleshing Out Projections*, IBM J, Res. Develop., Vol. 25, No. 6, p.934–954 (1981); AOMURA, Shigeru, *Creating Solid Model with Machine Drawings*, The 6th Computational Mechanics Conference, JSME, No. 930–71, Japan, pp. 497–98 (1993); and AOMURA, Shigeru, *Recent Trends and Future Prospect of Research and Practical Use* (*Automatic Reconstruction of 3D Solid from Drawings*), Toyo Engineering Corp., Japan, pp. 6–13 (1995); the disclosures of which are expressly incorporated herein by reference in their entireties.

When developing the 3-D model at step S.168, an additional clean-up process may be included in order to further process and refine the resultant 3-D model. In accordance with an aspect of the invention, a 3-D clean-up process may be provided to compensate for ambiguities that are present in the 2-D, three view drawing of the part and that create extraneous or superfluous information in the developed 3-D representation of the part. As will be appreciated by those skilled in the art, a 2-D, three view representation of a part includes ambiguities concerning the representations of various features of the part in 3-D coordinate space. When developing the 3-D model from the three view, 2-D drawing, extraneous and superfluous information may be generated as a result of these ambiguities. As such, according to an aspect of the invention, the 3-D clean-up process may include processes and operations for detecting and removing one sided open lines and for detecting and cleaning bendlines and trimming faces. The 3-D clean-up process may be performed automatically when developing the resultant 3-D model of the part, or may be selectively performed based on input from an operator when the developed 3-D model is determined to require further processing.

Figure 49A:
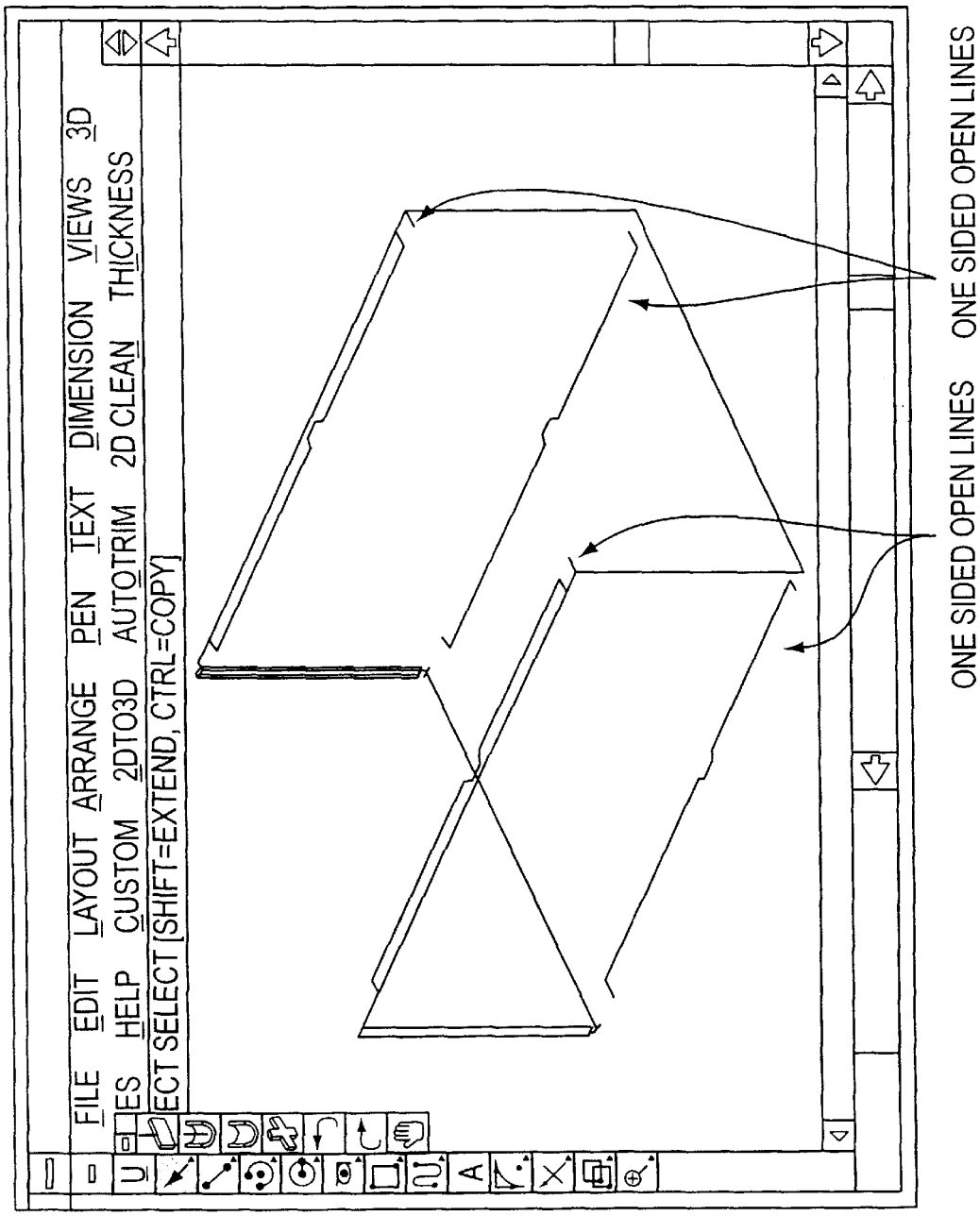
FIG. 49A illustrates an example of a 3-D representative of a part before one sided open lines are removed.
Figure 49B:
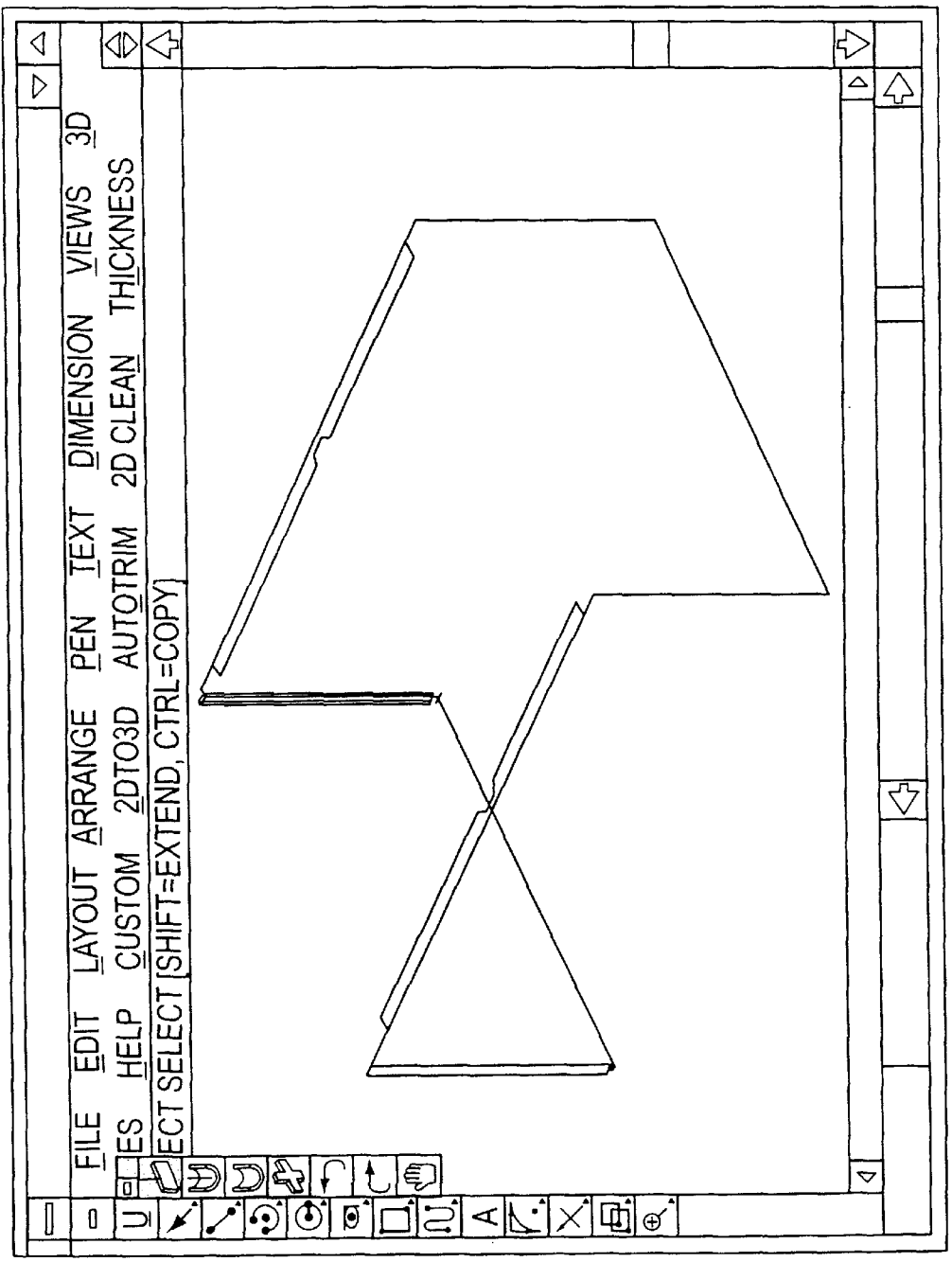
FIG. 49B illustrates the part after the one sided open lines have been removed from the 3-D representation, according to a 3-D clean-up process of the invention that may be used when developing a 3-D model of a part from a 2-D, three view drawing of the part.

According to the 3-D clean-up process, by analyzing the developed 3-D drawing data, every line or arc which is determined to be not connected to another entity at one of its endpoints may be identified and defined as a one sided open line. Any entity that is determined to be a one sided open line may be removed from the 3-D representation of the part. Once an open line is removed, it may cause another line or entity to be open. As such, new one sided open lines are also identified and removed recursively until all open lines or entities are removed. FIG. 49A illustrates an example of a 3-D representation of a part before one sided open lines are removed, and FIG. 49B illustrates the part after the one sided open lines have been removed from the 3-D representation.

Figure 50A:
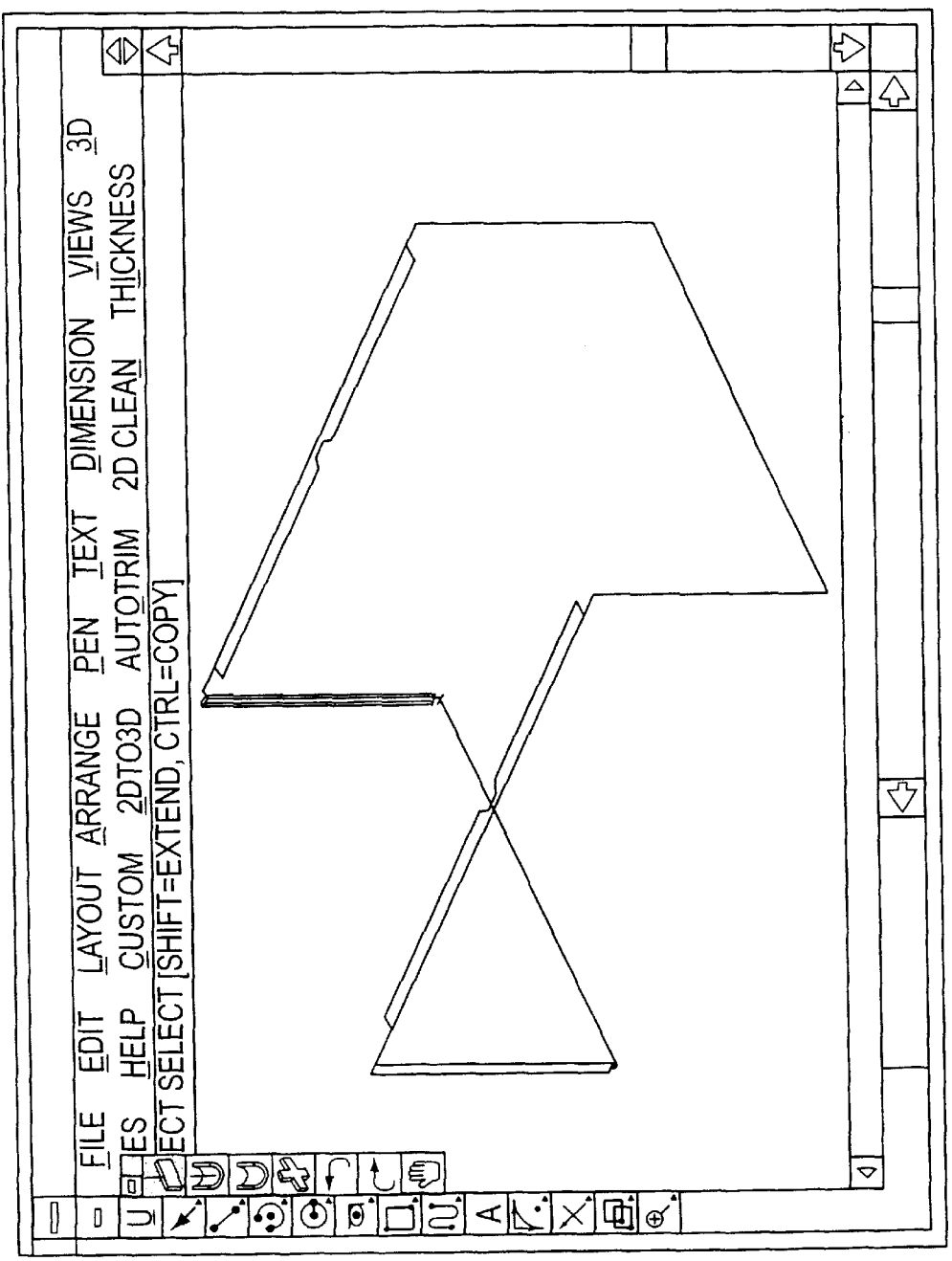
FIG. 50A illustrates an exemplary 3-D representation of a part before the bendlines have been identified.
Figure 50B:
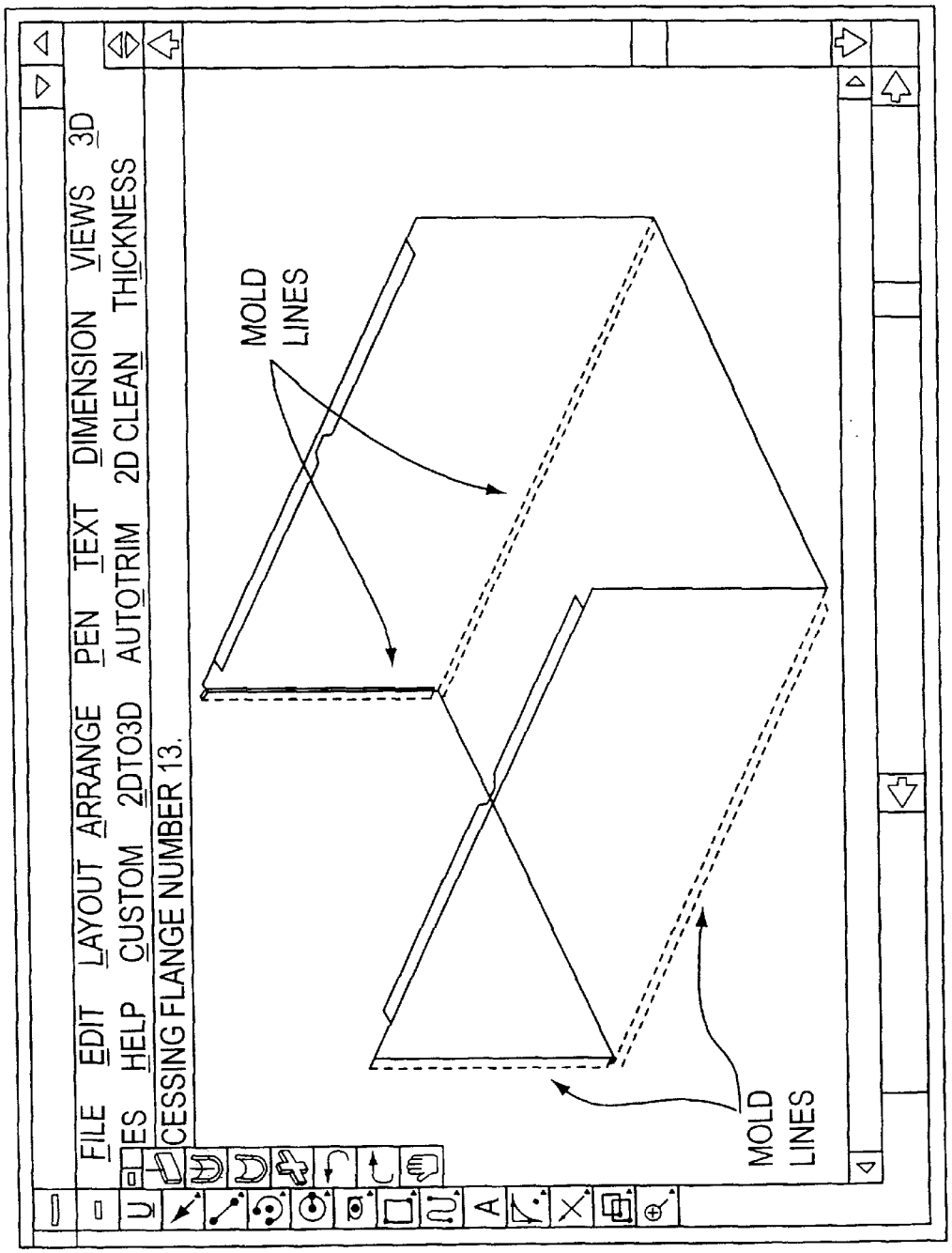
FIG. 50B illustrates the part after the mold lines have been added, according to a 3-D clean-up process of the invention.

As noted above, the 3-D clean-up process that may be performed at step S.168 may also include a process for detecting and cleaning bendlines. Bendlines may be identified and cleaned (e.g., by adding mold lines) in order to facilitate the detection of face information of the part in 3-D space. Based on the developed 3-D model data, each bendline may be identified based on the detection of a pair of 3-D arcs (e.g., represented by arc entities in the drawing data)

which have the same normal defined by their centers. During this process, mold lines may be added to the bendlines that are identified. The mold lines may be added by identifying corresponding endpoints in each pair of 3-D arcs, and extending mold lines (e.g., represented by line entities) between the corresponding endpoints of the 3-D arcs. FIG. 50A illustrates an exemplary 3-D representation of a part before the bendlines have been identified, and FIG. 50B illustrates the part after the mold lines (represented by dashed lines in the drawing) have been added.

Figure 51A:
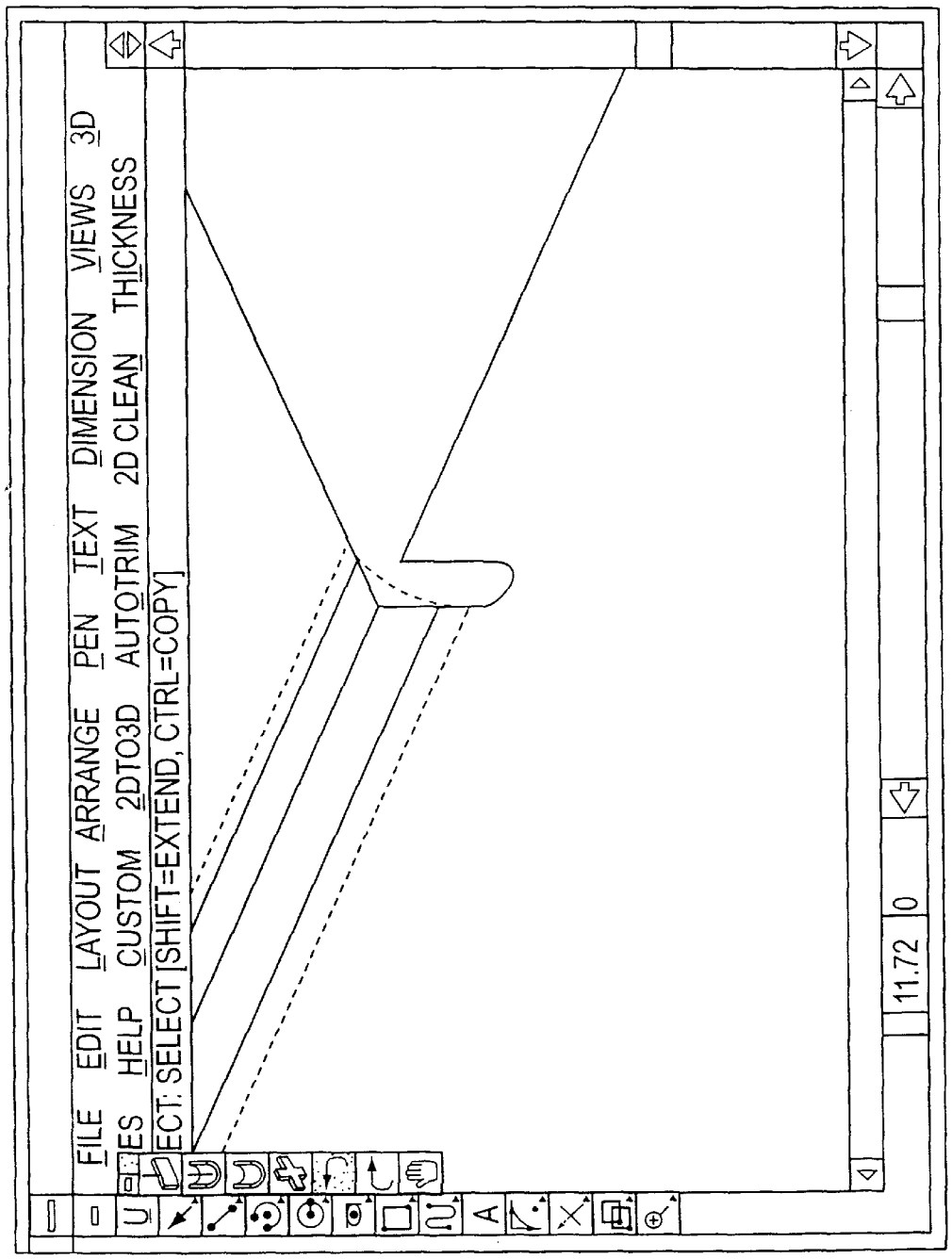
FIG. 51A illustrates an exemplary section of a part before cleaning the bendlines and trimming the faces.
Figure 51B:
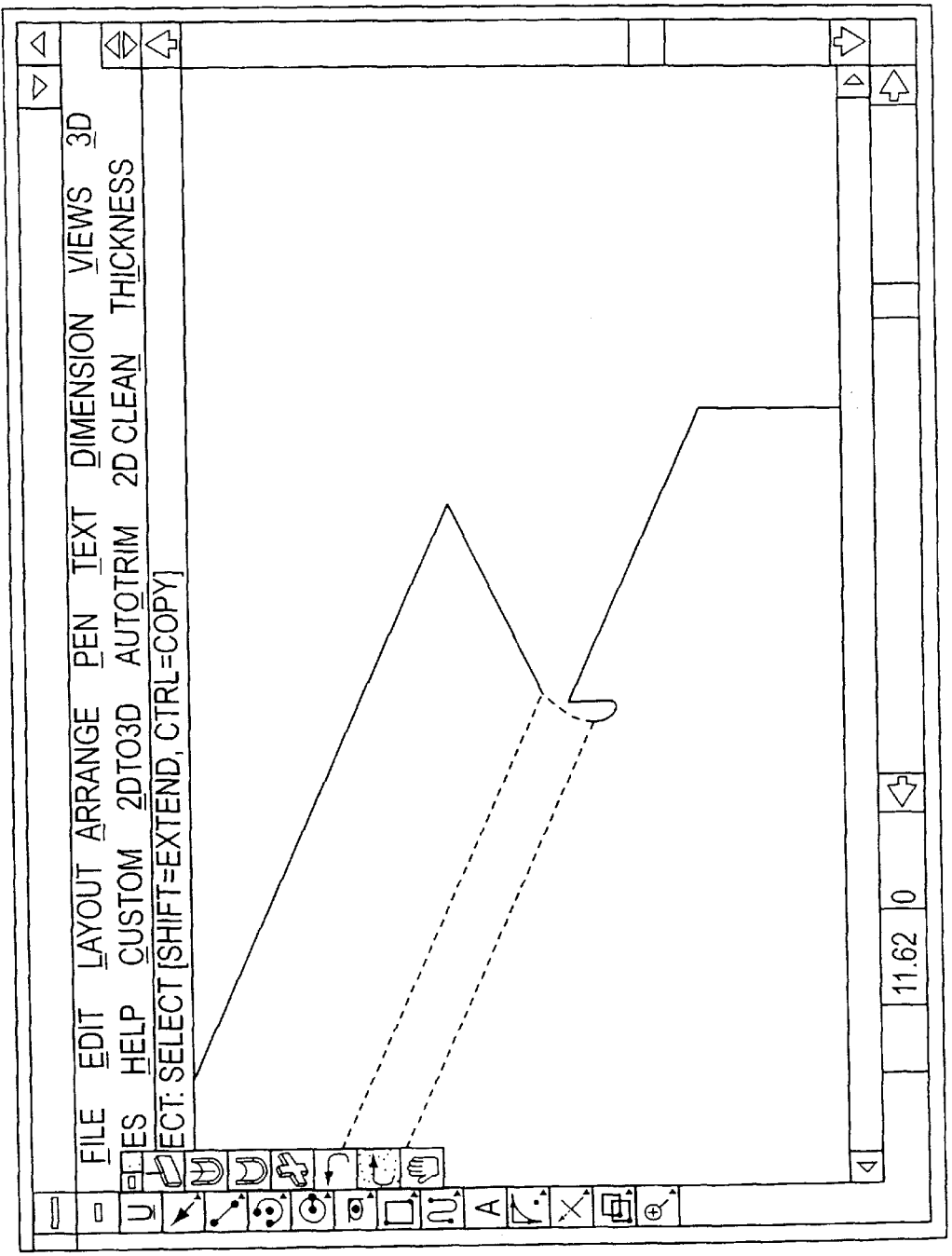
FIG. 51B shows the section of the part after cleaning and trimming has been performed, according to a 3-D clean-up process of the invention.

After the bendlines have been identified and the mold lines have been added, the 3-D clean-up process may further process the 3-D representation of the part to further clean all bendlines and trim the faces of the part. Due to frequent ambiguities in the views of the 2-D, three view drawing data, superfluous sections of the faces may be generated in the 3-D representation of the part. The 3-D clean-up process may identify these superfluous sections of the faces and trims the faces using sheet-metal domain knowledge (e.g., knowledge relating to what is unfoldable). Other extraneous information, such as extra holes or openings, may also be identified and eliminated. As a result, the superfluous sections of the part may be removed and the 3-D representation may provide a more accurate representation of the sheet metal part. FIG. 51A illustrates an exemplary section of a part before cleaning the bendlines and trimming the faces, and FIG. 51B shows the section of the part after cleaning and trimming has been performed.

FIG. 16 illustrates an example of the logic flow of the processes and operations that may be performed in order to develop a 3-D drawing with no material thickness from an original 3-D drawing with material thickness. At step S.200, the original 3-D drawing with material thickness may be entered or imported to server module 32. The 3-D model may be a 3-D, wire frame drawing with material thickness and may be a CAD drawing file, such as a DXF or IGES file. After the 3-D drawing has been imported to the server module 32, an eliminate thickness procedure may be performed at step S.204. The eliminate thickness procedure at step S.204 on the 3-D model may be performed in a similar manner to that provided in the Amada UNFOLD software system, described above. In order to eliminate the thickness in the 3-D model, the operator may first be prompted to indicate the thickness and to select the surface to be retained. Based on the operator's selection, the thickness is measured by analyzing the endpoints of the entity line defining the thickness. Thereafter, the boundaries of the selected surface may be traced, in a similar manner to that described above with respect to the loop and entity analysis process, with the entities to be kept being marked (e.g., by setting or incrementing a flag) and the corresponding thickness entities being eliminated. When tracing the entities of the 3-D part, the entities may be distinguished based on the length of the thickness entity selected by the user. Generally, all entities having the same length of the thickness entity may not be selected and eliminated, with the other entities that are not of the same length being marked and retained. Any remaining entities that are not marked during the surface trace of the 3-D part may also be eliminated. Once again, the server module 32 may provide a manual thickness removal mode, in which an operator may manually indicate each entity in the 3-D part that is to be removed.

After step S.204, the resultant 3-D model with no material thickness may be developed and/or displayed to the operator at step S.206. An unfolding algorithm or process may then be applied to the 3-D model with no material thickness to develop the single view, 2-D flat drawing for the bend model data, as described in greater detail above.

As discussed above, the design and manufacturing information that is stored in database 30 may include a bend model data file comprising part geometry and topology as well as manufacturing data for the sheet metal component. Further, the software that may be used to implement the various features of the invention may be developed using a high level programming language such as C++ and by using object oriented programming techniques. Different object oriented techniques may be used, such as Booch or OMT to implement the various features of the invention. If object oriented programming is utilized, an object oriented data model may be utilized to represent the sheet metal part and the bend model for the part may be implemented through a completely self-contained class library. In accordance with an aspect of the present invention, a description will now be provided of any exemplary data structure and access algorithm for the bend model, based on object oriented programming techniques.

Figure 17:
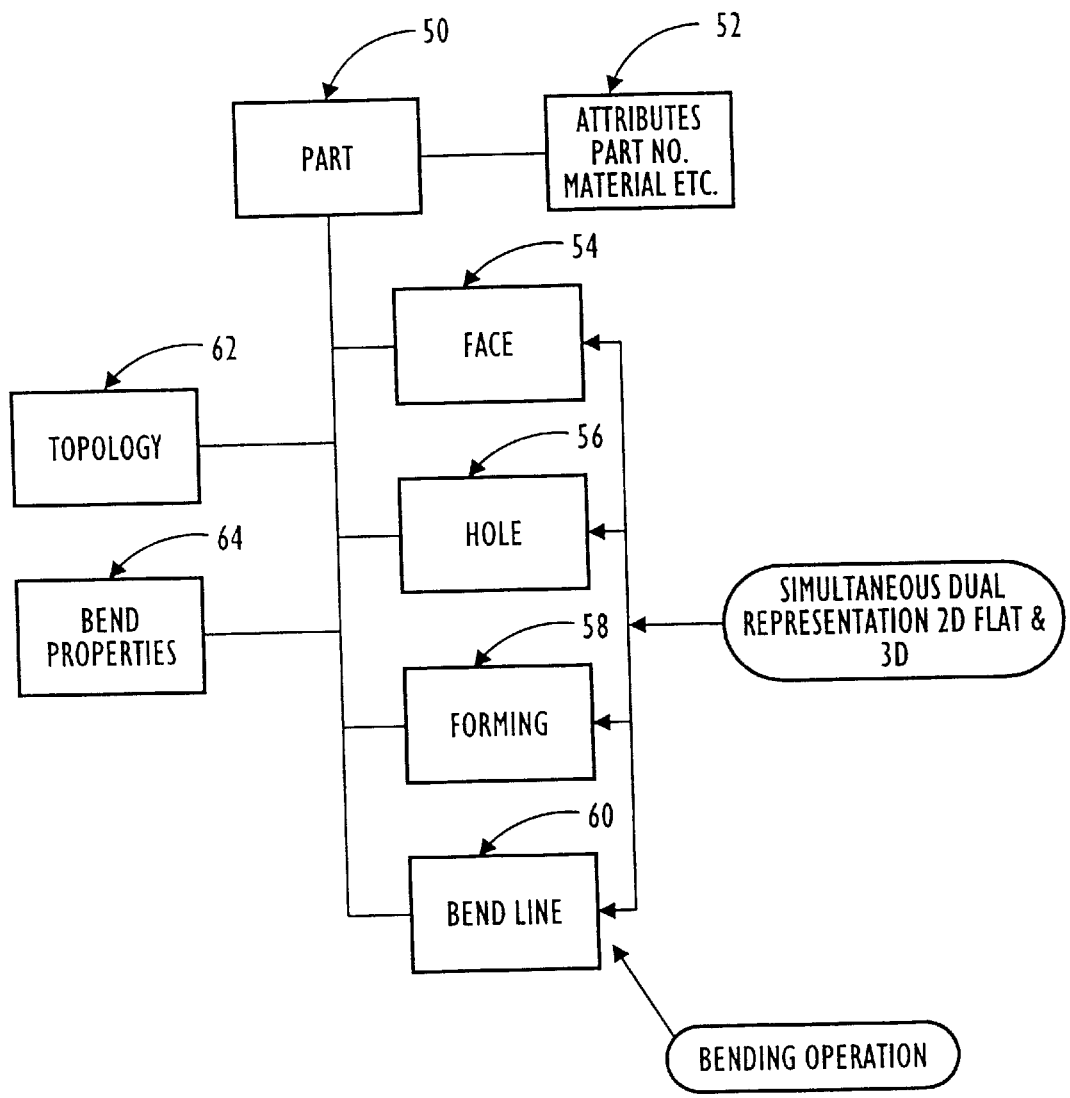
FIG. 17 illustrates an exemplary data structure and access algorithm of the bend model that may be utilized when implementing the present invention through, for example, object oriented programming techniques.

FIG. 17 illustrates an exemplary data structure and access algorithm of the bend model that may be utilized when implementing the present invention through object oriented programming. Object oriented programming is a type or form of software development that can model the real world by combining objects or modules that contain data as well as instructions that work upon that data. In object oriented programming, objects are software entities that may model something physical, like a sheet metal part, or they may model something virtual, like business transactions. Objects may contain one or more attributes (i.e., fields) that collectively define the state of the object, and may contain an identity that distinguishes it from all other objects. In addition, objects may include behavior that is defined by a set of methods (i.e., procedures) that can modify the attributes or perform operations on the object based on the existence of certain conditions.

According to an embodiment of the present invention, the sheet metal part may be represented as an object oriented data model. As shown in FIG. 17, the bend model for the sheet metal part may be defined as a completely self-contained class library. All of the required data manipulation and functions for the sheet metal part (e.g., folding, unfolding, etc.) may be captured as member functions of the class library. All of the geometrical and topological data may be defined in objects that are grouped within the bend model. The bend model class library may be a hierarchy of classes or objects with a part class being the top level class in the hierarchy. The part class may include a part object with various part attributes and may have various objects that define the part and the actions that may be performed on or to the part.

FIG. 17 shows an example of the various objects that may be grouped in the bend model class library. For example, a part class 50 may be provided that includes various attributes 52. The part attributes 52 may include various part information such as the part number and/or name, the part material type and the thickness of the part. The attributes 52 may also include bend sequence information for indicating the order in which the bends are to be performed and other manufacturing information such as tolerance requirements for the various dimensions of the part. Part class 50 may also comprise various objects, such as a faces object 54, a holes object 56, a formings object 58, and a bendlines object 60, as shown in FIG. 17. Each of the objects 54, 56, 58 and 60 may actually consist of a group of objects for each of the entities (e.g., faces, holes, formings, and bendlines) represented therein. The faces object 54, holes object 56, formings object 58 and bendlines object 60 may each include geometry and dimension data, location and coordinate data in both 2-D and 3-D space representations, and data relating to the edges and surfaces of their respective entities (e.g., faces, holes, formings, and bendlines) of the part. For example, the faces object 54 may include geometry and dimension data for each of the faces, location space data of the faces in both 2-D and 3-D representation, and edges and surface data for the edges and surfaces of the faces. In addition, the formings object 58 may include data relating to special formings in the part, including geometry and dimension data, 2-D and 3-D location space data, and edges and/or surfaces data.

As further shown in embodiment of FIG. 17, the part class 50 may also include a topology object 62 and a bend properties object 64. The topology object 62 may include the part topology data for the faces, holes, formings and bendlines of the part. The data in the topology object 62 may indicate the structure and geometric relationships of the various features of the part. The bend properties object 64 may also be provided and include information concerning special manufacturing constraints for one or more features of the part. For example, bend properties information concerning how the sheet metal part should be bent may be provided in the bend properties object 64. The bend properties information may include specific manufacturing data for different bend property types (e.g., simultaneous bend, colinear bend, Z-bend, etc.).

The bendlines object 60 may also include manufacturing specific data relating to the bends to be performed. Thus, in addition to providing geometry and dimension data, 2-D and 3-D location space data, and edges data for each bendline, the bendlines object 60 may also include V-width data, bend pitch data, bend count data and/or orientation data for each of the bendlines. Each of the bendlines may also include an associated bending operation, as shown in FIG. 17. The bending operations may be implemented as a group of objects with data and operations/instructions for performing bends at each bendline. If provided as an object, each bending operation may include data and instructions indicating how and what type of bending is be performed (e.g., conic bend, Z-bending, Hemming, arc bending, etc.), as well as pertinent bend data such as the bend angle, bend radius and/or bend deduction amount.

By implementing the bend model of the part through an object oriented data model, all of the complex mathematical calculations, computational geometry and matrix transformations may be built into a single class library. Special bending operations, such as hemming, Z-bending and arc bending, may also be captured inside the class library. Further, manufacturing information, such as the V-width, the bend deduction amount, and the bend sequence, may be also captured within the class library. With the bend model, simultaneous dual representation of both the 2-D flat model and 3-D model may be effectuated, as shown in FIG. 17. Further, bending operations may be performed in accordance with the bend lines object 60 of the bend model. General comments regarding the bend model and the part structure, as well as implementation of the same, are provided in Appendix K attached hereto.

Figure 18:
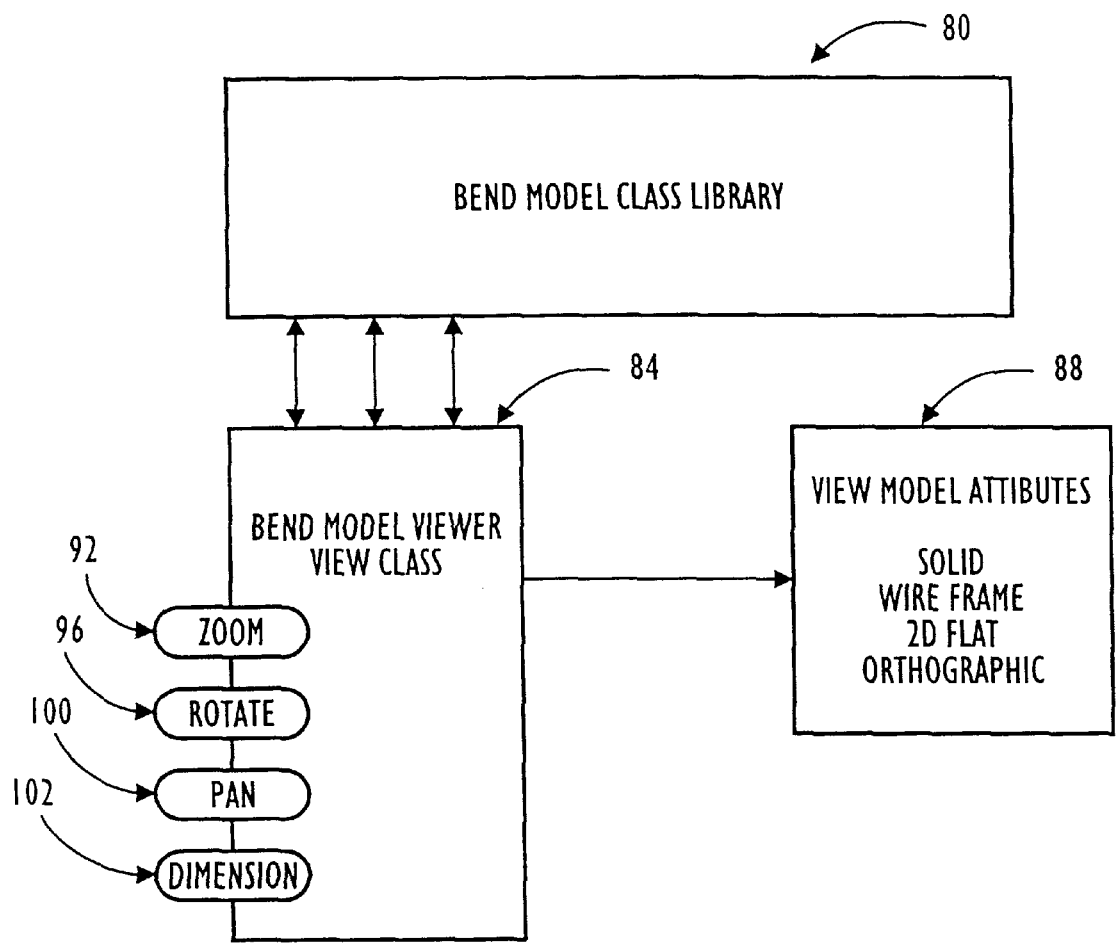
FIG. 18 illustrates a block diagram of the structure of the bend model viewer, in accordance with another aspect of the present invention.

A bend model viewer may be provided to interpret the bend model and display visual images of the part in 2-D and/or 3-D space representation. FIG. 18 illustrates a block diagram of the structure of the bend model viewer and its relation to the bend model, in accordance with another aspect of the present invention. The bend model viewer may be implemented through object oriented programming techniques and may be a Windows based application that permits users at the station modules of the various locations 10, 12, 14 . . . 20 in the facility 38 to display various views of the part based on the information provided in the bend model. The bend model viewer may comprise a set of application library modules that are used to visualize the sheet metal part. Further, the bend model viewer may be designed as a base view class of the Windows application so that it can be used as a base view class for any Windows application. Most of the standard operations to view the 2-D and 3-D models (e.g., zoom 92, rotate 96, pan 100, dimension 102, etc.) may be implemented as member functions of the bend model viewer. Geometric transformations and fundamental computer graphics techniques may be applied to the bend model objects when performing viewing operations. In addition, the bend model viewer may comprise view model attributes 88, that comprise, for example, four major view modes including a solid view, a wire frame view, a 2-D flat view and an orthographic view.

According to an aspect of the invention, the bend model class library 80 may include a set of procedures or functions that act upon sheet metal parts depending upon the selected view (e.g., solid, wire, 2-D flat or orthographic view). The bend model viewer view class 84 may comprise a series of standard operations, such as zoom 92, rotation 96, pan 100 and dimension 102; and, depending upon the state of the bend model viewer, the bend model viewer view class may call functions from the bend model class library 80. As shown in FIG. 18, the various view model attributes or features 88 that may be selected by a user may include a solid view, a wire frame view, a 2-D flat view and an orthographic view. A brief description of these various view modes that may be provided in the present invention is provided below with reference to FIGS. 19–22.

Fundamental computer graphics and geometric modeling techniques, such as geometric transformations and 3-D geometry techniques, may be utilized to implement the various features of the bend model viewer and to provided the different viewing modes and functions. Recent advancements and developments in computer-based 2-D and 3-D modeling and simulation, such as the availability of graphics libraries or packages, may be applied to implement these features of the present invention. In addition, a wide variety of publications and material are available regarding computer graphics and modeling. See, for example, MORTENSON, FOLEY et al., and MANTYLA, each of which is referenced above.

In order to provide the various viewing and modeling features of the present invention, each station module and the server module may be provided with a high resolution desplay screen, such as a SVGA screen with 800×600 resolution. A joystick and game card may also be provided at the station module and server module to permit the user to selectigely modify and view the different 2-D and 3-D representations of the part. Software based graphics packages, such as OpenGL and REnderWare, may be used to provide graphical omputations. Such graphic libraries or packages may be Windows based applications and can be used to render the various viewing modes. Open GL, for example, may be used to render the vaious 2-D wire frame views based on the part geometry and topology data provided in the bend model. Further, Renderware may be utilized to render the vaious 2-D and 3-D solid views of the sheet metal part based on the part data provided in the bend model. For more information on OpenGL, see, for example, the *OPenGL Reference Manual* and the *OpenGL Programming Guide*, Release 1, OPenGL Architecture Review Board, Addison-Wesley Publishing Company, Reading, Mass. (1992). For information on RenderWare, see, for example, the *RenderWare API Reference Manual*, V2.0, Criterion Software Ltd., United Kingdom (1996).

In order to render the vaious views of the part, the bend model may be accessed from the database 30 by, for example, the station module of the operator. The bend model data may then be reformatted in accordance with the data format utilized by the graphics library or package (e.g., OpenGL or RenderWare) that is utilized. Thereafter, the graphics data may be processed in accordance with various programmed routines in order to render the viewing mode (wire, solid, etc.) selected by the operator or perform the viewing function (zoom, pan, etc.) executed by the user.

When a particular view mode is selected by an operator, the selected viewing mode is detected along with the current zoom ratio or factor and orientation of the view. This information is then used to make function calls to the graphics package to update the current display. Function calls to the graphics package may be made in accordance with the viewing mode to be rendered, as well as the zoom or other viewing function to be performed. Based on these function calls, the graphics package provides the necessary data so that the station module may render the view of the part to the operator. Based on the modifications to the 2-D or 3-D representation by the user (e.g., by moving a joystick or a mouse), additional function calls may be made to the graphics library to update the rendered image.

To provide the wire frame views of the part, the line entity data of the part may be provided to the graphics package to perform the necessary graphical computations. With solid views, however, one or more polygons should be derived for each of the faces and provided as input to the graphics package to render the view. Graphics packages such as OpenGL and RenderWare will take as input polygonal data and fill in the areas defined by the polygons to provide a solid image. Polygons may be derived from the face and bendline information in the bend model and by determining the boundaries of each face. Polygons should be created to present and define each face of the part. The faces may then be connected, based on the part topology and other data in the bend model, in order to render the overall sheet metal part. If a face contains an opening or hole, then it will be necessary to define the face with several polygons that do not encompass such openings. For orthographic views, data for each of the individual views (which may be wire frame or solid) may be sent to the graphics package and the resultant views combined on a single display screen, such as that further shown in FIG. 22.

An exemplary code for implementing the various viewing modes and functions of the bend model view is provided in Appendix E. The sample code is written in C++ and includes comments relating to the processes and operations performed therein. The code in combination with an appropriate graphics package (such as OpenGL and RenderWare) may not only be used to render the different views (e.g., 2-D and 3-D wire frame or solid), but also provide the functionality of each of the viewing functions (e.g., zoom, rotate, pan, etc.). A brief description of the various viewing mode display screens that may be rendered is provided below.

Figure 19:
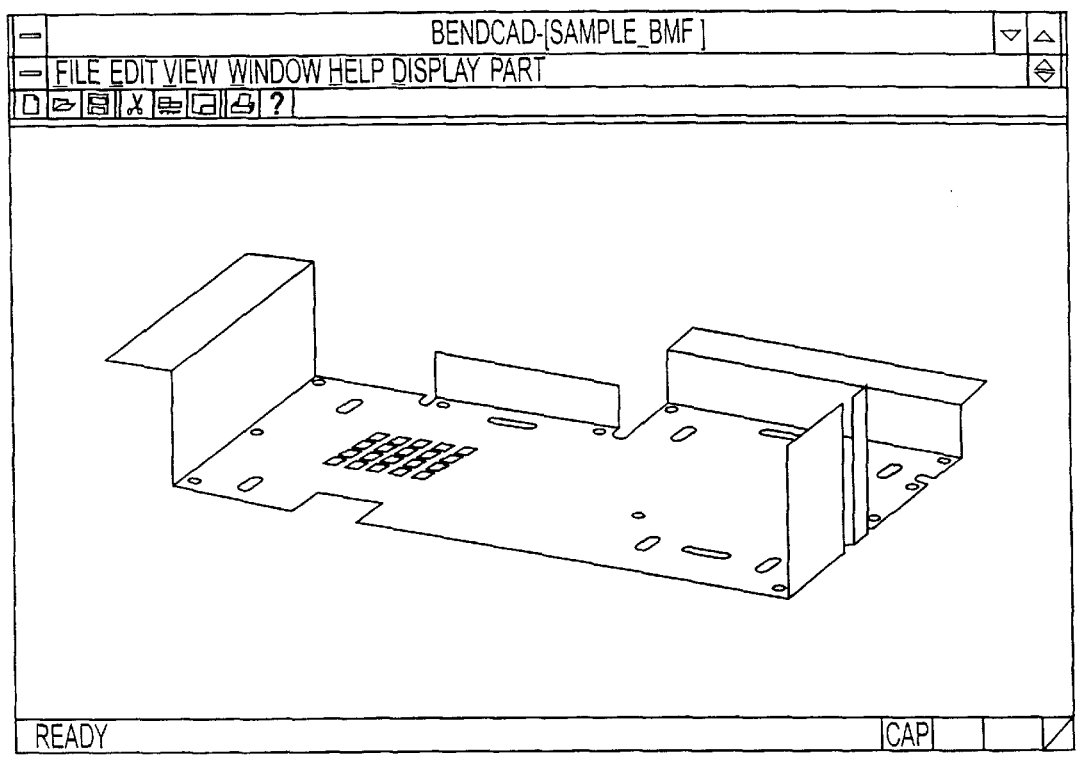
FIG. 19 illustrates an exemplary solid view window display that may be provided as output to a display screen.

The solid view mode displays a solid rendered 3-D view of the part defined by the bend model. FIG. 19 illustrates an exemplary solid view window that may be provided as output to a display screen provided at any of the locations 10, 12, 14 . . . 20 within the sheet: metal facility 38. In the solid view mode, the user or operator may be provided with a plurality of viewing functions for manipulating 3-D space navigation and 3-D automatic dimensioning. The basic functions that may be provided for altering the solid view of the part may include rotation, zooming, panning, and/or standard view selections. The standard views that may be provided and selected by the user may include the following: isometric, top, bottom, front, back, left and right. An automatic or manual dimension operation may also be provided to display the critical dimensions of the part based on the current viewing angle. An exemplary embodiment of the dimension feature of the present invention is provided below with reference to FIGS. 23–27.

As shown in FIG. 19, the solid view window may be a Windows based application; and, thus, multiple windows or sectional views of the part may be provided. The multiple view windows may include a worm view that provides a very close-up isolated view within a window, and a bird's eye view which provides a very far away view of the part in an isolated window. The sectional view may provide a partial view of the object as selected by the user. In order to control the various viewing functions, a joystick interface may be provided at the server module 32 and the station modules of each of the locations 10, 12, 14 . . . 20. Operation of the joystick alone and/or in combination with operation of certain keys on the keyboard (e.g., a shift key or control key) may be performed by the user in order to carry out the various functions such as rotating, panning and zooming. In addition, -the displayed texture of the solid view of the part may be selected in order to simulate the material specified for the part in the database. For this purpose, a material texture library may be provided that comprises a library of material textures, such as steel, stainless steel, aluminum, etc. The stored material texture library may be accessed and applied by an operator when a solid view is present, so that the surface of the displayed part will more closely simulate the actual texture of the sheet metal part.

Figure 20:
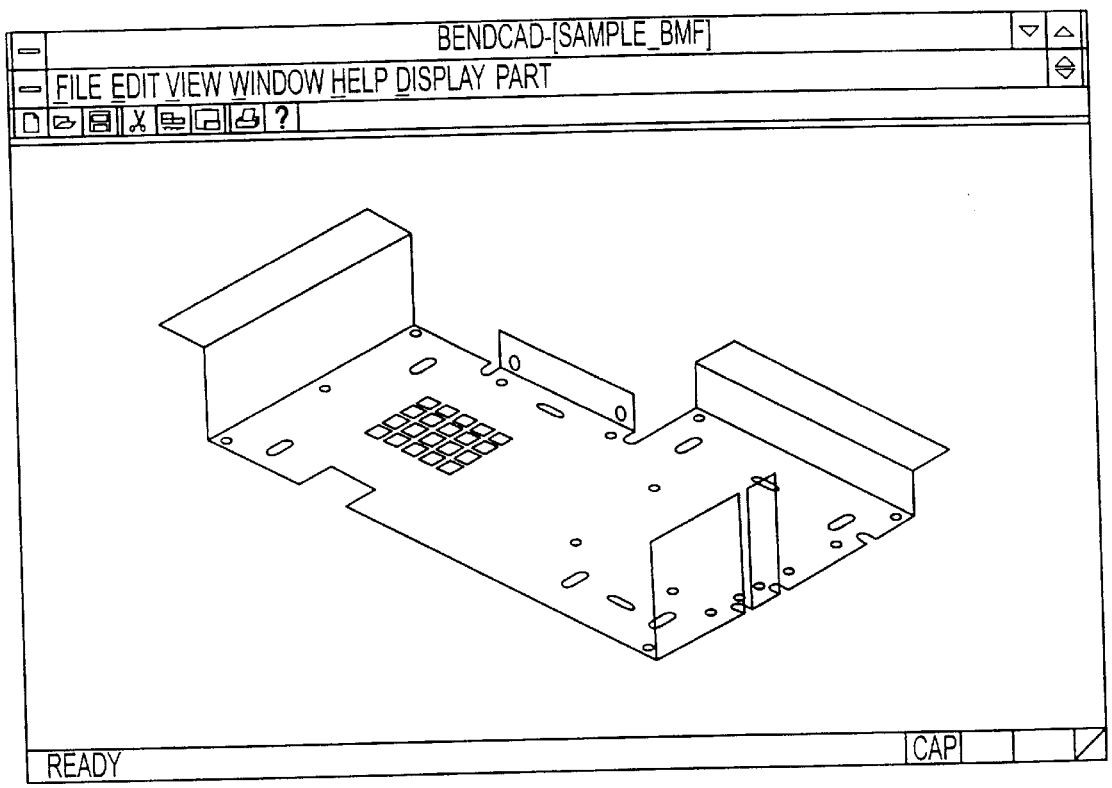
FIG. 20 illustrates an exemplary wire frame view window display that may be provided as output to a display screen.
Figure 21:
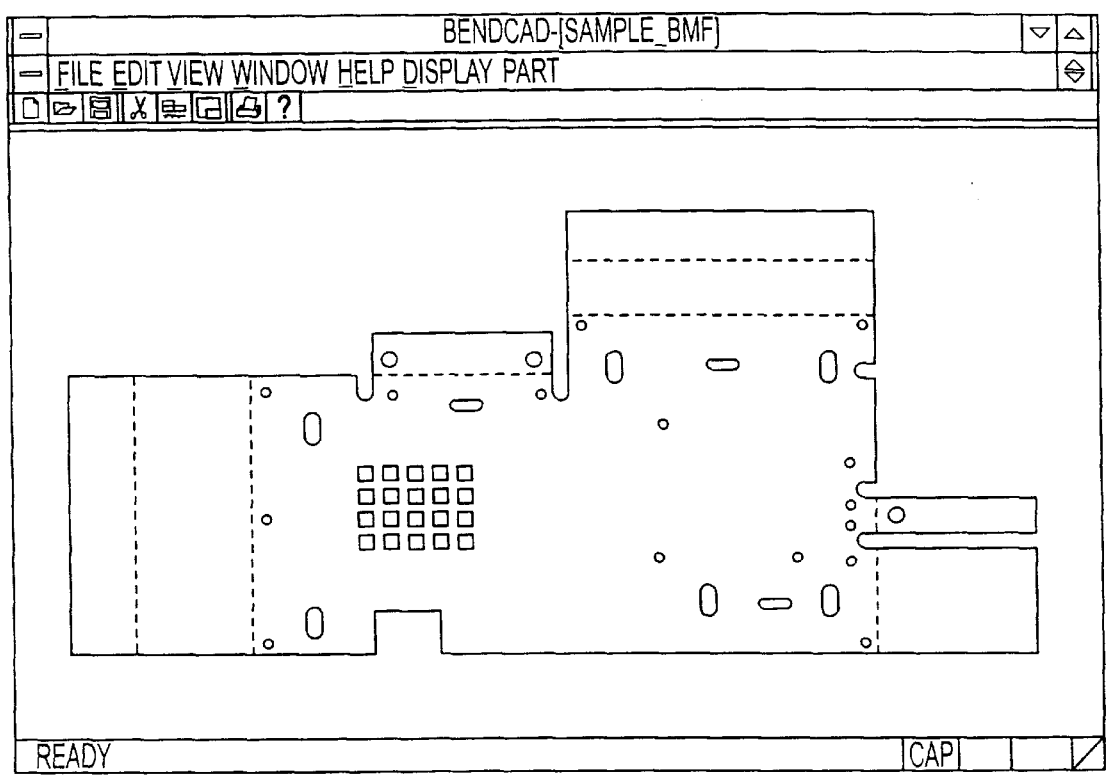
FIG. 21 illustrates a 2-D flat screen image window display that may be provided as output to a display screen.

The wire frame view mode may provide a Windows based display of a wire frame view of the sheet metal part. An example of a wire frame window is shown in FIG. 20. The key functions for providing 3-D space navigation and 3-D dimensioning in the wire frame view may be similar to that described above with respect to the solid view. For example, such functions as rotation, zooming, panning, and standard view selection may be provided. Automatic dimensioning, multiple view windows and sectional view options may also be provided in the wire frame view mode. In addition, a joystick and/or keyboard interface may be provided to permit the user to select and activate the various viewing functions.

The 2-D flat view mode may display an unfolded, 2-D flat view of the part in wire frame representation. An example of a 2-D flat view window is provided in FIG. 21. The 2-D flat view mode may comprise a plurality of viewing functions to permit a user to change or alter the view in the window. For example, zooming and panning functions may be provided to permit a user to selectively zoom and pan the 2-D flat wire frame view. In addition, dimensioning and multiple windows viewing functions may be provided in a similar manner to that described above with respect to the solid view mode. A joystick and/or keyboard interface may be provided to permit the user to pan, zoom and control other viewing functions. Any special forming or shapes that are provided in the part may be displayed as a form or shape on the outermost boundary of the formed area with a special forming indicator or description.

Figure 22:
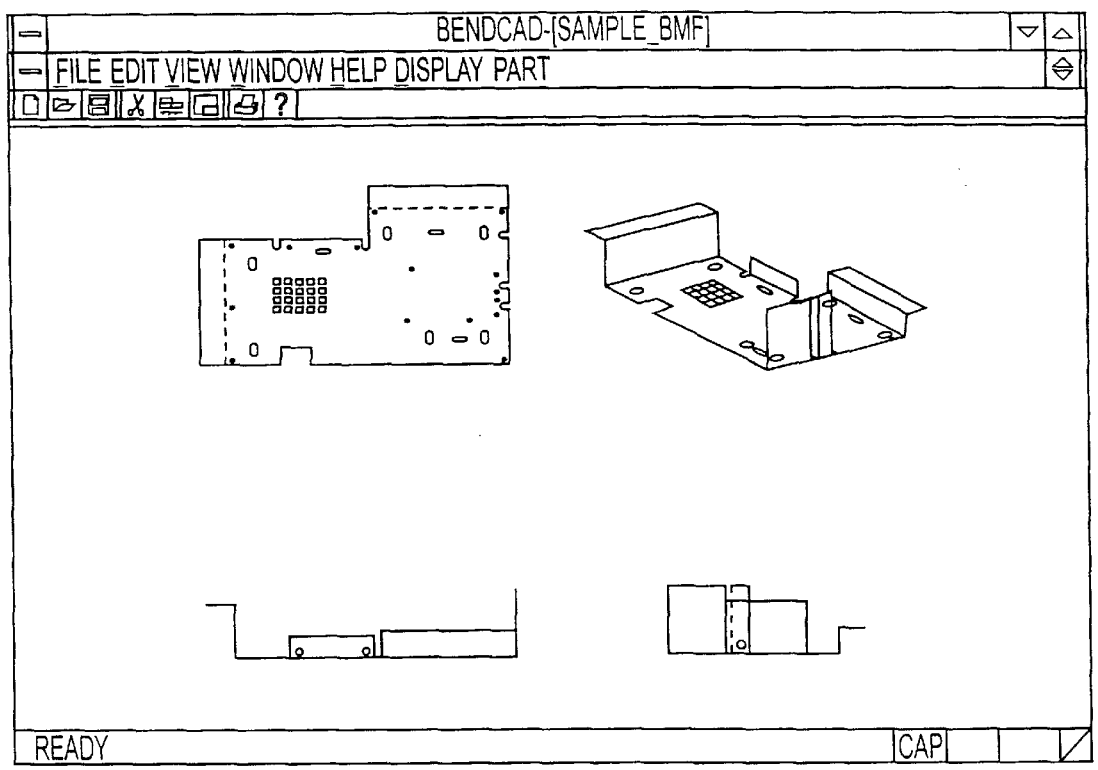
FIG. 22 illustrates an orthographic view screen image that may be provided as output to a display screen.

An orthographic view window, such as that illustrated in FIG. 22, may also be provided as part of the bend model viewer. The orthographic view mode may display the top, front, right and isometric views of the part in wire form representation. A hidden line option may be provided to occlude blocked lines based on the viewing angle. The hidden line option may be utilized to simplify each view window. Various view functions may also be provided in the orthographic view mode to permit the user to selectively manipulate and change the present view in the window. For example, zooming and panning functions may be provided, as well as dimensioning and multiple windows viewing functions. As described above, a multiple windows viewing feature may be provided to permit the user to selectively display a worm view and/or a bird's eye view of the orthographic views in multiple windows. A joystick and/or keyboard interface may be provided at each of the locations to permit the user to selectively activate and manipulate each of the viewing functions in the orthographic view mode.

In addition to rendering each of the various view displays noted above, the bend model viewer view class may be implemented with other features. For example, the bend model viewer may include and maintain a selection set to indicate those items or entities in the current view that are selected or highlighted by the operator. In accordance with an aspect of the present invention, an operator may be permitted to select faces, bendlines and other features of the rendered part in order to modify the data relating to the selected items or to perform certain operations of those items of the part. For instance, an operator may be permitted to select a face of the displayed part and change the dimensional data of the face along its width or length. The operator could also be permitted to modify the various bend data associated with each bendline, such as the bend angle or V-width.

The bend model viewer may maintain a list of entities or items (e.g., faces, bendlines, edges of a face or bendline, etc.) that are selected by the user. The viewer may update the list so that the current items that are currently selected by the operator are always maintained in the selection list. Other portions of the software in the invention may call the view class for the current list of selected entities when performing or executing different routines (e.g., manual dimensioning, etc.).

In addition, the bend model viewer may also provide a visibility function, which provides visibility information and coordinate information based on the current rendered view. As discussed more fully below, the visibility function may provide information as to whether a particular portion or entity of the part is currently visible on the screen and may also provide coordinate information as to where a screen entity is presently located. The visibility function of the bend model viewer may be called by a dimensioning feature of the invention in order to determine what portions of the part are currently visible on the screen, so that only dimensional information of the portions of the part that are visible on the screen are displayed to the viewer. A more detailed discussion of the dimensioning and visibility functions of the invention is provided below. In addition, an exemplary code for implementing the visibility function of the bend model viewer is provided in Appendix J attached hereto.

Referring now to FIGS. 23–27, an example of a dimensioning feature will be described in accordance with an aspect of the present invention. As described above, each of the viewing modes may include a dimensioning function which will automatically display the dimensions of the part based on the current viewing angle. An automatic dimensioning function may be provided so that the dimension of flanges or bend lines which cannot be seen at the current viewing angle will not be displayed to the user. When the automatic dimension function or mode is activated, only the viewable dimensions of the part will be displayed based upon the current viewing angle. Further, in the automatic dimensioning mode, only predetermined dimensions (i.e., those dimensions which are important to the bending operation) may be displayed based on the state of the current viewing angle. A manual dimension mode may also be provided, to permit a user to selectively indicate which dimension items are to be displayed. In the manual dimensioning mode, only those dimension items that have been selected by the user will be displayed based on the current viewing angle of the part. In both dimension modes, the displayed dimension items may be erased or removed from the window display when the part is being zoomed or panned.

Figure 23:
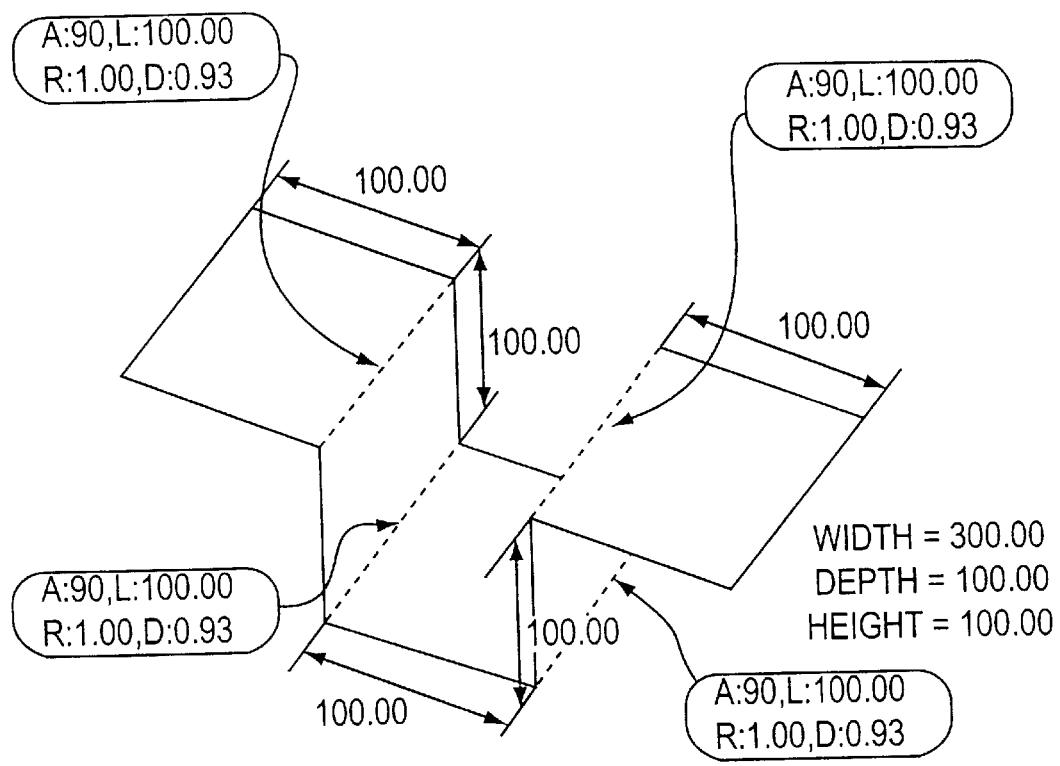
FIG. 23 illustrates an example of the various dimension items that may be displayed in an automatic dimension mode of the present invention.
Figure 24A:
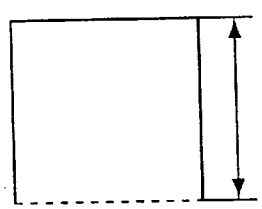
FIGS. 24A, 24B and 24C illustrate a manner in which the flange length may be defined for various different parts, according to an aspect of the invention.
Figure 24B:
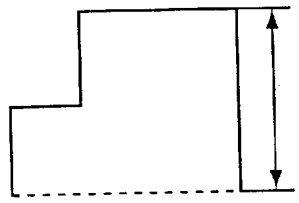
Figure 24C:
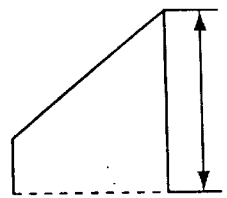
Figure 25A:
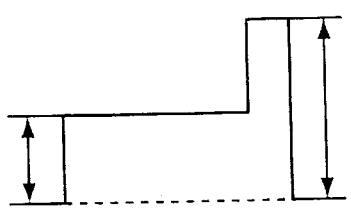
FIGS. 25A and 25B illustrate, in accordance with another aspect of the present invention, adding an auxiliary flange length for two different types of parts.
Figure 25B:
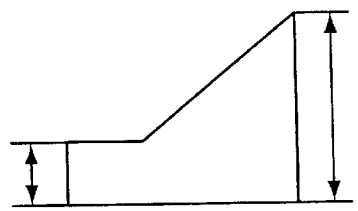

FIG. 23 illustrates an example of the various dimension items that may be displayed in an automatic dimension mode. The dimension items that are displayed in the automatic dimension mode consist of those items that are important to the bending operation (e.g., flange length, bend line length, bend angle, etc.) and not extraneous dimension items, such as the dimension of a punched hole or opening. The displayed dimension items may include, for example, the width, depth and height of the sheet metal part, as well as the flange lengths. In addition, the bend line length (L), the bend angle (A), the inside radius (R) and the bend deduction (D) of each bend line may be displayed either alone or together in a window or group information box. As noted above, only the visible dimension items will be displayed based on the current viewing angle. Further, all dimensions may be erased or removed from the display when the operator is rotating, zooming or panning to change the viewing angle of the part, and the dimensions may be redisplayed after each operation has been completed. The size and orientation of the display information (including any text and reference arrows) may always be sized relative to the screen size and not to the current zooming ratio or viewing angle. However, in order to improve the readability of the dimension information, the color, style, weight and/or font of the dimension information may be configurable to permit the user to alter the same. As a result, an operator or designer may highlight critical dimensions in a part by selecting a particular color, font size, etc. of the dimension information. For example, the color, size or font of dimension text, or the color, line weight, or style of a dimension reference, line or arrow may be highlighted or selectively altered to indicate critical dimensions within the part. An operator may also be permitted to color, fill or style the window information boxes, or to color particular bend lines to also highlight other critical dimensions within the part.

Various processes and operations may be utilized for implementing the dimensioning feature of the present invention. Further, as noted above, the bend model viewer may be provided with a visibility function that may provide visibility information to the dimensioning feature of the invention. Theses functions and features may be implemented by software at, for example, server module 32 and/or each of the station modules located throughout the factory. Exemplary code is provided in Appendices F-I to implement the automatic dimensioning feature of the invention. In addition, sample code for the visibility function of bend model viewer is provided in Appendix J. The code in these appendices are written in C++ programming language and include comments to facilitate an understanding of the logic flow of the processes and operations performed therein.

The logic flow of the dimensioning feature of the invention may be generally categorized into three phases. During the first phase, the bend model geometry and topology data for the part is accessed from the database 30 and is used to compute all dimensions of the part, as well as all possible ways that the dimensions can be displayed. For each bendline and face of the part, all of the extreme points at which data can be displayed is computed, and all ways in which the dimension lines and arrows can be displayed are computed with respect to these points. Certain heuristics may be applied when determining where the dimension data and other information may be displayed. For example, as a general rule, it may be determined that all information may only be displayed on the outside of the part. A heuristic such as this may be applied in order to provide a more meaningful and less crowded display of information to the viewer.

The first phase described above may be executed whenever the dimensioning feature of the invention is activated by an operator. Alternatively, the computations of the first phase may only be done once when the part is initially viewed by the user. In such a case, the computed data may be stored in memory for subsequent use and modified when the dimensions or other geometry data of the part is modified or changed by the user. In addition, all of the computations of the first phase may be performed relative to the geometry of the part and not the view screen, so that the data can be reused every time regardless of the current view or if the view is changed.

A second phase of the automatic dimensioning feature of the invention may be performed whenever the view of the part is updated. The main objective of the second phase is to filter the data developed during the first phase based on what entities of the part are visible in the changed view. During the second phase, all data that is not visible in the current view is filtered out so that only the data computed in the first phase that is presently visible remains. A function call to the bend model viewer may be performed in order to determine what points or portions of the part are presently visible. As noted above, the bend model viewer may include a visibility function that maintains and provides information on the visible portions of the part based on the present view that is displayed. Based on the orientation of the part, the bend model viewer may determine which faces and bendlines of the part (as well as what edges or portions of such faces and bendlines) are visible and which are hidden on the screen.

As noted above, sample code for implementing the visibility function of the bend model viewer is provided in Appendix J. In order to determine what points or portions of the part are visible, the bend model viewer may determine and maintain the current view orientation of the part and the current zoom aspect or ratio of the rendered part. The bend model viewer may use conventional perspective projection techniques (see, e.g., Chapter 12 of MORTENSON) to determine and maintain the current view orientation. When determining the visibility of any point on the part, the visibility function may first get the world coordinates (i.e., the coordinates in which the part is represented) of the point. Then, the screen coordinates (i.e., the pixel location on the screen) corresponding to the world coordinates are determined for that point based on the current view orientation and zoom aspect or ratio. Thereafter, based on the screen coordinates it is determined whether any entity or portion of the part is in front of the point of interest from the perspective of the screen viewpoint. The hidden nature of a point on the part may be determined based on whether some other entity or portion of the part is assigned the same screen point as the point of interest. A function call to a graphics package or library (such as OpenGl or RenderWare) may be made to determine whether more than one point of the part is assigned to the same screen point. If something is assigned to the same screen point, then it may be determined if the point of the part is behind it based on the respective Z-buffer depths of the points. The Z-buffer depth is used by graphics packages, such as OpenGL and RenderWare, to define the distance to each point from the viewpoint or camera position. The Z-depth may be determined by making a function call to the graphics package with the points of the part that are in interest.

The above-described processed of the visibility function of the bend model viewer may be executed whenever there is prompt to the bend model viewer from the auto-dimensioning feature of the invention. Such processes may, thus, be performed whenever the current view of the rendered part is modified or altered by the operator. As discussed above, the bend model viewer may maintain and update the status of the current view orientation and zoom ratio whenever there is a change made to the orientation of displayed image so as to accurately provide visibility information when required.

After determining which data is visible, the auto-dimensioning function may determine (e.g., based on the computations from the first phase) every possible way and locations that the dimension data and other information may be displayed. A set of heuristics may be applied to select the best way to display the data from the available ways that the data may be displayed. For example, a first heuristic may require that the area of the screen that is closer to the viewpoint of the viewer is preferred. A second heuristic may define that the data is to be displayed in an area that is closer to the area where the distance between the possible points defining the dimension is smallest. Other heuristics may also be applied based on the relative position of other dimension data and other information to prevent overlapping and crowding on the screen.

After determining the visible portions of the part and the best areas to display the information for the visible areas, a third phase of the auto-dimensioning function may be executed to draw the various information on the display screen. For example, based on the selection of areas to display the information, the dimension information may be displayed on the screen for each of the visible dimensions of the part. Further, based on which bendlines are visible, bendline information may also be displayed in information boxes (such as that shown in FIG. 23) in areas of the screen that do not overlap with other part information. The part dimensions, including the width, height and depth of the part, may also be displayed on the screen at a predetermined location (e.g., to the lower right of the part) or a location that is closest to that part and that will not overlap or block other information.

FIGS. 24–27 illustrate the various methods and definitions that may be used when displaying the dimension items in the dimensioning mode. In particular, FIGS. 24A, 24B and 24C illustrate the manner in which the flange length may be defined for various different parts. In accordance with an aspect of the present invention, the flange length may be defined as the farthest point on the flange from each bend line. If the farthest point of the flange does not exist on the longest edge of the flange which is parallel to the bend line, then the dimension of the longest flange may be added and displayed in the dimensioning mode. By way of non-limiting examples, FIGS. 25A and 25B illustrate adding an auxiliary flange length for two different types of parts.

When the thickness of a part is displayed, the flange length may be displayed as an outside to outside dimension.

Figure 26A:
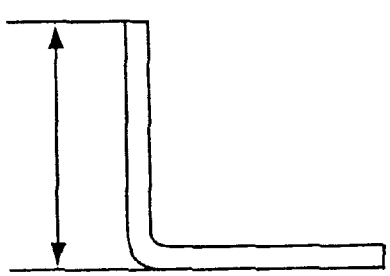
FIGS. 26A, 26B and 26C illustrate a manner in which the flange length may be indicated for various parts that are displayed with thickness, in accordance with yet another aspect of the invention.
Figure 26B:
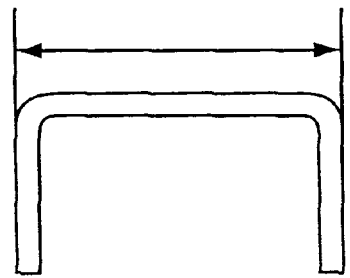
Figure 26C:
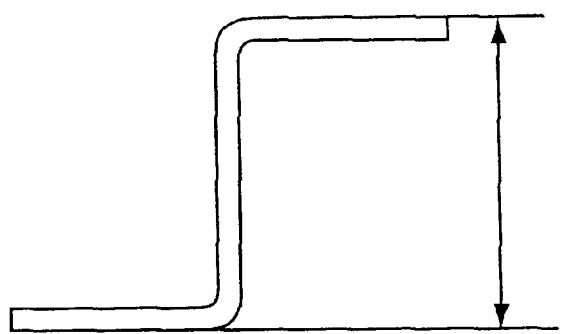
Figure 27A:
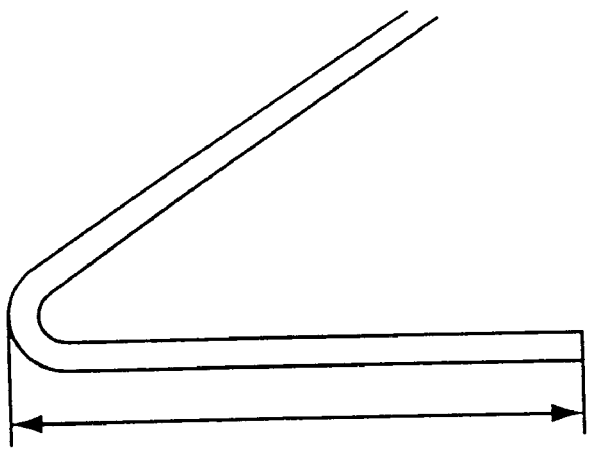
FIGS. 27A and 27B illustrate manners in which the flange length of parts with acute bend angles may displayed, in accordance with a tangent dimension method and an intersection dimension method of the invention.
Figure 27B:
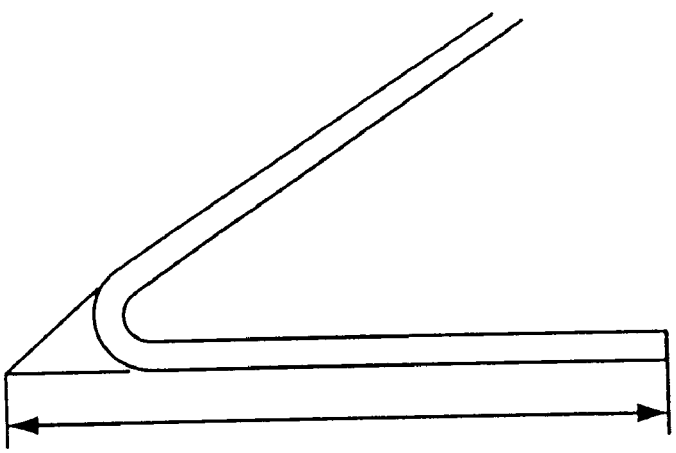

For example, FIGS. 26A, 26B and 26C illustrate the manner in which the flange length may be indicated for various parts that are displayed with thickness. In addition, for parts with an acute angle bend, the flange length may be indicated in a variety of ways. For example, as shown in FIG. 27A, the flange length may be displayed based on a tangent dimension definition, in which the flange length is measured from a tangent line extending from the acute angle bend. Alternatively, an intersection dimension method may be used, such as that shown in FIG. 27B to indicate the flange length based on a point defined by the intersection of two lines extending from both sides of the acute bend angle. An operator may be permitted to choose between the tangent dimension or intersection dimension method for displaying the flange length, and/or a particular dimension method (e.g., the tangent dimension method) may be provided as a default setting.

In order to facilitate the development of the bending code sequence, a graphical user interface with various display functions may be provided to aid the development of the bending plan by the operator. FIGS. 28–32 illustrate the various processes and operations that may be performed to develop the bending code sequence through the use of a graphical user interface, in accordance with another aspect of the present invention.

Normally, the initial bend model data and other job information will be developed by a design programmer through entering the critical geometric and manufacturing data at server module 32. The resultant bend model file may then be stored in database 30. Before the sheet metal part may be produced, it will be necessary for a bending operator to develop a bending sequence for carrying out the required bending operations. The bending operator must also decide what type of tooling is required and define the tooling set-up for the bending machinery. This process of developing a bending plan may be aided and made more efficient by use of a graphical user interface and the various teachings of the present invention.

In order to develop the bending plan, a bending operator at, for example, bending station 18, may access and download the bend model and other job information from database 30. The bend model for the relevant part may be loaded or imported to the station module on the shop floor at bending station 18 via the communications network 26. This step is generally shown at step S.220 in FIG. 28. Thereafter, at step S.224, the bending operator may examine the shape and dimensions of the part by using the bend model viewer. At this point, the bend operator may selectively zoom and pan the various 2-D and 3-D views of the part at a display screen located at the bending station. By activating the automatic dimension feature of the present invention, the bending operator may also view the important bending dimensions for the part for carrying out the bending operations.

Once the operator understands the shape and dimensions of the part, the bending operator may begin to develop the bending plan by selecting and displaying a bend sequence input window, at step S.228. The bend sequence input window may provide a graphical user interface to assist a bending operator to create, modify and delete a bend sequence, and may also enable the operator to specify and enter various manufacturing parameters (e.g., backgauge location, tooling, NC data, etc.) for each step in the bend sequence. The bend sequence input window may contain a 2-D flat view image of the part displayed on a portion of the screen (e.g., at the center of the screen or towards the left hand side of the screen). The 2-D flat view image may include the various features of the unfolded part, including the flanges, holes and openings of the part. As the bending operator selects and indicates the bendlines and the bending sequence for each bendline, a solid 2-D or 3-D image of the intermediate part shape at each bending step may appear and be provided on a portion of the screen, such as on the right hand side of the screen, as shown for example in FIG. 29A. The images of the intermediate part shapes may be displayed in a sequence corresponding to the entered bend sequence, and may be simultaneously displayed on the screen with the 2-D flat view image of the part (such as in the example of FIG. 29A) or separately displayed on a different screen display.

Figure 29A:
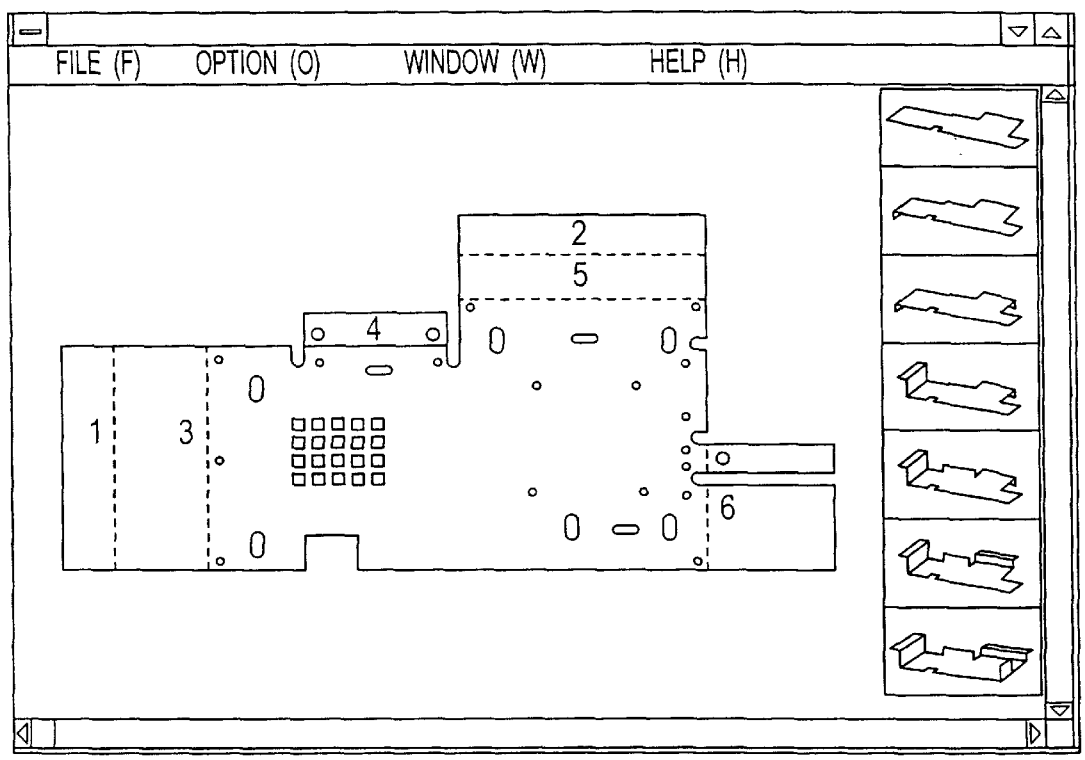
FIG. 29A illustrates an example of a bend sequence input screen image that may be displayed to a bending operator for developing a bending sequence.
Figure 29B:
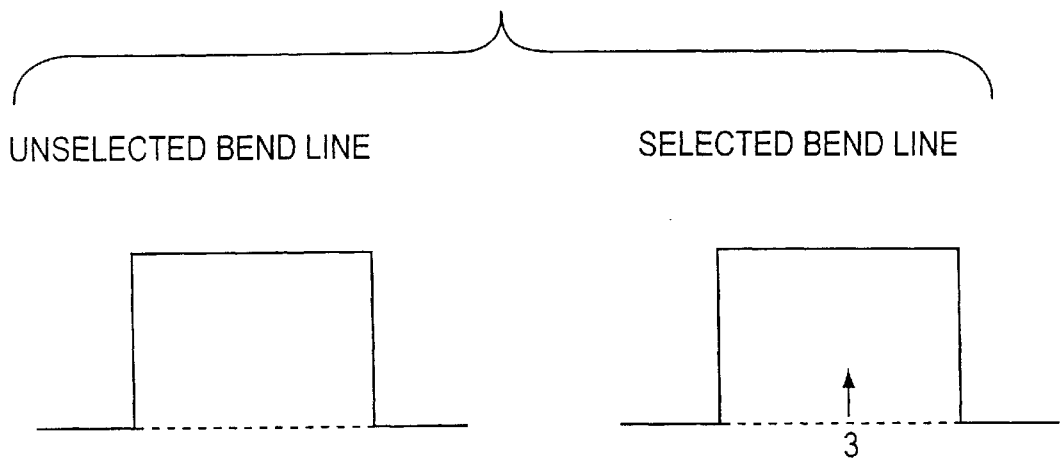
FIGS. 29B and 29C illustrates examples of selection a bend sequence and modifying the insertion direction, in accordance with another aspect of the present invention.
Figure 29C:
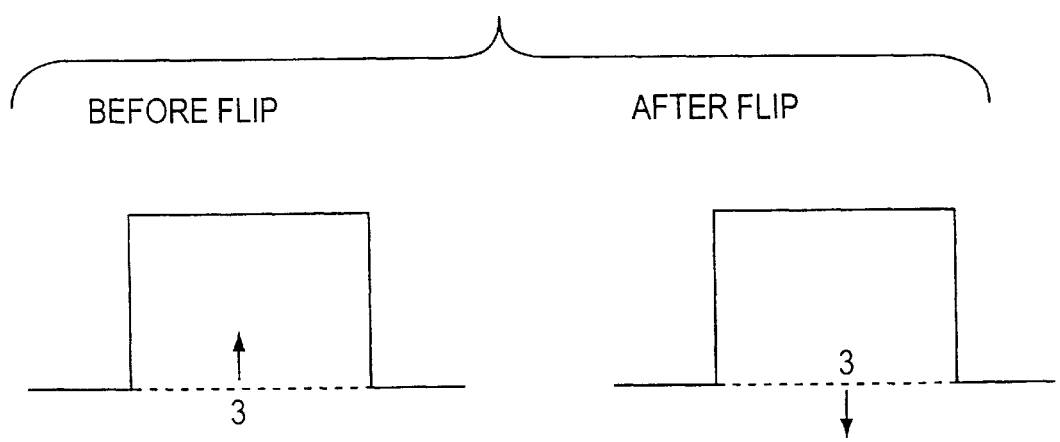
Figure 29D:
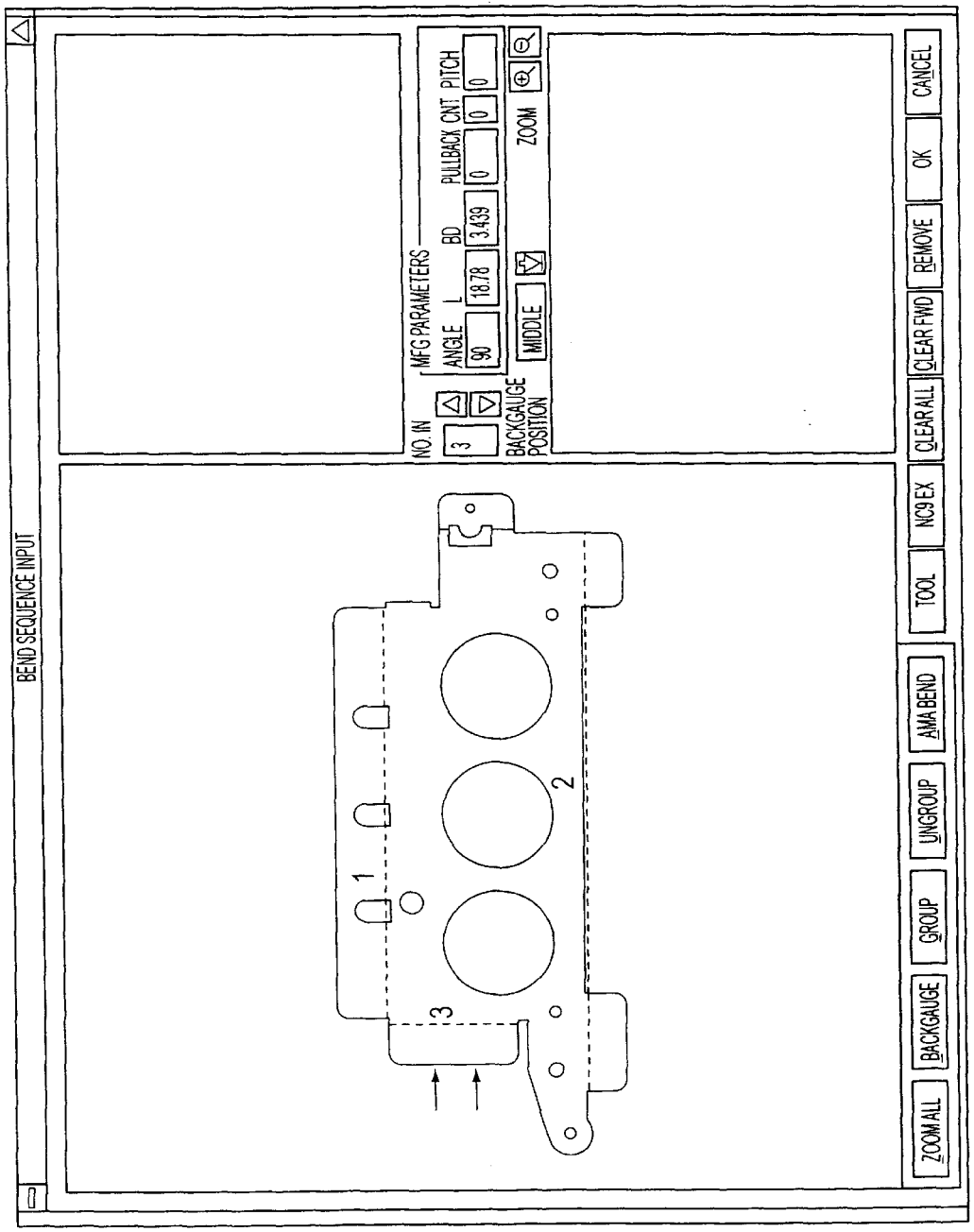
FIGS. 29D and 29E illustrate further examples of a bend sequence input screen image and a related screen display.
Figure 29E:
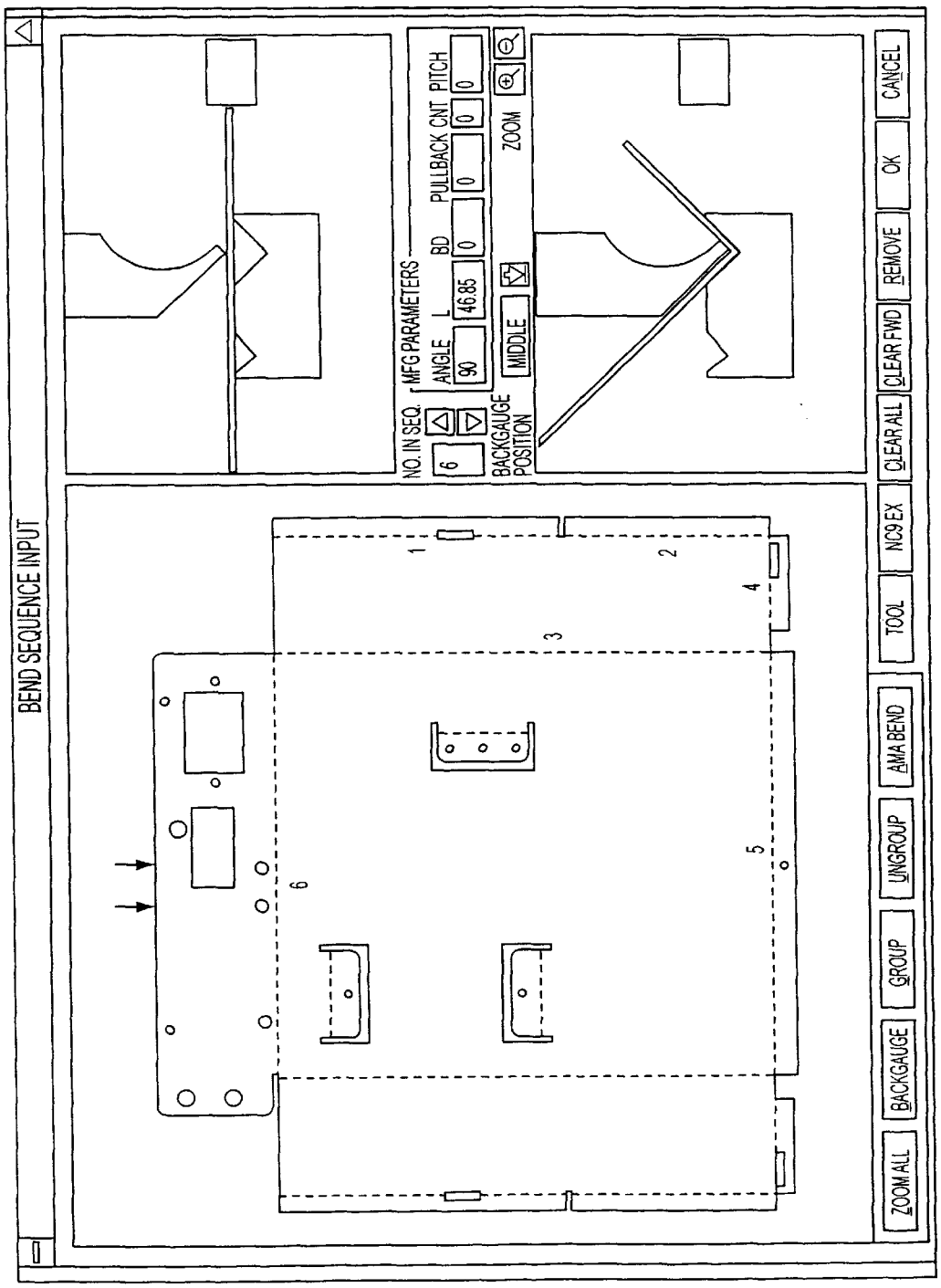

Further, as each bendline is selected, the bendline may be highlighted and a bend sequence number and an insert direction (e.g., represented by an arrow) may be displayed on or near the bendline, as shown for example in FIG. 29B. The bend sequence number for each bendline may be set automatically based on the sequence in which it has been selected, or the bend sequence number may be entered manually by an operator after each bendline has been selected. Other manufacturing information relating to the bendline, such as the bend angle, bendline length and backgauge position, may also be entered and/or displayed on the screen when each bendline is selected or highlighted, as shown for example in FIG. 29D and 29E. As shown in FIGS. 29D and 29E, dialog or information boxes may be displayed on the screen to permit a bending operator to select, enter or modify the manufacturing information and other parameters related to each bendline. The dialog or information box may also permit a bending operator to highlight or select a bendline, and hot function keys or fast switching keys may be displayed in the bend sequence input window to permit the bending operator to select or enter tooling and view and modify NC data. For example, a bending operator may select a Tool function key to switch from the bend sequence input window to a tool input display screen or display screens to enter tooling information. An NC function control key (e.g., NC9 Ex) may also be provided to permit an operator to view and/or modify NC data related to the bending operations to be performed.

Further, as shown in FIGS. 29D and 29E, other function keys and controls may also be provided related to defining and/or modifying the bendlines and the related manufacturing information. For example, a Zoom All key may be provided to zoom in and zoom out of the 2-D flat view image; a Backgauge key may be provided to select or set a position for the backgauge; a Group and Ungroup control key may be displayed to permit and control the bendlines that are to be bent together; and a control key (e.g., Ama Bend) may be provided to define special bend operations. Other functions keys may also be displayed to permit the bending operator to select, modify and/or delete the bend sequence (e.g., Remove, Clear Fwd, Clear All, OK, Cancel). With the bend sequence input window, the bending operator is able to efficiently view and modify the bend sequence and the various manufacturing information.

In addition, according to another aspect of the invention, cross-sectional views of the part and/or a bending simulation of the part may be displayed on the screen for each bending step in the bend sequence (see, e.g., FIG. 29E). The cross-sectional views and bend simulations may be selectively displayed on the screen or displayed as each bending line is selected by a bending operator. The cross-sectional views and bend simulations may include representations of, for example, the upper and lower bending tools (e.g., punch and die) and/or a backgauge position or setting, and may be displayed simultaneously on the screen with the 2-D flat view image of the part or displayed separately on a different screen display. The backgauge position may be determined automatically based on the topology of the part or may be set or modified by the operator. If the tooling information for the bendline has not been entered or set by the bending operator, the cross-sectional view and/or bend simulation may not be displayed on the screen, or only the representations of the intermediate part shape and a calculated or defined backgauge position may be displayed. The bend simulations may comprise a displayed simulation of any required flipping of the part, the handling and orientation of the part, and/or the bending of the part that is performed at each bendline. It is also possible to simultaneously display, on the display screen with the 2-D flat view image of the part, a cross-sectional view of the part before the bending step and a cross-sectional view of the part after the bending step has been formed (see, for example, FIG. 29E). These cross-sectional views may be provided on the right hand side of the screen and may include representations of the upper and lower bending tools and the backgauge for each bending step in the bend sequence. In addition, zoom control or function keys (ZoomIn and ZoomOut) may also be displayed to permit an operator to control the zoom ratio or aspect related to the before-bend and after-bend cross-sectional views. Techniques and processes similar to that disclosed in Japanese Examined Patent Application No. HEI 7-121418 (published on Dec. 25, 1995 in the names of NIWA et al.) and Japanese Unexamined Patent Application No. HEI 1-309728 (published on Dec. 14, 1989 in the names of NAGASAWA et al.), the disclosures of which are expressly incorporated herein by reference in their entireties, may be utilized to display the cross-sectional views and bend simulations of the part.

In accordance with an aspect of the invention, software or programmed logic may also be provided to automatically determine the insertion direction for the bend by calculating the shorter or smaller side of the part relative to the selected bendline. Based on a feature of the invention, each bendline may be used to divide the part into two sides. The insert direction may be determined for each bendline based on the side of the part that has a smaller or shorter length (e.g., the dimension of the side that is perpendicular to the bendline) or based on the side that has a smaller overall area. If an operator is not satisfied with the insertion direction that was selected, the operator may flip the insertion direction, as illustrated in FIG. 29C. The operator may change or flip the insertion direction by, for example, clicking a select button of the mouse or keypad when the bendline is highlighted. The insertion direction information may include an arrow and/or text to indicate the insertion direction of the flange defined by the bendline for bending the part with a bending apparatus or machinery. The insertion direction information may be displayed at or near the bendline (see, for example, FIGS. 29B and 29C) or at or near the end of related flange (see, for example, FIG. 29D). In addition, the insertion direction information may be displayed when each bendline is selected, or may be selectively displayed based on input received from a joystick device, mouse device or keyboard device.

Figure 30:
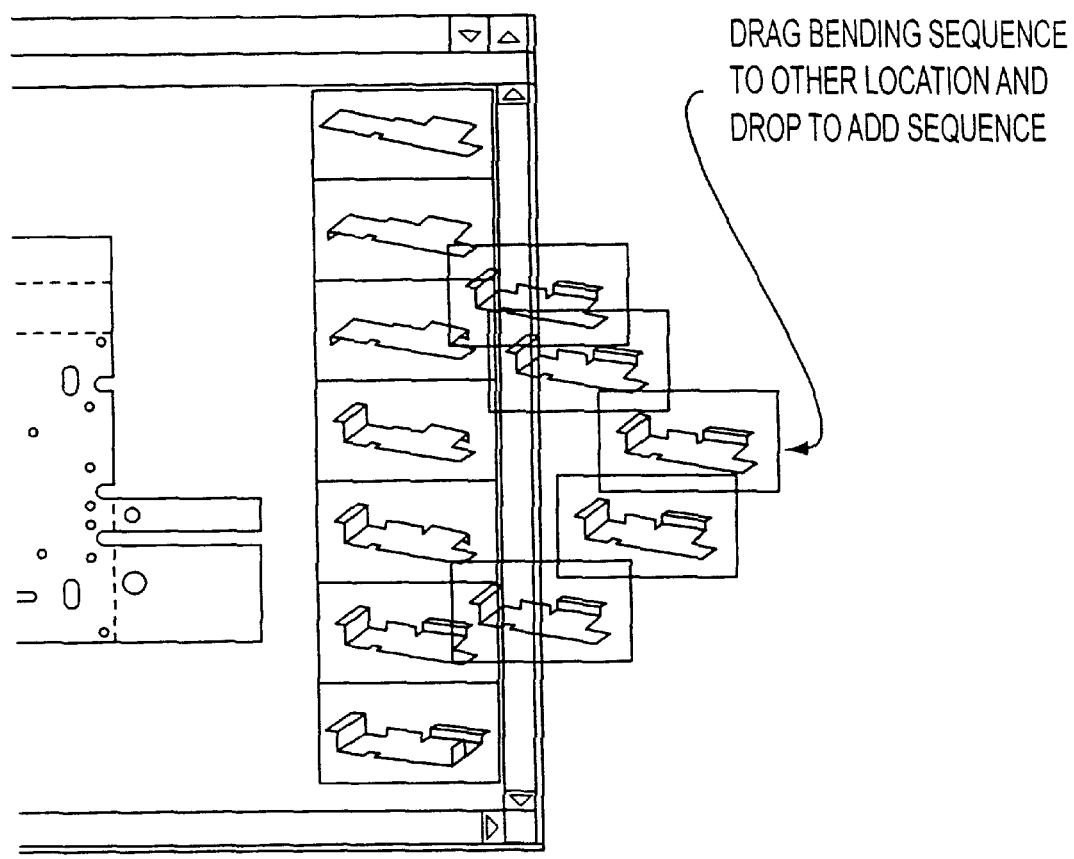
FIG. 30 illustrates, in accordance with an aspect of the present invention, a drag and drop editing feature that may be provided to facilitate a bending operator in modifying and editing a proposed bend sequence.

Thus, through the use of a graphical user interface, the bending operator can see the various intermediate shapes and the forming of the final part based on the selected bend sequence entered by the operator. Once again, the operator may enter and select data on the screen through an appropriate input device, such as a joystick interface, a mouse interface and/or a keyboard interface. If the bend operator is not satisfied with the proposed bend sequence, the bend operator may edit the bend sequence before finalizing the bending plan, as generally shown at step S.232. The editing of the bend sequence may be carried out in a variety of ways and methods. In particular, in accordance with an aspect of the present invention, a drag and drop editing feature may be provided to facilitate the bending operator in modifying and editing the bend sequence. As shown in FIG. 30, the operator may edit a selected bend sequence by simply grabbing one of the intermediate part shaped icons or displays provided on the left or right hand side of the screen and dropping it to its desired location in the sequence. Thereafter, based on the bend operator's modification to the bend sequence, the various intermediate part shapes illustrated on the screen will be modified to indicate the intermediate bend stages in accordance with the revised bend sequence. In addition, the bend sequence numbers on the 2-D flat view image may be revised based on the bend operator's drag and drop editing of the bend sequence.

Figure 31:
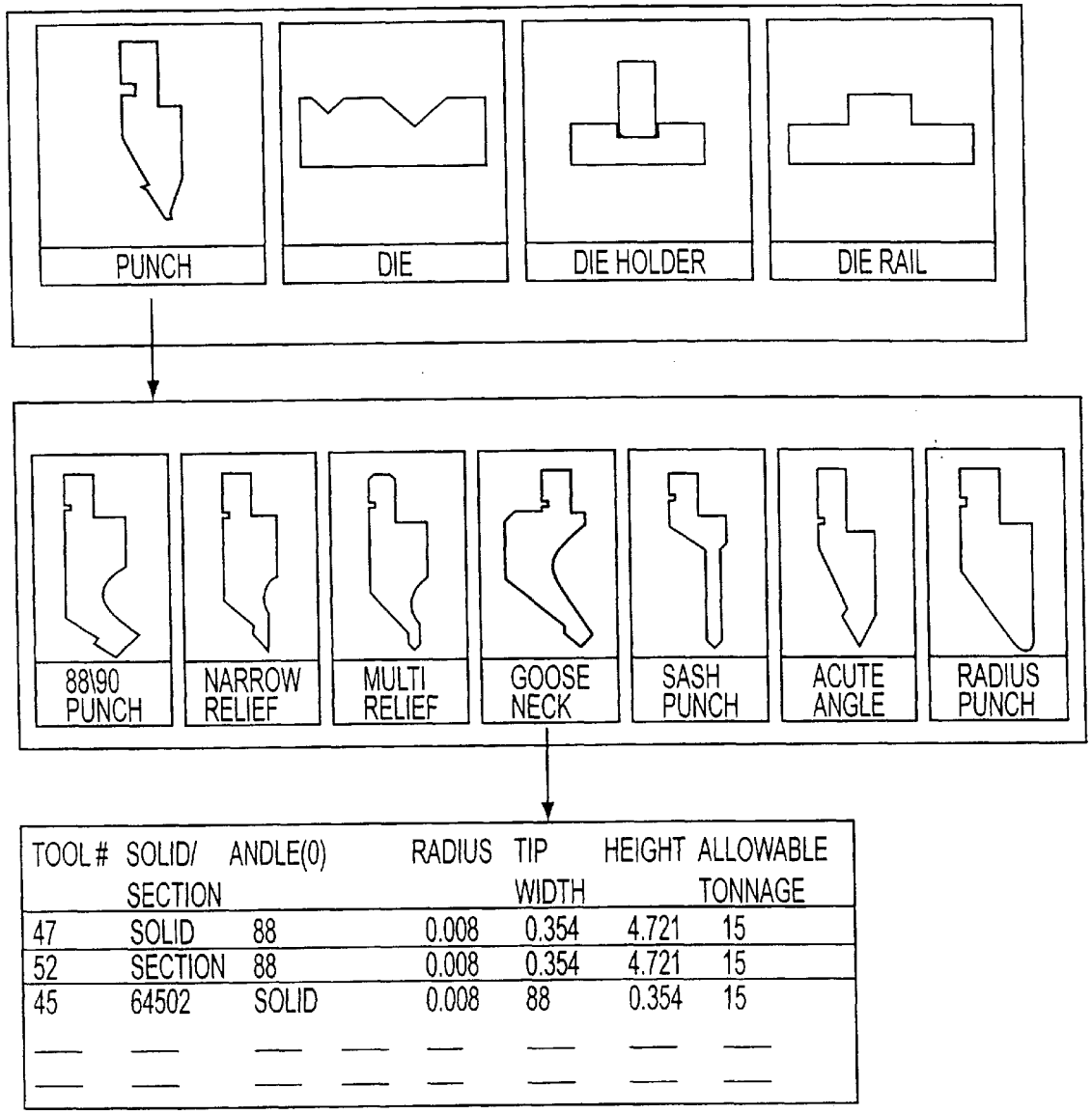
FIG. 31 illustrates an example of the various display menus and data tables that may be graphically displayed to aid a bending operator in selecting tooling.

After the bending sequence has been determined, the operator decides what type of tooling should be used by selecting tools from a stored library of tooling data, as shown at step S.236. The pertinent tooling information may be displayed to the bending operator on the shop floor and display menus may be provided to graphically aid the bending operator in selecting tooling from the library. Once a particular tool has been selected from the library, the pertinent data relating to the tool may be indicated on the screen. FIG. 31 illustrates an example of the various display menus and data tables that may be graphically displayed to the bending operator for manual tool selection. In the example of FIG. 31, successive display menus or screen displays are graphically displayed in order to aid the bending operator in picking a particular tool from the tool library. The successively displayed screen displays may be displayed simultaneously on the display device (e.g., in overlapping or cascading fashion), or may be individually displayed with the screen being cleared before each successive screen display is displayed. Once a particular tool has been selected, the particular data for that tool may be provided in a table and displayed to the operator. The data in the tooling library may be predefined and stored (e.g., in database 30) during an initial set-up procedure of the software.

The manual tool selection feature of the present invention may permit a user to select a tool type and the shape of the tool in each type. For example, various tool types may be selected, including punch, die, die holder, and die rail. Each type may consist of many shapes, and for each shape there may be many tools with different sizes and dimensions. To select a tool, a user would first pick one tool type by selecting one icon from the tool type icons that are displayed, such as that illustrated in FIG. 31. Thereafter, the user would be provided with a menu of different shapes that are available for the selected tool. After analyzing the tool shapes, the user may select a tool shape by selecting one of the shape icons from the displayed shape icons for the selected tool (e.g., in FIG. 31 a goose neck shape punch has been selected). Finally, the user may select the appropriate size and dimension for the tool shape that has been selected. As further shown in FIG. 31, a table may be displayed to the user to indicate the different sizes and dimensions of tools available for the tool shape that was selected. By selecting an item from the table, the selected tool may be displayed as an icon to replace the generic tool type icon and to confirm the selection of the tool.

Figure 32:
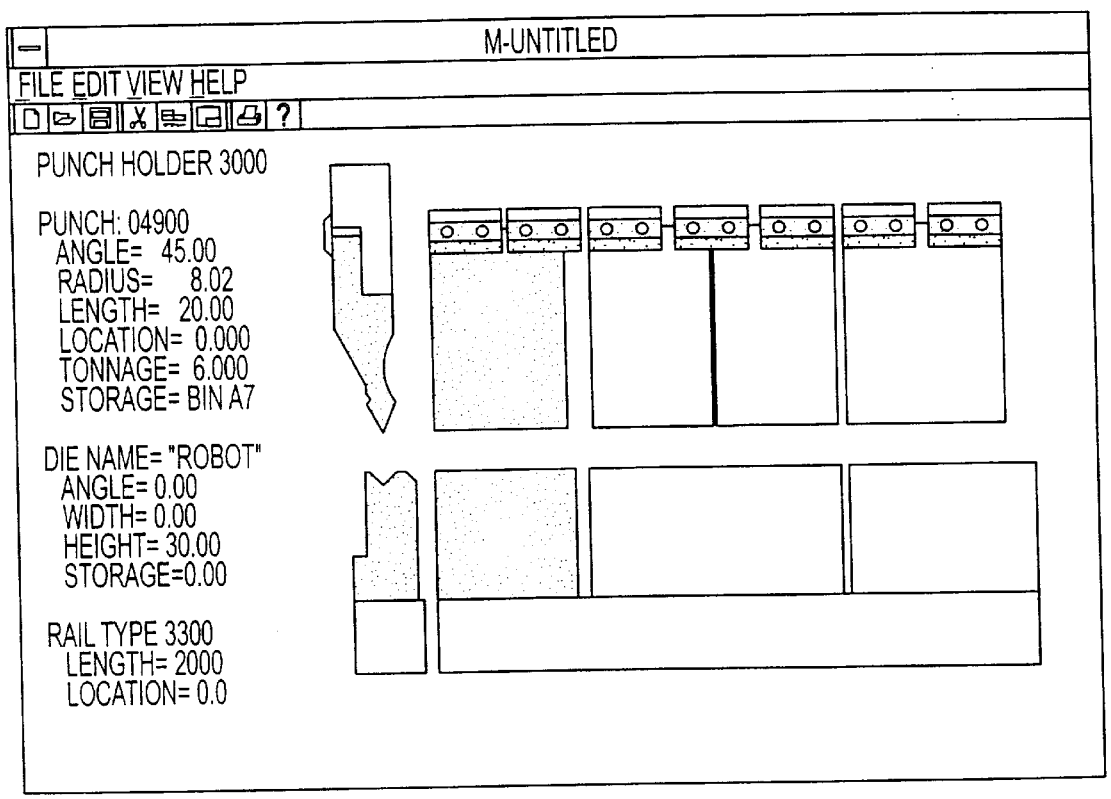
FIG. 32 illustrates an exemplary tool set-up window that may be displayed to a bending operator to facilitate the set-up of tooling in a proposed bending plan.

At step S.240, the bend operator may then set-up the various tool stages in the press brake by aid of a graphical interface. FIG. 32 illustrates an exemplary tool set-up window that may be provided to the bending operator to facilitate definition of the tool set-up to be used in the bending plan. Various punch, die and rail data may be indicated in the tool set-up window, as shown for example in FIG. 32. The tool and die information for the sheet metal part may be entered by the operator. A joystick may be provided at the bending operator's station module to permit the bending operator to indicate the tooling location and to select the tool and dies from a list of available tools and dies. In the tool set-up window, the left hand side of the screen may display the profile of the current tool set-up and the right hand side of the screen may display the location of the current set-up in the press brake. The current set-up location may be highlighted or shaded, as shown in FIG. 32.

Figure 28:
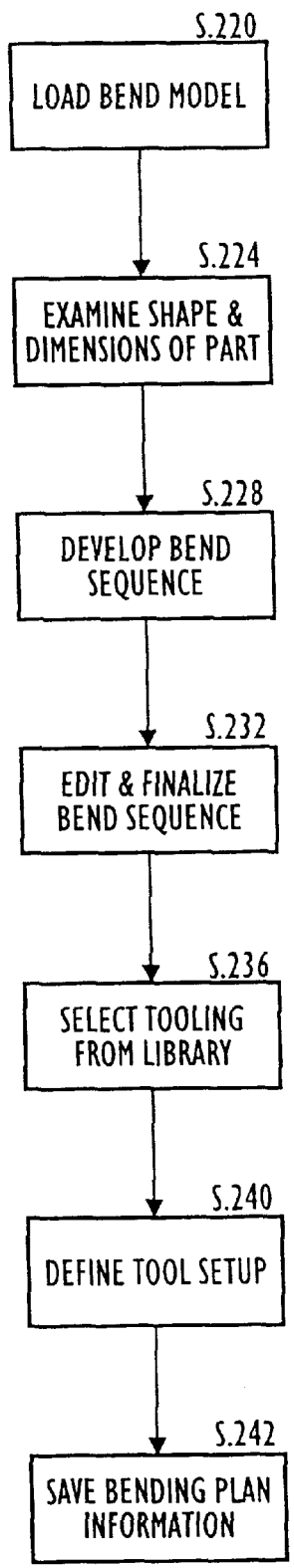
FIG. 28 is a flow chart of the logic flow of the processes and operations that may be performed to develop a bending plan through the use of a graphical user interface, in accordance with another aspect of the present invention.

Finally, once the bend operator is satisfied with the bend sequence, the bending plan information including the tooling and bend sequence information, may be saved with the bend model in the database 30, as generally shown at step S.242 in FIG. 28. Actual testing of the bend sequence may then be performed with the press brake in order to verify the bend sequence selected by the bend operator. If required, any further modifications to the tooling definitions or bend sequence may be performed by the operator or designer at the station module.

Various other features of the invention may be provided to aid the bending operator in the development of the bending plan. For example, in accordance with another aspect of the present invention, a tooling expert may be provided to automatically provide to the bending operator suggested tooling and bend sequences based on the part geometry and other information stored in the bend model. The suggestions from the tooling expert may be followed or revised by the bending operator after analyzing the same. In addition, a more complex tooling expert system may be provided to make tooling suggestions and bend sequence suggestions as to more complex operations based on the geometry of the part in the bend file and a profile analysis of the tooling to check for potential collisions and interference. Such expert systems may be used and implemented with either manual or robot assisted bending machinery. By way of non-limiting examples, the present invention may be implemented with the features and teachings disclosed in pending U.S. patent application Ser. No. 08/386,369, entitled "Intelligent System for Generating and Executing a Sheet Metal Bending Plan," in the names of David A. BOURNE et al., and U.S. patent application Ser. No. 08/338,115, now U.S. Pat. No. 5,835,684, entitled "Method for Planning/Controlling Robot Motion," in the names of David A. BOURNE et al., the disclosures of which are expressly incorporated herein by reference in their entireties.

As described above, a graphical user interface and various functions may be provided to facilitate the bend operator when developing the bending plan for a sheet metal part. In accordance with another aspect of the present invention, additional features may also be provided to aid in the design and manufacturing of the part. As described more fully below, various multimedia features may be implemented into the present invention, such as the storage of audio and visual information, to provide additional assistance to the bending operator when developing the bending plan or executing a bend sequence. Further, a collision check feature may be provided that automatically checks for potential interference and collision between the tools and the parts at each of the intermediate bending stages. This collision check feature may be provided to replace the cumbersome and time consuming manual check of the tool profiles and spacing in the part, which is customarily performed by bending operators when developing a bending plan. These features and others will now be described with reference to the accompanying drawings.

In accordance with an aspect of the present invention, a method may be provided for storing audio and video information with the bend model data. Various audio and video instructions can be recorded at the shop floor to provide special instructions with respect to, for example, the handling and bending of the sheet metal part. For this purpose, a CCD camera or digital camera may be provided at each of the station modules of the various locations 10, 12, 14 . . . 20, along with an audio microphone. Other equipment, such as a video camera with an audio microphone, may be provided at the station modules to permit the operator or user to record audio and video information. The various recording equipment may be connected to a station module computer at the shop floor. By way of a non-limiting example, an Intel PROSHARE personal conferencing CCD camera (available from Intel Corporation) may be used for recording audio and video information. Other commercially available CCD cameras or digital cameras may also be utilized to record such information.

The various audio and video information that is stored with the bend model data may be accessed and retrieved by the user according to various methods and procedures. For example, menu options may be displayed by the station module to permit the replay of stored audio and video information. In addition, in accordance with a preferred embodiment of the present invention, an operator may be provided the ability to attach and associate the stored audio and video information with the various display screens and views of the part by selecting and creating icons that are displayed in the view window. This feature may be implemented through software and object oriented programming techniques, whereby an icon object is created and stored within the bend model data structure. The icon object may contain procedures for retrieving attached audio and video information from memory based on certain conditions (e.g., the selection of the icon by the operator by double clicking a mouse or indicating selection by use of a joystick or other input means). With the icon feature of the present invention, the operator may associate different audio and video messages or information with different parts of the sheet metal part and to any display. By incorporating the icon into the part representation, the icons may be adapted to zoom, rotate and translate with the 2-D and/or 3-D model displays of the part as the view is changed on the screen.

Figure 33A:
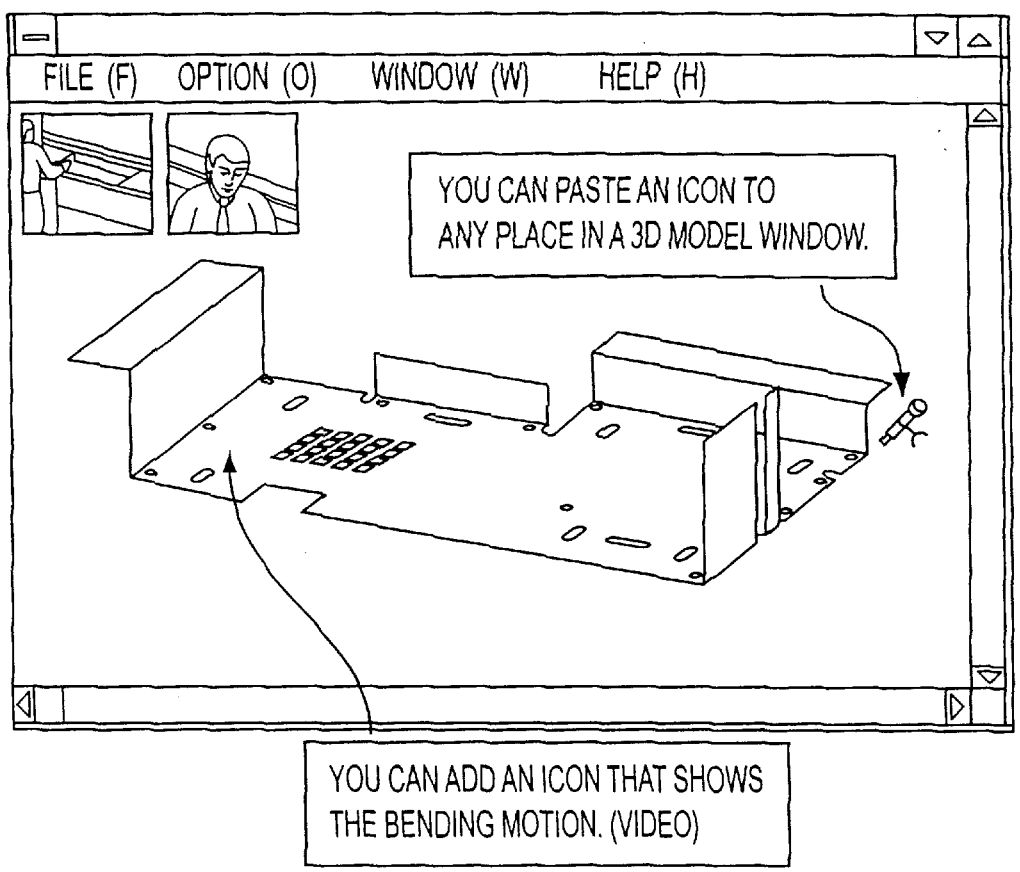
FIG. 33A illustrates an example of a 3-D solid view window display with audio and visual information attached through the use of pasted icons.

FIG. 33A illustrates an example of attaching audio and visual information through the use of icons pasted to a 3-D solid model of the part. After the user has recorded the audio and visual information, the operator may paste an icon at any location within the 3-D model window. When the icon is subsequently selected by an operator or user, the stored audio and visual information may be played back and displayed in the window to provide any special instructions or messages concerning the part or the area of the part to which the icon was placed. Other information, such as the simulation or recording of the bending motion, may be associated with the part by placing icons in proximity to the various bend lines of the part. The video information concerning the bending motion may then be played back to the user when the icon is selected.

The operator or user may record both audio and video information, or only record a simple audio message or a still or motion video signal, that may be selectively played back to the user. The icons that are attached to the window display may graphically indicate the type of information that is stored (e.g., a microphone icon may be depicted to indicate that audio information has been stored or a display monitor icon may be provided to indicate that video information has been stored). Special icons may also be provided to indicate that both audio and visual information are associated with that icon (e.g., an "A/V" symbol or a video camera icon that includes a microphone). A directory of icons may be provided and displayed to allow the user to select among the various icons when attaching audio and/or video information to the screen display or image.

Figure 33B:
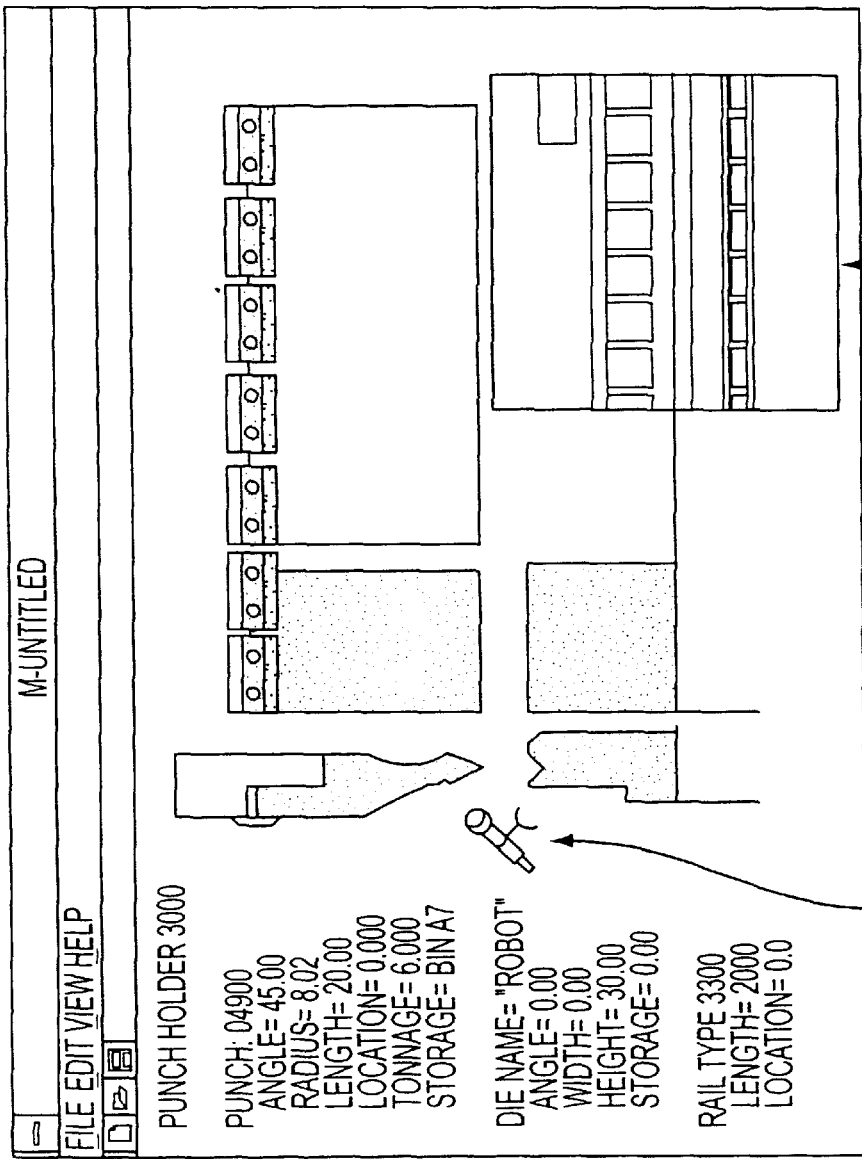
FIG. 33B illustrates another example of a display window that may be incorporated with icons for retrieving stored audio and video information, in accordance with an aspect of the invention.

FIG. 33B illustrates another example of a display window that may be incorporated with icons for retrieving stored audio and video information. The display window depicted in FIG. 33B relates to the tool set-up screen image, such as that described above with reference to FIG. 30. In the example of FIG. 33B, audio information may be stored and retrieved by a microphone icon and separate video information may be stored and retrieved by pasting a video icon to the display window. The audio and video information may relate to special instructions or information regarding tool set-up or operation. Further, regardless of the type of window display that is currently active, the operator may paste as many icons as required to the various areas in the window display so that different audio and video information may be later retrieved.

Figure 34:
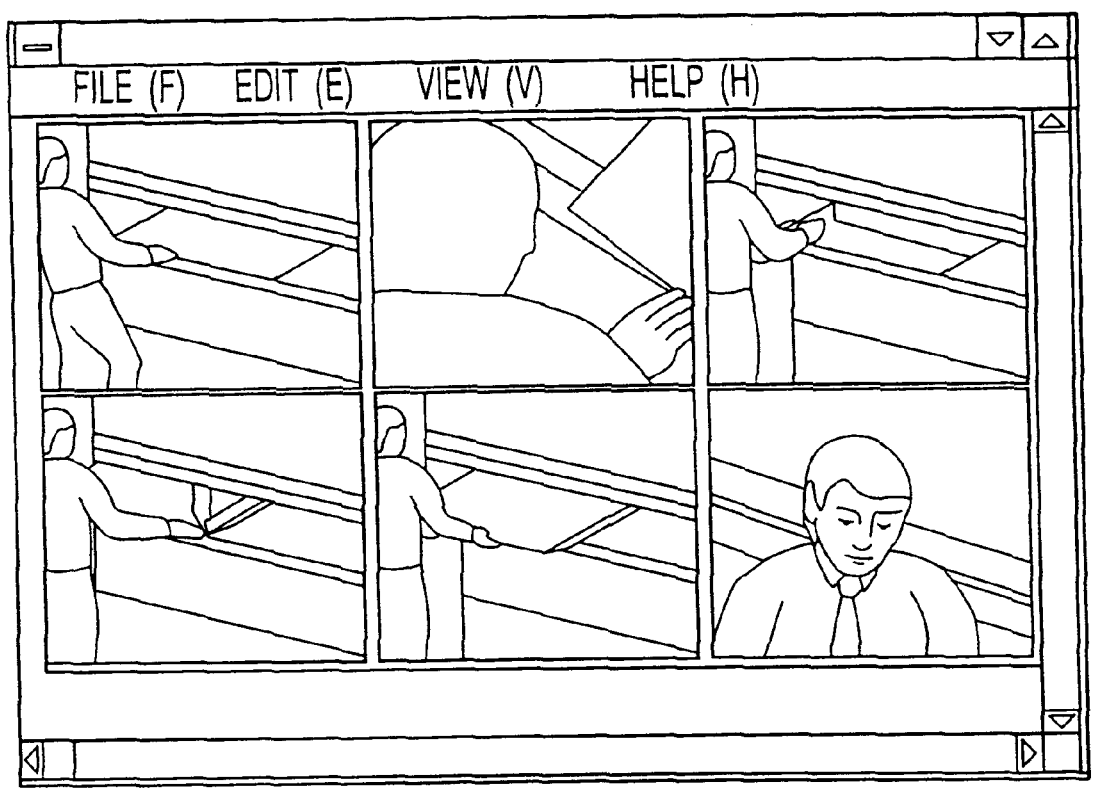
FIG. 34 illustrates an example of an image editing window that may be implemented in accordance with the teachings of the present invention.

In accordance with another aspect of the invention, an image editing window feature may be provided to facilitate the operator in selecting stored images and applying them to different screens. The imaging editing window feature may be provided as a Windows based application that may be accessed at, for example, server module 32 or any of the station modules provided throughout the manufacturing facility. FIG. 34 illustrates an example of the image editing window that may be implemented in accordance with the teachings of the present invention. The images displayed in the image editing window may include images shot by a digital camera or a CAM coder. The images that are displayed on the screen may be selectively chosen by the operator (e.g., through a mouse or other appropriate data input means) and copied to different screens so that they may be associated with particular model views of a part. The operator may then paste the image or an icon to the model window (e.g., a 3-D solid model window of the part, such as that shown above with respect to FIG. 33B). The images shown in FIGS. 33 and 34 are photocopy reproductions of actual screen images; the actual video images will themselves be clearer, dependent upon the resolution of the camera and screen used. The images can include, e.g., a still or motion video image of a bending operator discussing or illustrating special handling or other instructions relating to a bending operation, or may be a video image of a sheet metal bending operation. In other words, any actual image which may be useful can be taken and later displayed. Thus, the actual images shown in FIGS. 33–34 are for illustrative purposes only.

Figure 35A:
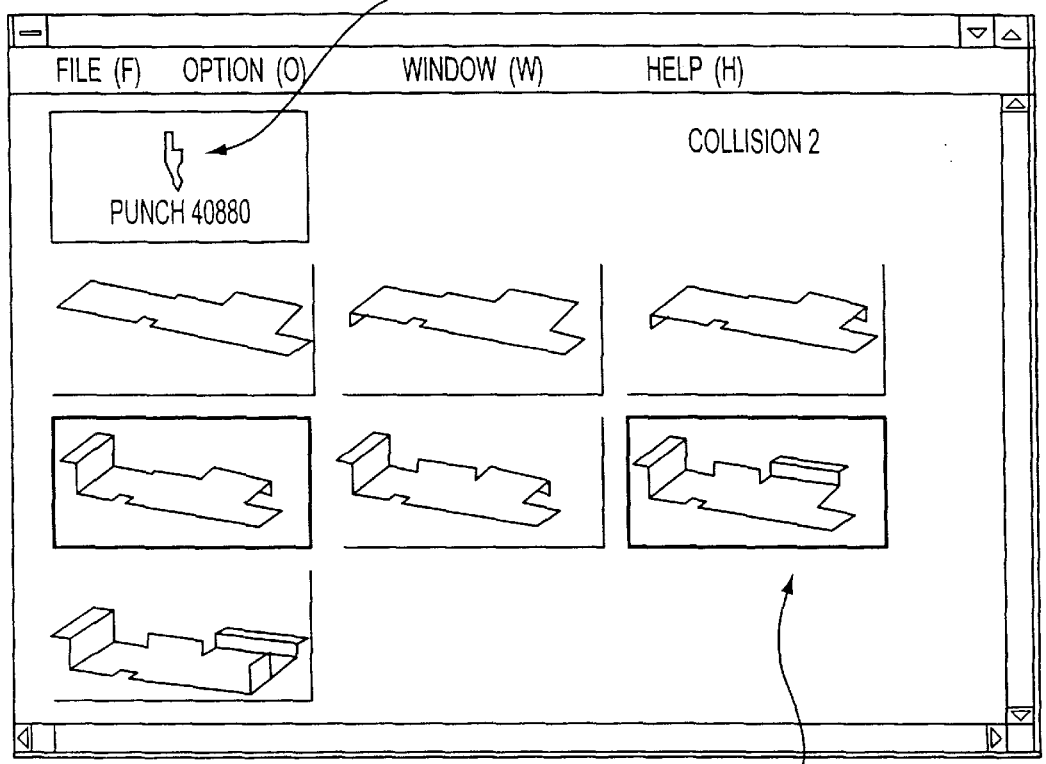
FIGS. 35A and 35B illustrate examples of a collision check function of the present invention that may be implemented through a graphical user interface.
Figure 35B:
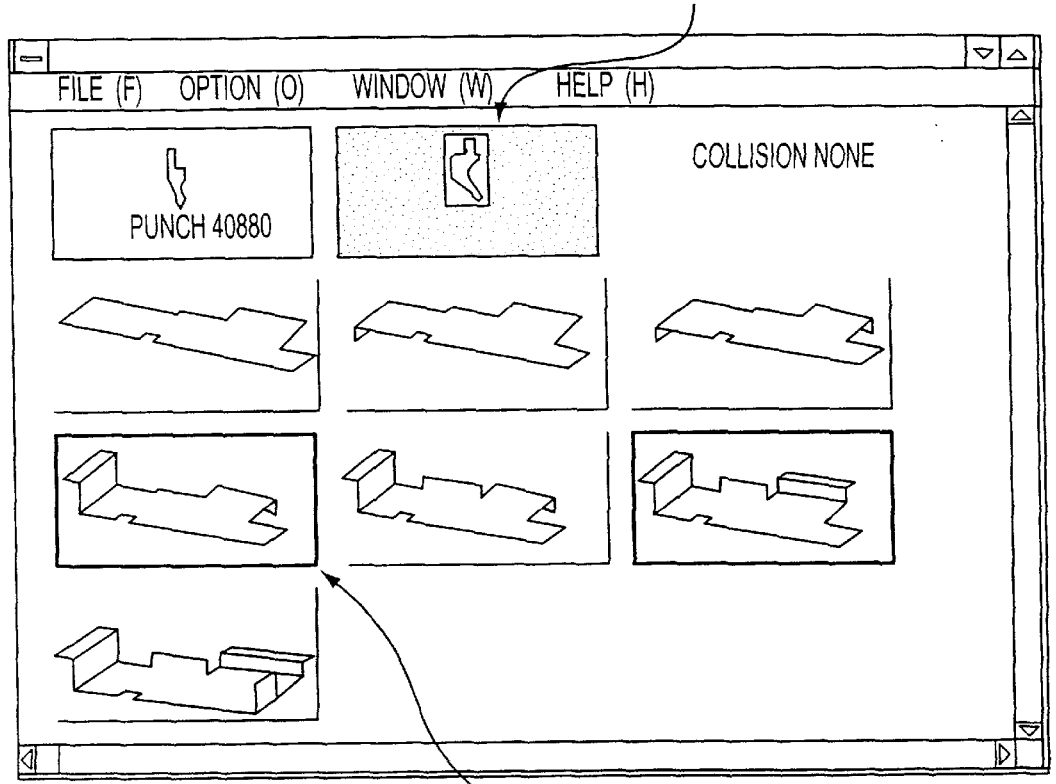

Referring now to FIGS. 35A and 35B, an example of a collision check function of the present invention will be provided. In accordance with an aspect of the present invention, a collision check function may be provided to allow users to check for potential collisions between the part and punch tool through use of a graphical user interface. The collision check function may be a Windows based application that may be accessed at any station module or location within the manufacturing facility. The automatic collision check function of the present invention may be used by a bending operator in place of the traditional and cumbersome manual profile check that is customarily performed when developing the bending plan.

Traditionally, when developing a bending plan for a sheet metal part, a bending operator will first determine the bend sequence for the part. The bend sequence defines the order and manner in which the sheet metal part is to be bent during production. After the bend sequence has been determined, the bending operator will select and define the tooling to be used to carry out each of the bending operations. During this process, the profile of the tools selected and the intermediate shapes of the part will be analyzed to ensure that there is no interference or collision(s) between the tools and the part when carrying out each of the bending steps. If a collision or interference is detected, then the type of tooling selected (or, if necessary, the bend sequence) will have to be modified so that the bending operations may be carried out without interference or collision between the tool(s) and the sheet metal part.

When detecting for potential collisions or interference, bending operators have traditionally relied upon manual methods to analyze the clearance between the profile of a tool and the bent parts or shapes of the sheet metal component. Typically, a model of the tool profile is constructed and used by a bending operator. The tool profile model is manually matched or overlaid with engineering or technical drawings (having the same scale size as the tool profile model) of the various intermediate shapes of the sheet metal. By fitting and matching the tool profile model with the drawings of the part, the bending operator can determine whether there is sufficient space and clearance between the tool and the part at each of the bending steps. This process, however, tends to be cumbersome and time consuming.

The present invention overcomes the disadvantages of such traditional methods by providing an automatic collision check function. The collision check function of the present invention may be implemented through a graphical user interface to permit the bending operator to check for collisions at each intermediate step within a defined bending sequence. FIGS. 35A and 35B illustrate examples of the collision check function implemented through a graphical user interface. When activated, the collision check function will automatically check for collisions between each intermediate shape of the part within the bending sequence and the punch tool or tools defined for that sequence. The intermediate shapes may be displayed on the screen (see, for example, FIGS. 35A and 35B) and if a collision is found, the step at which the collision is detected may be highlighted on the screen. In addition, other display indications, such as text, may be provided to indicate the number of collisions detected. In the examples of FIGS. 35A and 35B, the collision information is provided in the upper right hand area of the display window. In addition, the type of punch tool or tools for which the collision has been checked may be displayed or indicated in the upper left hand area of the display window.

If a collision is detected for the punch tool selected by the operator, the intermediate shapes or stages at which the collision is detected may be highlighted on the screen. In this case, an operator may select another punch tool for that particular bending stage and the collision check function may be reexecuted to determine if a collision will occur with the second choice for the punch tool. The operator may select a punch tool for each bend and check for collisions with the collision check function. Drag and drop editing may be provided to allow the user to change the bend sequence displayed in the window display by dragging the intermediate bending shapes and dropping it to a desired position within the proposed bend sequence. The bend sequence may then be modified based on the drag and drop editing performed by the operator, in a similar manner to that described above with reference to FIG. 32.

Various processes and operations may be used to implement the collision check feature of the present invention. For example, in order to detect for a potential collision, the geometry for the selected tool and the geometry for the part at each intermediate shape may be accessed. The geometrical data relating to the part at each intermediate step may be generated based on the bend sequence and the part dimensions and topology data. Each flange of the part may be folded in accordance with the bend data (e.g., bend angle, bendline location, deduction amount, etc.) in order to render the part at each intermediate stage in the bending sequence. The above described folding process and deduction compensation features of the invention may then be applied when generating the geometrical data for the part at each intermediate stage. With the tool and part geometry, the tool and part may be oriented with respect to one another by placing the tip of the tool at the bendline of the part at each of the bending stages. A collision may be detected by analyzing the geometrical data and boundaries of the tool and the part and determining whether there are common points or overlapping points in the tool and the part. When a collision is detected at a particular bending step, that step may be highlighted on the screen to indicate the detection of a collision to the user.

The tool data that is used to detect for collisions may be actively taken out of a tool shape library based on the tooling selection(s) made by the user. Recalculation of a collision at any intermediate bending step may be performed based on a different tool shape or modification of the bending sequence. By providing such features, and displaying such information through a graphical user interface, such as that described herein, the potential for collisions may more easily be determined and corrected by the bending operator.

As described above, a joystick or mouse device may be provided at each of the station modules and locations throughout the manufacturing facility in order to permit the user to selectively activate and control various viewing functions (e.g., zoom, pan, rotate, etc.) when viewing the rendered model of the sheet metal part. The joystick device may be a multi-axis joystick and include select and control buttons. The joystick may be implemented through various commercially available joystick devices, including a Microsoft SideWinder joystick, and may be plugged into a game port of the computer of each of the station modules and/or other locations in the facility. The mouse may also be implemented by any commercially available mouse support software, such as Windows 95 or Windows NT, and any commercially available mouse device that is plugged into a game or mouse port of the computer at each of the facility locations By way of non-limiting examples, FIGS. 36–41 illustrate various aspects of a system for manipulating 3-D geometrical shapes and renderings of the part by using a joystick or mouse device. The 3-D navigation system of the invention permits a user to control various viewing functions, such as rotation, zooming and panning. In accordance with an aspect of the present invention, the system may also use a dynamic rotation axis that is calculated based on the current zoom view when viewing the 3-D model. According to this aspect, the center of rotation may be dynamically changed and calculated based on the current view and zoom ratio or factor so that the zoomed area of the part will not disappear from the screen when the part is rotated with, for example, a high zoom ratio or factor.

In accordance with an aspect of the present invention, the 3-D manipulation and navigation system may be provided at the station modules and/or server module of the facility. The processes and operations of the 3-D navigation system may be implemented through software or programmed logic and by using any one of a wide variety of programming languages and techniques. For example, the system may be implemented by using a high level programming language such as C++ and using objected oriented programming techniques. Further, by way of a non-limiting example, VISUAL C++ may be utilized, which is a version of the C++ programming language provided by Microsoft Corporation for Windows based applications. The viewing functions (e.g., zoom, rotate, pan, etc.) may be defined and implemented as member functions of the view class of the bend model viewer of the present invention described above (see, e.g., FIG. 18 and the related disclosure provided above). Information concerning the current zoom factor and position of the part (e.g., the position of the part in 3-D space) may also be accessed from the bend model viewer to calculate the dynamic rotation axis and to provide the desired viewing functions.

Various hardware components and interfaces may also be provided in order to implement the 3-D navigation system of the present invention. For example, the software used to implement the system may be provided or reside in the computer or personal computer of the station modules and server module. As discussed above, the computer or personal computer may include a graphics card and a display screen or terminal, such as a high resolution monitor, to display 3-D renderings of the sheet metal part to the user. The computer or personal computer may also include a mouse or game port adapter card to connect and interface with the mouse or joystick device. Commercially available software may also be provided to interpret the command signals received by the mouse or game adapter card from the user-operated mouse or joystick device.

Figure 36A:
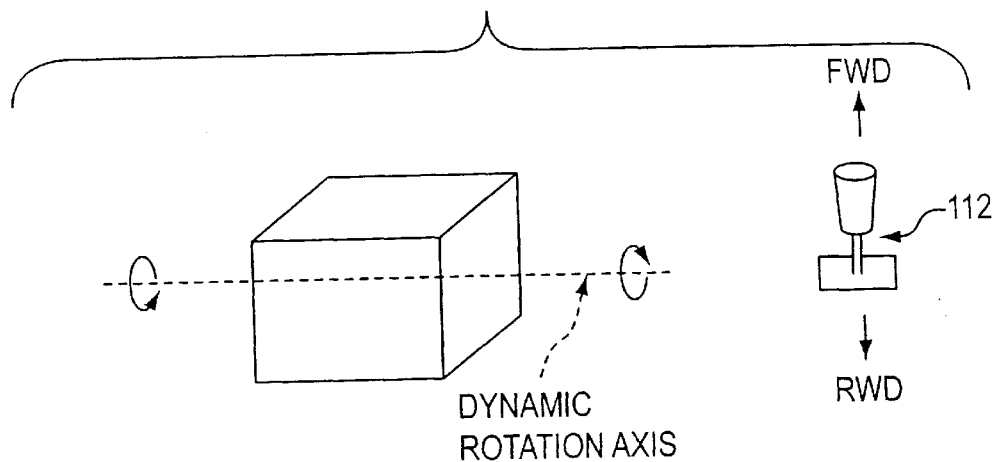
FIGS. 36A and 36B illustrate a manipulation system of the invention for manipulating the rotation and display of 3-D geometrical shapes by using, for example, a joystick.
Figure 36B:
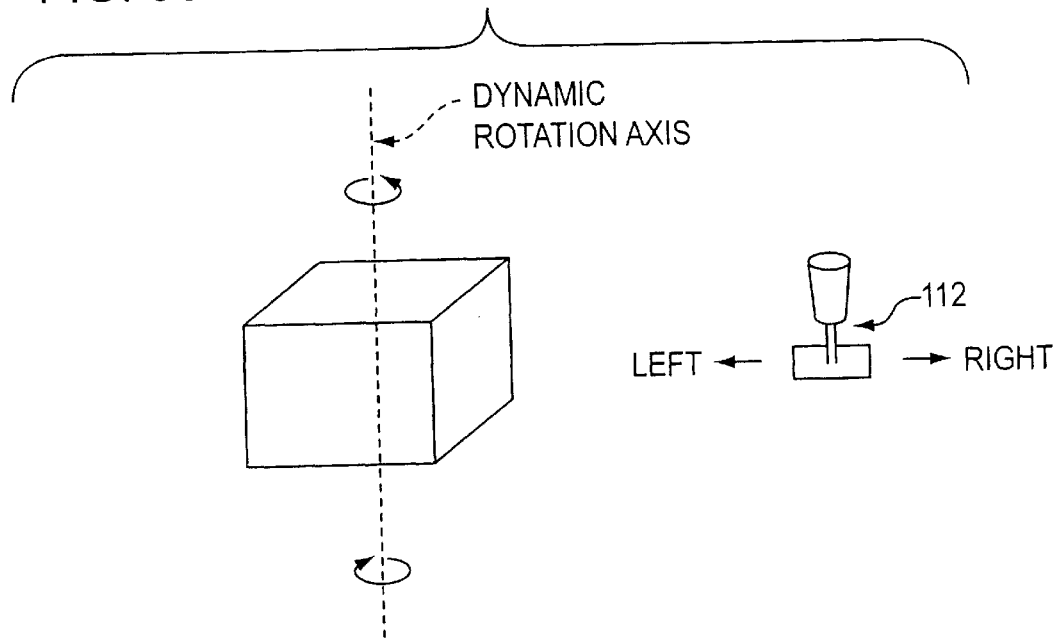

FIGS. 36A and 36B illustrate examples of rotation functions that may performed with a multi-axis joystick 112 to rotate, for example, a simple 3-D box shaped part. As noted above, a joystick may be provided and connected to a computer or equipment provided at the station modules and/or server module provided throughout the facility. As shown in FIGS. 36A and 36B, rotation of the part may be achieved by moving the joystick 112 forwardly or rearwardly, and to the left and the right. The orientation or direction of the rotation axis may be set based on the movement of the joystick 112 (or mouse). For example, moving the joystick 112 forwardly or rearwardly may cause the part to rotate in the clockwise or counter clockwise direction about a rotation axis defined along the X-coordinate axis (see, e.g., FIG. 36A). Further, moving the joystick 112, however, to the left or right may cause the part to rotate in the clockwise or counter clockwise direction about a rotation axis defined along the Y-coordinate axis (see, e.g., FIG. 36B).

When the zoom ratio or factor of the current view is low and the entire rendering of the part is provided on the screen, the rotation axis may be defined as passing through the geometric center or centroid of the part. As described above, the zoom factor and the visibility of the part on the screen may be determined based on the visibility function provided by the bend model viewer of the present invention. When it is determined that the entire part is displayed in the screen (such as that in FIGS. 36A and 36B), then coordinate geometry techniques may be used to define and set the rotation axis to the geometric center of the part. Rotation of the part may then be performed based on the user-defined movement of the joystick device and through the rotate member, viewing function of the bend model viewer of the present invention.

If, however, only part of the object is displayed on the screen and it is determined that portions of the part are not visible (e.g., a high zoom factor or ratio has been selected), the rotation axis should not be maintained at the geometric center or centroid of the part, since to do so may cause the zoomed portion of the part to disappear from the screen during rotation. Instead, according to the invention, when the zoom ratio is increased, the rotation axis is dynamically recalculated such that the rotation axis passes through the coordinate of the closest point to the viewpoint (or camera view) at the center of the screen. By dynamically recalculating the rotation axis based on changes in the zoom factor, the part may rotated about an axis that does not cause the visible portion of the part to go out of view during rotation.

Figure 37:
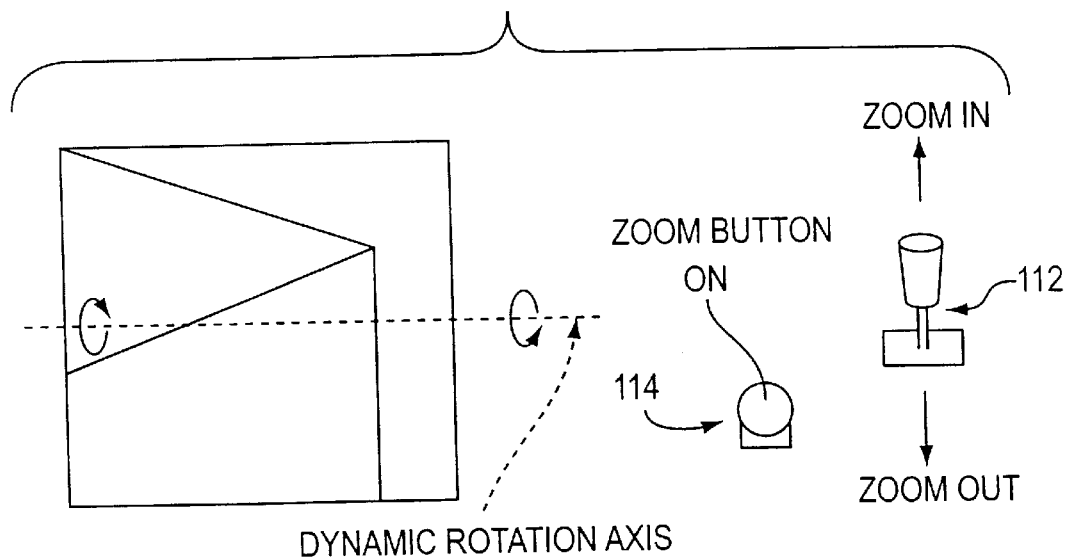
FIG. 37 illustrates a manipulation system of the invention for manipulating the zooming and display of 3-D geometrical shapes by using, for example, a joystick and zoom button.
Figure 38:
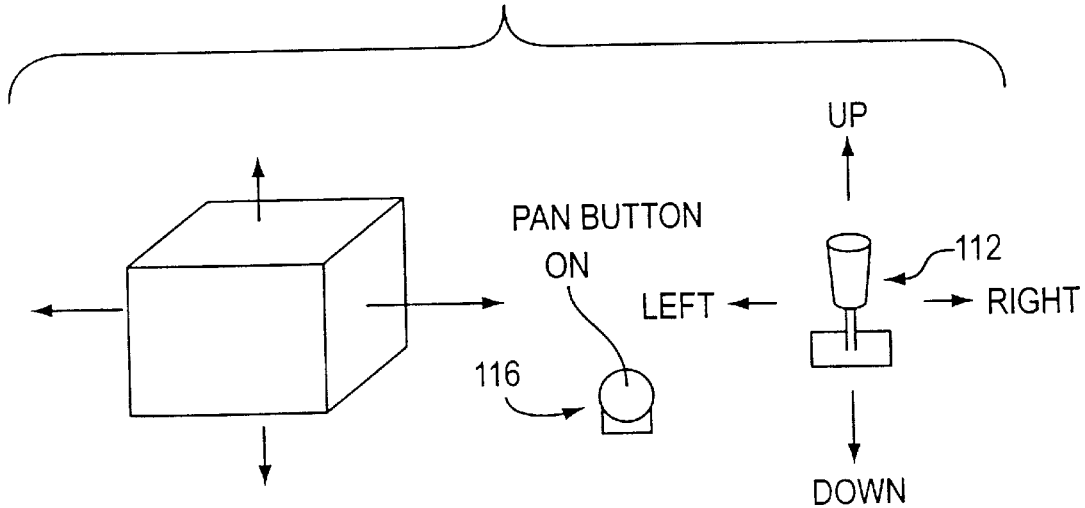
FIG. 38 illustrates a manipulation system of the invention for manipulating the panning and display of 3-D geometrical shapes by using, for example, a joystick and pan button.

In order to perform zooming and panning of the 3-D model, additional control buttons may be provided on a keypad that is provided separately or with the joystick or mouse device. For example, by pressing a zoom button 114, and moving the joystick 112 forwardly or rearwardly, the part may be zoomed in or out based on a predetermined rate, as shown in FIG. 37. As discussed above, the rotation axis may be recalculated within each zoom window to permit the user to view the zoomed portion of the part when rotation is performed. In addition, panning of the 3-D shape may be controlled by the user by pressing or activating a pan button 116 and moving the joystick 112, as shown in FIG. 38. As with the zoom button 114, the pan button 116 may be provided on a digital input pad that is provided separately or with the joystick or mouse device at each of the various locations of the facility.

In accordance with an exemplary embodiment of the invention, the various processes and operations that may be provided to implement the 3-D navigation and manipulation system will be described below with reference to FIGS. 39–41. As indicated above, the necessary processes and operations of the 3-D navigation system may be implemented through a combination of software or programmed logic, and hardware components and interfaces. Input signals from a user-controlled device, such as a joystick or mouse device, may be interpreted to determine the amount of movement and reorientation of the rendered part that is desired. In accordance with the invention, the rotation axis of the rendered part may be calculated dynamically, based on the current view and zoom factor, in order to prevent the zoomed area of the part from disappearing from the screen during rotation.

Figure 39:
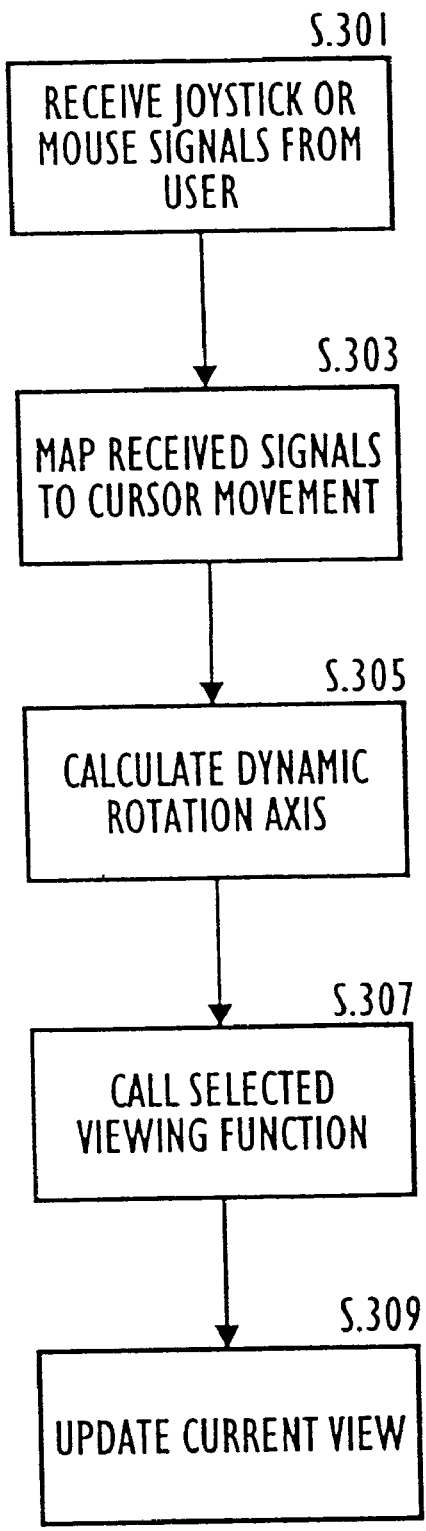
FIG. 39 is an exemplary flow chart of the processes and operations, that may be performed in order to implement the 3-D navigation and manipulation system of the present invention.

When updating the current view of the rendered part, input signals are received from the user based on the manipulation of the joystick or mouse device, as generally indicated at step S.301 in FIG. 39. Movement of the joystick or mouse device by the user in a particular direction, and/or in combination with the activation of special control buttons, may cause certain viewing functions (e.g., rotate, zoom, pan, etc.) and movement of the rendered part in predetermined directions (e.g., clockwise or counterclockwise; zoom-in or zoom-out; left or right; etc.) to be effectuated, as described for examples in FIGS. 36–38. The received signals, whether they are from a joystick or mouse device, may be mapped to cursor movement to define the amount of movement on the screen that is desired by the user. If the user is not within one of the viewing function modes (e.g., the user is selecting information on the screen or reviewing information in a dialog box or window), then mapping of the received signals may not be required.

As will be appreciated by those skilled in the art, the signals that are received from conventional joystick or mouse devices are based on different coordinate or reference systems than that of the screen space, and must be translated in order to provide meaningful information regarding cursor movement on the screen. Therefore, after receiving the input signals from the user, the received signals may be mapped to cursor movement, as indicated at step S.303, before calculating the rotation axis and updating the current view of the rendered part.

Different methods and processes may be used to translate and map the input signals from the user-controlled device to cursor movements in screen space. Traditionally, movements of a mouse device have been translated and mapped to cursor movements by commercially available software. For example, Windows 95 and Windows NT include software routines for translating mouse movements to cursor movements. As such, movements of a mouse device may be mapped to cursor movement by using such commercially available software. If, however, the user is provided with a joystick interface, then the joystick movements should also be translated and mapped to cursor movements in order to provide useful information. Various methods and techniques may be used to map the joystick movements within the joystick virtual space to cursor movements within the screen space. For example, the joystick movement signals may be first processed and translated to mouse movements before they are finally mapped to cursor movements. Alternatively, the joystick signals may be directly mapped to cursor movements as a function of the ratio of the screen space size to the size of the joystick virtual space.

Figure 40:
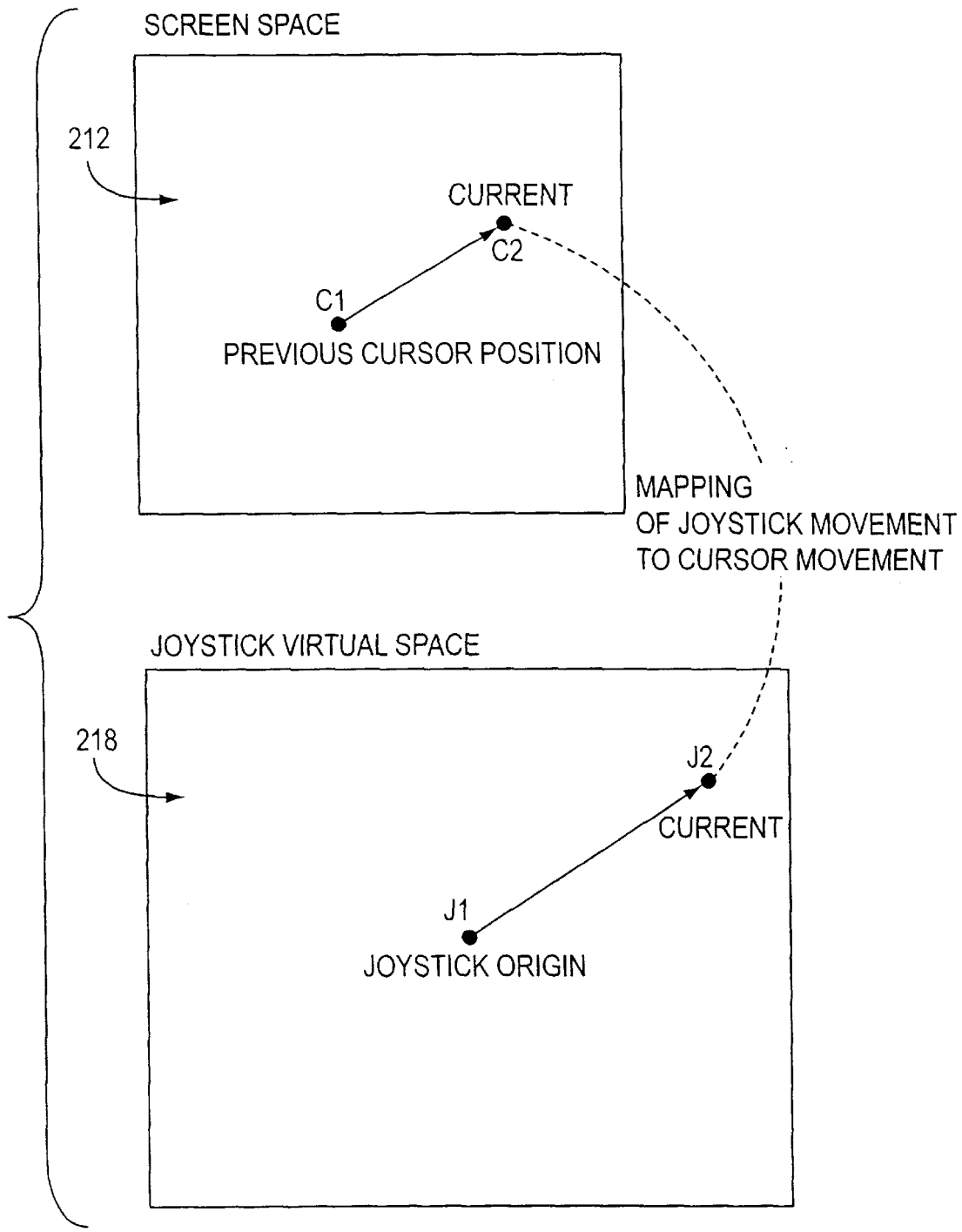
FIG. 40 illustrates an example of mapping joystick movements to cursor movements, in accordance with an aspect of the invention.

FIG. 40 illustrates an example of mapping joystick movements to cursor movements in screen space, in accordance with an aspect of the present invention. As indicated above, a joystick device may include its own virtual coordinate system or space 218. The joystick virtual space 218 includes an origin J1 that corresponds to the position at which the joystick is in a center or neutral position (i.e., a position at which the joystick is not moved). When the joystick is moved to a new position (e.g., a current position J2 as shown in FIG. 40), the joystick device generates signals to indicate the new or current position within the virtual space of the joystick. Since the joystick virtual space 218 is often larger (in terms of pixels) than the screen space 212, the virtual coordinates and movements of the joystick must be translated to screen coordinates in order to determine the desired cursor movements and, thus, movement of the part on the screen.

Various methods and processes may be utilized to map and translate the virtual coordinate movements of the joystick to screen coordinate movements. For example, joystick movements may be mapped to screen cursor movements based on the ratio of the screen space size to the joystick virtual space size. More particularly, when it is determined that a viewing function mode (e.g., zoom, rotate, pan, etc.) is active and the joystick device has been manipulated by the user, the actual movement of the cursor from a previous point C1 to current point C2 may be determined by the following equation: current_point=previous_point+ (scale_factor×V); wherein, "current_point" is the current point C2 of the cursor; "previous_point" is the previous point C1 of the cursor; "scale_factor" is the ratio of the screen size to the joystick virtual space size (both in pixels); and "V" is a vector representing the movement and direction of the joystick from the joystick origin J1 to the joystick current position J2. Thus, in order to map joystick movements to cursor movements, a vector "V" indicating the direction and movement of the joystick from the origin Ji to the current position J2 may first be calculated based on the signals received from the joystick device when it is manipulated by a user. After the vector "V" has been calculated, the joystick movement may be mapped to cursor movement by using the vector "V" amount and the "scale-factor" amount in the equation described above; that is, the new or current position C2 of the cursor may be calculated by multiplying the vector "V" by the ratio of the screen size to the joystick space size (i.e., the "scale factor"), and then adding the result of this computation to the previous cursor position C1.

Depending on the scale factor, it may be necessary to increase or decrease the rate of scaling or movement by a predetermined or user selected adjustment factor. In such a case, and depending on the preference of the user, the scale factor may be multiplied by the adjustment factor when calculating the current point of the cursor in order to increase or decrease the rate of scaling. For example, if the ratio of the screen size to the joystick space size provides a scale factor of 1/64, then it may be preferable to increase the rate of scaling in order to provide a more satisfactory relationship between movements of the joystick and the rate of movement of the rendered part on the screen. By way of a non-limiting example, with a scale factor of 1/64, an adjustment factor of 3 may be used when zooming or rotating the rendered part. Further, for a scale factor of 1/64, an adjustment factor of 6 may be used when panning of the rendered part is performed. Of course, the rate of scaling may be modified based on the particular needs of the user, and the adjustment factor may be predetermined or the user may be given the option to adjust or select the adjustment factor to modify the rate of scaling. Further, as indicated in the example discussed above, the adjustment factor may be set to the same amount for each of the viewing functions or may be individually set to the same or different amounts for each of the viewing functions provided.

After the received signals have been appropriately mapped and translated, the rotation axis of the part may be dynamically calculated, as generally shown at step S.305 in FIG. 39. Depending on the current view of the part, the rotation axis may be defined to pass through the center of the part or to pass through another point so that the zoomed area of the part will not disappear from the screen when the part is rotated with, for example, a high zoom ratio or factor. Various methods and processes may be utilized to dynamically recalculate the rotation axis of the part based on the current zoom view. In accordance with another aspect of the invention, FIG. 41 illustrates an exemplary logic flow and sequence of processes and steps that may be performed to calculate the rotation axis whenever the view of the part has been modified by the user.

Figure 41:
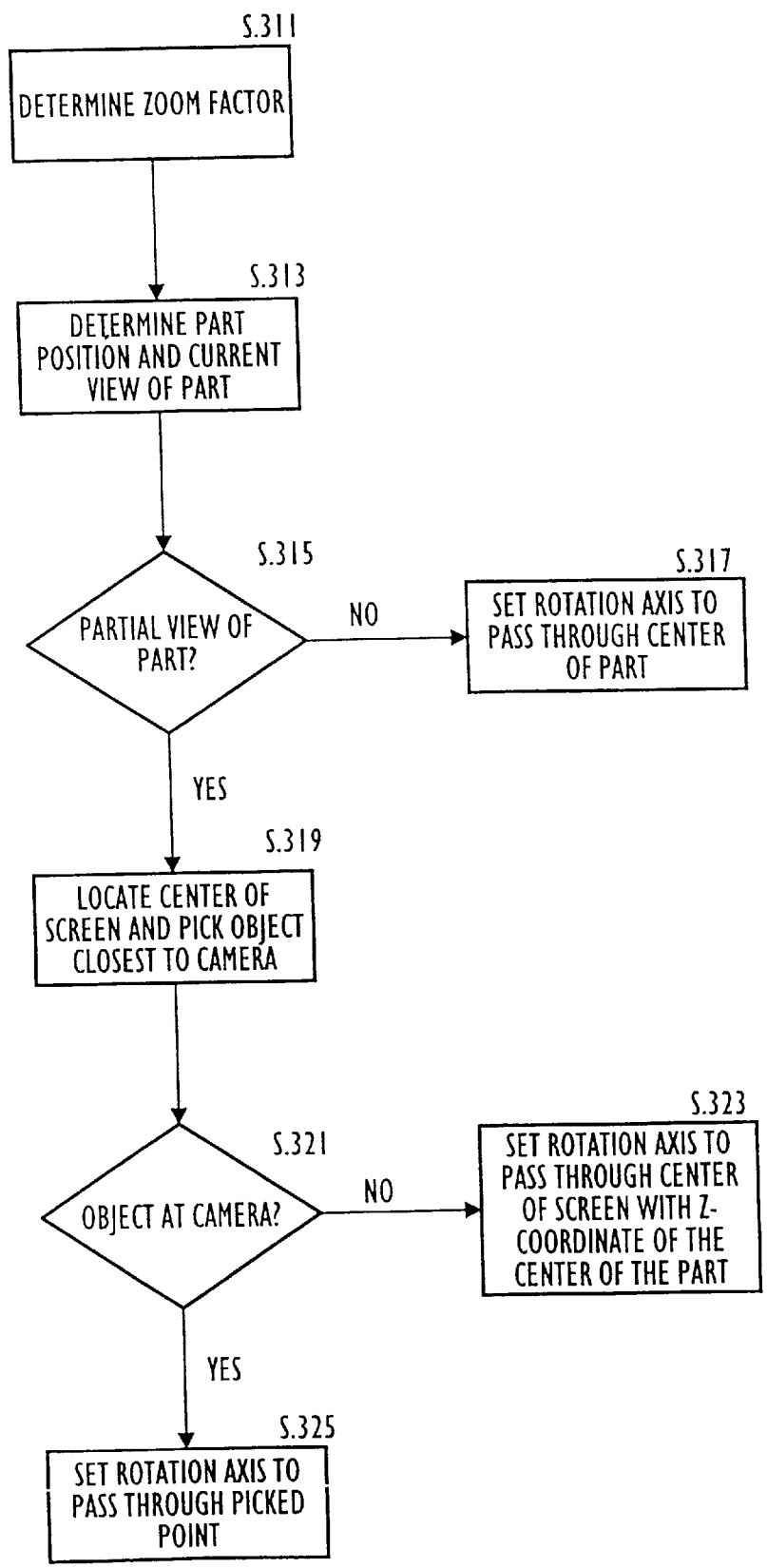
FIG. 41 is an exemplary flow chart of the processes and operations that may be performed to dynamically calculate the rotation axis of the rendered part.

As shown in FIG. 41, the current zoom factor or ratio and the part position and current view may be determined at steps S.311 and S.313. The zoom factor and orientation of the rendered part selected by the user will cause the entire part to be visible on the screen (i.e., a full view) or cause only a portion of the part to be made visible on the screen (i.e., a partial view). Thus, the current zoom factor and part orientation should be determined in order to properly set the rotation axis of the rendered part. Various methods and processes may be used in order to determine the current view of the part. As described above, a visibility function may be provided with the bend model viewer of the present invention to maintain and update the status of the current view orientation and zoom ratio whenever there is a change made to the displayed image. A function call may be made to the bend model viewer to determine what points or portions of the part are presently visible. Whether all of the part is displayed on the screen may be determined by comparing the view volume with the part's boundary base size.

If it is determined at step S.315 that a full view of the part is currently visible on the screen, then the rotation axis may be set to pass through the center of the part at step S.317. Setting the rotation axis to the center of the part when there is a full view is possible, since the entire rendered part will be visible on the screen when it is rotated by the user. With the entire part visible on the screen, the rotation axis may be defined so as to pass through the geometric center or centroid of the part. Conventional coordinate geometry techniques may be used to define and set the rotation axis to the geometric center of the part. In addition, the direction of the rotation axis may be defined as a vector that is perpendicular to the vector from the previous cursor position to the current cursor position.

If it is determined at step S.315 that only a partial view of the part is currently visible on the screen, then logic flow may continue to steps S.319–S.325 in order to calculate the rotation axis so that portions of the rendered part will not disappear from the screen when the zoomed part is rotated by the user. As described above, when a high zoom factor is selected by the user and only portions of the part are displayed on the screen, the rotation axis should not be set to pass through the geometric center of the part, since to do so may cause the zoomed portion(s) of the displayed part to disappear from the screen during rotation. In order to prevent the displayed portion of the part from being occluded or disappearing from the screen, the rotation axis should be set so as to pass through the coordinate of the closest point to the viewpoint (i.e., camera) at the center of the screen. In such a case, the direction of the rotation axis may be defined as a vector that is perpendicular to the vector from the previous cursor position to the current cursor position.

Thus, at step S.319, the center of the screen is located and the object or portion of the part at the center of the screen that is closest to the camera is selected. That is, the portion of the rendered part that is located at the center of the screen and that is closest to the camera or user viewpoint of the screen is picked. If it is determined at step S.321 that there is an object at the camera (e.g., that there is a solid portion of the part that is located at the center of the screen and that is closest to the camera), then at step S.325 the rotation axis may set to pass through the picked point. As discussed above, the direction of the rotation axis may be defined as a vector that is perpendicular to the vector from the previous cursor position to the current cursor position.

If it is determined at step S.321 that there is not an object at the camera (e.g., that the part includes a hole or opening that is located at the center of the screen and that is closest to the camera), then logic flow may continue to step S.323. At step S.323, the rotation axis may alternatively be define to pass through the center of the screen (e.g., the X and Y coordinate of the physical center of the screen) and at the Z-coordinate (i.e., depth) equal to the geometric center of the part. Thus, the rotation axis may be set to pass through the X, Y, and Z coordinates discussed above, with the direction of the rotation axis being defined as the vector that is perpendicular to the vector from the previous cursor position to the current cursor position.

Referring back to FIG. 39, after the dynamic rotation axis has been calculated, the selected viewing function (e.g., zoom, rotate, pan, etc.) may be called at step S.307. As discussed above, the various viewing functions of the 3-D manipulation system may be defined and implemented as member functions of the view class of the bend model viewer (see, e.g., FIG. 18 and the related disclosure provided above). In such a case, based on the viewing function selected by the user, a function call may be made to the bend model viewer to update the current view of the rendered part, at step S.309. The current view and orientation of the part may be updated based on the viewing function selected by the user and the mapped cursor movements received from the user-controlled input device (e.g., the mouse or joystick device). A graphics package, such as OpenGL or RenderWare, may be provided to facilitate the update of the current view provided to the user.

The logic flow and processes performed in the exemplary flowcharts of FIGS. 39 and 41 may be implemented by software and by using a wide variety of programming languages and techniques. For example, object oriented programming techniques and C++ may be used to implement the noted processes and operations. An exemplary code for implementing the 3-D manipulation system of the present invention is provided in Appendix L. The exemplary source code was written in C++ programming language and includes the various processes and operations for calculating the dynamic rotation axis. Comments are provided in the code of Appendix L to facilitate the analysis of the logic and algorithms used therein.

Although the 3-D manipulation system described above has been described with respect to the use of a joystick device and control buttons, the system may also be implemented by any other particular type of input means, including a mouse or keyboard. Further, in the above-described embodiments of FIGS. 37–38, boundaries may be defined to limit zooming or panning of the object in or out of the screen into infinity, since such continuous zooming or panning may cause the system to fail or crash.

In addition, various other features may be implemented in connection with the joystick interface. For example, movement in any of the viewing functions may not be effectuated unless the joystick is moved beyond a predetermined range or distance from the joystick center position. Requiring such a threshold of movement of the joystick before movement of the part is permitted prevents accidental movements of the rendered part based on inadvertent handling or pushing of the joystick from the center position. Other features may also be provided to improve the joystick interface and system interaction with the user. For instance, continuous or incremental (e.g., step-wise) movement in any one of the viewing functions (e.g., zoom, rotate, pan, etc.) may be provided based on the single operation of the joystick by the user. Selection of the continuous or incremental movements may also be provided based on the amount or duration of movement of the joys-tick in any single direction. If desired, the rate of scaling or movement of the rendered part may also be increased based on the degree or duration of movement of the joystick in any direction. Modification of the speed adjustment factor described above may also be implemented by permitting the user to manual insert the correction to the adjustment factor to increase or decrease the rate of scaling.

Various other features and embodiments may also be implemented in the present invention in order to aid in the design and manufacturing of components at the factory. For example, a bar code system may be implemented to keep track of and access information concerning each customer's order. A bar code with a predetermined reference or job number may be assigned to each part ordered by a customer. This bar code may be used for accessing and retrieving job information from database 30. A bar code reader or scanner, such as a Barcode Anything SCAN CCD sensor from Zebra Technologies VTI, Inc., Sandy, Utah, may be provided at each of the locations to permit users to scan the bar code for a particular job in to the server module or station module and to access and retrieve critical design and manufacturing information associated with that part that is stored in database 30. The bar code reader may be plugged into the computer of each of the station modules and/or the server module. The bar codes may be formatted in accordance with any conventional bar code formats, such as UPC-A, Codabar, Code 39, EAN/JAN-8 or Plessey, and the resultant bar code number may be translated in accordance with a lookup table to find the corresponding job reference number and/or file name in order to retrieve the job information from the database. Alternatively, the job number may be typed in or selected from a displayed directory at any of the stations located throughout the factory to instantaneously retrieve and display the job information at the user's location. The ability to instantaneously retrieve such information is aided by the use of communications network 26 and the storage of the design and information at a centrally located database, such as database 30.

In accordance with yet another aspect of the present invention, an apparatus and method for scheduling and assigning jobs may be provided in the proposed system. Conventionally, the scheduling and assignment of jobs throughout a manufacturing facility is performed by a shop or factory foreman who determines the current set-up and availability of machinery, as well as the status of current jobs. After gathering and analyzing this information, the shop or factory foreman may develop a schedule and distribute the assignments for the jobs (e.g., in the form of a job schedule sheet that is distributed to the factory floor) that are to be performed at the various locations in the factory. The scheduling and assignment of jobs is provided to ensure that each customer's job is completed in a timely fashion and by the specified delivery date. The conventional process of scheduling and assigning jobs is, however, often arduous and usually performed manually by the factory foreman.

In accordance with an aspect of the invention, a job assignment and scheduling system may be provided to assist a shop or factory foreman in establishing job schedules for the factory. The system may take advantage of communications network 26 and the bend model information that is stored in database 30 to automatically gather the necessary information so that the shop foreman may more easily develop a job schedule. The system may be implemented through software or programmed logic at the server module or station modules located throughout the factory. By entering the various jobs that need to be scheduled, the system software may analyze the design and part information and determine which machines are best suited for doing particular jobs. For this purpose, the current status and set-up of the machinery in the factory may be defined and stored in database 30 and accessed by the job scheduler software. Based on various criteria, the software may suggest to the foreman, in the form of a display, which machines are available to perform a particular job and which machines cannot perform other jobs. In this regard, a table may be displayed that ranks the availability of machines for particular jobs and that provides a proposed job schedule that may be implemented or modified by the shop foreman.

The criteria that may be used to set and recommend job schedules may include a wide variety of criteria including the current set-up of each machine in the factory, the types of bends and tooling required for each job and the other types of jobs that need to be performed within the same time frame or period. Information from the bend model file for each part may also be utilized, such as the bend angle, the flange length, and type of bending, in order to determine which machines can perform a particular job. A table stored at, for example, database 30, may include critical information as to the current set-up and capabilities of each of the punching and bending machines on the shop floor.

Based on the proposed job schedule, the foreman may assign jobs to various locations throughout the factory in order to optimize production and output capacity of the factory. The final job schedule or assignment may be entered electronically and routed to each of the machines through communications network 26. A pilot lamp, such as an LED, may be provided at each of the bending or machinery work stations to indicate and confirm that a job has been assigned or transferred to that station. The job assignment and schedule may be stored in a file of the server module that can be accessed instantaneously from any location within the factory.

In addition to the above features, other miscellaneous features may be implemented in accordance with the teachings of the present invention. For example, menu screens may be provided and displayed at the various station modules and locations to facilitate the user in selecting the various display and function modes of the present invention. For example, a main menu screen such as that shown in FIG. 42 may be provided to a user when the station module is initialized. The main menu window display may include icon images of each of the available window displays and viewing modes provided by the station module. The main menu screen may pop-up anytime a menu button (e.g., F1 key) is selected. The user may select a window by moving a highlighted block to the desired window icon and selecting the same. Such operations may be performed through the use of a keyboard, mouse or joystick.

Figure 43:
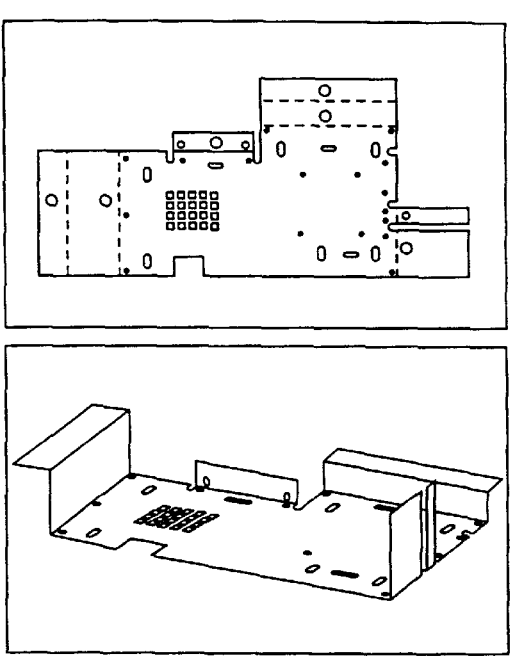
FIG. 43 illustrates an exemplary part information window display that may be provided to permit a user to enter and modify part information.
Figure 44:
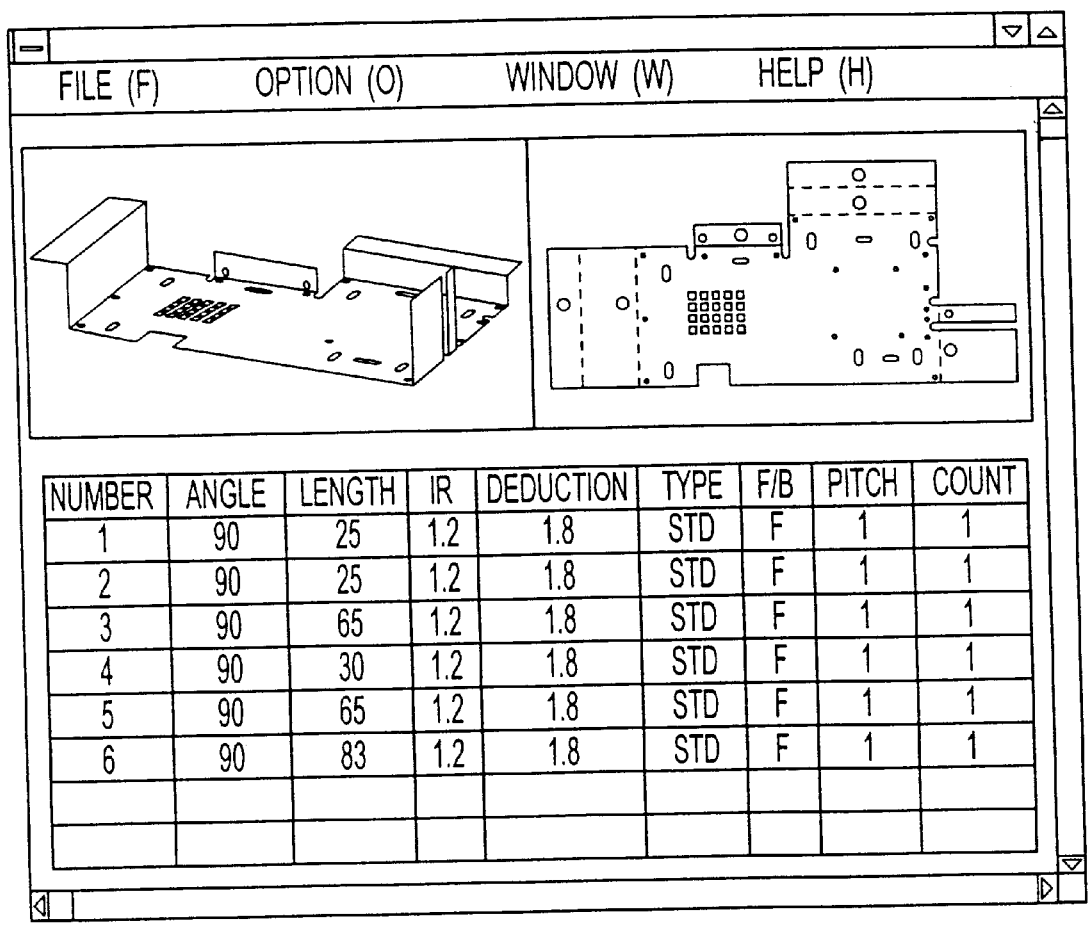
FIG. 44 illustrates an exemplary bendline information window display that may be provided to permit a user to enter and modify bendline information.

Other window screens may also be provided and displayed to the user to facilitate the entry and display of the job information. For example, a part information window may be displayed to permit a user to enter or modify the part information. An example of a part information window display is provided in FIG. 43. The part information window may include all of the pertinent part information (e.g., part number, material type, dimensions, etc.) and may include a 2-D flat drawing and isometric view of the sheet metal part. A bendline information window, such as that illustrated in FIG. 44, may also be provided to allow a user to view the various bendline information, including the bend sequence and deduction amount for each bendline. The bendline information window may permit the user to enter or modify the bendline information for each bend, and may include both a 2-D flat drawing and isometric view of the sheet metal part.

Figure 45:
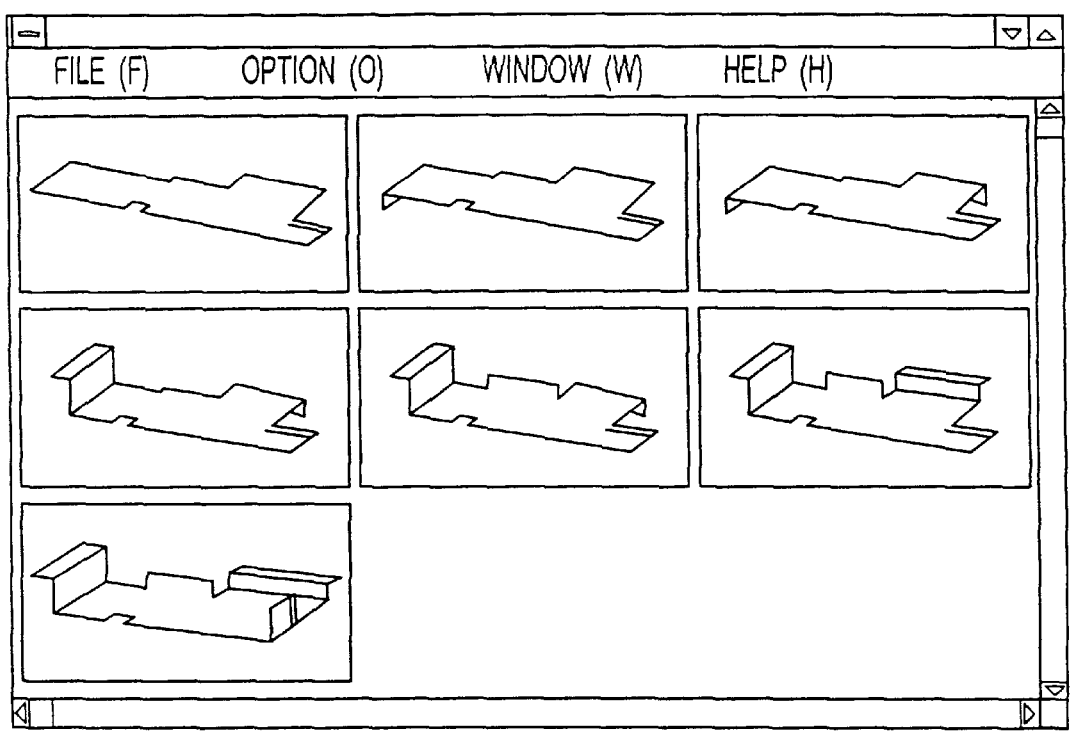
FIG. 45 illustrates an exemplary bend sequence window display of the present invention for viewing the intermediate bend stages of a sheet metal part.
Figure 46:
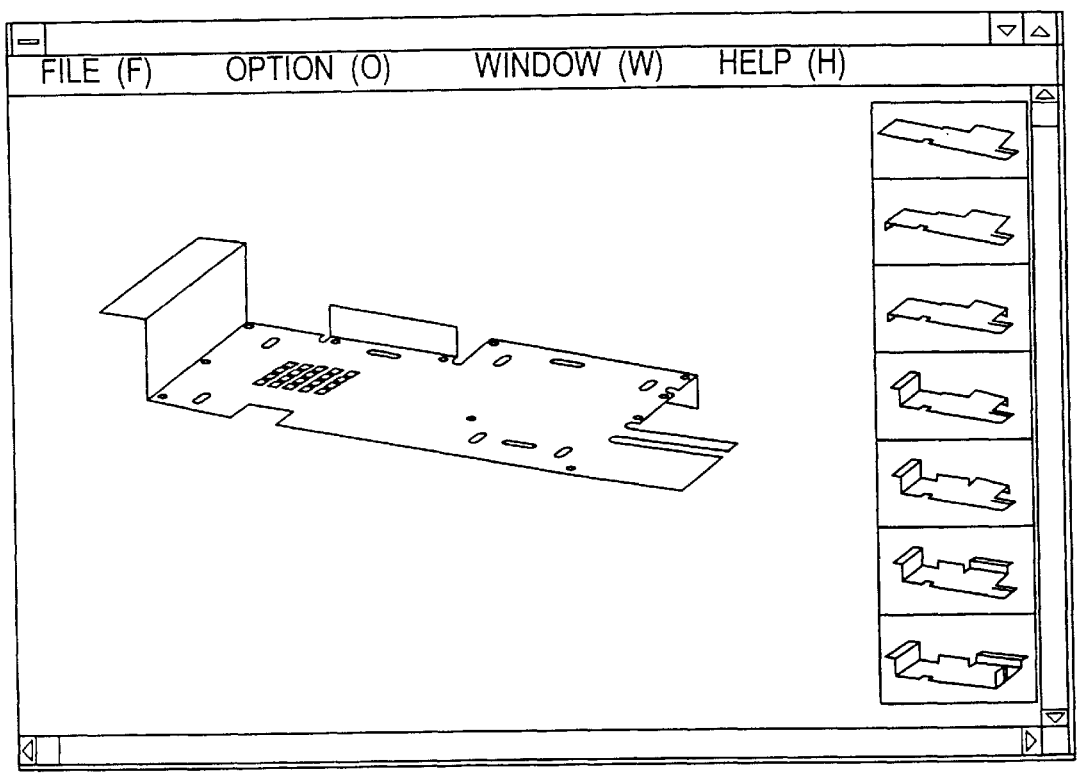
FIG. 46 illustrates an exemplary bend simulation window display of the invention for simulating the intermediate bend stages of a sheet metal part.

Additional window display may also be provided to facilitate a bending operator's analysis of the bending sequence. For example, a bend sequence window display and a bend simulation window display may be provided to indicate the various bending stages of the part and to simulate the part orientation during bending operations. A bend sequence window, such as that shown in FIG. 45, may be selected from the main menu screen and displayed to the user to indicate the intermediate shapes of the part (in static form) at each stage of the bending sequence. A bend simulation window (see, e.g., FIG. 46) may also be selected by the user and provide both static information of the bending stages (in the form of part icons provided on the righthand side of the screen) and active simulation (in the center of the display) of the orientation and bending performed at each stage in the bend sequence. By intermittently selecting the part icons on the screen, the user may view an active simulation of the orientation of the part during bending at the stage represented by the selected part icon. The part may be flipped, translated and bent/rotated about the bendlines in order to actively simulate each bend sequence.

Figure 42:
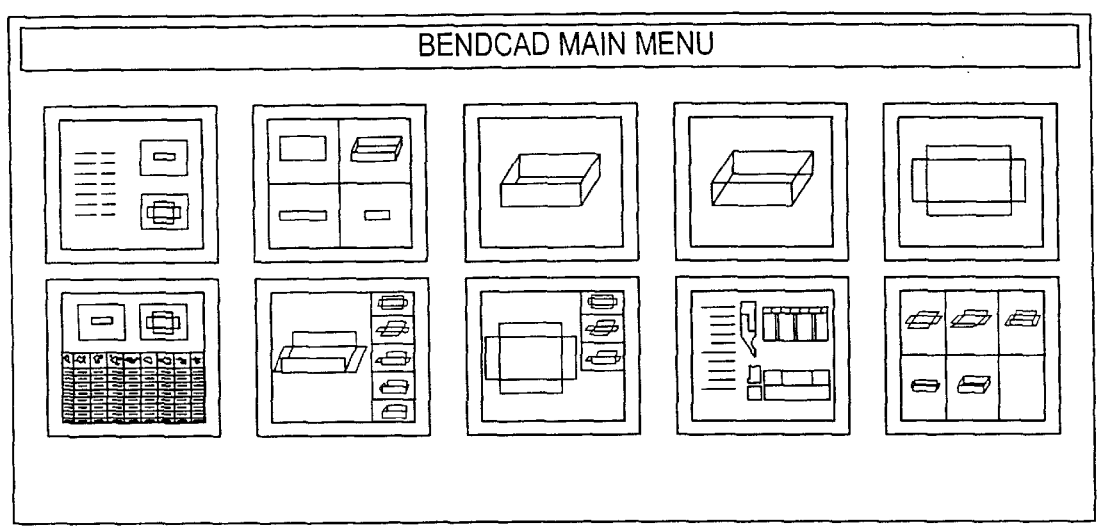
FIG. 42 illustrates an example of a main menu window display that may be provided and displayed at, for example, a station module.
Figure 47A:
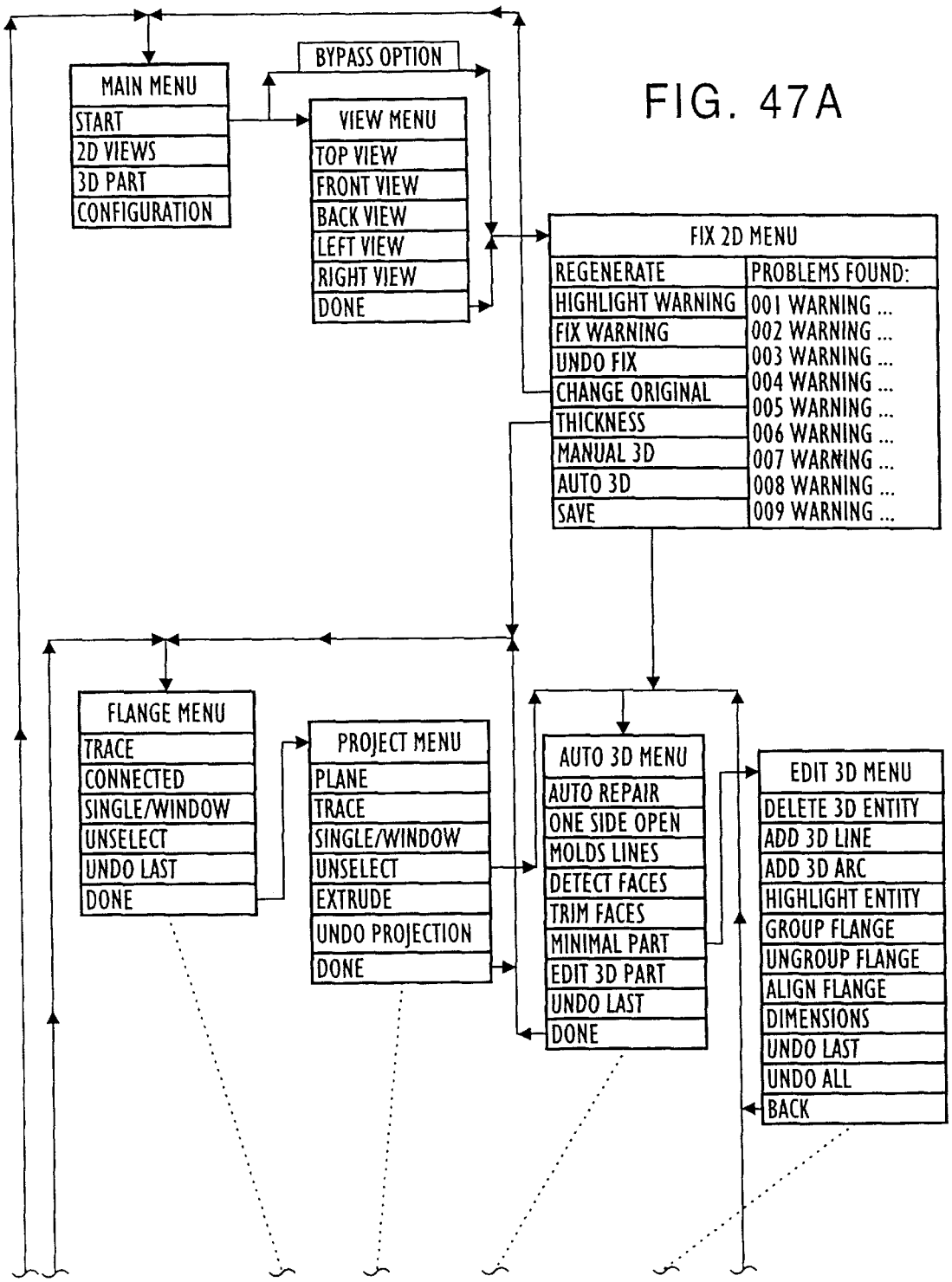
FIG. 47 is an exemplary menu screen diagram and structure of the present invention that may be provided and displayed to users for 2-D to 3-D conversions.
Figure 47B:
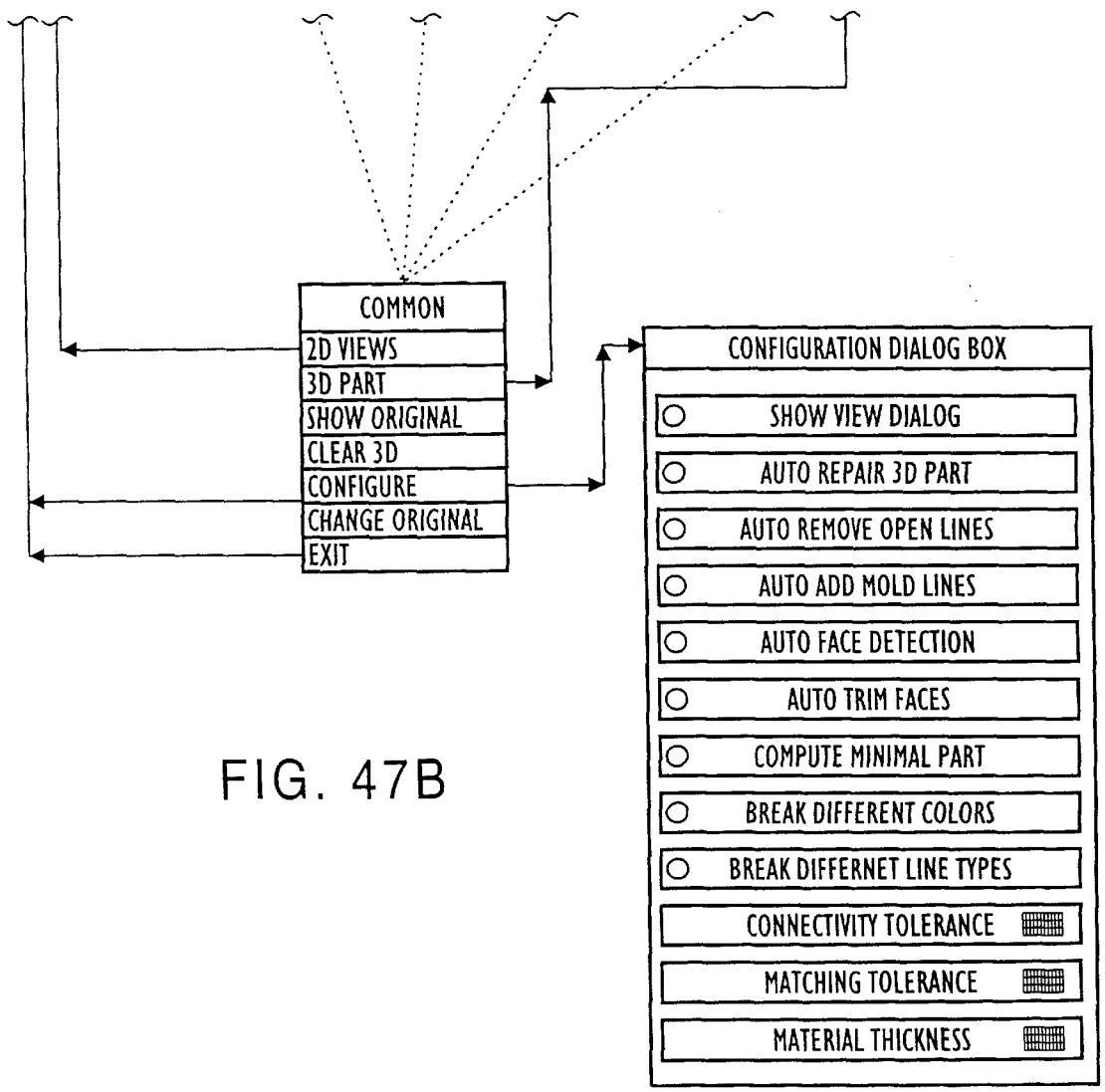

Each of the above-described window displays of FIGS. 43–46 may be selected and displayed to a user from the main menu window display of FIG. 42. In addition, a user at any of the station modules may select the appropriate window icons in the main menu window display to have the 2-D and/or 3-D representations of the part displayed in accordance with the viewing modes (e.g., 2-D flat, wire-frame, solid, orthographic) of the invention, as described in greater detail above with reference to FIGS. 19–22. Various menu windows may also be provided, for example, at the station modules to facilitate the operation of the features and functions of the present invention. FIG. 47 illustrates exemplary menus that may be displayed for the 2-D to 3-D operations. In addition, FIG. 48 illustrates an exemplary menu structure for the 2-D cleanup operation of the invention. The present invention, however, is not limited to these menu arrangement, and other menu screens and/or tool icon bars may be provided to facilitate a user's interaction with the system.

Other features may also be implemented in the present invention. For example, higher levels of automation may be provided to facilitate the development of the bending plan. For example, bending and tooling expert systems may be provided to develop and propose tooling set-up and bending sequences based on the part geometry and shape for each job, such as that disclosed in pending, U.S. patent application Ser. Nos. 08/386,369 and 08/338,115, now U.S. Pat. No. 5,835,684.

While the invention has been described with reference to several exemplary embodiments, it is understood that the words which have been used herein are words of description and illustration, rather than words of limitations. Changes may be made without departing from the scope and spirit of the invention and its various aspects. Although the invention has been described herein with reference to particular means, materials and embodiments, the invention is not intended to be limited to the particulars disclosed herein; rather, the invention extends to all functionally equivalent structures, methods and uses.

What is claimed:

1. A system for developing a bend model of a part to be produced in an intelligent production facility, said part including a plurality of faces, each face being defined in a single plane, and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system.

2. A system according to claim 1, wherein said first predetermined coordinate space comprises a 3-D coordinate space and said second predetermined coordinate space comprises a 2-D coordinate space, said predetermined operation comprising an unfolding operation performed on said faces detected by said face detecting system.

3. A system according to claim 1, wherein said data relating to a representation of said part within a first predetermined coordinate space comprises coordinate data.

4. A system according to claim 1, wherein said part comprises a sheet metal part.

5. A system according to claim 1, further comprising a system for detecting additional features of said part, said predetermined operation being performed on said additional features of said part.

6. A system according to claim 5, said additional features comprising holes, openings and special formings of said part.

7. A system according to claim 1, wherein said initial part information comprises data relating to a representation of said part in 3-D coordinate space, said data including thickness data of said part in said 3-D coordinate space.

8. A system according to claim 7, further comprising a system for eliminating said thickness data to provide modified part data relating to a representing of said part in said 3-D coordinate space with no thickness.

9. A system according to claim 1, wherein said bendline identification system comprises a system for detecting common edges between said faces detected by said face detecting system, said at least one bendline being identified based on the detection of one of said faces having only one common edge with another one of said faces.

10. A system according to claim 9, wherein said at least one bendline is identified and defined at said one common edge detected between said faces.

11. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a generating system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said first predetermined coordinate space comprises a 2-D coordinate space and said second predetermined coordinate space comprises a 3-D coordinate space, said predetermined operation comprising a folding operation performed on said faces detected by said face detecting system.

12. A system according to claim 11, said folding operation including rotating and translating each of said faces detected by said face detecting system relative to at least one bendline identified by said bendline identification system.

13. A system according to claim 11, wherein said initial part information further comprises a bend angle amount relating to at least one bendline of said part, said folding operation being performed based on said bend angle amount.

14. A system according to claim 13, wherein said folding operation comprises rotating and translating each of said faces around at least one bendline of said part based on said bend angle amount.

15. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said first predetermined coordinate space comprises a 3-D coordinate space and said second predetermined coordinate space comprises a 2-D coordinate space, said predetermined operation comprising an unfolding operation performed on said faces detected by said face detecting system, said unfolding operation including rotating and translating each of said faces detected by said face detecting system relative to at least one bendline identified by said bendline identification system.

16. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said first predetermined coordinate space comprises a 3-D coordinate space and said second predetermined coordinate space comprises a 2-D coordinate space, said predetermined operation comprising an unfolding operation performed on said faces detected by said face detecting system, said unfolding operation including rotating and translating each of said faces detected by said face detecting system relative to at least one bendline identified by said bendline identification system wherein said initial part information further comprises a bend angle amount relating to at least one bendline of said part, said unfolding operation being performed based on said bend angle amount.

17. A system according to claim 16, wherein said unfolding operation comprises rotating and translating each of said faces around at least one bendline of said part based on said bend angle amount.

18. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said data relating to a representation of said part within a first predetermined coordinate space comprises vector data.

19. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said faces comprise base surfaces of said part and folded surfaces of said part.

20. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space, said initial part information comprising data relating to a representation of said part in a 3-D coordinate space, said data including thickness data of said part in said 3-D coordinate space;

a face detecting system for detecting, within said first predetermined coordinate space, said faces of said part based on said initial part information;

a bendline identification system for identifying at least one bendline of said part based on said faces detected by said face detecting system;

a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system; and a system for eliminating said thickness data to provide modified part data relating to a representation of said part in said 3-D coordinate space with no thickness, wherein said face detecting system detects said faces of said part based on said modified part data and said representation of said part in said 3-D coordinate space with no thickness.

21. A system according to claim 20, wherein said second predetermined coordinate space comprises a 2-D coordinate space, said predetermined operation comprising an unfolding operation performed on said faces detected by said face detecting system.

22. A system according to claim 21, said unfolding operation including rotating and translating each of said faces detected by said face detecting system relative to at least one bendline identified by said bendline indentification system.

23. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a generating system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, said system further comprising an auto-trimming and cleanup system for performing an auto-trimming and cleanup operation on said data relating to said initial part information to prepare said data for said face detecting system and said bendline identification system.

24. A system according to claim 23, wherein said data comprises part entity data representing, at least, line entities and bendline entities of said part, said auto-trimming and cleanup system comprising a system for detecting intersection points of said entities and for selectively breaking said entities at detected intersection points, and a system for assigning the resultant broken entities to have a common endpoint based on said detected intersection points.

25. A system according to claim 23, wherein said data comprises part entity data representing, at least, line entities of said part, said auto-trimming and cleanup system comprising a system for detecting open intersection areas between adjacent entities and for selectively connecting said adjacent entities by assigning a common endpoint to said adjacent entities.

26. A system according to claim 25, wherein an open intersection area is detected, by said system for detecting open intersection areas, if the endpoints of said adjacent entities are within a predetermined distance from one another.

27. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said data relating to said initial part information comprises part entity data representing, at least, line entities of said part, said face detecting system performing a loop and entity analysis of said part based on said part entity data to detect said faces of said part.

28. A system according to claim 27, wherein said loop and entity analysis is initially performed on an outside boundary of said part and then performed on inner boundaries and areas of said part.

29. A system according to claim 28, wherein said face detecting system generates an initial linked list of entities when performing said loop and entity analysis on the outside boundary of said part, said initial linked list of entities defining an outward loop and boundary of said part.

30. A system according to claim 29, wherein said face detecting system further generates an additional linked list of entities when performing said loop and entity analysis on the inside boundaries and areas of said part, said additional linked list of entities defining inner loops and boundaries of said part.

31. A system according to claim 30, wherein said face detecting system further comprises a system for generating a loop tree based on said outward loop defined by said initial linked list of entities and said inner loops defined by said additional linked list of entities.

32. A system according to claim 31, wherein said face detecting system detects said faces of said part based on said loop tree and the sequence of boundaries defined by said initial linked list entities and said additional linked list of entities.

33. A system according to claim 30, wherein said bendline identification system comprises a system for analyzing said initial linked list of entities and said additional linked list of entities to determine common line entities between said faces detected by said face detecting system.

34. A system according to claim 33, said at least one bendline being identified based on the detection of one of said faces having only one common line entity with another one of said faces.

35. A system according to claim 34, wherein said at least one bendline is identified and defined at said one common line entity detected between said faces.

36. A system according to claim 34, wherein said bendline identification system applies predetermined heuristics to identify bendlines of said part when said system for determining common line entities detects that there are more than one common line entity between said faces.

37. A system according to claim 36, wherein said heuristics comprise identifying bendlines of said part such that a minimum number of total bendlines are identified for said part.

38. A system according to claim 36, wherein said heuristics comprise identifying bendlines of said part, when one of said faces have more than one common line entity with another one of said faces, based on the common line entity that has the longest length.

39. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, wherein said bendline identification system comprises a system for detecting common edges between said faces detected by said face detecting system, said at least one bendline being identified based on the detection of one of said faces having only one common edge with another one of said faces, and wherein said bendline identification system applies predetermined heuristics to identify bendlines of said part when said system for detecting common edges detects that there are more than one common edge between said faces.

40. A system according to claim 39, wherein said heuristics comprise identifying bendlines of said part such that a minimum number of total bendlines are identified for said part.

41. A system according to claim 39, wherein said heuristics comprise identifying bendlines of said part, when one of said faces have more than one common edge with another one of said faces, based on the common edge that has the longest length.

42. A system for developing a bend model of a part to be produced in an intelligent production facility, said part including a plurality of faces and at least one bendline, said system comprising:

a receiving system for receiving initial part information relating to said part, said initial part information including data relating to a representation of said part within a first predetermined coordinate space;

a face detecting system for detecting, within said first predetermined coordinate space, said faces of said part based on said initial part information;

a bendline identification system for identifying at least one bendline of said part based on said faces detected by said face detecting system; and a generating system for generating additional part information, relating to said part and including data relating to a representation of said part within a second predetermined coordinate space, by performing a predetermined operation on each of said faces detected by said face detecting system, said operation being performed based upon at least said initial part information and at least one bendline identified by said bendline identification system, said system further comprising a system for receiving a deduction amount related to said part and a system for compensating for bend deduction, when performing said predetermined operation on said faces, based on said deduction amount.

43. A system according to claim 42, wherein said predetermined operation comprises a folding operation performed on said faces detected by said face detecting system, said system for compensating for bend deduction increasing a dimensional length of said faces by one half of said deduction amount on each side of said bendline of said part when performing said folding operation.

44. A system according to claim 42, wherein said predetermined operation comprises an unfolding operation performed on said faces detected by said face detecting system, said system for compensating for bend deduction decreasing a dimensional length of said faces by one half of said deduction amount on each side of said bendline of said part when performing said unfolding operation.

45. A method for developing a bend model of a part to be produced in an intelligent production facility, said part including a plurality of faces, each face being defined in a single plane, and at least one bendline, said method comprising:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting; and generating additional part information, including data relating to a representation of said part within a second predetermined coordinate space, by performing a predetermined operation on each of said faces detected by said detecting, said operation being performed based upon said initial part information and at least one bendline identified by said identifying.

46. A method according to claim 45, wherein said first predetermined coordinate space comprises a 3-D coordinate space and said second predetermined coordinate space comprises a 2-D coordinate space, said method further comprising performing an unfolding operation on said faces detected by said detecting.

47. A method according to claim 46, wherein said intial part information further comprises a bend angle amount relating to at least one bendline of said part, said unfolding operating being performed based on said bend angle amount.

48. A method according to claim 47, wherein said unfolding operation comprises rotating and translating each of said faces around at least one bendline of said part based on said bend angle amount.

49. A method according to claim 45, further comprising detecting additional features of said part, said predetermined operation being performed on said additional features of said part.

50. A method according to claim 49, said additional features comprising holes, openings and special formings of said part.

51. A method according to claim 45, wherein said initial part information comprises data relating to a representation of said part in a 3-D coordinate space, said data including thickness data of said part in said 3-D coordinate space.

52. A method according to claim 51, further comprising eliminating said thickness data to provide modified part data relating to a representation of said part in said 3-D coordinate space with no thickness.

53. A method according to claim 45, wherein said identifying said at least one bendline comprises detecting common edges between said faces detected by said detecting, said at least one bendline being identified based on the detection of one of said faces having only one common edge with another one of said faces.

54. A method for developing a bend model of a part to be produced in an intelligent production facility, said part including a plurality of faces and at least one bendline, said method comprising the steps of:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting; and generating additional part information, including data relating to a representation of said part within a second predetermined coordinate space, by performing a predetermined operation on each of said faces detected by said detecting, said operation being performed based upon said initial part information and at least one bendline identified by said identifying, wherein said first predetermined coordinate space comprises a 2-D coordinate space and said second predetermined coordinate space comprises a 3-D coordinate space, said method further comprising performing a folding operation on said faces detected by said detecting.

55. A method according to claim 54, said folding operation including rotating and translating each of said faces relative to at least on bendline identified by said identifying.

56. A method according to claim 54, wherein said intial part information further comprises a bend angle amount relating to at least one bendline of said part, said folding operation being performed based on said bend angle amount.

57. A method according to claim 56, wherein said folding operation comprises rotating and translating each of said faces around at least one bendline of said part based on said bend angle amount.

58. A method for developing a bend model of a part to be produced in an intelligent production facility, said part including a plurality of faces and at least one bendline, said method comprising:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting;

generating additional part information, including data relating to a representation of said part within a second predetermined coordinate space, by performing a predetermined operation on each of said faces detected by said detecting, said operation being performed based upon said initial part information and at least one bendline identified by said identifying; and performing an unfolding operation on said faces detected by said detecting, said unfolding operation including rotating and translating each of said faces relative to at least one bendline identified by said identifying wherein said first predetermined coordinate space comprises a 3-D coordinate space and said second predetermined coordinate space comprises a 2-D coordinate space.

59. A method for developing a bend model of a part to be produced in an intelligent production facility, said part including a plurality of faces and at least one bendline, said method comprising:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting;

generating additional part information, including data relating to a representation of said part within a second predetermined coordinate space, by performing a predetermined operation on each of said faces detected by said detecting, said operation being performed based upon said initial part information and at least one bendline identified by said identifying, said initial part information comprising data relating to a representation of said part in a 3-D coordinate space, said data including thickness data of said part in said 3-D coordinate space; and eliminating said thickness data to provide modified part data relating to a representation of said part in said 3-D coordinate space with no thickness, wherein said detecting said faces of said part is adapted to be performed based on said modified part data and said representation of said part in said 3-D coordinate space with no thickness.

60. A method according to claim 59, wherein said second predetermined coordinate space comprises a 2-D coordinate space, said method further comprising performing an unfolding operation on said faces detected by said detecting.

61. A method for developing a bend model of a part to be produced in an intelligent production facility, said part including a plurality of faces and at least one bendline, said method comprising the steps of:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting; and generating additional part information, including data relating to a representation of said part within a second predetermined coordinate space, by performing a predetermined operation on each of said faces detected by said detecting, said operation being performed based upon said initial part information and at least one bendline identified by said identifying, said method further comprising performing an autotrimming and cleanup operation on said data of said initial part information before detecting said faces and identifying said at least one bendline.

62. A method for developing a bend model of a part to be produced in an intelligent production facility, said part including a plurality of faces and at least one bendline, said method comprising:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting; and generating additional part information, including data relating to a representation of said part within a second predetermined coordinate space, by performing a predetermined operation on each of said faces detected by said detecting, said operation being performed based upon said initial part information and at least one bendline identified by said identifying, wherein said data of said initial part information comprises part entity data representing, at least, line entities of said part, said detecting of said faces comprising performing a loop and entity analysis of said part based on said part entity data to detect said faces of said part.

63. A method according to claim 62, wherein said loop and entity analysis is initially performed on an outside boundary of said part and then performed on inner boundaries and areas of said part.

64. A method for developing a bend model of a part to be produced in an intelligent production facility, said part including a plurality of faces and at least one bendline, said method comprising:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting; and generating additional part information, including data relating to a representation of said part within a second predetermined coordinate space, by performing a predetermined operation on each of said faces detected by said detecting, said operation being performed based upon said initial part information and at least one bendline identified by said identifying, wherein said identifying at least one bendline comprises detecting common edges between said faces detected by said detecting, said at least one bendline being identified based on the detection of one of said faces having only one common edge with another one of said faces, wherein said identifying at least one bendline further comprises applying predetermined heuristics to identify bendlines of said part when more than one common edge between said faces is detected.

65. A method according to claim 64, wherein said heuristics comprise identifying bendlines of said part such that a minimum number of total bendlines are identified for said part.

66. A method according to claim 64, wherein said heuristics comprise identifying bendlines of said part, when one of said faces have more than one common edge with another one of said faces, based on the common edge that has the longest length.

67. A method for developing a bend model of a part to be produced in an intelligent production facility, said part including a plurality of faces and at least one bendline, said method comprising the steps of:

receiving initial part information relating to said part, said initial part information including data relating to a representation of said part within a first predetermined coordinate space;

detecting, within said first predetermined coordinate space, said faces of said part based on said initial part information;

identifying at least one bendline of said part based on said faces detected by said detecting; and generating additional part information, including data relating to a representation of said part within a second predetermined coordinate space, by performing a predetermined operation on each of said faces detected by said detecting, said operation being performed based upon said initial part information and at least one bendline identified by said identifying, said method further comprising receiving a deduction amount related to said part and compensating for bend deduction, when performing said predetermined operation on said faces, based on said deduction amount.

68. A method according to claim 67, further comprising performing a folding operation on said faces, said compensating for bend deduction comprising increasing a dimensional length of said faces by one half of said deduction amount on each side of said bendline of said part when said folding operation is performed.

69. A method according to claim 67, further comprising performing an unfolding operation on said faces, said compensating for bend deduction comprising decreasing a dimensional length of said faces by one half of said deduction amount on each side of said bendline of said part when said unfolding operation is performed.

70. A system for developing a bend model of a part to be produced in a production facility, said part including a plurality of faces, each face being defined in a single plane and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means.

71. A system according to claim 70, wherein said first predetermined coordinate space comprises a 3-D coordinate space and said second predetermined coordinate space comprises a 2-D coordinate space, said predetermined operation comprising an unfolding operation performed on said faces detected by said face detecting means.

72. A system according to claim 70, further comprising means for detecting additional features of said part, said predetermined operation being performed on said additional features of said part.

73. A system according to claim 72, said additional features comprising holes, openings and special formings of said part.

74. A system according to claim 70, wherein said initial part information comprises data relating to a representation of said part in a 3-D coordinate space, said data including thickness data of said part in said 3-D coordinate space.

75. A system according to claim 74, further comprising means for eliminating said thickness data to provide modified part data relating to a representation of said part in said 3-D coordinate space with no thickness.

76. A system according to claim 70, wherein said bendline identification means comprises means for detecting common edges between said faces detected by said face detecting means, said at least one bendline being identified based on the detection of one of said faces having only one common edge with another one of said faces.

77. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means, wherein said first predetermined coordinate space comprises a 2-D coordinate space and said second predetermined coordinate space comprises a 3-D coordinate space, said predetermined operation comprising a folding operation performed on said faces detected by said face detecting means.

78. A system according to claim 77, said folding operation including rotating and translating each of said faces detected by said face detecting means relative to at least one bendline identified by said bendline identification means.

79. A system according to claim 77, wherein said initial part information further comprises a bend angle amount relating to at least one bendline of said part, said folding operation being performed based on said bend angle amount.

80. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means, wherein said first predetermined coordinate space comprises a 3-D coordinate space and said second predetermined coordinate space comprises a 2-D coordinate space, and said predetermined operation comprises an unfolding operation performed on said faces detected by said face detecting means, and further wherein said unfolding operation includes rotating and translating each of said faces detected by said face detecting means relative to at least one bendline identified by said bendline identification means.

81. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate spaces, by performing a predetermined operation on said faces detected by said detecting means, said predetermined operation being performed based on, at least in part, said bendline identified by said bendline determining means, wherein said first predetermined coordinate space comprises a 3-D coordinate space and said second predetermined coordinate space comprises a 2-D coordinate space, said predetermined operation comprising an unfolding operation performed on said faces detected by said face detecting means, wherein said initial part information further comprises a bend angle amount relating to at least one bendline of said part, said unfolding operation being performed based on said bend angle amount.

82. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space, said initial part information comprising data relating to a representation of said part in a 3-D coordinate space, said data including thickness data of said part in said 3-D coordinate space, means for detecting, within said first predetermined coordinate space, said faces of said part based on said initial part information;

means for identifying at least one bendline of said part based on said faces detected by said face detecting means;

means for generating additional part information, including data relating to a representation of said part within a second predetermined coordinate space, by performing a predetermined operation on said faces detected by said detecting means, said predetermined operation being performed based on, at least in part, said bendline identified by said bendline determining means; and means for eliminating said thickness data to provide modified part data relating to a representation of said part in said 3-D coordinate space with no thickness, wherein said face detecting means detects said faces of said part based on said modified part data and said representation of said part in said 3-D coordinate space with no thickness.

83. A system according to claim 82, wherein said second predetermined coordinate space comprises a 2-D coordinate space, said predetermined operation comprising an unfolding operation performed on said faces detected by said face detecting means.

84. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means, said system further comprising auto-trimming and cleanup means for performing an auto-trimming and cleanup operation on said data relating to said initial part information to prepare said data for said face detecting means and said bendline identification means.

85. A system according to claim 84, wherein said data comprises part entity data representing, at least, line entities and bendline entities of said part, said auto-trimming and cleanup means comprising means for detecting intersection points of said entities and for selectively breaking said entities at detected intersection points, and means for assigning the resultant broken entities to have a common endpoint based on said detected intersection points.

86. A system according to claim 84, wherein said data comprises part entity data representing, at least, line entities of said part, said auto-trimming and cleanup means comprising means for detecting open intersection areas between adjacent entities and for selectively connecting said adjacent entities by assigning a common endpoint to said adjacent entities.

87. A system according to claim 86, wherein an open intersection area is detected, by said means for detecting open intersection areas, if the endpoints of said adjacent entities are within a predetermined distance from one another.

88. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means, wherein said data relating to said initial part information comprises part entity data representing, at least, line entities of said part, said face detecting means performing a loop and entity analysis of said part based on said part entity data to detect said faces of said part.

89. A system according to claim 88, wherein said loop and entity analysis is initially performed on an outside boundary of said part and then performed on inner boundaries and areas of said part.

90. A system according to claim 89, wherein said face detecting means generates an initial linked list of entities when performing said loop and entity analysis on the outside boundary of said part, said initial linked list of entities defining an outward loop and boundary of said part.

91. A system according to claim 90, wherein said face detecting means further generates an additional linked list of entities when performing said loop and entity analysis on the inside boundaries and areas of said part, said additional linked list of entities defining inner loops and boundaries of said part.

92. A system according to claim 91, wherein said face detecting means further comprises means for generating a loop tree based on said outward loop defined by said initial linked list of entities and said inner loops defined by said additional linked list of entities.

93. A system according to claim 92, wherein said face detecting means detects said faces of said part based on said loop tree and the sequence of boundaries defined by said initial linked list entities and said additional linked list of entities.

94. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means, and wherein said bendline identification means comprises means for detecting common edges between said faces detected by said face detecting means, said at least one bendline being identified based on the detection of one of said faces having only one common edge with another one of said faces wherein said bendline identification means applies predetermined heuristics to identify bendlines of said part when said means for detecting common edges detects that there are more than one common edge between said faces.

95. A system according to claim 94, wherein said heuristics comprise identifying bendlines of said part such that a minimum number of total bendlines are identified for said part.

96. A system according to claim 94, wherein said heuristics comprise identifying bendlines of said part, when one of said faces have more than one common edge with another one of said faces, based on the common edge that has the longest length.

97. A system for developing a bend model of a part to be produced in a production facility, said part including a plurality of faces and at least one bendline, said system comprising:

means for receiving initial part information relating to said part, said initial part information including data relating to a representation of said part within a first predetermined coordinate space;

means for detecting, within said first predetermined coordinate space, said faces of said part based on said initial part information;

means for identifying at least one bendline of said part based on said faces detected by said face detecting means; and means for generating additional part information, including data relating to a representation of said part within a second predetermined coordinate space, by performing a predetermined operation on said faces detected by said detecting means, said predetermined operation being performed based on, at least in part, said bendline identified by said bendline determining means, said system further comprising means for receiving a deduction amount related to said part and means for compensating for bend deduction, when performing said predetermined operation on said faces, based on said deduction amount.

98. A system according to claim 97, wherein said predetermined operation comprises a folding operation performed on said faces detected by said face detecting means, said means for compensating for bend deduction increasing a dimensional length of said faces by one half of said deduction amount on each side of said bendline of said part when performing said folding operation.

99. A system according to claim 97, wherein said predetermined operation comprises an unfolding operation performed on said faces detected by said face detecting means, said means for compensating for bend deduction decreasing a dimensional length of said faces by one half of said deduction amount on each side of said bendline of said part when performing said unfolding operation.

100. A system for developing a bend model of a part to be produced in an intelligent production facility, said system comprising:

a receiving system for receiving initial part information relating to said part, said initial part information comprising respective representations of a plurality of views said part in 2-D coordinate space, each of said representations including part thickness representations of said part, said initial part information further comprising extraneous information;

a cleanup operation system that performs a 2-D cleanup operation on said initial part information to eliminate said extraneous information and to identify each of said representations;

a part thickness elimination system for selectively eliminating said part thickness representations in each of said identified representations to provide modified representations of said views of said part in 2-D coordinate space with no thickness; and a system for developing a representation of said part in 3-D coordinate space based on said modified representations of said part in 2-D coordinate space with no thickness.

101. A system according to claim 100, wherein said initial part information comprises part entity data representing, at least, line entities of said part, said cleanup operation system comprising a break and trimming system for detecting intersection points of said entities and for selectively breaking said entities at detected intersection points, said break and trimming system assigning the resultant broken entities to have a common endpoint based on said detected intersection points.

102. A system according to claim 101, said break and trimming system further comprising a system for detecting open intersection areas between adjacent entities and for selectively connecting said adjacent entities by assigning a common endpoint to said adjacent entities.

103. A system according to claim 102, wherein an open intersection area is detected, by said system for detecting open intersection areas, if the endpoints of said adjacent entities are within a predetermined distance from one another.

104. A system according to claim 100, wherein said cleanup operation system comprises a system for developing a connectivity graph structure based on said initial part information, said cleanup operation system eliminating said extraneous information based on said connectivity graph structure.

105. A system according to claim 104, wherein said extraneous information comprises unconnected line entities, said unconnected line entities relating to, at least, dimension lines.

106. A system according to claim 100, wherein said initial part information comprises type field data for identifying part entity data and extraneous information relating to text, said cleanup operation system eliminating said extraneous information relating to text based on said type field data.

107. A system according to claim 100, wherein said plurality of views comprise a top view, a front view, and a right side view of said part in 2-D coordinate space.

108. A system according to claim 107, wherein said cleanup operation system comprises a system for detecting, based on said initial part information, said representations of said top view, said front view, and said right side view of said part.

109. A system according to claim 100, wherein said part comprises a sheet metal part.

110. A system according to claim 100, wherein said part thickness elimination system comprises a system for prompting a user to identify said part thickness representations to be eliminated in each of said plurality of views and to identify a dimension of said part to be retained in each of said plurality of views.

111. A system according to claim 110, wherein said dimension of said part comprises one of an outside dimension or an inside dimension of said part.

112. A system according to claim 100, wherein said developing system comprises a system for performing a projection operation to develop said representation of said part in 3-D coordinate space based on said modified representations of said part in 2-D coordinate space.

113. A system according to claim 112, wherein said projection operation comprises detecting the relative depths of each of said plurality of views and projecting each of said plurality of views into 3-D coordinate space.

114. A method for developing a bend model of a part to be produced in an intelligent production facility, said system comprising the steps of:
- receiving initial part information relating to said part, said initial part information comprising respective representations of a plurality of views said part in 2-D coordinate space, each of said representations including part thickness representations of said part;
- performing a 2-D cleanup operation on said initial part information to eliminate extraneous information and to identify each of said representations;
- selectively eliminating said part thickness representations in each of said identified representations to provide modified representations of said views of said part in 2-D coordinate space with no thickness; and
- developing a representation of said part in 3-D coordinate space based on said modified representations of said part in 2-D coordinate space with no thickness.

115. A method according to claim 114, wherein said initial part information comprises part entity data representing, at least, line entities of said part, said performing comprising detecting intersection points of said entities and selectively breaking said entities at detected intersection points, said resultant broken entities being assigned to have a common endpoint based on said detected intersection points.

116. A method according to claim 114, said performing comprising detecting open intersection areas between adjacent entities and selectively connecting said adjacent entities by assigning a common endpoint to said adjacent entities.

117. A method according to claim 116, wherein an open intersection area is detected, by said step of detecting open intersection areas, if the endpoints of said adjacent entities are within a predetermined distance from one another.

118. A method according to claim 114, said performing comprising developing a connectivity graph structure based on said initial part information and eliminating said extraneous information based on said connectivity graph structure.

119. A method according to claim 118, wherein said extraneous information comprises unconnected line entities, said unconnected line entities relating to, at least, dimension lines.

120. A method according to claim 114, wherein said initial part information comprises type field data for identifying part entity data and extraneous information relating to text, said performing eliminating said extraneous information relating to text based on said type field data.

121. A method according to claim 114, wherein said plurality of views comprise a top view, a front view, and a right side view of said part in 2-D coordinate space.

122. A method according to claim 121, wherein said performing comprises detecting, based on said initial part information, said representations of said top view, said front view, and said right side view of said part.

123. A method according to claim 114, wherein said part comprises a sheet metal part.

124. A method according to claim 114, wherein said selectively eliminating said part thickness comprises prompting a user to identify said part thickness representations to be eliminated in each of said plurality of views and to identify a dimension of said part to be retained in each of said plurality of views.

125. A method according to claim 124, wherein said dimension of said part comprises one of an outside dimension or an inside dimension of said part.

126. A method according to claim 114, wherein said developing comprises performing a projection operation to develop said representation of said part in 3-D coordinate space based on said modified representations of said part in 2-D coordinate space.

127. A method according to claim 126, wherein said projection operation comprises detecting the relative depths of each of said plurality of views and projecting each of said plurality of views into 3-D coordinate space.

128. A system for developing a bend model of a part to be produced in an intelligent production facility, said system comprising:
- a receiving system for receiving initial part information relating to said part, said initial part information comprising respective representations of a plurality of views said part in 2-D coordinate space, each of said representations including part thickness representations of said part, said initial part information further comprising extraneous information;
- a cleanup operation system that performs a 2-D cleanup operation on said initial part information to eliminate said extraneous information and to identify each of said representations; and
- a system for developing a representation of said part in 3-D coordinate space based on said identified representations of said part in 2-D coordinate space.

129. A system according to claim 128, wherein said initial part information comprises part entity data representing, at least, line entities of said part, said cleanup operation system comprising a break and trimming system for detecting intersection points of said entities and for selectively breaking said entities at detected intersection points, said break and trimming system assigning the resultant broken entities to have a common endpoint based on said detected intersection points.

130. A system according to claim 129, said break and trimming system further comprising a system for detecting open intersection areas between adjacent entities and for selectively connecting said adjacent entities by assigning a common endpoint to said adjacent entities.

131. A system according to claim 130, wherein an open intersection area is detected, by said system for detecting open intersection areas, if the endpoints of said adjacent entities are within a predetermined distance from one another.

132. A system according to claim 128, wherein said part comprises a sheet metal part.

133. A system according to claim 128, wherein said developing system comprises a system for performing a projection operation to develop said representation of said part in 3-D coordinate space based on said identified representations of said part in 2-D coordinate space.

134. A system according to claim 133, wherein said projection operation comprises detecting the relative depths of each of said plurality of views and projecting each of said plurality of views into 3-D coordinate space.

135. A system for developing a bend model of a part to be produced in an intelligent production facility, said system comprising:
- a receiving system for receiving initial part information relating to said part, said initial part information comprising respective representations of a plurality of views said part in 2-D coordinate space, each of said representations including part thickness representations of said part, said initial part information further comprising extraneous information;

a cleanup operation system that performs a 2-D cleanup operation on said initial part information to eliminate said extraneous information and to identify each of said representations; and a system for developing a representation of said part in 3-D coordinate space based on said identified representations of said part in 2-D coordinate space, wherein said plurality of views comprise a top view, a front view, and a right side view of said part in 2-D coordinate space.

136. A system according to claim 135, wherein said cleanup operation system comprises a system for detecting, based on said initial part information, said representations of said top view, said front view, and said right side view of said part.

137. A system for developing a bend model of a part to be produced in an intelligent production facility, said system comprising:

a receiving system for receiving initial part information relating to said part, said initial part information comprising respective representations of a plurality of views said part in 2-D coordinate space, each of said representations including part thickness representations of said part, said initial part information further comprising extraneous information;

a cleanup operation system that performs a 2-D cleanup operation on said initial part information to eliminate said extraneous information and to identify each of said representations; and a system for developing a representation of said part in 3-D coordinate space based on said identified representations of said part in 2-D coordinate space, said system further comprising a part thickness elimination system for selectively eliminating said part thickness representations in each of said identified representations to provide modified representations of said views of said part in 2-D coordinate space with no thickness, said developing system being adapted to develop said representation of said part in 3-D coordinate space based on each of said identified representations of said part.

138. A system according to claim 137, wherein said part thickness elimination system comprises a system for prompting a user to identify said part thickness representations to be eliminated in each of said plurality of views and to identify a dimension of said part to be retained in each of said plurality of views.

139. A system for developing a bend model of a part to be produced in an intelligent production facility, said system comprising:

a receiving system for receiving initial part information relating to said part, said initial part information comprising respective representations of a plurality of views said part in 2-D coordinate space, each of said representations including part thickness representations of said part, said initial part information further comprising extraneous information;

a cleanup operation system that performs a 2-D cleanup operation on said initial part information to eliminate said extraneous information and to identify each of said representations; and a system for developing a representation of said part in 3-D coordinate space based on said identified representations of said part in 2-D coordinate space, said system further comprising a system for performing a 3-D clean-up operation on said representation of said part in 3-D coordinate space to further clean-up and eliminate extraneous information in said representation of said part.

140. A system according to claim 139, wherein said 3-D clean-up operation includes a process for identifying and eliminating one sided open lines that are present in said representation of said part in 3-D coordinate space.

141. A system according to claim 139, wherein said 3-D clean-up operation includes a process for identifying and cleaning each bendline that is present in said representation of said part in 3-D coordinate space.

142. A system according to claim 139, wherein said 3-D clean-up operation includes a process for trimming each face that is present in said representation of said part in 3-D coordinate space.

143. A system for developing a bend model of a part to be produced in an intelligent production facility, said system comprising:

a receiving system for receiving initial part information relating to said part, said initial part information comprising respective representations of a plurality of views said part in 2-D coordinate space, each of said representations including part thickness representations of said part;

a part thickness elimination system for selectively eliminating said part thickness representations in each of said representations to provide modified representations of said views of said part in 2-D coordinate space with no thickness; and a system for developing a representation of said part in 3-D coordinate space based on said modified representations of said part in 2-D coordinate space with no thickness.

144. A system according to claim 143, wherein said initial part information further comprises extraneous information, said system further comprising a cleanup operation system that performs a 2-D cleanup operation on said initial part information to eliminate said extraneous information and to identify each of said representations.

145. A system according to claim 144, wherein said initial part information further comprises part entity data representing, at least, line entities of said part, said cleanup operation system comprising a break and trimming system for detecting intersection points of said entities and for selectively breaking said entities at detected intersection points, said break and trimming system assigning the resultant broken entities to have a common endpoint based on said detected intersection points.

146. A system according to claim 143, wherein said developing system comprises a system for performing a projection operation to develop said representation of said part in 3-D coordinate space based on said modified representations of said part in 2-D coordinate space.

147. A system according to claim 146, wherein said projection operation comprises detecting the relative depths of each of said plurality of views and projecting each of said plurality of views into 3-D coordinate space.

148. A system according to claim 143, wherein said part thickness elimination system comprises a system for prompting a user to identify said part thickness representations to be eliminated in each of said plurality of views and to identify a dimension of said part to be retained in each of said plurality of views.

149. A system according to claim 143, further comprising a system for performing a 3-D clean-up operation on said representation of said part in 3-D coordinate space to further clean-up and eliminate extraneous information in said representation of said part.

150. A system according to claim 149, wherein said 3-D clean-up operation includes a process for identifying and eliminating one sided open lines that are present in said representation of said part in 3-D coordinate space.

151. A system according to claim 149, wherein said 3-D clean-up operation includes a process for identifying and cleaning each bendline that is present in said representation of said part in 3-D coordinate space.

152. A system according to claim 149, wherein said 3-D clean-up operation includes a process for trimming each face that is present in said representation of said part in 3-D coordinate space.

* * * * *

UNITED STATES PATENT AND TRADEMARK OFFICE
CERTIFICATE OF CORRECTION

PATENT NO. : 5,971,589
DATED : October 26, 1999
INVENTOR(S) : K. Hazama, et. al.

It is certified that error appears in the above-indentified patent and that said Letters Patent is hereby corrected as shown below:

On the cover of the printed patent, at Item [56], References Cited, Other Publications, page 2, column 2, line 7, "Pittsburagh" should be —Pittsburgh—.

At column 87, line 27 (claim 7, line 3) of the printed patent, before "3-D" insert —a—.

At column 87, line 31 (claim 8, line 3) of the printed patent, "representing" should be —representation—.

At column 95, line 23 (claim 55, line 3) of the printed patent, "on" should be —one—.

At column 95, line 24 (claim 56, line 1) of the printed patent, "intial" should be —initial—.

At column 94, line 35 (claim 47, line 4) of the printed patent, "operating" should be —operation—.

At column 98, line 28 (claim 70, line 3) of the printed patent, "plane" should be —plane,—.

At column 100, line 25 (claim 81, line 17) of the printed patent, "spaces" should be —space—.

On the cover of the printed patent, at Item [56], References Cited, Other Publications, page 2, column 1, line 16, "Heirarchy" should be —Hierarchy—.

Signed and Sealed this

First Day of May, 2001

Attest:

NICHOLAS P. GODICI

Attesting Officer

Acting Director of the United States Patent and Trademark Office